(12) United States Patent
Neill

(10) Patent No.: US 12,220,872 B2
(45) Date of Patent: Feb. 11, 2025

(54) METHODS AND APPARATUS FOR ADDITIVE MANUFACTURING BASED ON MULTI-DIMENSIONAL BUILD PLATFORMS

(71) Applicant: Advanced Printed Electronic Solutions LLC, New York, NY (US)

(72) Inventor: Richard Neill, Garrison, NY (US)

(73) Assignee: Advanced Printed Electronic Solutions LLC, Fishkill, NY (US)

( * ) Notice: Subject to any disclaimer, the term of this patent is extended or adjusted under 35 U.S.C. 154(b) by 385 days.

(21) Appl. No.: 17/574,330

(22) Filed: Jan. 12, 2022

(65) Prior Publication Data
US 2022/0219401 A1 Jul. 14, 2022

Related U.S. Application Data

(60) Provisional application No. 63/137,396, filed on Jan. 14, 2021.

(51) Int. Cl.
| | | |
|---|---|---|
| *B29C 64/393* | (2017.01) | |
| *B22F 10/85* | (2021.01) | |
| *B22F 12/17* | (2021.01) | |
| *B22F 12/30* | (2021.01) | |
| *B29C 64/209* | (2017.01) | |
| *B29C 64/245* | (2017.01) | |

(Continued)

(52) U.S. Cl.
CPC ............ *B29C 64/393* (2017.08); *B22F 10/85* (2021.01); *B22F 12/17* (2021.01); *B22F 12/30* (2021.01); *B29C 64/209* (2017.08); *B29C 64/245* (2017.08); *B29C 64/295* (2017.08); *B33Y 30/00* (2014.12); *B33Y 50/02* (2014.12)

(58) Field of Classification Search
CPC ... B29C 64/393; B29C 64/209; B29C 64/245; B29C 64/295; B29C 64/194; B22F 10/85; B22F 12/17; B22F 12/30; B22F 12/33; B22F 12/37; B22F 10/00; B33Y 30/00; B33Y 50/02; B33Y 10/00
See application file for complete search history.

(56) References Cited

U.S. PATENT DOCUMENTS

| | | | |
|---|---|---|---|
| 2003/0014398 A1* | 1/2003 | Ohta | .................. G06F 16/9532 |
| 2009/0173443 A1 | 7/2009 | Kozlak et al. | |

(Continued)

FOREIGN PATENT DOCUMENTS

| | | |
|---|---|---|
| CN | 107310149 A | 11/2017 |
| WO | 2019077512 A1 | 4/2019 |

(Continued)

OTHER PUBLICATIONS

Savva et al. "SHREC'17 Track Large-Scale 3D Shape Retrieval from ShapeNet Core55" from "Eurographics Workshop on 3D Object Retrieval (2017)" (Year: 2017).*

(Continued)

*Primary Examiner* — Yuhui R Pan
(74) *Attorney, Agent, or Firm* — McCarter & English, LLP; Dave S. Christensen

(57) ABSTRACT

An additive manufacturing system, a build platform and a method of operating are provided. A method includes receiving data defining a build platform for fabricating a target object using an additive manufacturing system. The method further includes generating the build platform based on the data.

20 Claims, 72 Drawing Sheets

(51) Int. Cl.
  *B29C 64/295* (2017.01)
  *B33Y 30/00* (2015.01)
  *B33Y 50/02* (2015.01)

(56) References Cited

U.S. PATENT DOCUMENTS

| | | | |
|---|---|---|---|
| 2014/0052415 A1* | 2/2014 | Baran | G06F 30/00 703/1 |
| 2015/0137423 A1* | 5/2015 | Ding | B29C 33/306 264/308 |
| 2015/0360421 A1* | 12/2015 | Burhop | G05B 19/4097 700/98 |
| 2016/0031010 A1 | 2/2016 | O'Neill et al. | |
| 2016/0067927 A1 | 3/2016 | Voris et al. | |
| 2016/0375491 A1 | 12/2016 | Swaminathan et al. | |
| 2018/0120817 A1 | 5/2018 | Schwartz et al. | |
| 2018/0126671 A1 | 5/2018 | Wilenski et al. | |
| 2018/0214947 A1* | 8/2018 | Haro Gonzalez | B29C 64/153 |
| 2018/0345649 A1 | 12/2018 | Prakash | |
| 2020/0086580 A1 | 3/2020 | Kohler et al. | |
| 2020/0198233 A1 | 6/2020 | Yang et al. | |
| 2020/0254566 A1 | 8/2020 | Mamrak et al. | |
| 2020/0307087 A1 | 10/2020 | Counts et al. | |
| 2020/0329814 A1 | 10/2020 | Wang et al. | |
| 2020/0353621 A1 | 11/2020 | Li et al. | |
| 2022/0134661 A1 | 5/2022 | Beetz et al. | |
| 2022/0219392 A1 | 7/2022 | Neill | |
| 2022/0219402 A1 | 7/2022 | Neill | |
| 2022/0396347 A1 | 12/2022 | Neill | |
| 2023/0350901 A1 | 11/2023 | Neill | |
| 2024/0181716 A1 | 6/2024 | Neill | |

FOREIGN PATENT DOCUMENTS

| | | |
|---|---|---|
| WO | 2019236074 A1 | 12/2019 |
| WO | 2020/074568 A1 | 4/2020 |

OTHER PUBLICATIONS

Friedrich et al. "A Hybrid Approach for Segmenting and Fitting Solid Primitives to 3D Point Clouds" from "GRAPP 2020—15th International Conference on Computer Graphics Theory and Applications" (Year: 2020).*

International Search Report Issued in International Application No. PCT-US2022-012264 mailed Jun. 8, 2022; 5 Pages.

Written Opinion Issued in International Application No. PCT-US2022-012264 mailed Jun. 8, 2022; 7 Pages.

Du et al., InverseCSG: Automatic Conversion of 3D Models to CSG Trees. ACM Transactions on Graphics. Nov. 2018;37(6):213, 16 pages.

Jurafsky et al., Hidden Markov Models. Speech and Language Processing. Chapter A, pp. 1-17, (2021).

Luo et al., Chopper: Partitioning Models into 3D-Printable Parts. ACM Transactions on Graphics. Nov. 1, 2012;31(5):1-9.

Savva et al., SHREC'17 Track Large-Scale 3D Shape Retrieval from ShapeNet Core55. Eurographics Workshop on #D Object Retrieval. 12 pages, (2017).

Sharma et al., CSGNet: Neural Shape Parser for Constructive Solid Geometry. Cornell University, arXiv:1712.08290. 9 pages, (2019).

Tangelder et al., A Survey of Content Based 3D Shape Retrieval Methods. Proceedings Shape Modeling Applications. 12 pages, Jun. 7-9, 2004.

International Search Report Issued in International Application No. PCT/US2022/012283 mailed Mar. 30, 2022; 2 Pages.

Written Opinion Issued in International Application No. PCT/US2022/012283 mailed Mar. 30, 2022; 7 Pages.

Xiao et al., Process planning for five-axis support free additive manufacturing. Additive Manufacturing. 2020;36:101569, 14 pages.

U.S. Appl. No. 17/574,326, filed Jan. 12, 2022, 2022-0219392, Published.

U.S. Appl. No. 17/574,331, filed Jan. 12, 2022, 2022-0219402, Published.

* cited by examiner

METHODS AND APPARATUS FOR ADDITIVE MANUFACTURING BASED ON MULTI-DIMENSIONAL BUILD PLATFORMS

CROSS-REFERENCE TO RELATED APPLICATIONS

The present application claims the benefit of and is a Nonprovisional Application of U.S. Provisional Application Ser. No. 63/137,396 filed on Jan. 14, 2021, the contents of which are incorporated herein by reference in their entirety.

BACKGROUND OF THE DISCLOSURE

The subject matter disclosed herein relates to additive manufacturing methods and systems for fabrication of complex multi-dimensional objects, parts, assemblies, and structures.

Current additive manufacturing systems include fused filament fabrication (FFF)/fused deposition modeling (FDM), stereolithography (SLA), selective laser sintering (SLS), digital light projector (DLP) printers, paste or aerosol jet, and direct metal laser melting (DMLS) deposition technologies, one or more robotic actuators, and other tools for depositing multi-materials such as structural or functional thermoplastics, resins and metals, solid or flexible, conductive and insulating inks, pastes and other nano-particle materials; tools for sintering, aligning/measuring, ablation, milling, drilling, and component pick-and-place tools for placement of components such as electronic, electro-mechanical, or mechanical devices. All of these processes generally rely on planar build plate geometries as shown in FIG. 1A and FIG. 1B for example, which are suitable for common additive manufacturing systems. A typical additive manufacturing system includes a planar build plate 100 that lies in a plane of the X and Y axes. The system includes one or more extruders that deposit a layer of material and then either the build plate 100, or the extruder, moves in the Z direction and a subsequent layer of material is deposited. This process is repeated until the target object is formed.

Generally, the deposited material forms either the target object, or is support material for the target object. It should be appreciated that when the target object has features, such as overhangs or hollow areas for example, the printer system may deposit material for the purpose of providing a surface to deposit the material of the feature and support the feature. This support structure is subsequently removed by the operator during post-processing. It should be appreciated that the material deposited for the support structure increases the part cost (more material used) and also slows down the fabrication process.

The target objects are fabricated, layer-by-layer in the Z axis by the extruder in accordance with execution of program instructions (i.e. G-code). In some applications the material selection uses a heated build plate (sometimes referred to hotbed) for material adhesion during extrusion or tool operations. The selection of an extruder (and any other tools), the movement of the extruder, and control of the build plate temperature profile are typically performed on a computer using software. Typically, an additive manufacturing system uses a CAD/CAM system in conjunction with a slicer software module. The software inputs a CAD model of the target object and generates the control instructions to the additive manufacturing system. This is code is typically represented in the G-code software language, however other software languages for additive manufacturing system control may be used.

Given the increasing utilization of additive manufacturing systems it is desirable to fabricate increasingly complex geometries, comprising multiple material characteristics with associated multiple operations and tools within the fabrication process. As a result additive manufacturing systems that expand beyond a 3-axis (X,Y,Z) range of motion have been proposed to include to 4-to-9-axis systems. These multi-axis systems overcome some of the geometrical fabrication and support for multiple tool positioning limitations of the 3-axis based additive manufacturing systems.

The use of planar build plate 100, 150 geometries within additive manufacturing systems had become less efficient and limited when used with multi-axis additive manufacturing systems especially as the number of tool axes increases. This is evident in cases where an additive manufactured object uses multiple tools that support movement and deposition positioning across complex trajectories such as curved or non-linear surface geometries and tool paths with material over-hangs that use support structures. Such challenges are compounded when additional materials and tools processes are used. Solutions to these challenges results in increasing requirements in terms of additional number of geometric tool axes, the complexity and amount of support materials, tool-path complexity, and limitations in material options. These increased requirements result in increased build time and need for additional additive manufacturing system processes and workflows. Further such limitations become increasingly challenging as the size, complexity, and functionality of the target object geometry increases.

Collectively, the challenges described lead to difficulty, and in some cases intractability, in the fabrication of objects such as those containing novel material characteristics. More generally, this results in increased production time and cost associated with the fabrication of products, components, parts, structures, and assemblies across a large class of additive manufacturing systems.

Accordingly, while existing additive manufacturing systems are suitable for their intended purposes the need for improvement remains, particular in providing an additive manufacturing system having the features described herein.

BRIEF DESCRIPTION OF THE DISCLOSURE

According to one aspect of the disclosure a method is provided. The method includes receiving data defining a build platform for fabricating a target object using an additive manufacturing system. The method further includes generating the build platform based on the data.

In addition to one or more of the features described herein, or as an alternative, further embodiments of the method may further include determining whether an existing build platform model that satisfies the data defining the build platform is stored in a build platform model database by comparing the data defining the build platform to model data stored in the database.

In addition to one or more of the features described herein, or as an alternative, further embodiments of the method may further include, responsive to determining that an existing build platform model that satisfies the data defining the build platform is stored in the build platform model database, implementing the existing model to generate the build platform, wherein the build platform is generated based on the existing build platform model.

In addition to one or more of the features described herein, or as an alternative, further embodiments of the method may further include, responsive to determining that no existing build platform model that satisfies the data defining the build platform is stored in the build platform model database, generating a new build platform model based on the data, wherein the build platform is generated based on the new build platform model.

In addition to one or more of the features described herein, or as an alternative, further embodiments of the method may further include storing the new build platform model in the build platform model database.

In addition to one or more of the features described herein, or as an alternative, further embodiments of the method may further include that the new build platform is generated by performing a first analysis to generate a first rendering using a predictive pipeline, performing a second analysis to generate a second rendering using a generative pipeline to generate a second rendering, and scoring the first rendering and the second rendering to generate final geometry data.

In addition to one or more of the features described herein, or as an alternative, further embodiments of the method may further include improving the predictive pipeline using a virtual pipeline, wherein the virtual pipeline implements aspects of the generative pipeline and the predictive pipeline.

In addition to one or more of the features described herein, or as an alternative, further embodiments of the method may further include generating a search vector that is used to search the build platform model database.

In addition to one or more of the features described herein, or as an alternative, further embodiments of the method may further include that the search vector is generated based at least in part on a target object unified geometry and attribute dataset and a multi-dimensional build platform unified geometry and feature/functional training/predefined dataset.

In addition to one or more of the features described herein, or as an alternative, further embodiments of the method may further include that the search vector includes a geometry vector and a fabrication vector.

In addition to one or more of the features described herein, or as an alternative, further embodiments of the method may further include that the geometry vector is generated by performing a multi-dimensional geometry analysis, and wherein the fabrication vector is generated by performing a multi-dimensional object parametric fabrication feature/functional analysis.

In addition to one or more of the features described herein, or as an alternative, further embodiments of the method may further include that at least one of the multi-dimensional geometry analysis or the multi-dimensional object parametric fabrication feature/functional analysis is performed using a neural network.

In addition to one or more of the features described herein, or as an alternative, further embodiments of the method may further include that the data defining the build platform is one or more of target object computer aided design (CAD) model data, target object scan data, a target object image, or a user generated multi-dimensional build platform CAD model.

In addition to one or more of the features described herein, or as an alternative, further embodiments of the method may further include determining whether the build platform fits within a usable fabrication volume of the additive manufacturing system, and responsive to determining that the build platform does not fit within the usable fabrication volume of the additive manufacturing system, partitioning the build platform.

In addition to one or more of the features described herein, or as an alternative, further embodiments of the method may further include that the build platform includes: an interface section configured to couple with the additive manufacturing system; a base section coupled to the interface section; and a build volume section having at least one layer of plurality of individually addressable elements, at least one of the plurality addressable elements including at least one of a feature characteristic or functional characteristic.

In addition to one or more of the features described herein, or as an alternative, further embodiments of the method may further include performing geometry processing on the data defining the build platform, and performing feature and functional metadata processing on data about the target object or an additive manufacturing system profile.

In addition to one or more of the features described herein, or as an alternative, further embodiments of the method may further include the feature and functional metadata processing is further based on information used to search or implement a new build platform.

In addition to one or more of the features described herein, or as an alternative, further embodiments of the method may further include that the geometry processing generates a target object unified geometry and attribute dataset.

In addition to one or more of the features described herein, or as an alternative, further embodiments of the method may further include that the feature and functional metadata processing generates a fabrication portion of a multi-dimensional build platform unified geometry and feature/functional training/predefined dataset.

In addition to one or more of the features described herein, or as an alternative, further embodiments of the method may further include manufacturing, using the additive manufacturing system, the build platform, and manufacturing, using the additive manufacturing system, the target object using the manufactured build platform.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIG. 5O is a perspective view of a planar build volume section comprised of a plurality of layers wherein the individually addressable elements may be defined to have different features, functions sizes and shapes;

Figure 41:
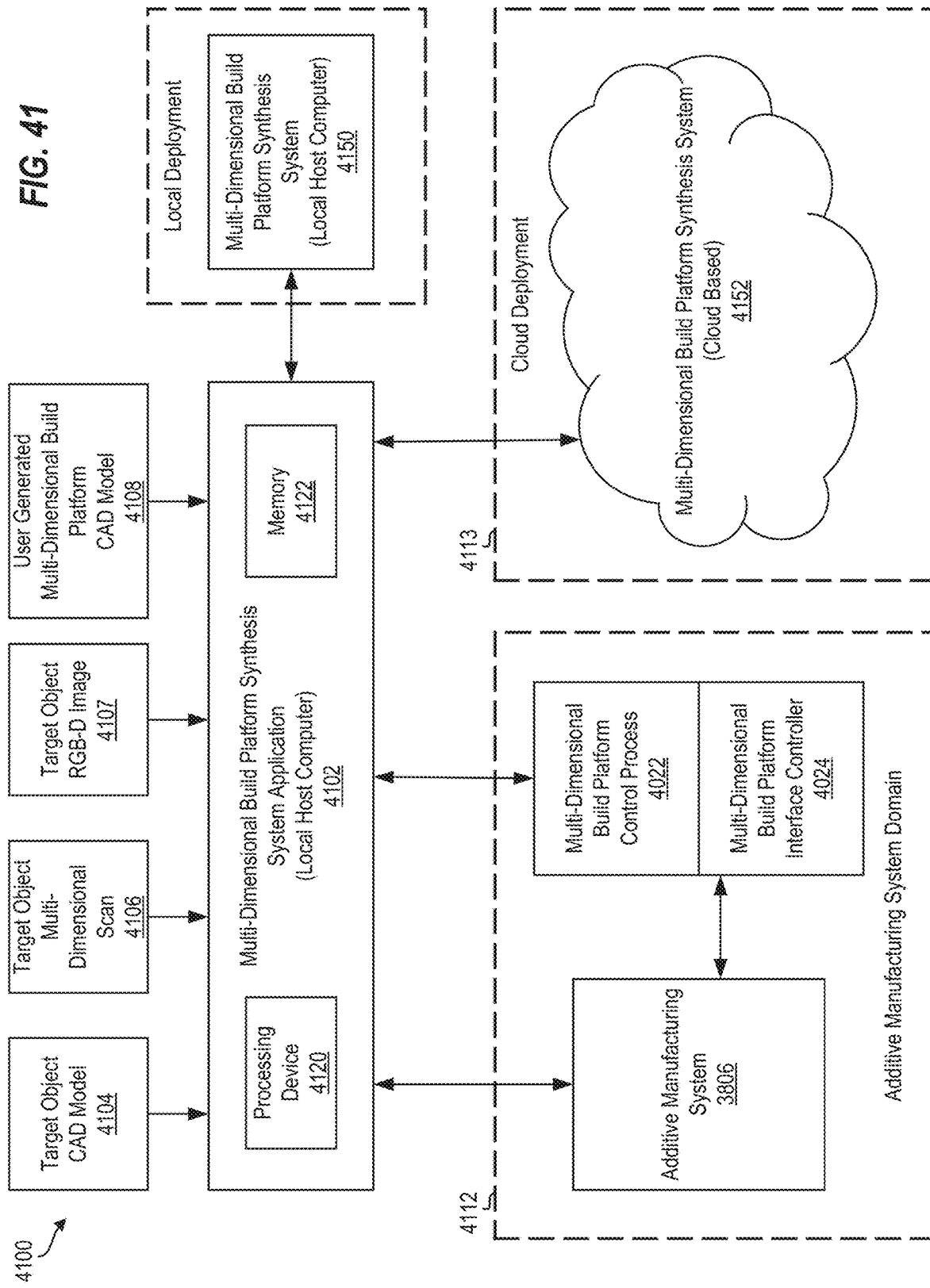
Figure 42A:
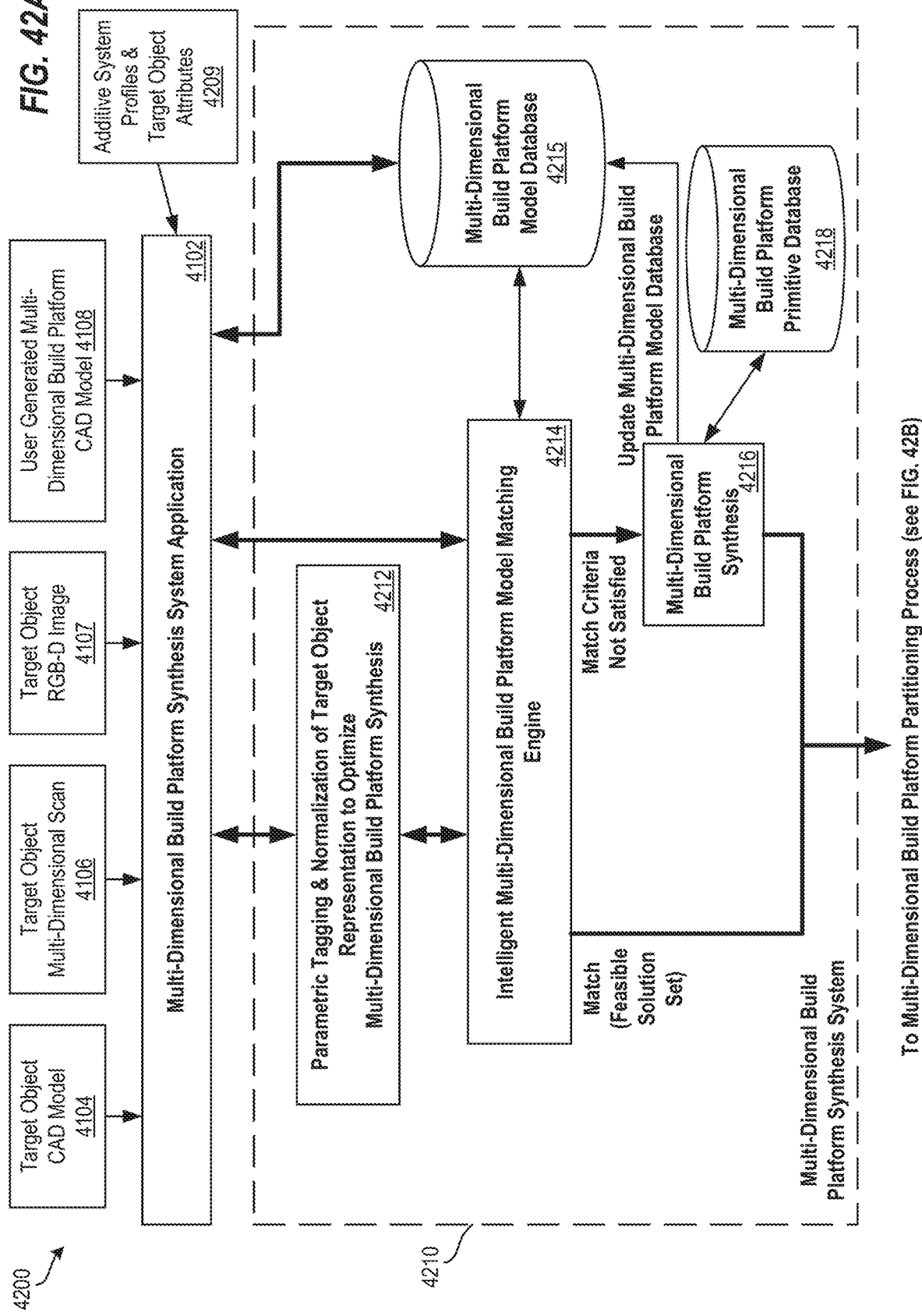
Figure 42B:
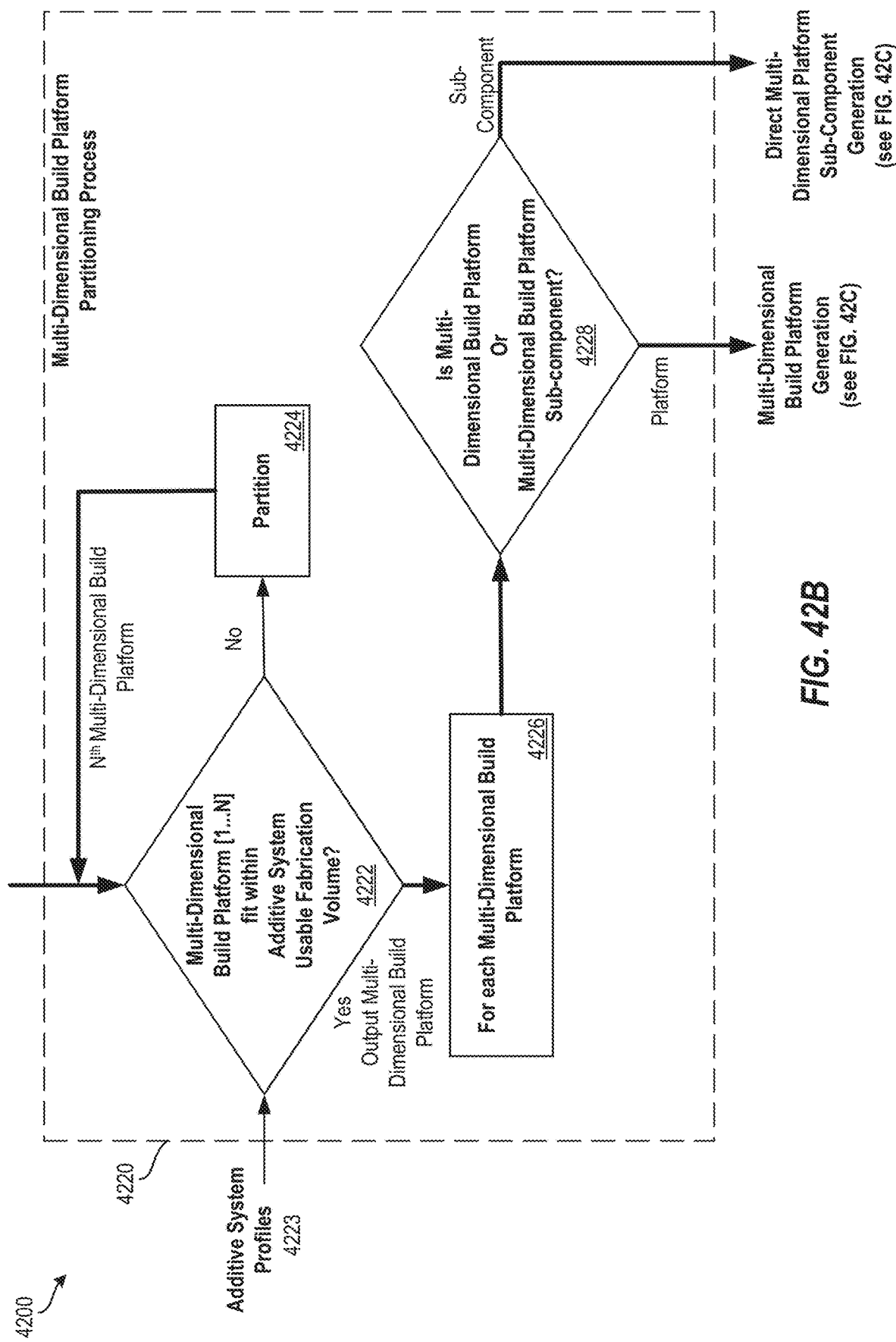
Figure 42C:
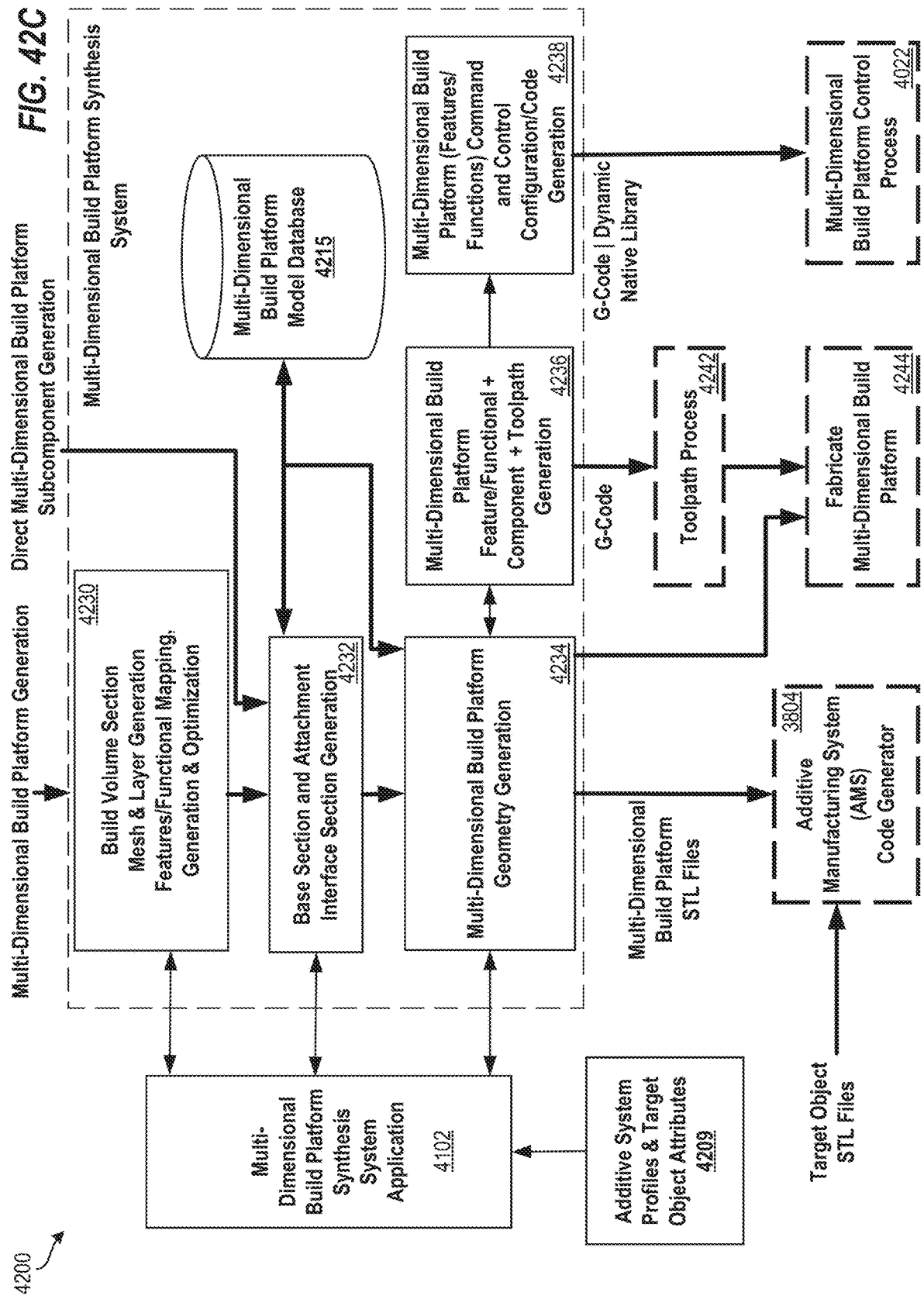
Figure 43A:
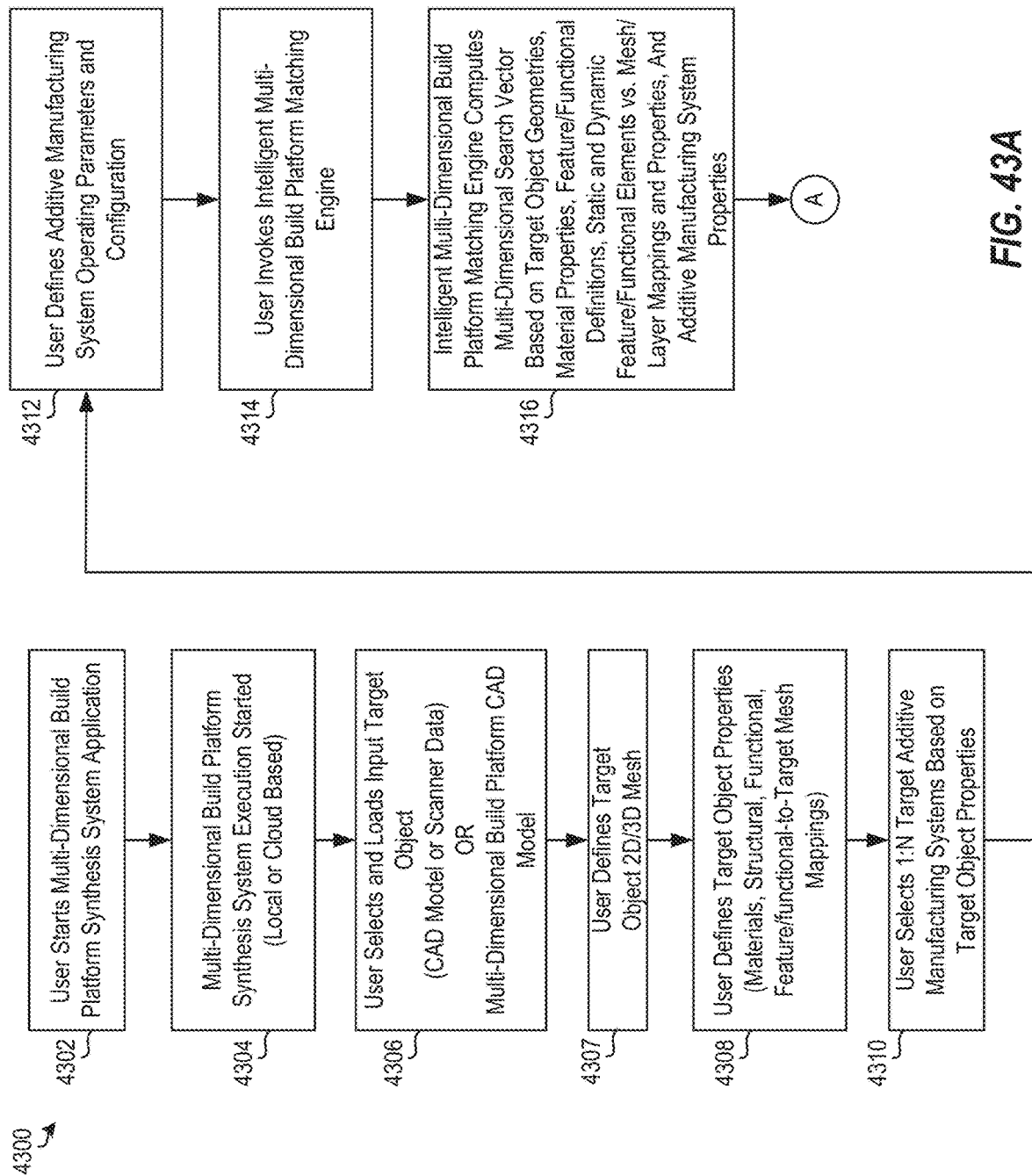
Figure 43B:
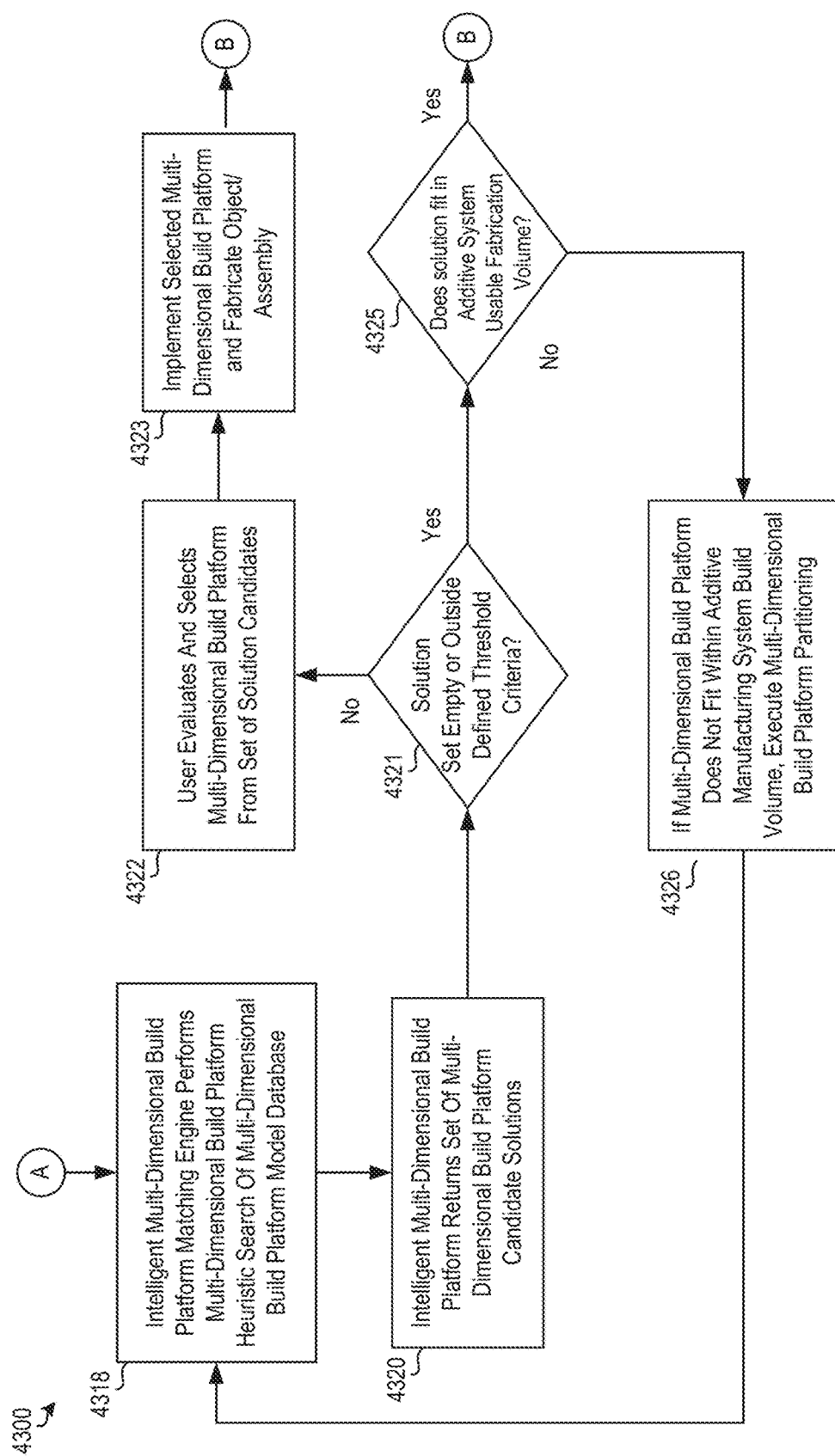
Figure 44:
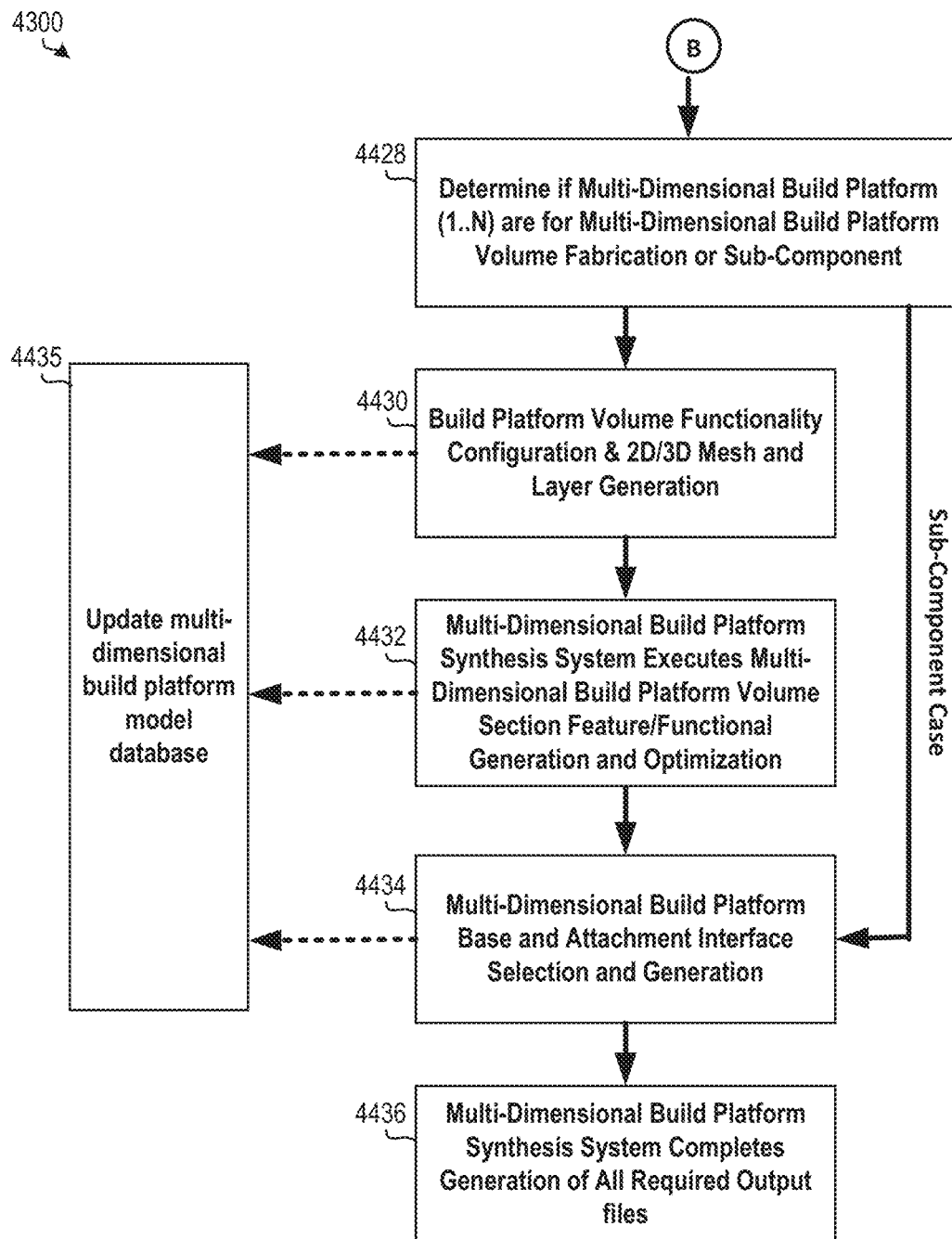
Figure 45:
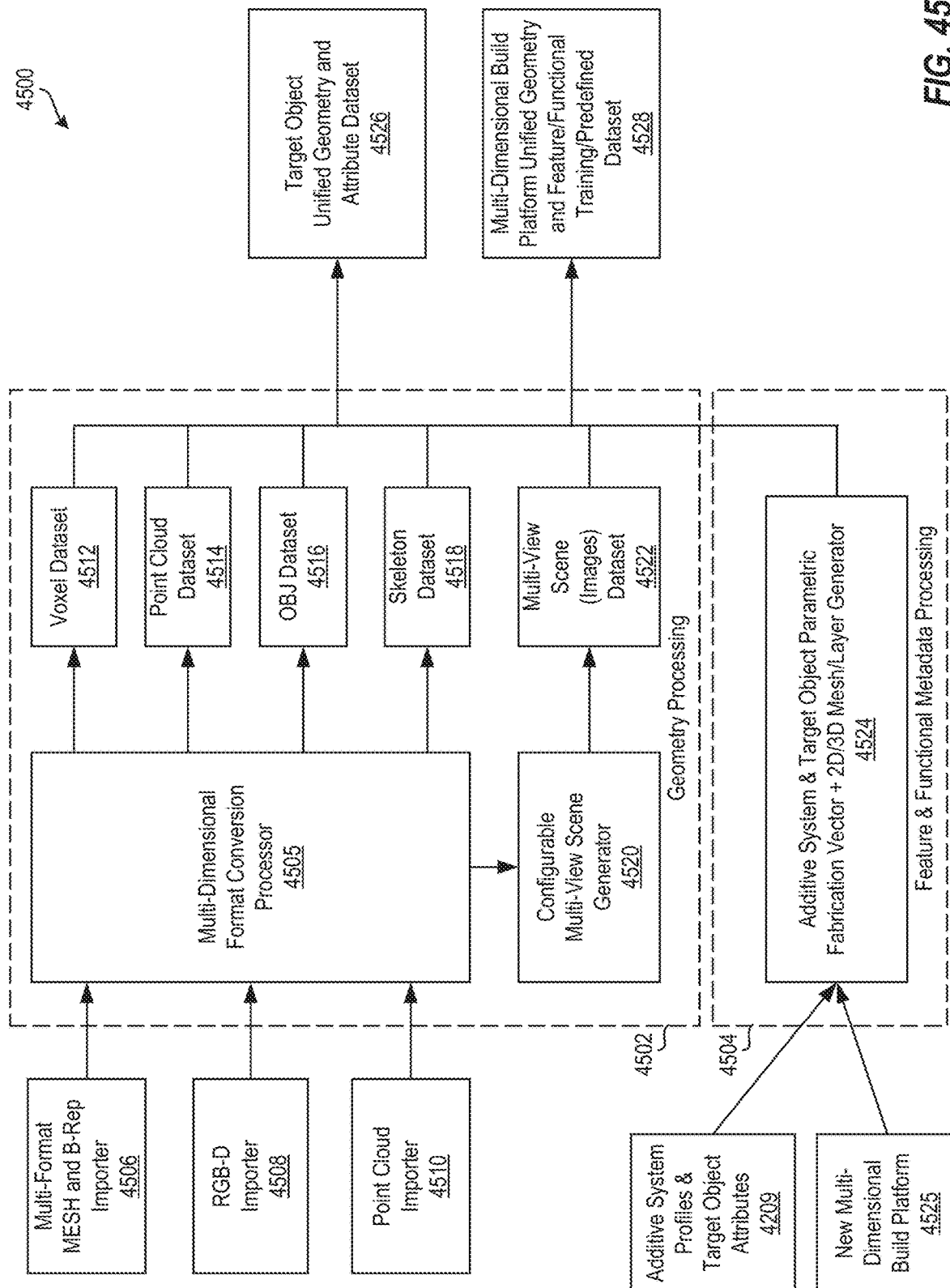
Figure 46:
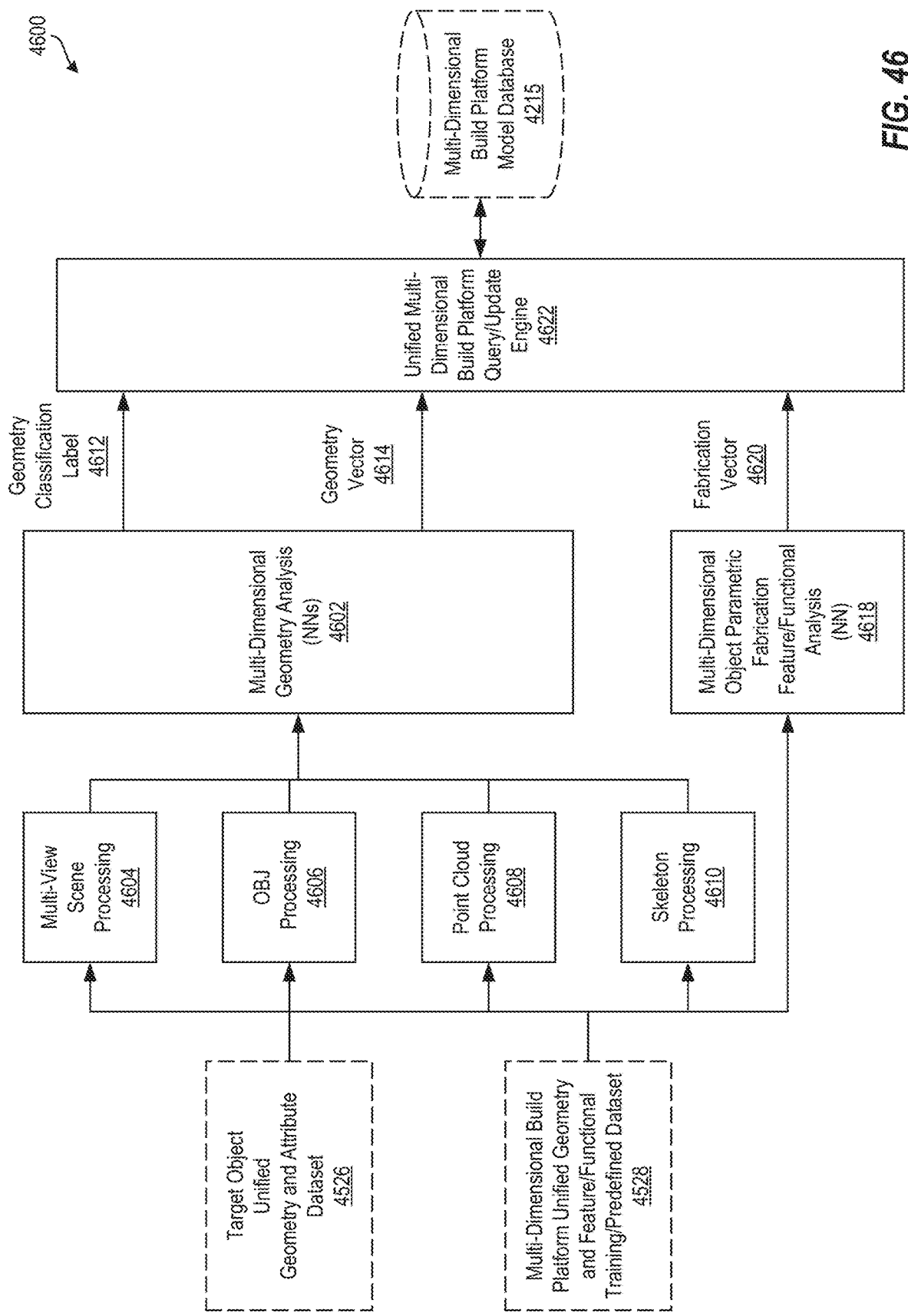
Figure 47:
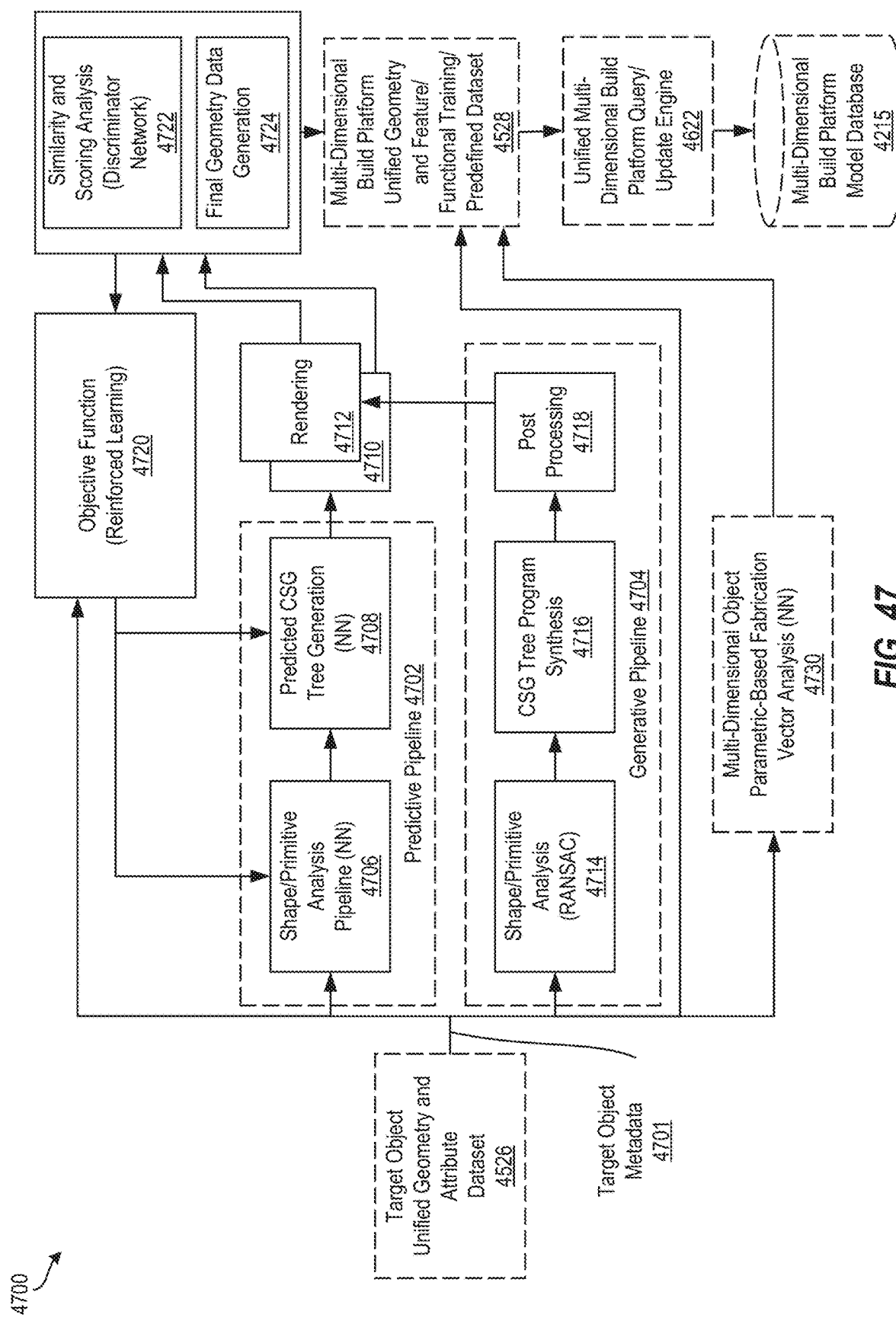

40B is a flow diagram of a method for fabricating an object or an assembly using a planar build platform modified with one or more embodiments of a multi-dimensional build platform in accordance with one or more embodiments;

FIG. 41 is a block diagram of a system for performing multi-dimensional build platform synthesis and additive manufacturing fabrication according to one or more embodiments;

FIGS. 42A-42C are flow diagrams of a method for selecting or fabricating a multi-dimensional build platform according to one or more embodiments;

FIGS. 43A, 43B, and 44 are flow diagrams of methods for user interaction and operation of the multi-dimensional build platform programmatic synthesis and generation system;

FIG. 45 is a flow diagram illustrating ingestion of multiple target object representations and their respective transformations utilizing methods for format conversion, parametric tagging, and normalization of target object representation to optimize multi-dimensional build platform synthesis according to one or more embodiments;

FIG. 46 depicts a flow diagram of a method for determining whether an existing multi-dimensional build platform model exists according to one or more embodiments; and FIG. 47 is a flow diagram of a method for creating a build volume section geometry using build volume section geometry synthesis in accordance with an embodiment.

The detailed description explains embodiments of the disclosure, together with advantages and features, by way of example with reference to the drawings.

DETAILED DESCRIPTION OF THE DISCLOSURE

Embodiments herein are directed to additive manufacturing and in particular to an additive manufacturing system having a multi-dimensional build platform. The multi-dimensional build platform allows for fabrication across a build platform geometry with multiple degrees of freedom, such as x, y, z, roll, rotation, pitch and/or yaw as well as fabrication of complex objects requiring dynamic properties of the multi-dimensional build platform including additional dimensions such as temporal, energy, information, physical parameters, chemical characteristics, organic and inorganic, or a combination thereof (representing features or functional capabilities of the multi-dimensional build platform) that can vary in time in a fully dynamic manner Embodiments of the present disclosure provide advantages that includes reduction of cost and/or production time in additive manufacturing. Embodiments of the present disclosure provide further advantages in the reduction or elimination of traditional support material. Embodiments of the present disclosure provide further advantages in the fabrication of objects, parts, assemblies, sub-assemblies, or other structures (collectively referred to as a "target object") whose composition, properties and behavior comprise properties that would otherwise be intractable to achieve utilizing contemporaneous additive manufacturing systems and build platform technology.

For convenience, the following terms build volume section, base section, and attachment interface section may be referred to as build volume, base, and attachment interface respectively. The term multi-dimensional build platform may also be referred to as build platform herein.

Figure 2A:
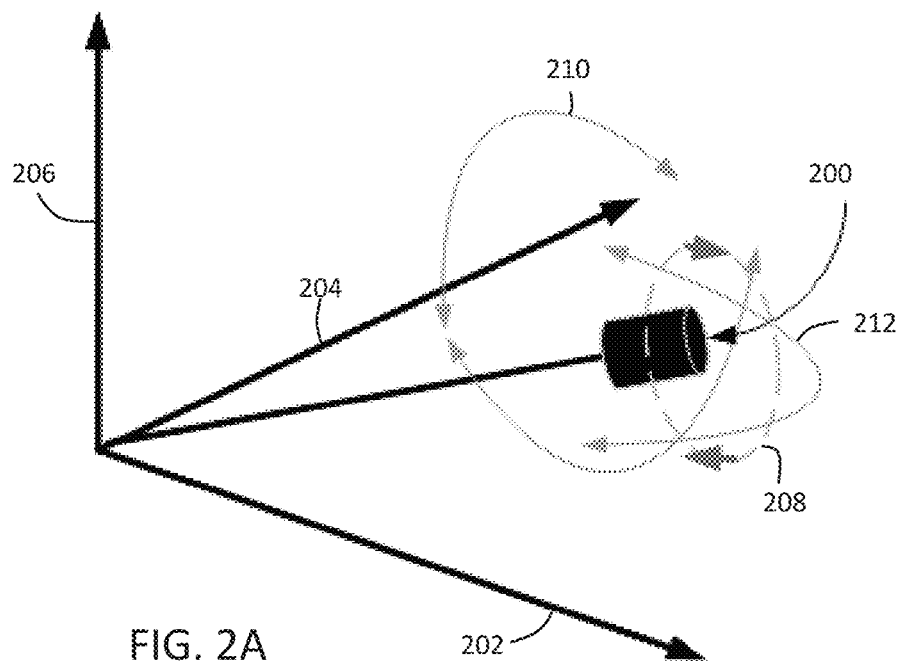
FIG. 2A illustrates a conceptual 3-dimensional space additionally depicting pitch, yaw and rotation, that the multidimensional build platform operates within.
Figure 2B:
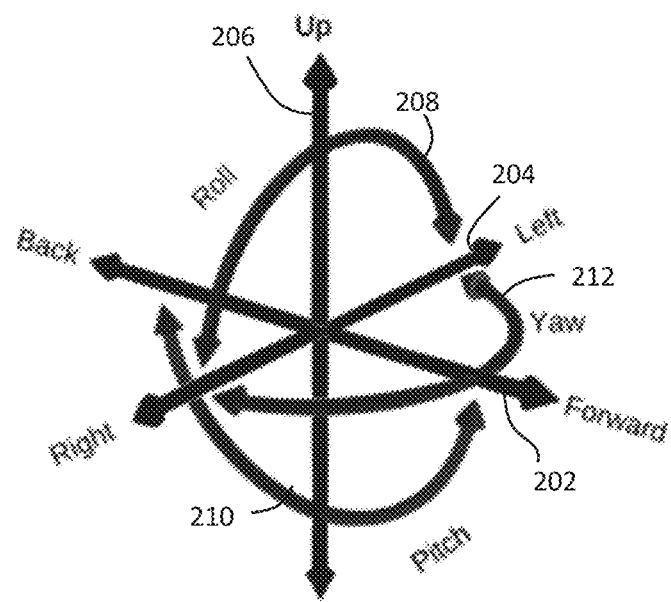
FIG. 2B illustrates a tool and/or multiple tools with movement within multiple degrees of freedom or multiple axes in a multi-dimensional space in accordance with an embodiment.
Figure 3A:
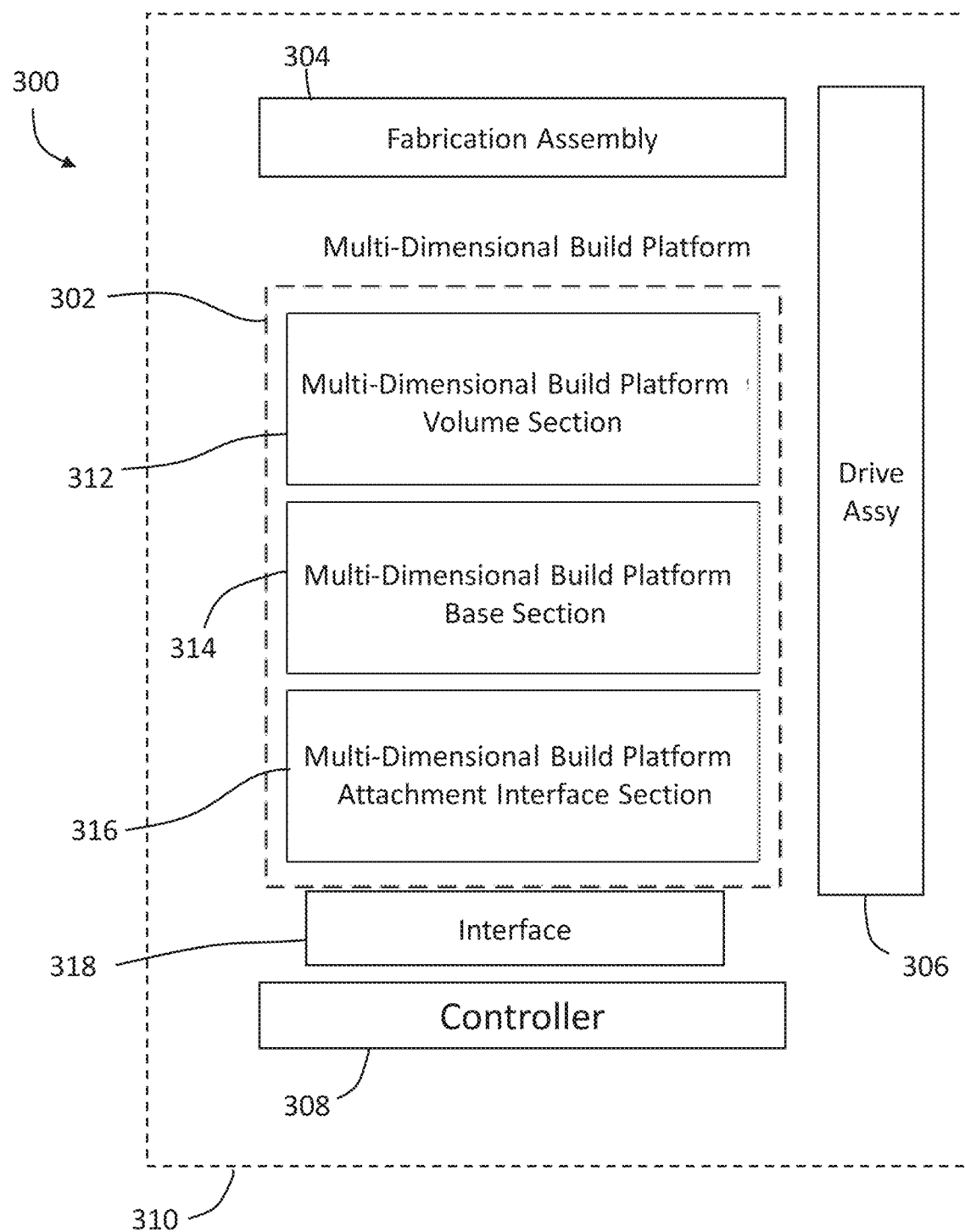
FIG. 3A illustrates a block diagram embodiment describing the multi-dimensional build platform in terms of three different regions or sections in accordance with an embodiment.

Referring to FIGS. 2A, 2B and FIG. 3A, an additive manufacturing system 300 is provided that includes a multi-dimensional build platform 302, a fabrication assembly 304, a drive assembly 306 and a controller 308. The components of the system 300 may be coupled by a frame or enclosure 310. As discussed in more detail herein, the multi-dimensional build platform 302 is positioned in a three-dimensional space 200 and material may be deposited or added to the multi-dimensional build platform 302 to form the target or fabricated object. It should be appreciated that while embodiments herein may refer to three-dimensional space, it should be appreciated that the systems and methods described herein may be applied to a two-dimensional space without deviating from the teachings contained herein.

In an embodiment, the three-dimensional space 200 may be defined in terms of an x-axis 202, a y-axis 204 and a z-axis 206. The 3D space 200 may further be defined in terms of a roll angle 208, pitch angle 210, or yaw angle 212. The multi-dimensional build platform 302 may also be positioned in 3D space and functional tool operations may be performed to the multi-dimensional build platform 302 to fabricate additional features and structures (mechanical, electromechanical, electronic components, devices, and systems, conductive circuitry, microfluidic, as non-limiting embodiments) to the target or fabricated object in the exemplary embodiment, the multi-dimensional build platform 302 defines one or more surfaces that extend in three-dimensional space. The multi-dimensional build platform 302, the fabrication assembly 304, or a combination thereof may be moved in three or more degrees of freedom 202, 204, 206, 208, 210, 212 (FIG. 2A, FIG. 2B). In an embodiment, the system can operate with any combination of six-degrees of freedom (X, Y, Z, Roll, Pitch, Yaw) as illustrated and inclusive of nine-degrees of freedom.

In an embodiment the multi-dimensional build platform 302 may also be positioned to operate in a horizontal position as to emulate existing prior-art planar build platforms but with enhanced capabilities as described by the embodiments herein.

The fabrication assembly 304 may include any suitable additive manufacturing material handling unit, such as but not limited to an extruder for example. The type of material depositing device used in fabrication assembly 304 used will depend on the type of additive manufacturing system used, such as fused filament fabrication (FFF), fused deposition modeling (FDM), stereolithography (SLA), material or binder jetting, selective laser sintering (SLS), digital light projector (DLP), or direct metal laser sintering (DMLS) and other powder bed fusion methods. It should be appreciated that the multi-dimensional build platform 302 may be used in any known additive manufacturing system that is capable of operating in multiple dimensions (e.g., three or more degrees of freedom). The assembly may further include tools or systems used for fabricating the target object. These tools or systems may include but are not limited to: ink deposition systems (including nano-scale inks), aerosol jet systems, paste deposition and dispensing systems, optical or laser alignment tools, curing tools, sintering tools, surface energy tools, milling tools, cutting tools, pick and place tools, and laser ablation systems for example. It should be appreciated that while embodiments herein may refer to the deposition of plastic or powdered-metal materials, this is for example purposes and the claims should not be so limited. In other embodiments, the systems and methods disclosed herein may be applied to inorganic and/or organic materials including materials (such as biomolecular or biomaterials) used in additive manufacturing processes that are sometimes referred to as "bioprinting."

It should be appreciated that the fabrication assembly 304 may include both additive manufacturing and subtractive manufacturing functionality to form the target object. For example, the fabrication assembly 304 may generate an initial form of the target object using additive manufacturing, then remove material (e.g., using a drill or end-mill) such as to form a pocket, and then place a sub-assembly (e.g., a circuit or a sensor) into the pocket using a pick and place tool.

In an embodiment, the geometry, characteristics, properties and functionality of the object to be fabricated (i.e., the target object) may be defined based on a specification and associated set of requirements as input typically defined by a Computer Aided Design (CAD) system or some other generative specification such as a 3D scanner or camera system or combinations of such tools and design systems. The output of such systems the object to be fabricated is typically described in surface or volumetric formats including but not limited to mesh, boundary-representations, volumetric, formats based on constructive geometry methods and operations, and point-clouds, any of which represent the target object. Embodiments of the present disclosure describe methods and systems for implementing the desired multi-dimensional build platform appropriate for fabricating the target object given the additive manufacturing systems capabilities.

In an embodiment, the drive assembly 306 is an articulated robotic arm that moves the fabrication assembly 304 relative to the multi-dimensional build platform 302. It should be appreciated that in other embodiments, other types of device assemblies may be used. For example, one or more robotic arms or actuators can coordinate multiple drive assembly units 306 and multi-dimensional build platforms 302 in an integrated cluster or network of fabrication systems operating in a coordinated manner. The fabrication system network comprising multiple multi-dimensional build platforms 302 (where each multi-dimensional build platform, in the network of multiple multi-dimensional build platforms, supports fabrication of a complete or partial target object assembly, sub-assembly or component) providing the advantage of further increases in production velocity or complexity of the target object and reduced manufacturing or product costs. The robotic arm and multiple multi-dimensional build platform fabrication system are for example purposes and the claims should not be so limited.

In an embodiment, the multi-dimensional build platform 302 includes three sections that may be formed as separate components that are coupled together, or integrally formed, depending on an embodiment as further described within the application disclosure. These sections include a build volume section 312, a base section 314 and an attachment interface section 316.

In contrast to the planar build plate 100, 150 (also known as build-plate, hotbed, printer bed, or print surface) in prior art systems, a multi-dimensional build platform 302 may take on a plurality of geometries including both linear and non-linear or curved surfaces or volumes across multiple dimensional axes. The build platform supports the use of complex material deposition or extruders, sintering, lasers, tools, actuators, additive manufacturing system platform movements (such as rotational, tilt, pitch, yaw, roll, X-Y-Z, spherical, Euler angles, and other axes of movement and their respective representations or transformations) within the capabilities supported by a multi-axis additive manufacturing system. A multi-axis additive manufacturing system supports tools and tool path orientations in arbitrary 3D space. It should be appreciated that prior art additive manufacturing systems include tools that operate normal to a Z-axis relative to a planar build plate 100, 150. This is difference from systems described herein that use the multi-dimensional build that provide for a potentially infinite set of multi-dimensional build platforms that can be synthesized to allow fabrication of the desired target object.

In an embodiment, the multi-dimensional build platform may emulate an existing/prior-art build platform. In other embodiments, as discussed in more detail herein, the multi-dimensional build platform may be an existing/prior-art build platform, such as that originally provided with the additive manufacturing system, that has been upgraded or modified to include the desired functional characteristics to fabricate the target object.

The build volume section 312, which is described in more detail with respect to FIGS. 5A-FIG. 23, comprises the build platform surface or volume region where additive fabrication processing occurs in terms of sequential/multiple material deposition, functional and structural fabrication operations. In this section, additive manufacturing system tools are utilized for fabricating some target object in accordance with the tools and their respective operational characteristics within the additive manufacturing system. As used herein the multi-dimensional nature of the build volume section 312 is an intelligent and reconfigurable system that may be in dimensions that include physical space, temporal, energy, information, physical parameters, or a combination thereof that can vary in time in a fully dynamic manner.

Below the build volume section 312, the second section is provided that includes a base section 314. The base section 314 is not included in the fabrication process, but rather is utilized to provide functionality support of the implementation of the given multi-dimensional build platform 302

Figure 1A:
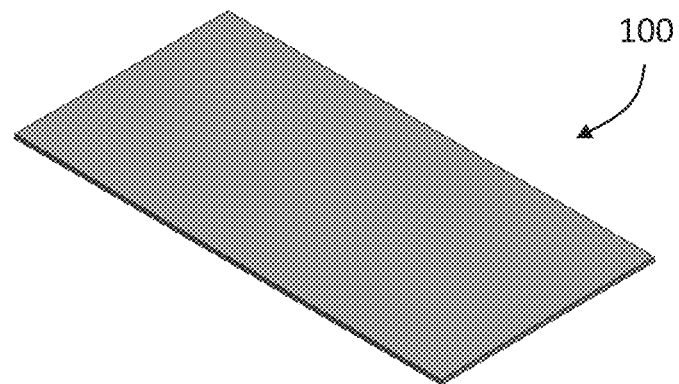
FIG. 1A is a perspective view of a prior art planar build platform.
Figure 1B:
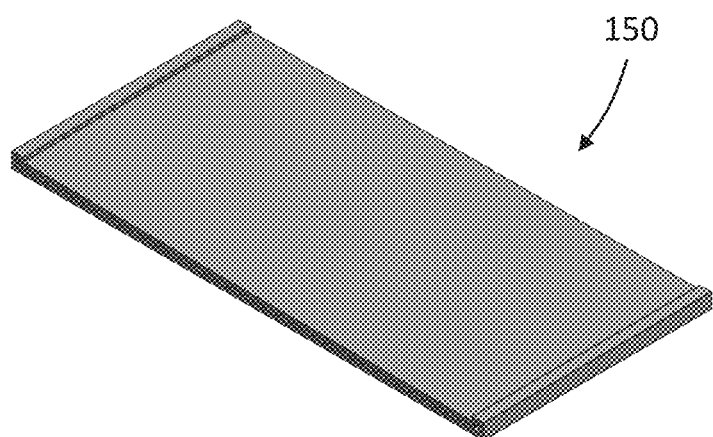
FIG. 1B is a perspective view of a prior art planar build platform with side attachment brackets or clips in a variety of locations for typical additive manufacturing system.

(specifically, the build volume section 312 and a subsystem for integration to the additive manufacturing system controller) as discussed in more detail herein. A prior art base section 314 is shown in FIG. 1A and FIG. 1B. The base section 314 may be configured in a variety of categories, such as but not limited to square, rectangular and circular base sections. The third section, located adjacent to or underneath the base section 314, is an attachment interface section 316 that secures the first two sections 312, 314 of the multi-dimensional build platform 302 to the additive manufacturing system 300 platform interface 318. The base section 314 and attachment interface section 316 may vary in implementation in accordance with the configuration of the build volume section 312 as described and illustrated herein.

The multi-dimensional build platform 302 may be either dynamically synthesized programmatically, such as where a new build platform is desired; or otherwise, reusable based on a library of pre-existing build platforms implemented during previous synthesis operations. In this embodiment, each newly created build platform is stored in a build platform model database for reusability across new additive fabrication scenarios. The model database and other components of the build platform software platform are collectively referred to multi-dimensional build platform synthesis system. It should be appreciated that in accordance with the embodiments described herein, a user defined multi-dimensional build platform may also be implemented, utilized, and stored for reuse in the model database.

Figure 3B:
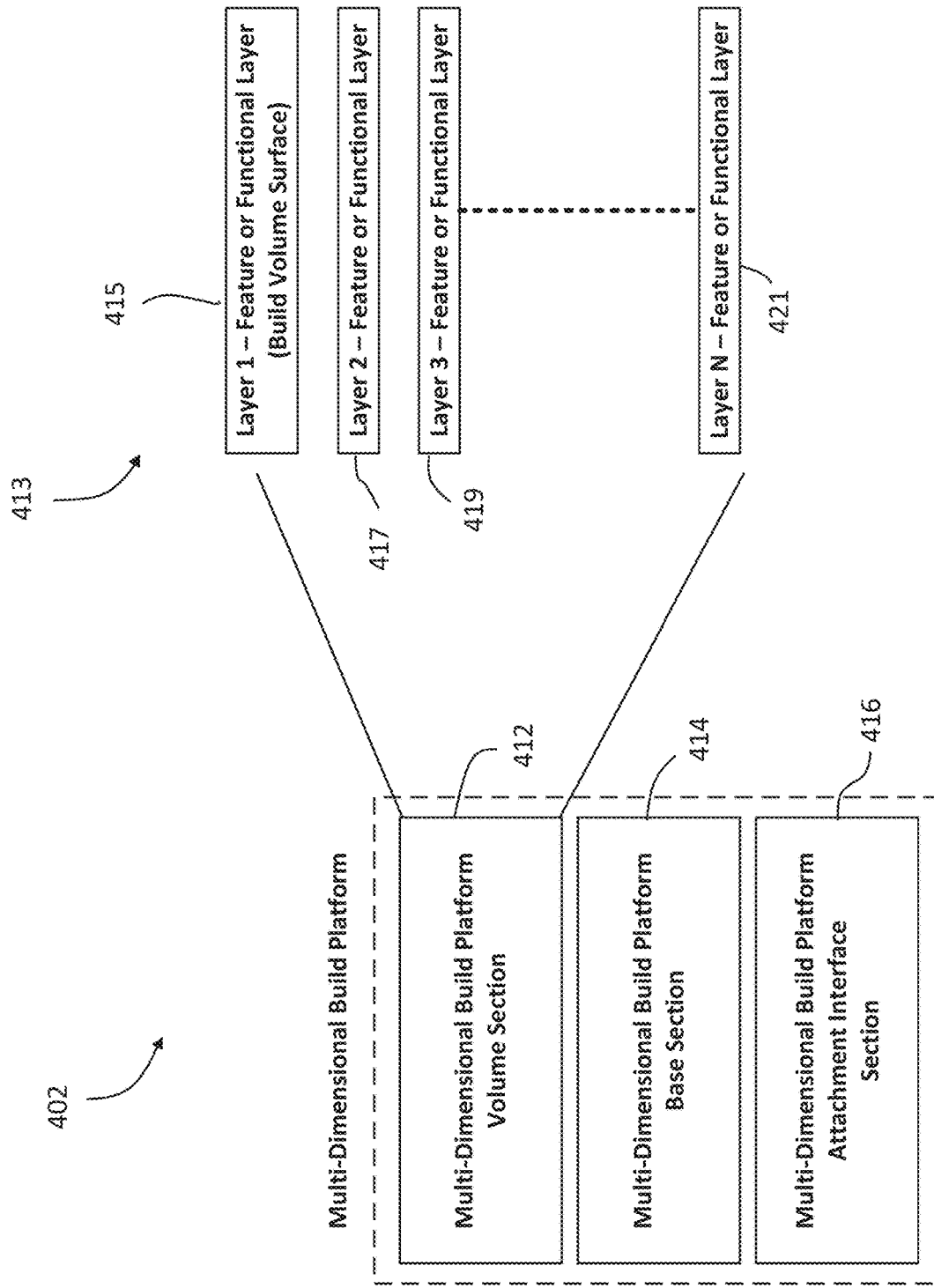
FIG. 3B is a schematic illustration of the multi-dimensional build platform in accordance with another embodiment.

Referring now to FIG. 3B, in an embodiment, a build platform 402 may be provided that includes a build volume section 412, a base section 414, and an attachment interface section 416. In this embodiment, the build volume section 412 may be comprised of a plurality of feature or functional layers 413. As discussed in more detail herein, where multiple features of functions may be configured and reside on a given layer; and further, a feature or function is mapped to one or more independent and addressable elements are organized in a mesh structure defined for the given layer. As used herein, features may be properties like surface energy, material, properties and characteristics. Features may be defined as a matrix of properties as rows and attributes/values as columns. e.g. $F_{ijk}$ where F is the feature type (e.g. as described with respect to FIG. 5A and FIG. 5B). Functions, on the other hand, may be more complex, incorporating devices such as coils, optical elements, or other mechanisms that can define gradients (gradient operator), time varying, function of multiple variables or events.

The top most layer 415 directly faces the additive manufacturing tools (e.g., an extruder) and may be a surface layer defined by the build volume section 412 geometry. The properties of this layer 415 are defined to facilitate deposition by the tools of the additive manufacturing system and/or the required properties of the materials deposited by the additive manufacturing system. For example, the material properties of layer 415 may be configured for tool deposition of printable materials, can accept a thin adhesive layer, tape, or comprise a material structure that includes other binding, reagents or agents used by a wide range of printable materials (e.g., plastics, composites, metals, ceramics, resins, food, or biomaterials, organic and inorganic printable substances). In an embodiment, the layer 415 is chemically pretreated in accordance to the defined set of elements such that the layer 415 surface provides the required set of surface characteristics facilitating material (where there may be multiple material types deposited spanning the build volume section surface) adhesion with no further configuration or preparation of the build volume section required.

In an embodiment, the layer 415 is defined/configured to accept the printed materials of the additive manufacturing system. Moreover, in some embodiments the layer 415 is configured to provide a solid cover for any components used/formed/deposited in underlying layers 417, 419, 421 that implement features or functional elements (e.g., the heater/RF/magnetic generation coils should not be exposed, so the final layer 415 provides a "covering" surface).

As used herein, the final layer 415 is described as layer one of the plurality of layers of the build volume section and the initial layer (e.g. the furthest layer from layer one) is described as layer "N." In an embodiment, the layer 415 (e.g. layer one) is configured to allow for the deposition of material by the additive manufacturing system (e.g. the extruder). In this embodiment, the layer 415 has a desired set of adhesive characteristics that is integral to the structure of layer 415 to allow material bonding during deposition while also allowing removal of the target object when the operations are completed. In other words, the outer surface of layer 415 has a desired surface energy pattern that allows the deposited material or set of materials to stick while allowing for target object removal.

To obtain the desired surface characteristics of layer 415, the surface mesh elements may optionally be subjected to a plasma treatment, a chemical treatment (e.g. to encapsulate or coat the surface with an adhesive, a primer, an organic or a inorganic substance), or by physically modifying the surface areas to have a desired surface roughness or surface energy characteristic. In some embodiments, the treatment of the layer 415 may be on an individual element basis, meaning that the treatment may be applied to a portion of the elements, or different elements may have different treatments applied. In this embodiment the surface characteristics of layer 415 is a represents a feature (adhesion or surface energy properties) of the corresponding elements making up layer 415. In some embodiments, the treatment of the surface occurs prior to the start of operation. In other embodiments, the additive manufacturing system performs the treatment during operation in accordance to the embodiments described (e.g. the additive manufacturing system includes tools to perform the treatment as defined by the desired layer 415 requirements).

The functional layers 413 comprises 1-to-N independently configurable layers, each layer having a tessellation surface or volume mesh (2D/3D) defined that is comprised of individually addressable elements, where a given mesh can have a single element or multiple elements. For any given layer, each element within the 2D/3D mesh implements a feature or functionality that is independently configurable The individually addressable elements may be arranged as a mesh that is uniform (i.e. all elements are the same) or nonuniform (i.e. elements of different sizes or shapes) or a combination of each in forming the desired tessellation pattern. A uniform mesh may produced in terms of any repeating geometry including but not limited to squares, rectangles, triangles, or polygonal shapes. The addressable elements may be different thicknesses on different layers. The addressable elements may comprise different features such as the nonlimiting examples including; materials that vary in characteristics or properties, composition, chemical and physical structure, organic or inorganic, biologic or cellular composition, polarization, actuation, and surface energy for example. Each of the addressable elements also may comprise one or more functional characteristics that may be programmably controlled by multi-dimensional build platform based on information from the additive manufacturing system such as tool activation/deactivation, tool and system state or events, tool types, status, positional/location data and any other information useful for multi-dimensional build platform utilization and operation for example. For example, the functional characteristic may be a parameter, such as temperature for example, that is controlled during operation. In an embodiment, the individually addressable elements may be referred to as having one of three states: fixed; static; or dynamic. When an element is fixed, it has a set functional characteristic that does not change from one fabrication process/run to another. For example, a build volume section may include elements that are a lattice structure for transferring thermal energy. These lattice elements are considered fixed since they do not change from one production run to the next. An element is considered "static," when the functional characteristic remains constant during a particular operation, but may change from one production run to the next. For example, a static element may comprise a heater coil that remains at a constant temperature during production. However, at during a second production run, the temperature may be changed. An element is "dynamic" when the element changes during operation, such as a time variable temperature, or a movable surface for example. For example, a dynamic element may comprise a magnetic field coil whose field distribution may be held at some level or vary in time. For example, a dynamic element may comprise a heater coil having a temperature profile during operation that varies. This could be performed to provide a desired material characteristic to the deposited material for example.

Another nonlimiting example is a surface 415 element having material properties that change during the production run based on a lower (higher) layer changing. Such as a magnetic coil changes the polarization of a magnetic nanoparticle coated ink making up the 415 surface so it reacts with a magnetic material being deposited for example. Still another example would include a surface 415 having a biomolecular property that changes in response to light or heat, and activates a bio printed materials in some desired manner or structure. Still another example includes a food deposition tool that deposits an eatable material (e.g. batter) on surface 415, where the underlying layers includes a set of elements (e.g. on layer 2) which activate heating elements to "cook" the batter in a predetermined manner in accordance to the geometry of the build volume section.

Figure 4A:
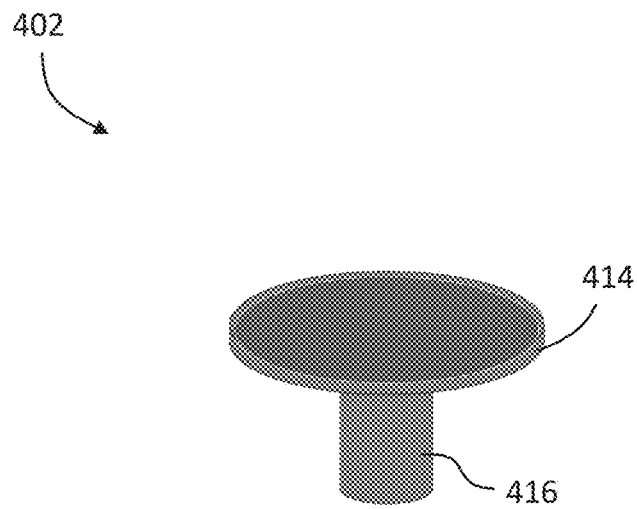
FIG. 4A and FIG. 4B are perspective and side views respectively of a simple circular multi-dimensional build platform embodiment of a given radius whose geometry may vary in accordance with an embodiment.

Referring now to FIG. 4A, in an embodiment, the coupling of the build platform 402 to the additive manufacturing system is via the attachment interface section 416. In this example, the attachment interface section 416 is a cylindrically shaped section that cooperates with a component in the additive manufacturing system to mechanically couple the base section 414 to the additive manufacturing system with a desired characteristic, such as a desired level of stability or rigidity for example. The attachment interface section 416 may be based on the additive manufacturing system, therefore the configuration of the attachment interface corresponds to the variety of interfaces from additive manufacturing system manufacturers. In an embodiment, one or more fasteners, clips, screws, magnetic couplers, and/or hook and loop fasteners may then mechanically fix the attachment interface section to the additive manufacturing system mounting method. In an embodiment, the attachment interface section 416 may include one or more of electrical, communication, and fluid interfaces in addition to a mechanical interface. In an embodiment, the attachment interface section 416 may be integrated (as a single assembly) or separable/removably-coupled from the base section 414 in order to facilitate the reusability of the various multi-dimensional build platform sections 312, 314, and 316 across multiple additive manufacturing systems and target object scenarios.

Figure 4B:
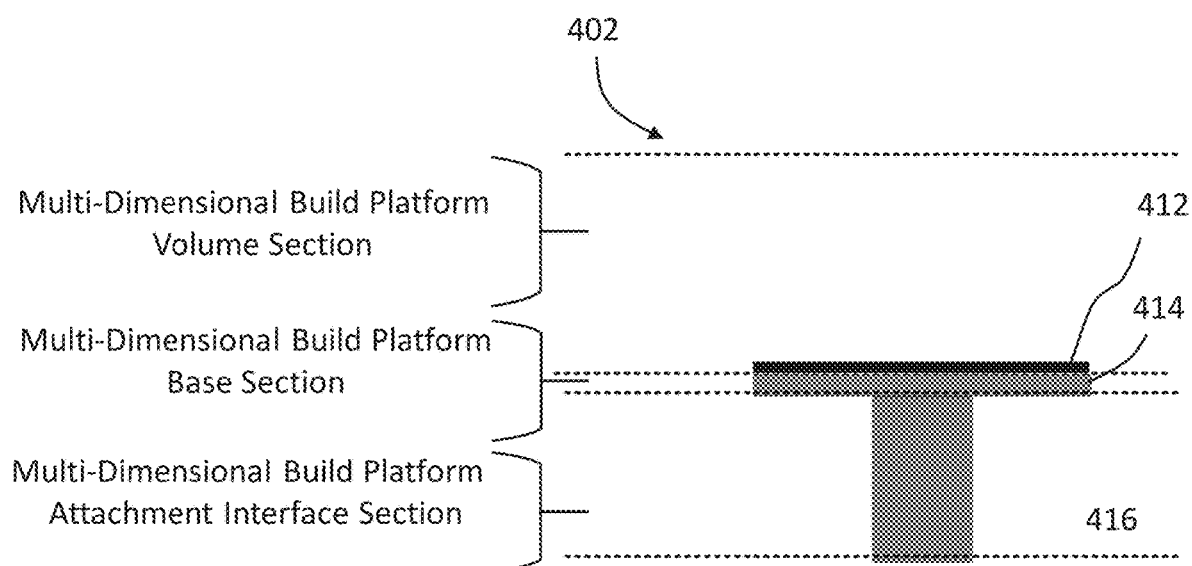
Figure 4C:
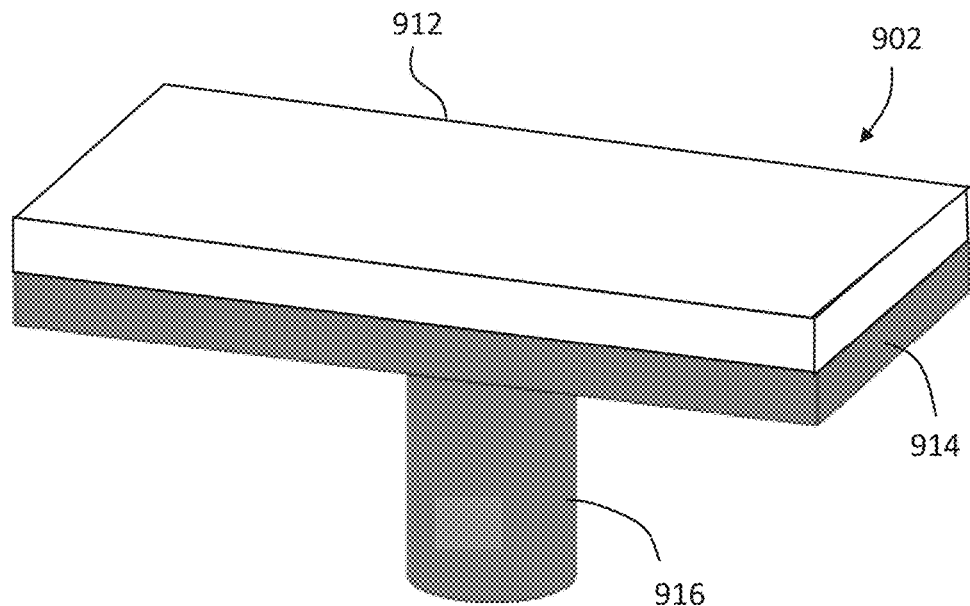
FIG. 4C and FIG. 4D are perspective and side views respectively of a cuboid rectangular multi-dimensional build platform embodiment whose geometry may vary in accordance with an embodiment.
Figure 4D:
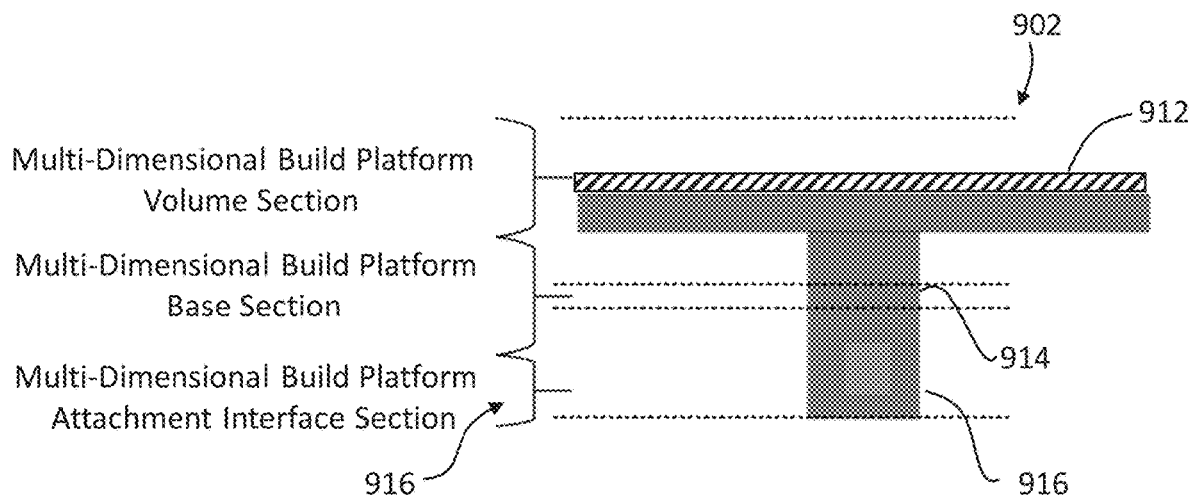

In the embodiment of FIG. 4A and FIG. 4B, the base section 414 has a circular shape and includes an example build volume section layer-1 412. In the embodiment of FIG. 4C and FIG. 4D the base section 914 is rectangular in shape with a cylindrical attachment interface section 916. In the embodiment illustrated in FIG. 4C and FIG. 4D an example layer-1 912 is arranged on a surface of the base section 914. The illustrated embodiments show a single layer build volume section 412, 912, but in other embodiments, there may be two (or more) layers, where layer 1 includes two different adhesive/surface energy features assigned to two elements (e.g. two element mesh, 50/50 divide of rectangle) and heater elements are provided on layer 2 also with a two-element mesh configuration in support of two different heater functions, one assigned to each element.

It should be appreciated that while a rectangular base section is illustrated in FIG. 4C, 4D, a planar build platform may be made from any polygonal shape (e.g., circles, rectangles, triangles, hexagonal, octagonal, tetrahedron etc.). The use of different planar shapes in a multiple degrees of freedom additive manufacturing system may provide advantages in improving or optimizing the build volume section 912 or additive manufacturing system motion or tool movement envelope since clipping angles (e.g., clearances for tool movement relative to the build platform geometry) are introduced by irregular shapes. In an embodiment, the build platform 902 may be used with any features or functional embodiments described herein.

Figure 4E:
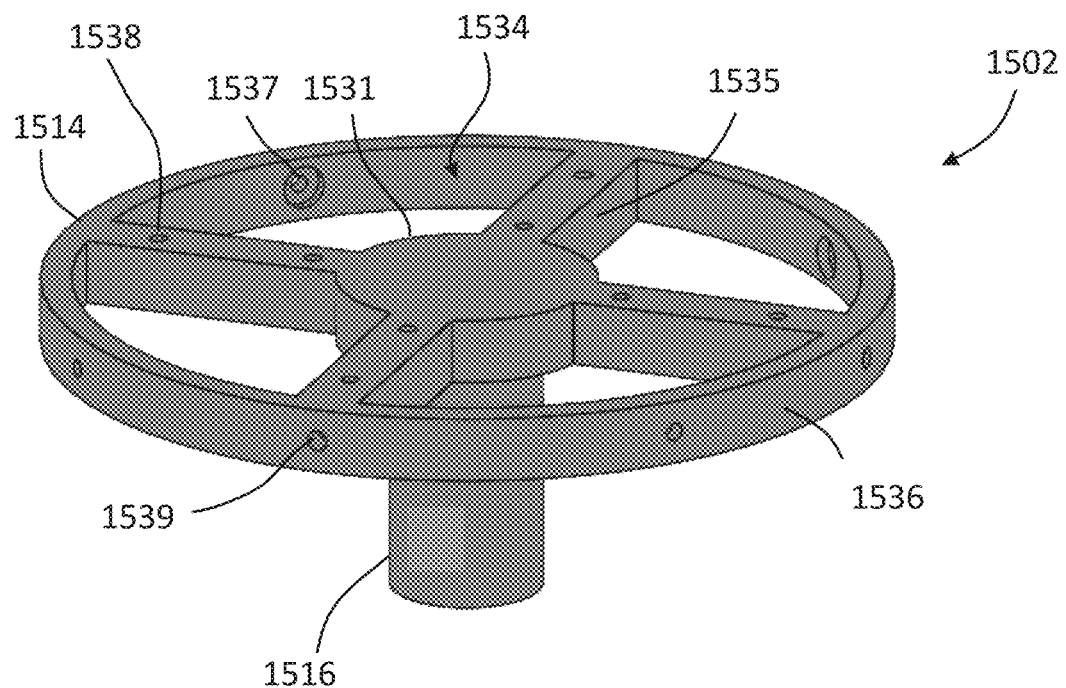
FIG. 4E is a perspective view illustration of a base section and attachment interface section implemented as a configurable circular geometry for separable build volume sections having functions, features, shape, size, and/or geometries that may vary in accordance with an embodiment.
Figure 4F:
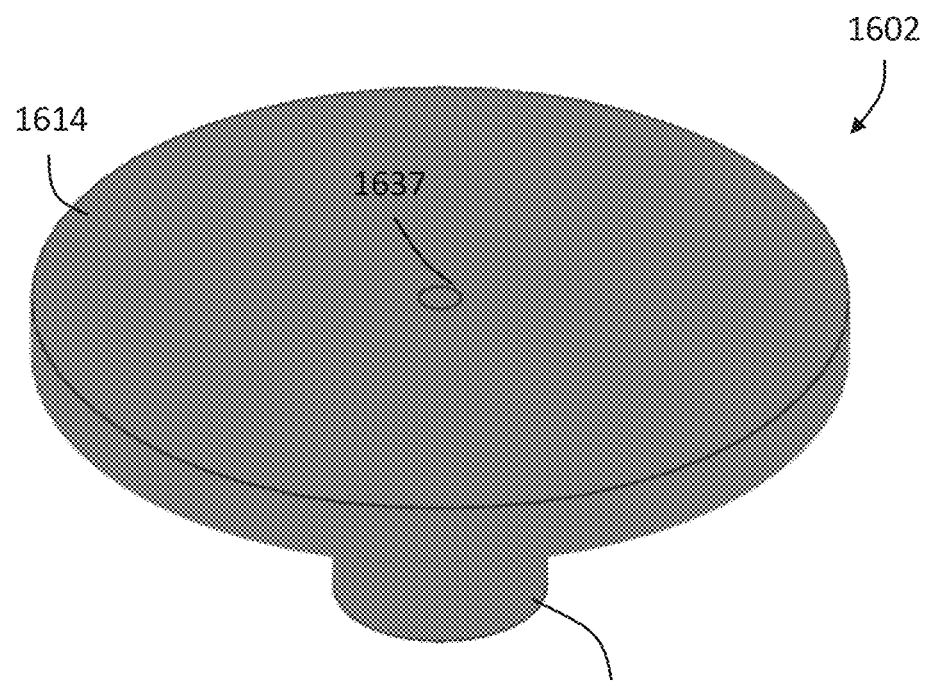
FIG. 4F is a perspective view illustration of a base section and attachment interface section embodiment implemented as a configurable circular geometry for separable build volume sections whose functions, features, shape, size, and/or geometries may vary in accordance with an embodiment.
Figure 4G:
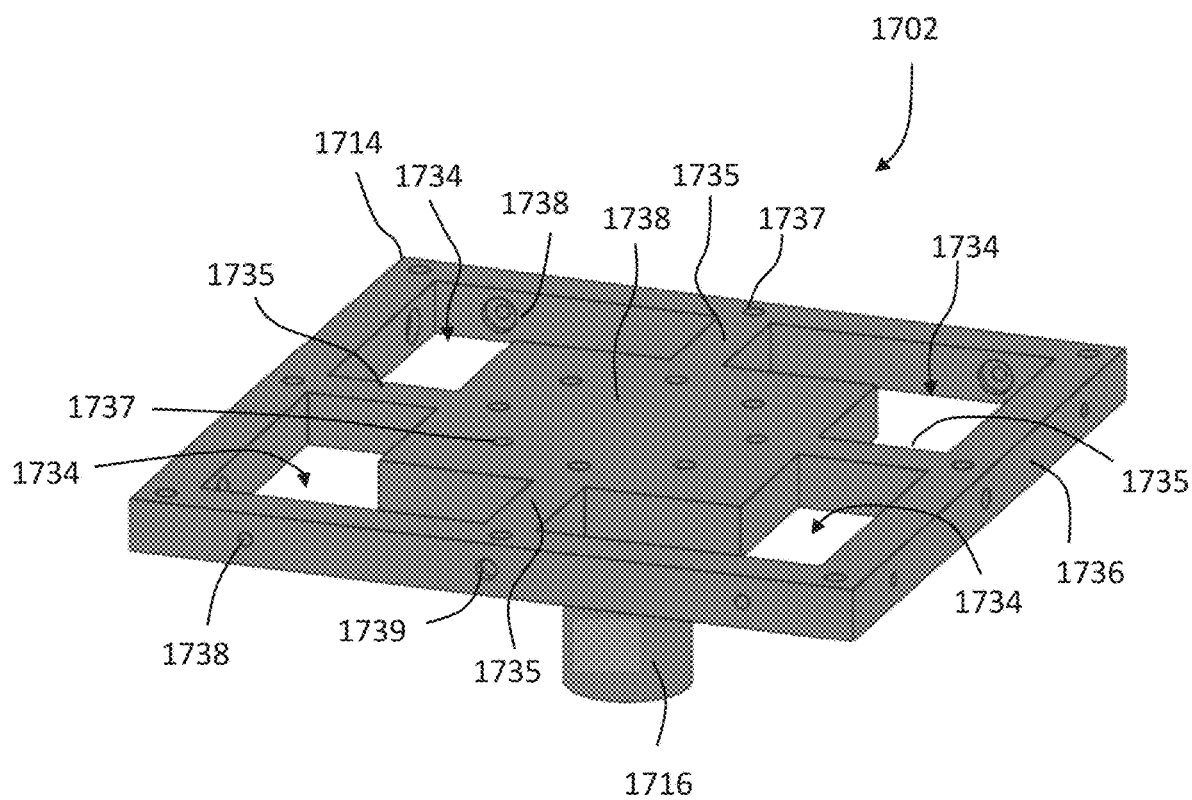
FIG. 4G, FIG. 4H and FIG. 4I are perspective views illustrating a base section and attachment interface sections implemented as configurable rectangular geometry with multiple interfaces for separable build volume sections whose functions, features, shape, size, and/or geometries may vary in accordance with an embodiment.
Figure 4H:
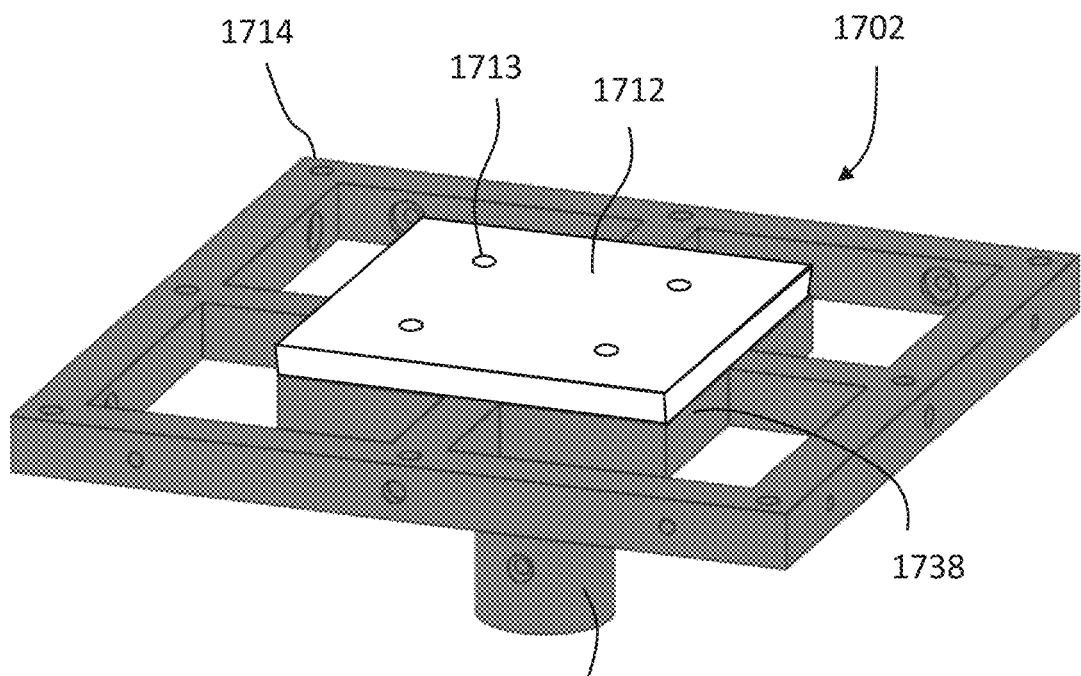
Figure 4I:
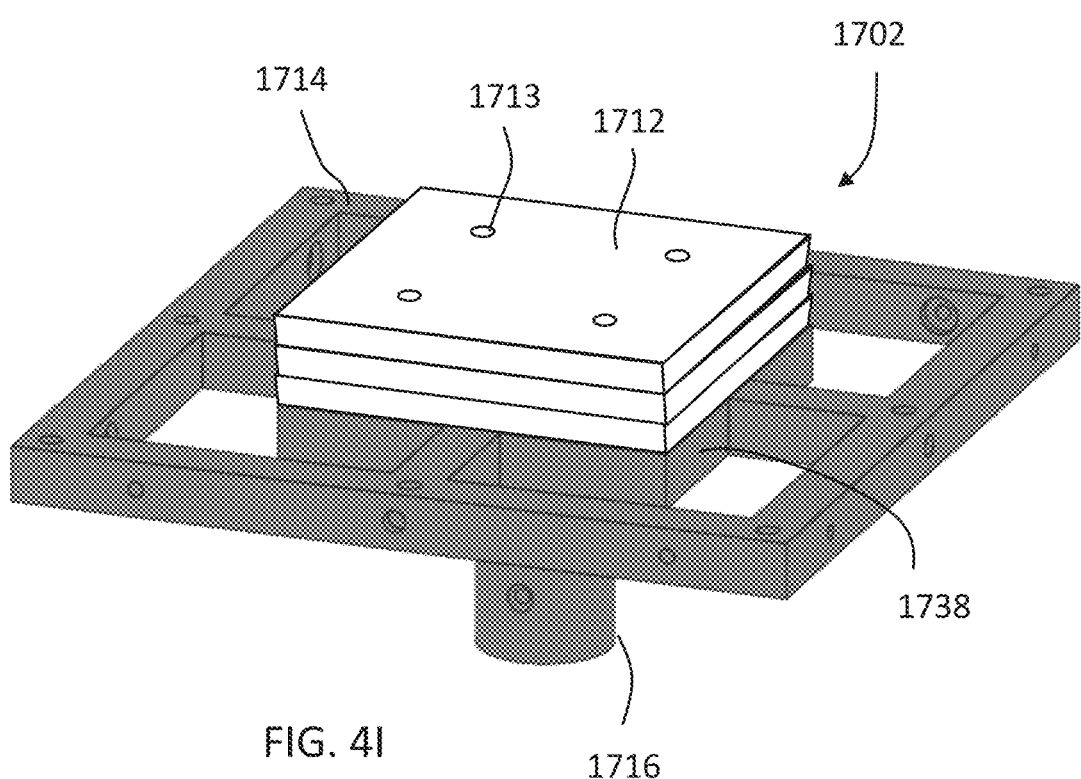

FIG. 4E shows an embodiment of a build platform 1502 having circular base section 1514 and attachment interface section 1516. In this embodiment, the base section 1514 includes a plurality of openings 1534. In an embodiment, the periphery or boundary of the openings 1534 is formed by the sides of a center portion 1531, arms 1535, and an outer diameter band 1536. In an embodiment, the build platform 1502 includes a plurality of attachment points, such as threaded openings 1537, 1538, 1539 for example. It should be appreciated that while the attachment points are illustrated as being threaded openings, this is for example purposes and the claims should not be so limited. In other embodiments, other types of attachment features may be used, such as but not limited to press-fits, snap-fits, heat-set inserts, recessed nuts, magnetic, and hook and loop fasteners for example. The attachment points 1537, 1538, 1539 allow the build platform 1502 to be used in embodiments where the build volume section is removably coupled to the build platform. In an embodiment, the build volume section may be formed from a plurality of modules that are coupled to the build platform 1502. In an embodiment, the build platform 1502 may be used with any features or functional embodiments described herein FIG. 4F shows an embodiment of a build platform 1602 having a circular base section 1614 and attachment interface section 1616. In an embodiment the circular base section 1614 includes an opening 1637. The opening 1637 may include a fastener such as a thread or be configured to receive a press-fit rod for example. The opening 1637 allows the build volume section surfaces to be removably coupled to the build platform 1602. In an embodiment, the build platform 1602 may be used with any features or functional embodiments described herein FIG. 4G shows an embodiment of a build platform 1702 having square base section 1714 and interface section 1716. In this embodiment, the base section 1714 includes center platform 1738 and a plurality of openings 1734. In an embodiment, the periphery of the openings 1734 is formed by the sides of arms 1535, the center platform 1738, and an outer band 1736. In an embodiment, the openings 1734 have an "L" shape. Similar to the embodiment, the FIG. 4E, the build platform 1702 includes a plurality of attachment points, such as threaded holes 1737, 1738, 1739 that allow the build volume section 1712 (FIG. 4H, FIG. 4I) to be attached (fixedly or removably) to the build platform 1702. FIG. 4H shows an example of a single layer (e.g. layer 1) build volume section 1712 mounted to the center platform 1738, such as by fasteners 1713 for example. FIG. 4I shows an example of a multilayer build volume section 1712. As will be described in more detail with respect to FIGS. 5A-FIG. 5T, the build volume section may include a single layer, or a plurality of layers that include individually addressable elements that provide for the desired feature or functional characteristics that allow for the fabrication of the target object. In an embodiment, the build platform 1702 may be used with any features or functional embodiments described herein.

It should be appreciated that the base sections shown and described with respect to FIGS. 4A-FIG. 4G are examples and the claims should not be so limited. In other embodiments, the base section may have a different shape, such as a nonsymmetric shape for example, that is suitable for a particular additive manufacturing system or target object.

As discussed above, the build volume section 312 may include one or more layers each with individually addressable elements that allow for the depositing or processing of deposited material with defined or predetermined features or functional characteristics. These individually addressable elements may be fixed, static, or dynamic in configuration defined during the fabrication of the build volume section.

Figure 5A:
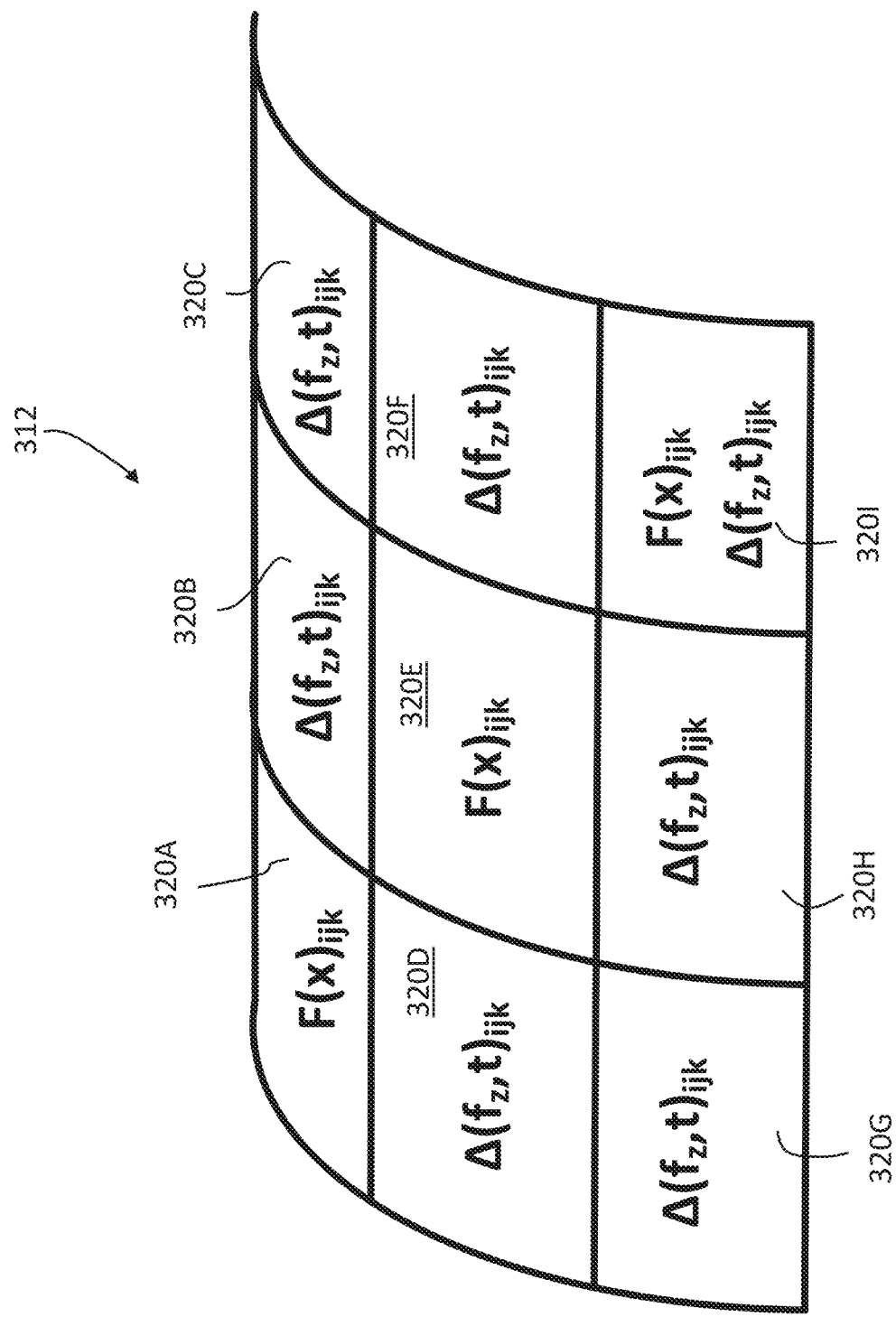
FIG. 5A illustrates a build volume section that exists in three-dimensional space and has individually addressable elements therein where each element can be individually configurable with a plurality of functional, material or geometrical properties during additive manufacturing in accordance with an embodiment.
Figure 5B:
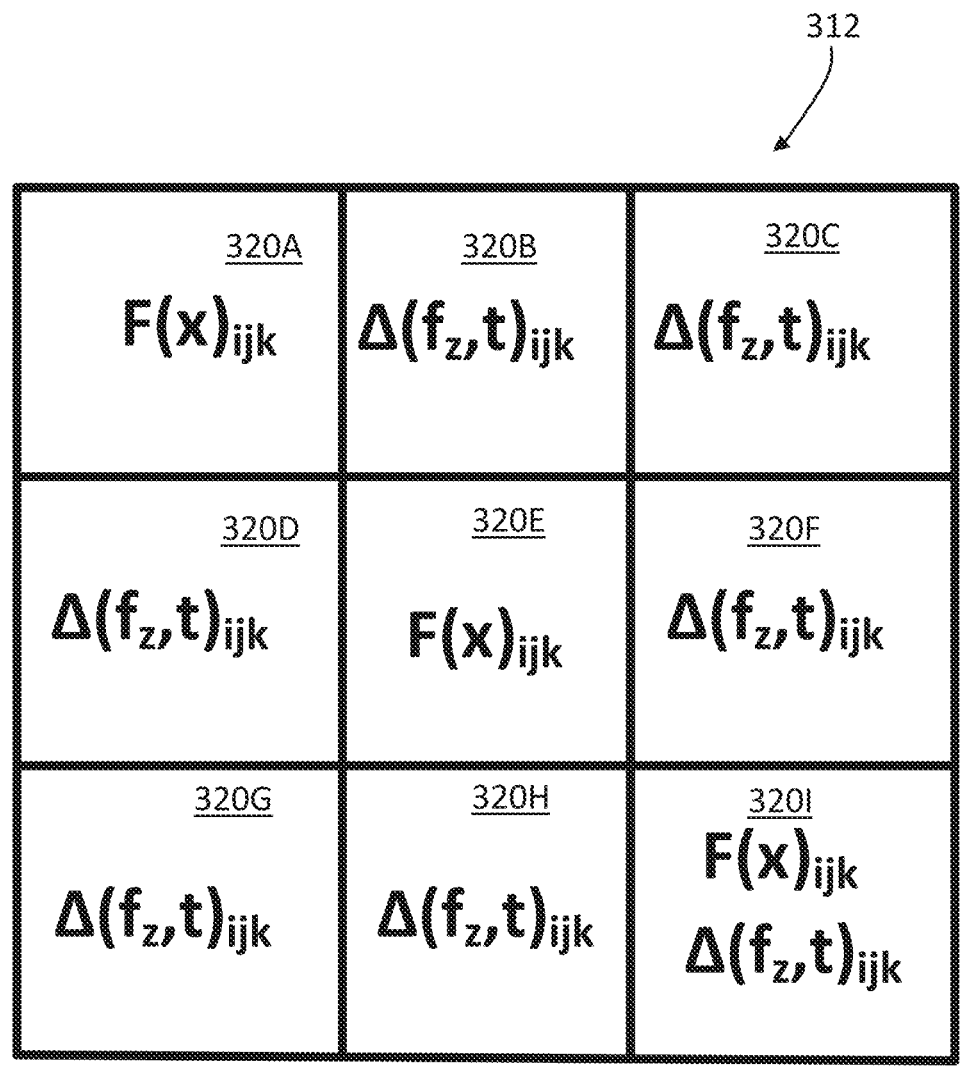
FIG. 5B illustrates a planar build volume section having individually addressable elements thereon where each element can be individually configurable with a plurality of functional, material, or geometrical properties during additive manufacturing in accordance with an embodiment.
Figure 5C:
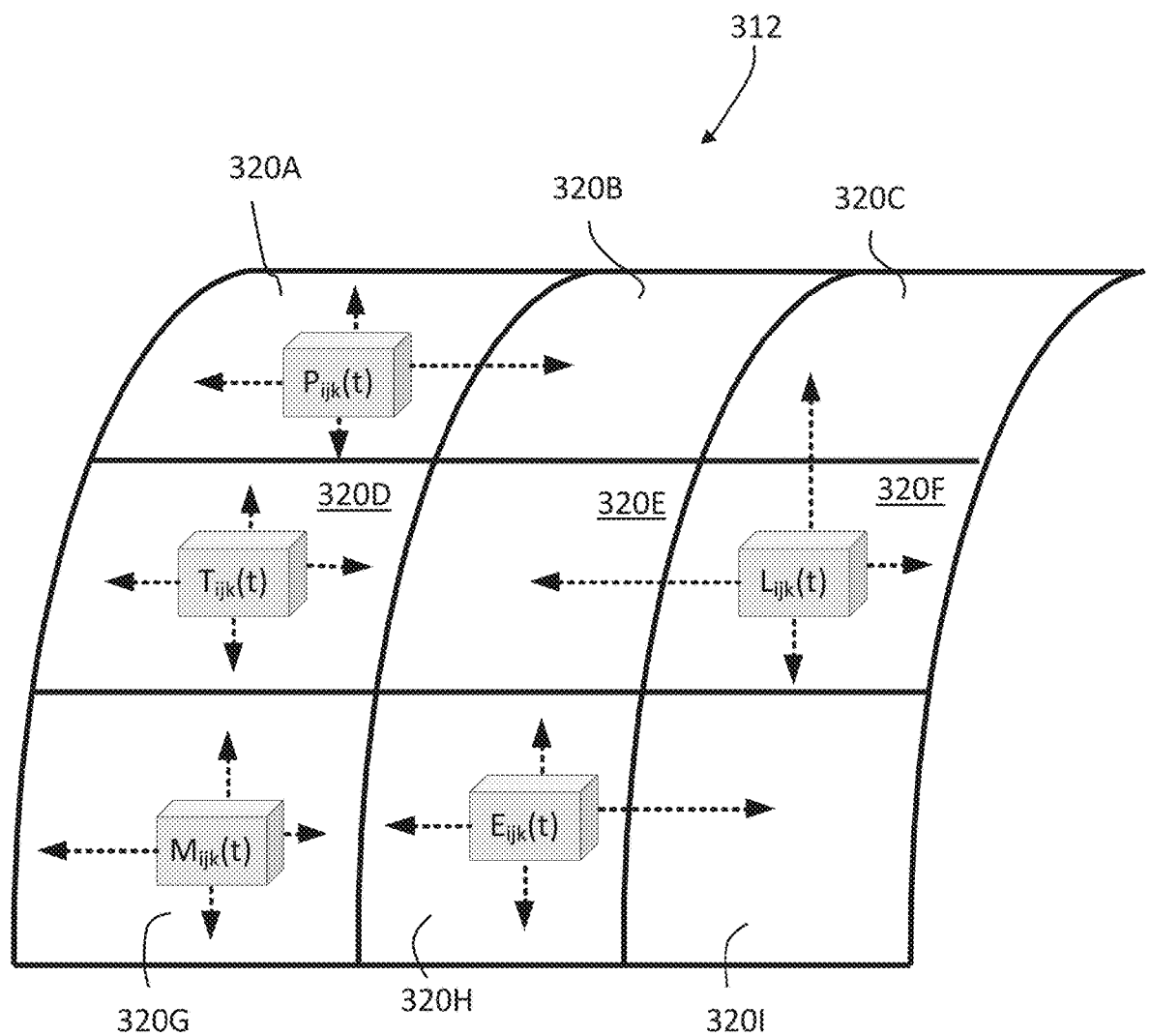
FIG. 5C illustrates a build volume section that exists in three-dimensional space such as a curved structure, and has individually addressable elements, such as functional surfaces or voxels whose functionality may span multiple adjacent elements, and allow for the generation of a target object using additive manufacturing methods in accordance with an embodiment.
Figure 5D:
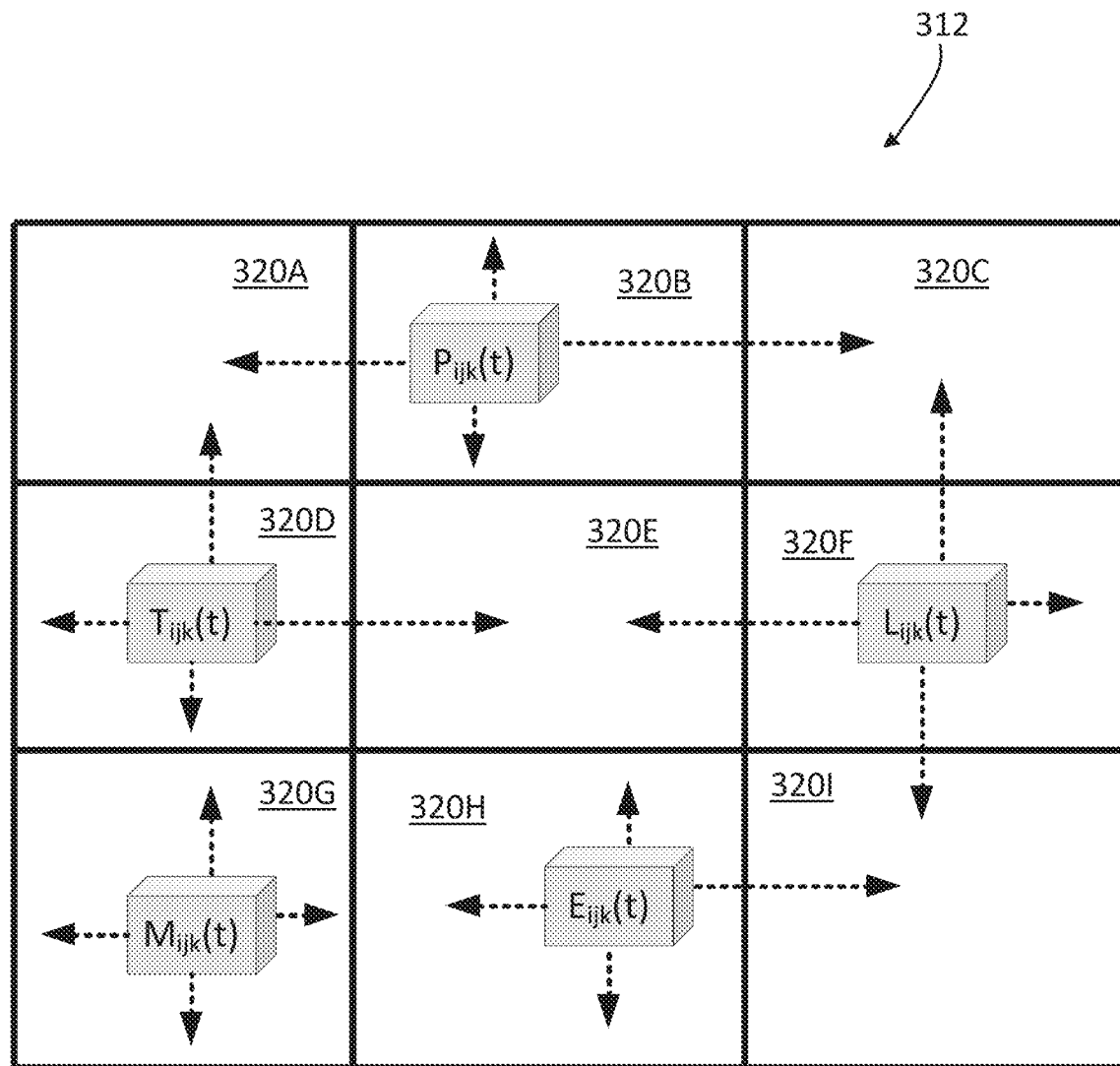
FIG. 5D illustrates a planar build volume section having individually addressable elements, such as functional surfaces or voxels, whose functionality may span multiple adjacent elements, and allow for the generation of a target object using additive manufacturing methods in accordance with an embodiment.
Figure 5E:
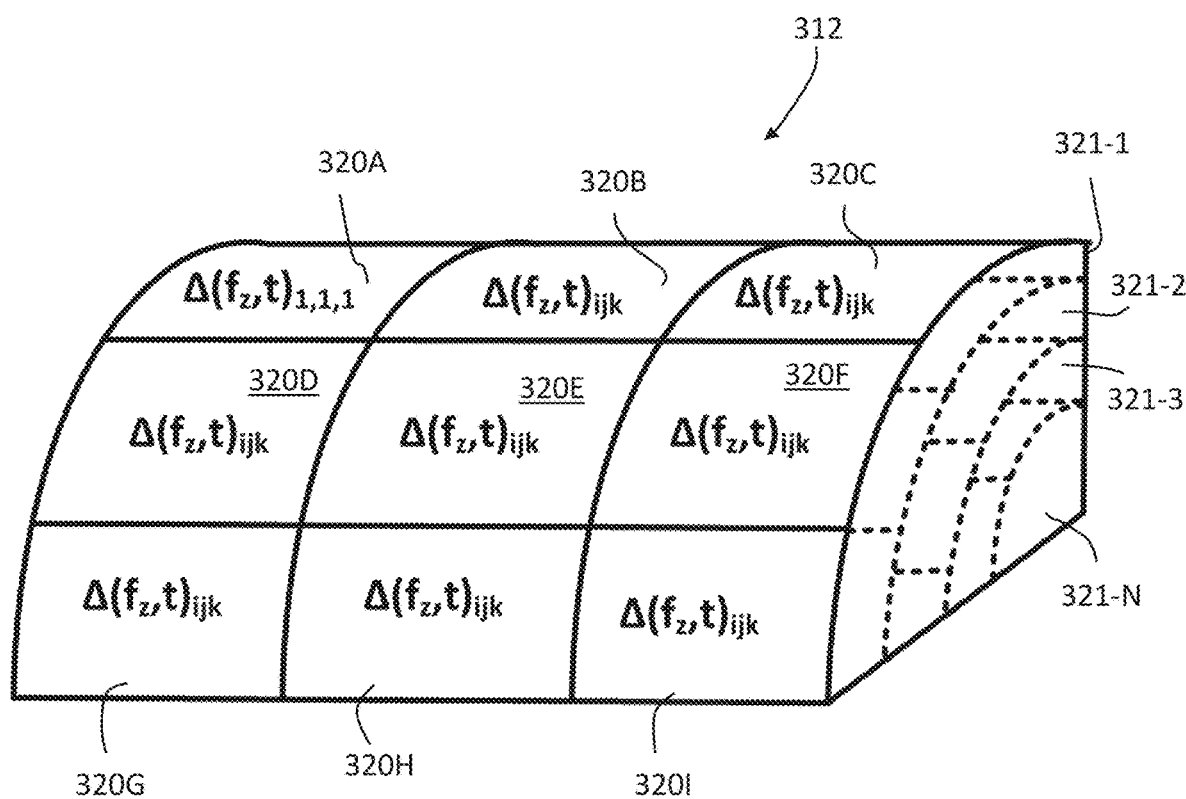
FIG. 5E is a schematic illustration of build volume section comprised of a plurality of layers, where each layer may include one or more individually addressable element, in accordance with an embodiments.
Figure 5F:
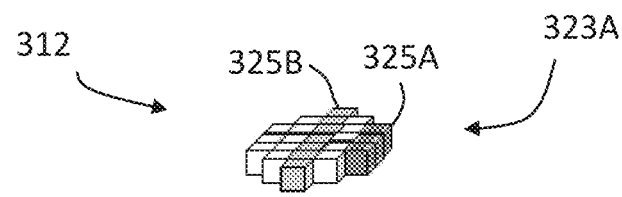
FIG. 5F-5J illustrate of a series of sectional views of a build volume section where each of the layers includes individually addressable elements/voxels, in accordance with an embodiment.
Figure 5G:
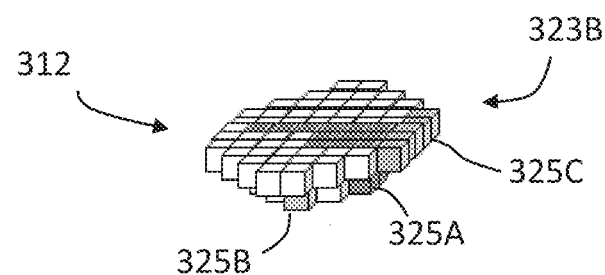
Figure 5H:
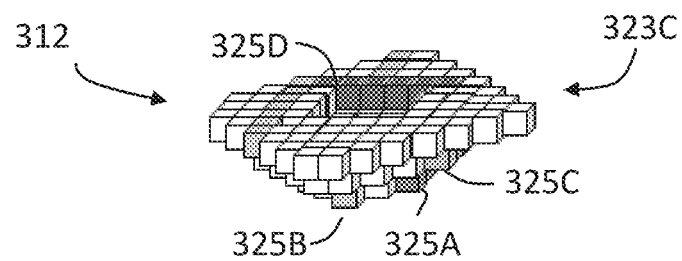
Figure 5I:
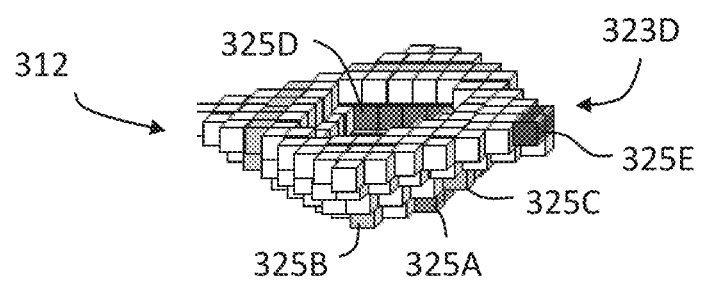
Figure 5J:
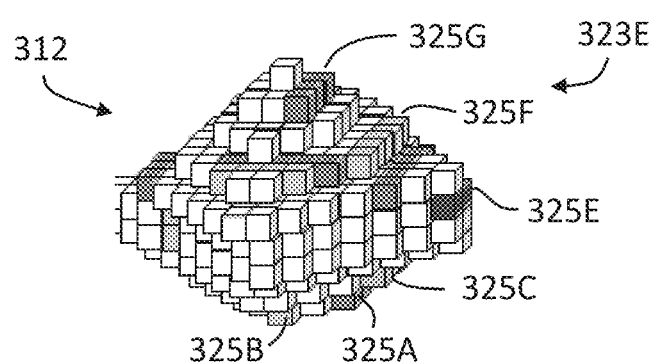
Figure 5K:
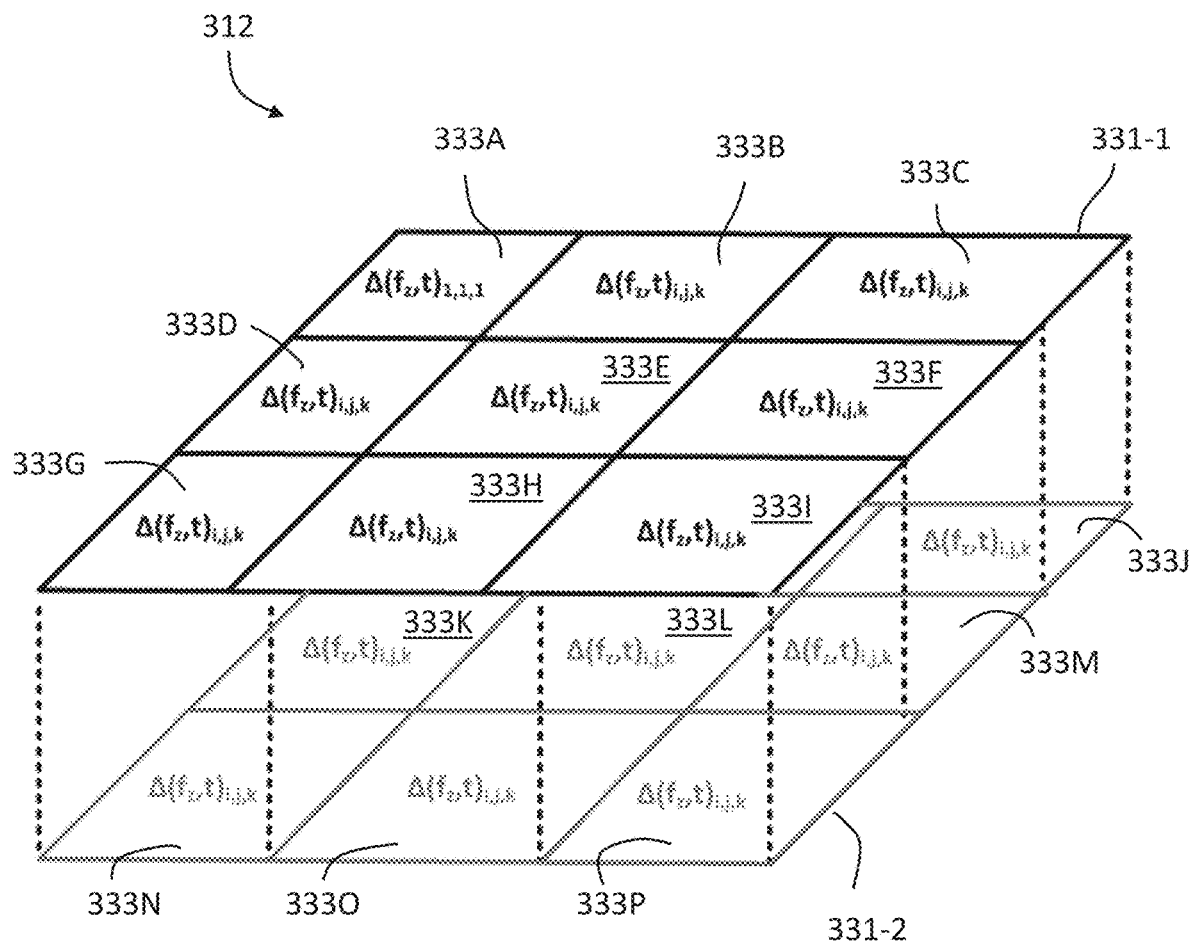
FIG. 5K is a schematic illustration of a planar build volume section comprised of a plurality of layers.
Figure 5L:
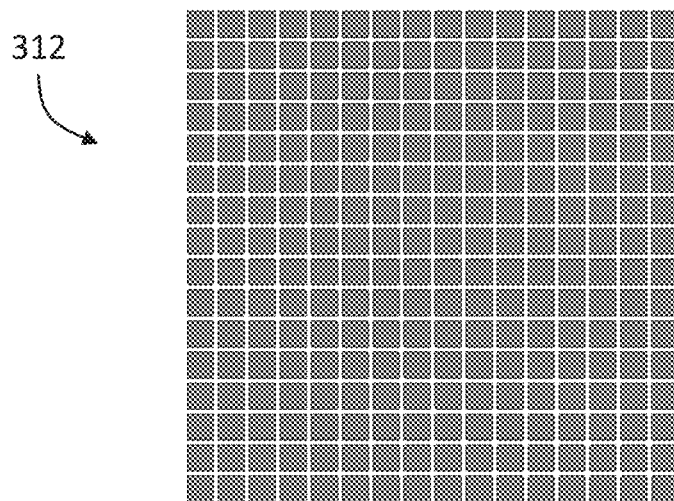
FIG. 5L, FIG. 5M and FIG. 5N are top and perspective views showing a planar build volume section comprised of a plurality of layers that include individually addressable elements and are uniform in size and shape.
Figure 5M:
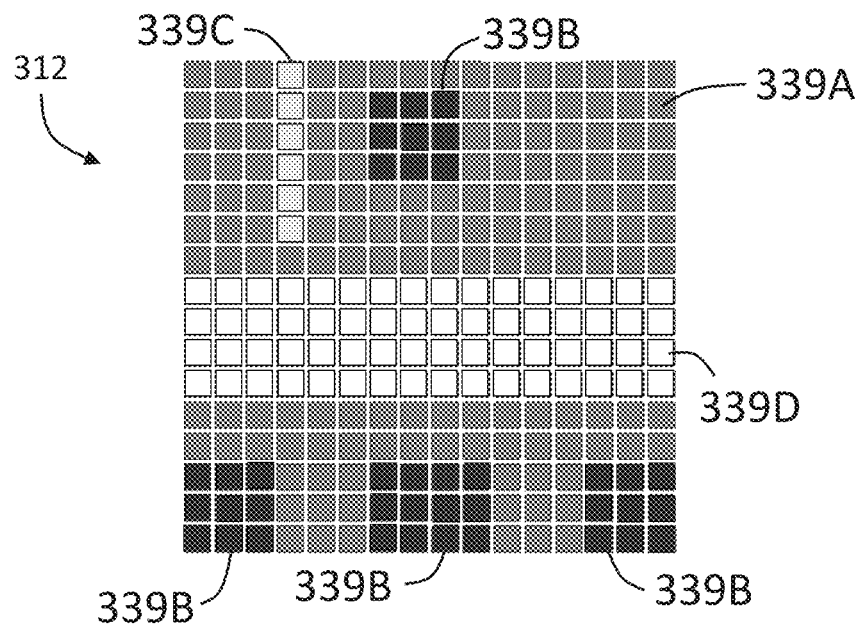
Figure 5N:
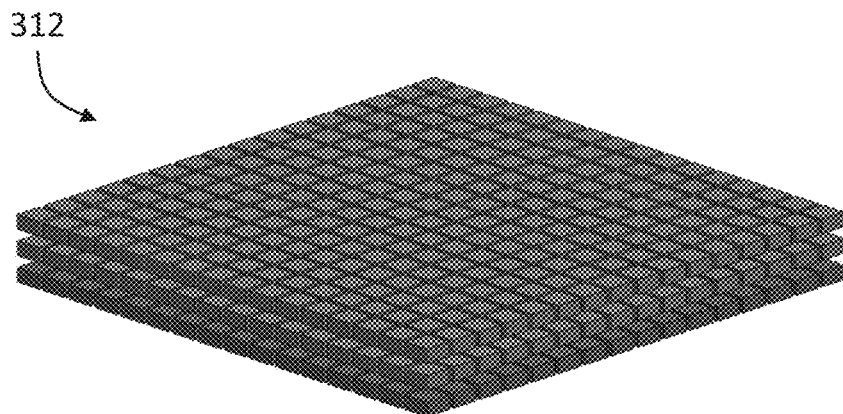
Figure 50:
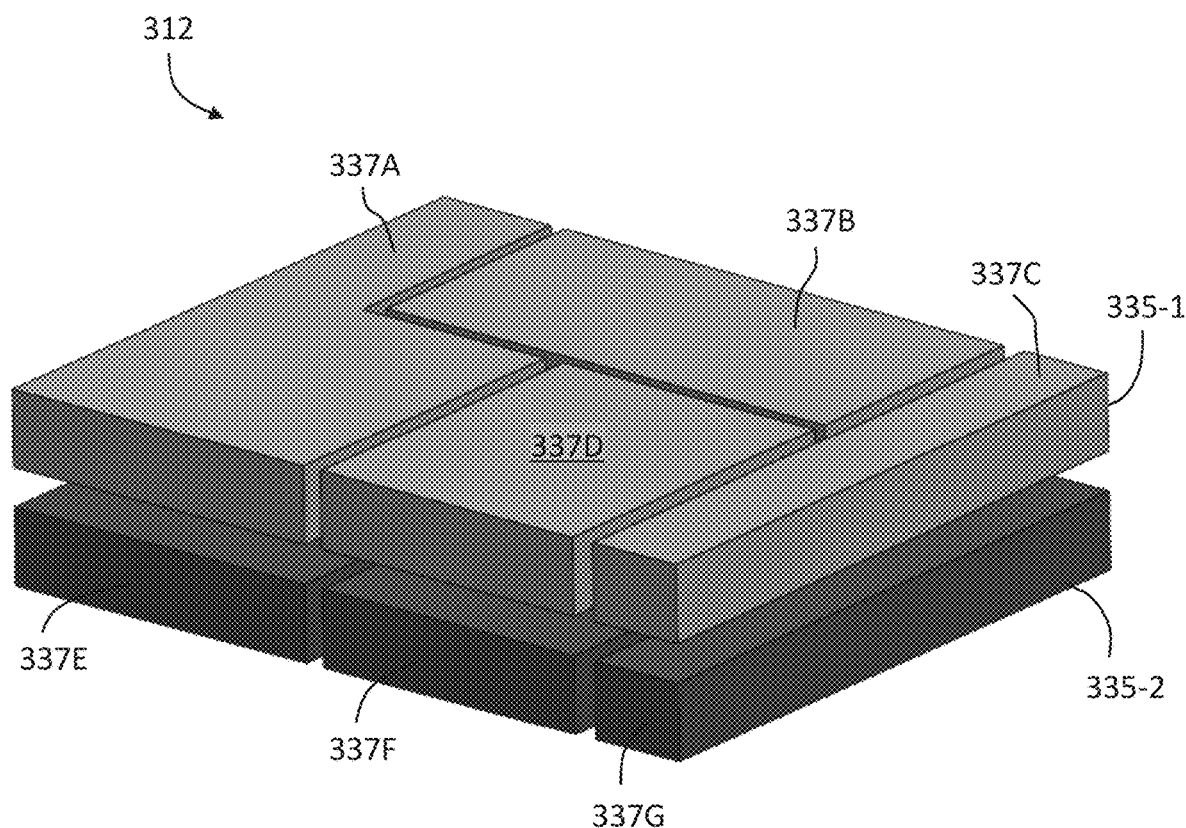
Figure 5P:
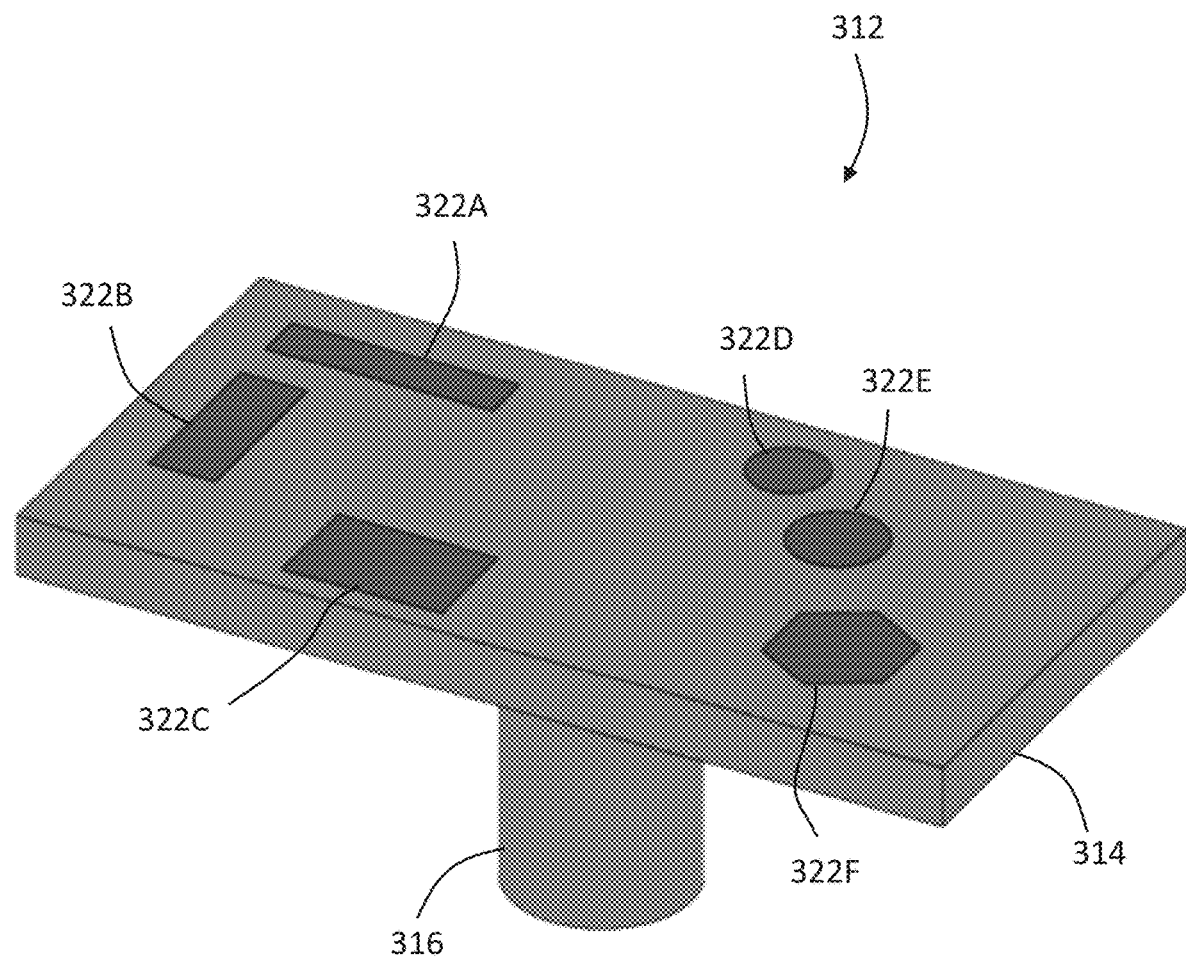
FIG. 5P is a perspective view of a multi-dimensional build platform having individually addressable elements where the elements have multiple shapes, sizes, and positions on the multi-dimensional build platform in accordance with an embodiment.
Figure 5Q:
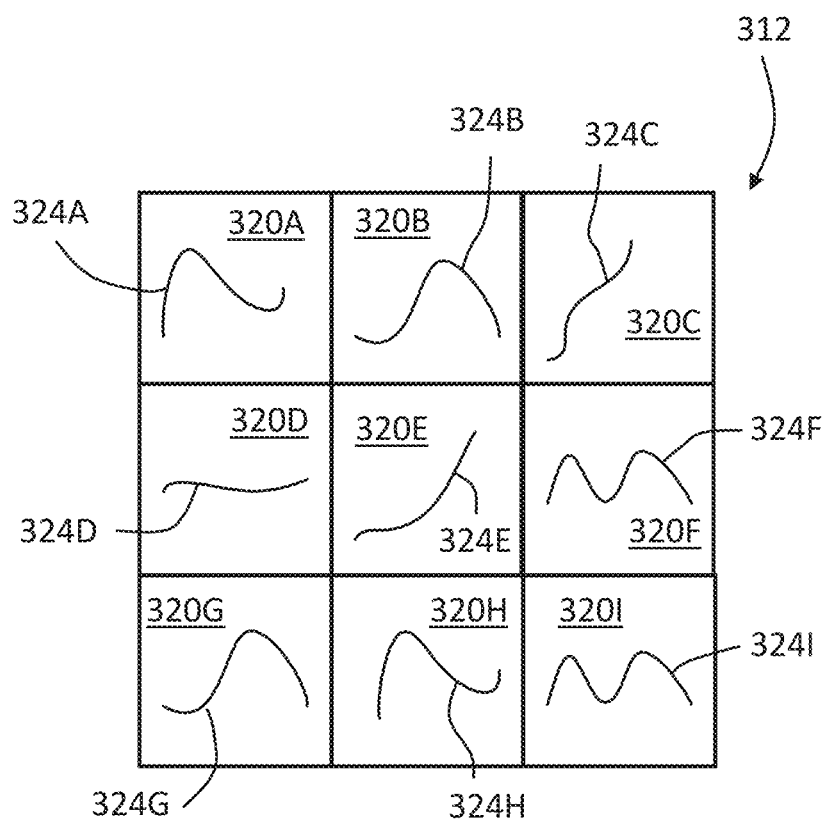
FIG. 5Q is a schematic illustration of a build volume section where the individually addressable elements each have time-variable functional characteristics, such as temperature gradients, in accordance with an embodiment.
Figure 5R:
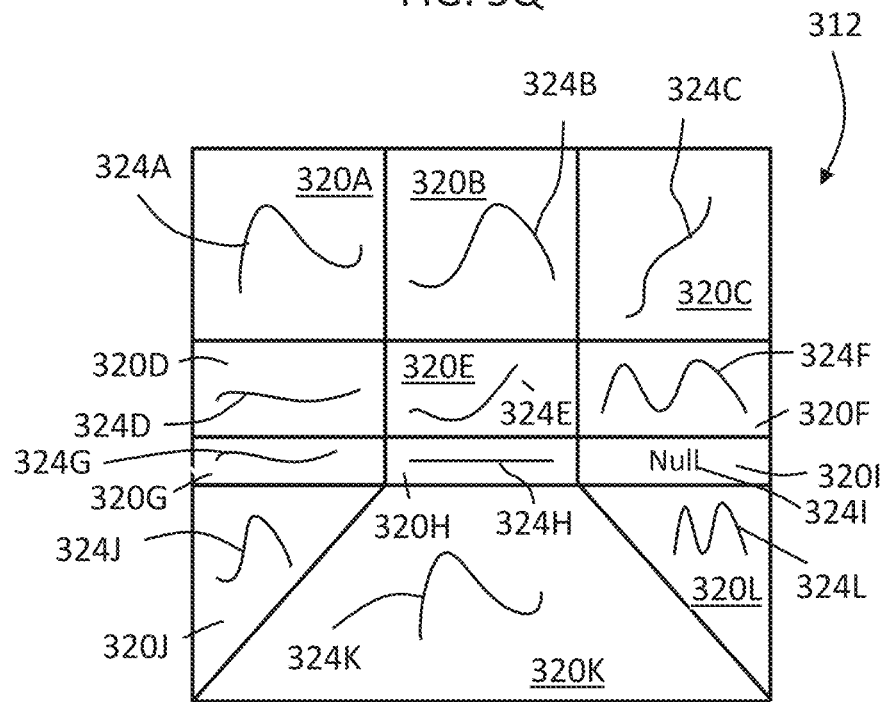
FIG. 5R is a schematic illustration of a build volume section where the individually addressable elements have different shapes and/or sizes and also each have time-variable functional characteristics, such as temperature gradients, in accordance with an embodiment.
Figure 5S:
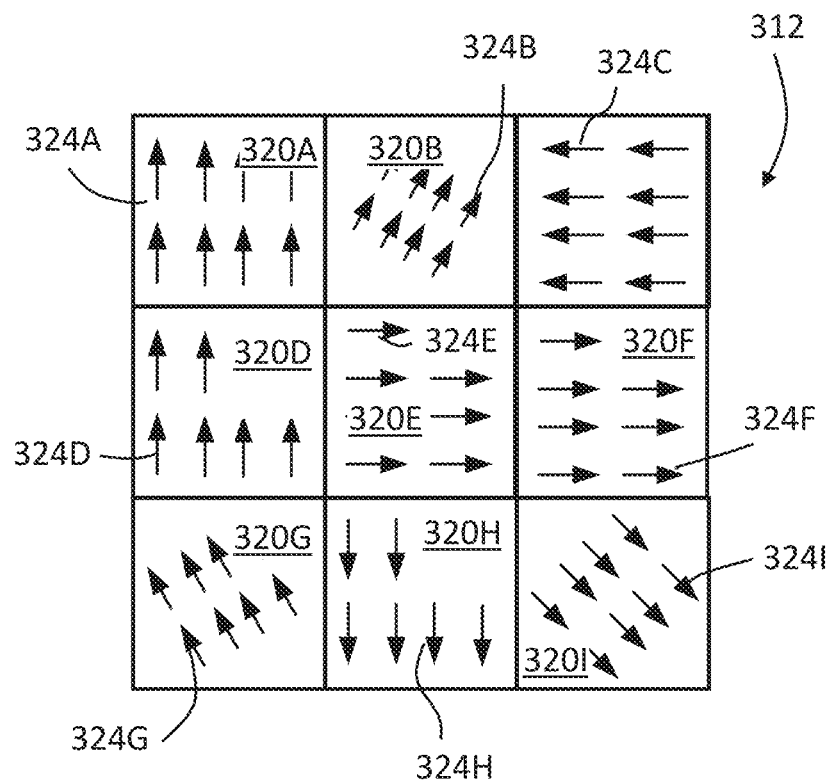
FIG. 5S and FIG. 5T are schematic illustrations of a build volume section where the individually addressable elements each have different time-variable functional characteristics, such as magnetic polarization, in accordance with an embodiment.
Figure 5T:
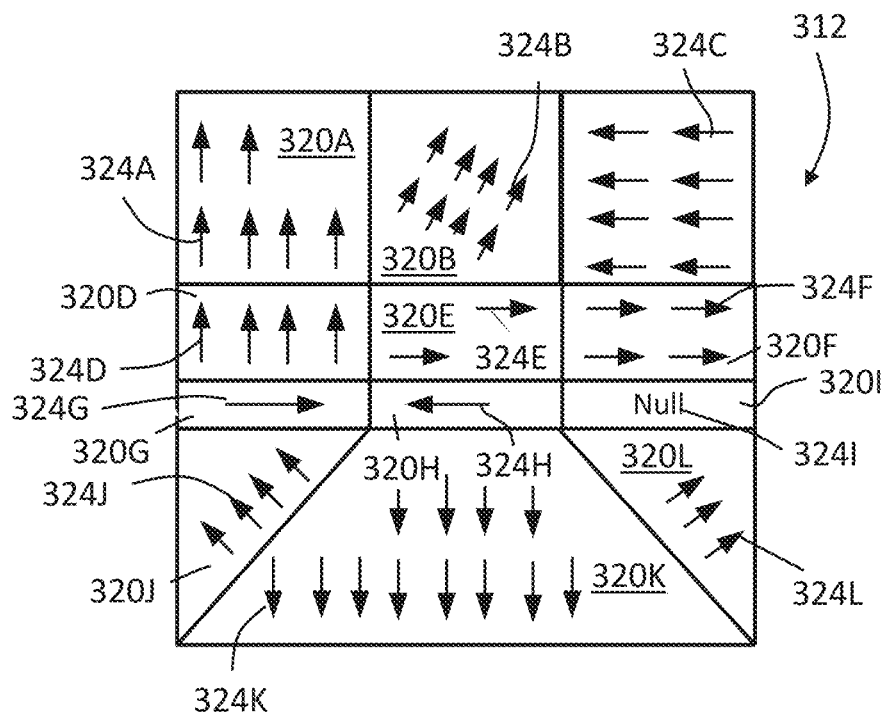

Referring now to FIGS. 5A-5T, embodiments of a build volume section 312 are shown for a single layer that include a plurality of individually addressable elements, such as elements 320A-320I that allow for different features or functional characteristics to be applied or used during the additive manufacturing process to produce a desired target object. It should be appreciated that in some embodiments, the multi-dimensional build platform, such as through the use of individually addressable elements, provides advantages in the fabrication of complex target objects, or target objects having dynamic properties that would otherwise be difficult or impossible to fabricate using prior art additive or subtractive methods.

In the embodiment illustrated in FIG. 5A, and FIG. 5B, features may be specified as a matrix function $F(x)_{ijk}$ (where F is the name of the feature, and x is the dataset associated to the feature) and shown within the diagonally arranged elements 320A, 320E, 320I. Features may be represented as a feature N×M matrix comprising N rows of feature properties and M columns of attribute values associated to the property. In an embodiment the matrix can be extended to a tensor data-structure in cases where a more complex data model of the feature attributes is desired. Features define the properties of an individual mesh element (residing on a layer definition), such as material type, surface energy, and any other characteristics of the given mesh element that can enumerated. Features may or may not change in time (e.g. be static or dynamic), depending on their interaction with functional elements. A feature is used to define the properties and specification of some region of the build volume section multi-dimensional space in an addressable manner.

The individually addressable elements may be in the form of a 2D/3D tessellation surface or volume elements (voxels) for example. Both feature-based and functional-based characteristics may take the form of multiple or "N" dimensions in the fabrication process. FIG. 5A illustrates a general case of a build volume section 312 having a three-dimensional physical shape (e.g., a curved surface) that is selected to produce the desired target object. Each of the individually addressable elements 320A-320I exists in a three-dimensional physical space (i, j, k) and has a defined feature F(x) (where capital F denotes a named matrix of x property types with associated attributes for the given feature) and/or functional characteristic ($f_z$, t) denoting a dynamic function of z variables that can each vary in time and/or space. For clarity, it should be noted that a given element may have both a feature characteristic and a functional characteristic, such as element 320I for example. For example, element 320A may have a temperature gradient profile or magnetic field distribution or polarization profile that is different than the temperature or magnetic characteristics of element 320B or 320I. These functional characteristics may vary over time. Further, the time variability may be different in each element.

It should be appreciated that while embodiments herein may refer to a single feature or functional characteristic (e.g., material type, temperature gradient profile), each element may have multiple defined feature and/or functional characteristics. Feature characteristics may include, but are not limited to: deposited material properties, material temperature, polarization or directional and vectors, or a combinations thereof. Functional characteristics may include, but are not limited to: thermal, particle radiation, electromagnetic radiation, photonic, optical, acoustic radiation, gravity, magnetic polarization, or a combinations thereof. As discussed above, where multiple feature or functional characteristics are applied to a single element, the functional characteristics may be applied simultaneously (e.g., temperature and a material property), sequentially, or a combination thereof.

It should further be appreciated that while the embodiment of FIG. 5A illustrate the elements 320A-320I as being a square or rectangular 2D/3D tessellation surface/volume or mesh of elements, this is for example purposes and the claims should not be so limited. In other embodiments, the elements may have different sizes, different shapes, and/or be spaced apart from each other (e.g., FIG. 5P). Further still, the size shape, and/or position of the individually addressable elements may be changed from when a first target object is fabricated to when a second target object is fabricated. In some embodiments, the size, shape, and/or position of the individually addressable elements may be changed during the course of fabricating the target object. In still further embodiments, the target object may be formed using a build volume section 312 that has a plurality of layers, and the layers may be of constant/uniform or variable thickness (i.e., layers of different thickness).

Referring now to FIG. 5B, an embodiment of the build volume section 312 is shown that is similar to the embodiment of FIG. 5A, but with the build volume section 312 being a planar surface. The build volume section 312 includes a plurality of individually addressable elements 320A-320I, with each having defined feature and/or functional characteristics. As discussed above, the shape, size, and/or position of the individually addressable elements 320A-320I may be different from that shown depending on the desired shape and characteristics of the target object.

Referring to FIG. 5C, a build volume section 312 is shown wherein the individually addressable elements are voxels rather than a tessellation surface. In other words, the embodiment of FIG. 5C is similar to that of FIG. 5A, except that the elements 320A-320I comprise a volume of space within the build volume section, with the feature and/or functional characteristics being defined or applied within that volume. In some embodiments, one or more of the functional characteristics (e.g., property of material (P), temperature (T), magnetic field (M), electric field (E), light/optical energy (L)) may be variable in three-dimensional space and time, and may also span multiple elements. For example, the functional characteristic $P_{ijk}(t)$ in element 320A may act upon a portion of the material in element 320B. Similarly, the functional characteristic $L_{ijk}(t)$ may act upon at least a portion of element 320E, and the functional characteristic $E_{ijk}(t)$ may act upon at least a portion of the element 320I. As discussed in more detail herein, where a feature or functional characteristic spans multiple elements, the elements that share a common feature or functional characteristic may be considered to form or define a zone. As with the embodiments discussed above, the shape, size, and/or position of the individually addressable elements 320A-320I may be different (e.g. FIG. 5O or FIG. 5P) from that shown depending on the desired shape and characteristics of the target object.

Referring to FIG. 5D, a planar build volume section 312 is shown wherein the individually addressable elements are voxels rather than a tessellation surface. In other words, the embodiment of FIG. 5D is similar to that of FIG. 5B, except that the elements 320A-320I comprise a volume of space within the build volume section, with the features and/or functional characteristics being defined or applied within that volume. In an embodiment, each of the functional characteristics (P, T, M, E, L) may be variable in three-dimensional space and time, and may also act upon or be applied to at least portions of adjacent elements as was discussed with respect to FIG. 5C. As with the embodiments discussed above, the shape, size, and/or position of the individually addressable elements 320A-320I may be different (e.g. FIG. 5O or FIG. 5P) from that shown depending on the desired shape and characteristics of the target object.

As shown in FIG. 5E, the embodiment of FIG. 5A is expanded to allow the defining of elements of the 2D/3D tessellation for each layer 321-1 to 321-N of the build volume section. In an embodiment, each of the elements are addressed as i, j, k variable, with each element in the mesh implementing a feature F(x) and/or functional characteristic f(z,t) representing a time-variable functional characteristic, such as but not limited to: temperature, radio frequency, magnetic fields, light, or a combination of the foregoing as non-limiting examples. In an embodiment, each of the layers 321-1-321-N include an independently configurable mesh of elements. The elements 320A-320I may be identical, either within the layer or across one or more layers. Further, the elements 320A-320I both within a single layer or between the layers 321-1-321-N may be different in size and/or shape. Further, while the illustrated embodiments shows the elements 320A-320I to be directly adjacent each other (e.g., mesh), this is for example purposes. In other embodiments, there may be gaps between the elements.

As discussed above, the outer layer 321-1 is a solid material that covers or encases the underlying layers 321-2, 321-3, 321-N and has an outer surface suitable to receive or have material deposited thereon by the additive manufacturing system. It should be appreciated that it may not be desirable to have underlying layers 321-2, 321-3, 321-N exposed to the environment, such as when the underlying layers 321-2, 321-3, 321-N include components, such as coils, active components, or printed circuits for example. In some embodiments, the outer layer 321-1 is removably coupled to the underlying layers 321-2, 321-3, 321-N. This would allow for the outer layer 321-1 to be periodically replaced for example.

As discussed above, the layer 321-1 surface may have feature characteristics defined by treating or coating the layer (or portions of the layer) with other substances, chemicals, doped, sprayed, impregnated with organic and/or inorganic porous substances (e.g., inks, pastes, nano-particle, etc.) to improve target object adhesion and removal processes as well as provide a desired material characteristic interaction. For example, to provide a feature or functional characteristic that defines how the deposited material interacts with the defined material on layer 321-1 surface since the layer 321-1 may be the only portion of the build volume section that comes into contact with the material forming the target object. Thus the feature and functional characteristics of the layer 321-1 define how the target object adheres to the build volume, or how the build volume integrates into the target object in embodiments where the build volume becomes part of the target object. The fabrication surface composition of the build volume section can be enriched for a desired multi-material printing/additive-manufacturing process inclusive of bioprinting of both organic and inorganic target objects and structures.

The embodiment of FIG. 5E illustrates a build volume section that includes a curved (e.g., cylindrical or arc) layers 321-1-321-N. It should be appreciated that this embodiment may be expanded to any arbitrary shape 323E as is shown in FIG. 5H. FIG. 5F-FIG. 5H illustrate different sections 323A-323D of the build volume section 312, culminating in the shape 323E that may include hollow interior areas. In this embodiment, the shape 323E is a multi-dimensional build volume section where each layer of the build volume section includes a uniform volume mesh of elements (uniform size) where the elements have one or more associated feature and/or functional characteristics. In the illustrated embodiments, elements or voxels of similar color have the same feature and/or functional characteristics. The functional characteristics may represent a time-varying functional characteristic, such as temperature, magnetic field, radio frequency or light for example. In an embodiment where adjacent elements have the same feature or functional characteristic, such as elements 325A, 325B, 325C, 325E, 325F, 325G for example, these elements may be referred to as a "zone" As previously introduced. In the illustrated embodiment, the each of the zones is illustrated using a different color/shade. In an embodiment, the white elements may be assigned a default feature (which may be a complex or basic property such as material type), with no functional characteristics assigned.

It should be appreciated that the zones illustrated in FIGS. 5F-FIG. 5H are examples only and the size, shape, and/or number of zones may be different depending on the target object being fabricated.

It should be appreciated that while the embodiments of FIGS. 5E-FIG. 5H illustrate a curved or arbitrary shaped build volume section, this same principle may be applied to a simpler shape, such as a planar build volume section 312 shown in FIG. 5K. In this embodiment, the layers 331-1, 331-2 are 2D/3D tessellation (surfaces/volume) that define a mesh of elements 333A-333P. In an embodiment, the elements 333A-333P may have a uniform or variable thickness. In an embodiment, each of the elements 333A-333P are addressed as i, j, k variable, with each element in the tessellation implementing a feature F(x) or functional characteristic f(z,t) representing a time-variable functional characteristic, such as but not limited to: temperature, radio frequency, magnetic fields, light, or a combination of the foregoing. In an embodiment, each of the layers 331-1, 331-2 includes an independently configurable matrix or mesh of elements 333A-333P. The elements 333A-333P may be identical, either within the layer or across one or more layers 331-1, 331-2. Further, the elements 333A-333P may be aligned between the layers 331-1, 331-2. For example, the element 333C may be aligned (e.g., colinear) with element 333J. Further, the elements 333A-333P both within a single layer or between the layers 321-1-321-N may be different in size and shape. Further, while the illustrated embodiments shows the elements 333A-333P to be directly adjacent each other (e.g., a matrix or mesh), this is for example purposes, in other embodiments, there may be gaps between the elements.

Referring now to FIG. 5L, embodiments are shown of a build volume section 312 having planar layers having individually addressable elements configured as a 2D or 3D tessellation. In the embodiment of FIG. 5L, the build volume section 312 consists of a single layer comprised of a plurality of individually addressable elements each having a feature and/or functional characteristic mapped to each mesh element. In the embodiment of FIG. 5M, the build volume section 312 consists of a single layer comprised of a plurality of individually addressable elements where some of the individually addressable elements grouped into zones 339A, 339B, 339C, 339D. In the embodiment of FIG. 5N, the build volume section 312 is comprised of a plurality of layers each comprised of a plurality of individually addressable elements each having a feature and/or functional characteristics mapped to the corresponding plurality of mesh elements.

FIG. 5O illustrates another embodiment of a build volume section 312 formed by planar layers 335-1, 335-2. In this embodiment, each of the layers 335-1, 335-2 includes a plurality of elements 337A-337G having non-uniform size and/or shape relative to the other elements in the layer. It should be appreciated that the illustrated shapes and sizes are for example purposes only. In other embodiments, other size or shaped elements may be used to achieve the desired target object. Further, in some embodiments, each of the planar layers 335-1, 335-2 may have different feature or functional characteristics (as denoted by the different shading for the elements on each layer).

FIG. 5P shows a multi-dimensional build platform 302, a build volume section 312 coupled to a base section 314, and attachment interface section 316. The build volume section 312 includes a plurality of individually addressable elements 322A-322F. As discussed above, the elements 322A-322F may each be of a different size, shape and in different positions spaced apart from each other. For example, the elements may be rectangular, such as elements 322A, 322B, 322C, and each may have a different width and/or length (or depth when the element is a voxel). Further, the elements may have different shapes such as a circle, such as elements 322D, 322E, or a hexagon like element 322F for example. In an embodiment, the individually addressable elements 322A-322F may comprise any feature or functional embodiment described herein.

FIG. 5Q illustrates a build volume section 312, similar to the planar build volume section of FIG. 5B or FIG. 5D. In this embodiment, each of the individually addressable elements 320A-320I includes a functional characteristic 324A-324I that varies as a function of time. The profile of the functional characteristic 324A-324I may be non-linear. In the illustrated embodiment, the functional characteristic is a temperature as a function of time. In other words, the temperature, such as a material temperature or cure temperature for example, within the element 324A-324I varies over time and in some embodiments varies between elements. It should be appreciated that while FIG. 5Q illustrates the build volume section 312 as being planar, this is for exemplary purposes and the claims should not be so limited. In other embodiments, the build volume section 312 may be a three-dimensional curved surface, such as that shown in FIG. 5A or FIG. 5C for example.

FIG. 5R illustrates a multi-dimensional build platform 302, similar to the build volume section of FIG. 5Q having elements 320A-320L with functional characteristics 324A-324L that vary as a function of time. In this embodiment, the individually addressable elements 320A-320L have different shapes and/or are a different size. For example, elements 320A-320C are substantially square, while elements 320D-320I are rectangular, elements 320J, 320L are triangularly shaped and element 320K is a trapezoid. It should be noted that in some embodiments, the functional characteristic may be absent, such as the null characteristic 324I of element 320I that will map to a default feature as previously described herein. It should be appreciated that while FIG. 5R illustrates the build volume section 312 as being planar, this is for exemplary purposes and the claims should not be so limited. In other embodiments, the build volume section 312 may be a three-dimensional curved surface, such as that shown in FIG. 5A or FIG. 5C for example.

FIG. 5S illustrates a build volume section 312 that is the same as FIG. 5Q, except that the functional characteristic of the individually addressable elements 320A-320I is a magnetic polarization or field distribution, which is represented by arrows 324A-32I. Similarly, FIG. 5T illustrates a build volume section 312 that is the same as FIG. 5R except that the functional characteristic is a magnetic polarization. It should be appreciated that the functional characteristics of FIG. 5Q and FIG. 5R may be applied to the elements 320A-320I simultaneously or sequentially for example. In other words, the temperature and magnetic polarization may be applied to the same element simultaneously (and varied over time) or utilizing multiple elements spanning two or more different layers. It should be appreciated that while FIG. 5S and FIG. 5T illustrate the build volume section 312 as being planar, this is for exemplary purposes and the claims should not be so limited. In other embodiments, the build volume section 312 may be a three-dimensional curved surface, such as that shown in FIG. 5A or FIG. 5C for example.

It should be appreciated that while the embodiments of FIGS. 5Q-FIG. 5T describe a time variable functional characteristic, it is contemplated that the elements may have time variable feature characteristics as well.

Referring now to FIGS. 6A-FIG. 22D embodiments are shown of build volume sections that may be used in a multi-dimensional build platform and additive manufacturing systems, such as that described with respect to FIG. 3A. It should be appreciated that while build volume sections of FIGS. 6A-FIG. 22D do not illustrate the layers described above with respect to FIGS. 5A-FIG. 5T, these build volume sections may be formed from one or more layers as described herein.

In an embodiment, there may be five categories of the build volume section 312, each differing in the method by which a build volume section is generated or made available for use to the additive manufacturing system.

Figure 6A:
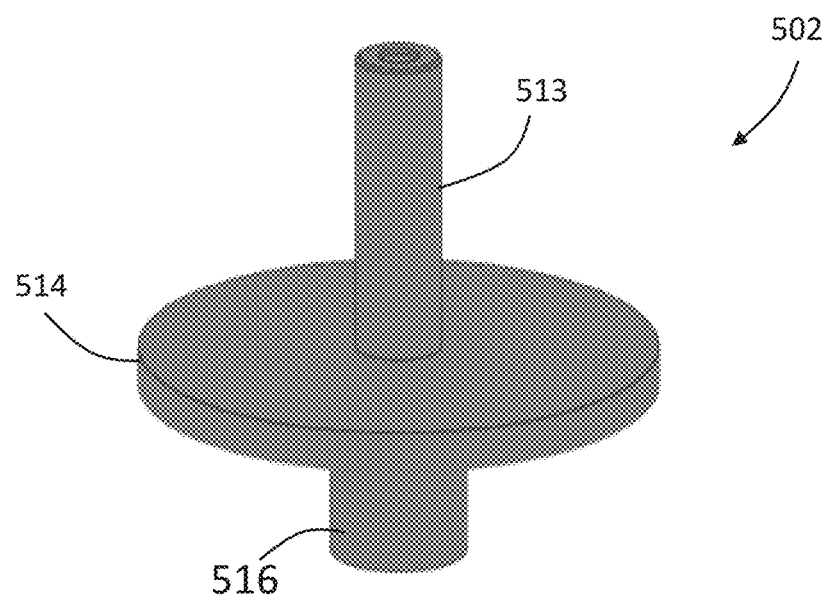
FIG. 6A and FIG. 6B are perspective and side views respectively of a multi-dimensional build platform having circular base section, an attachment interface section, and a build volume section that includes a cylindrical boss extrusion embodiment of a given height and radius whose geometry may vary in accordance with an embodiment.
Figure 6B:
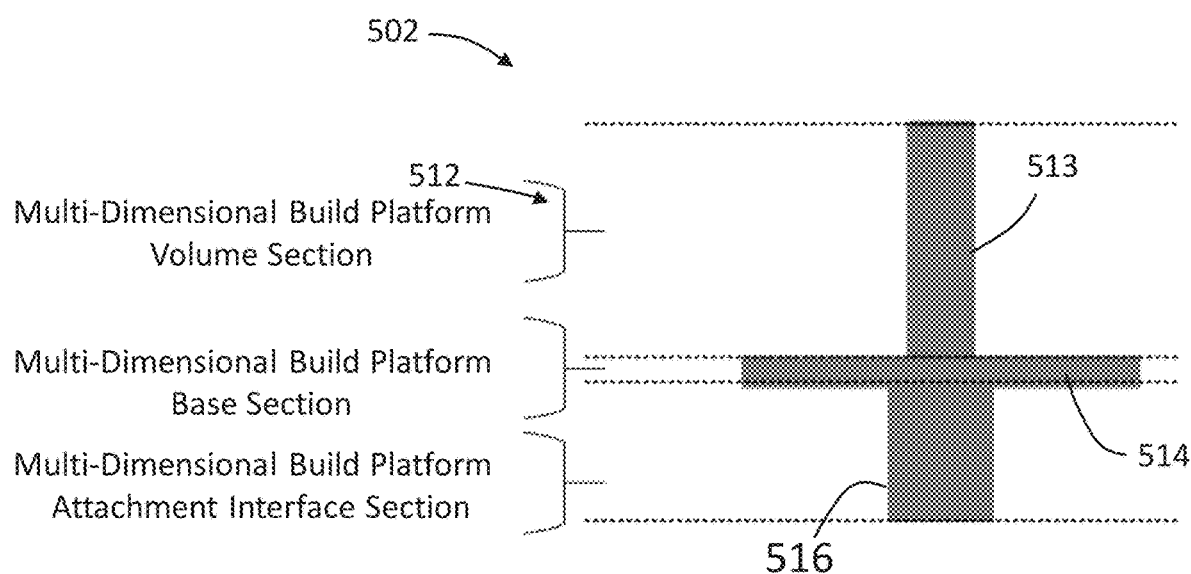
Figure 6C:
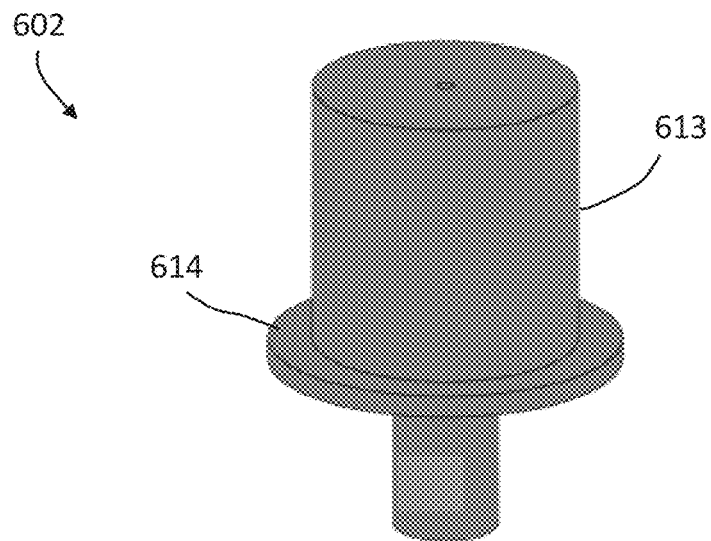
FIG. 6C and FIG. 6D are perspective and side views respectively of a multi-dimensional build platform with a circular base section, an attachment interface section, and a build volume section having a cylindrical boss extrusion whose height and radius are different whose geometry may vary in accordance with another embodiment.

The first category is a simple build volume section that includes, but is not limited to simple geometries such as rectangular, polygonal, and circular slabs, as well as other geometric primitives (spheres, pyramids, cuboids, toroid, conical, cylinders) such as shown in FIG. 6A and FIG. 6C for example. Each of these geometric primitives may be of arbitrary size, shape and dimension based at least in part on the target object geometry. The multi-dimensional build platform 302 may also include 3D boss extrusions, revolutions, or cuts as well as one or more additions (stacking of primitives) and their combinations thereof, using basic geometrical shapes resulting in build volume section geometry variants such as is shown in FIG. 6A and FIG. 6C.

Figure 10A:
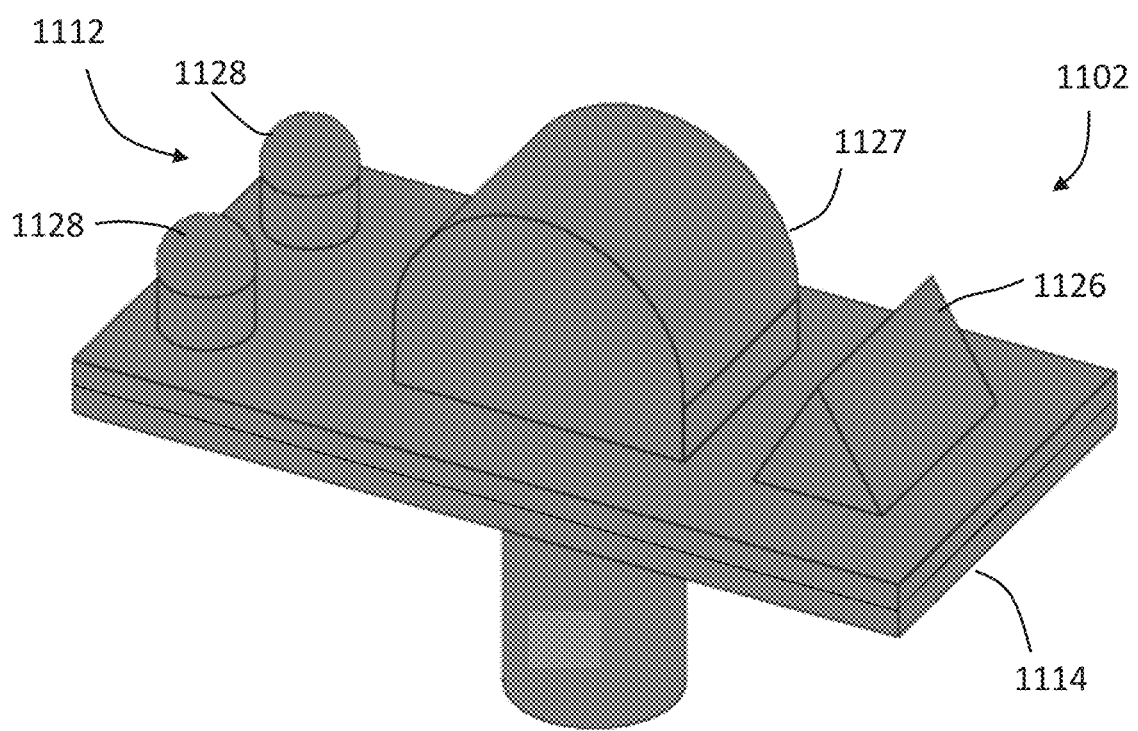
FIG. 10A is a perspective view illustration of a multi-dimensional build platform embodiment having a rectangular base section, an attachment interface section, and a build volume section that includes a cuboid with a plurality of representative 3-D primitive boss extrusions in accordance with an embodiment.
Figure 10B:
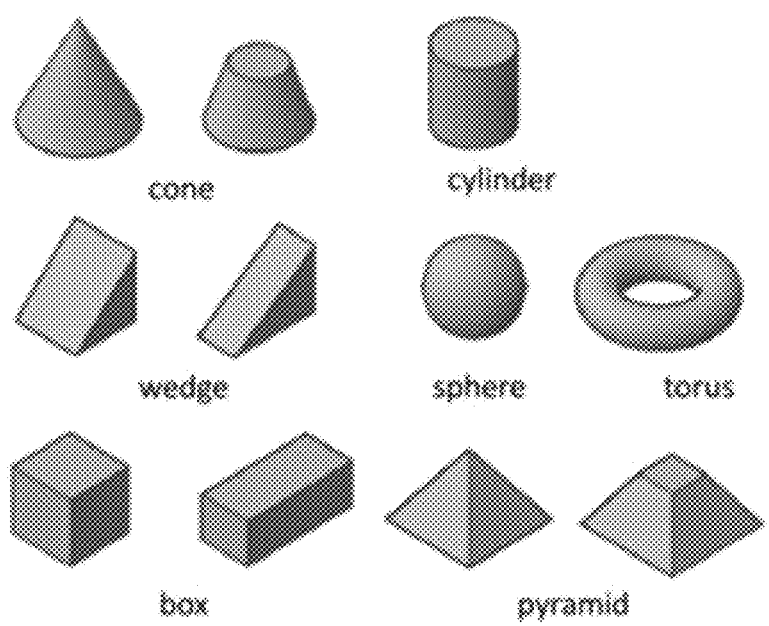
FIG. 10B and FIG. 10C are perspective view illustrations of different primitive geometry shapes and constructive solid geometry operations that may be used to construct a build volume section, such as that of FIG. 10A, in accordance with an embodiment.
Figure 10C:
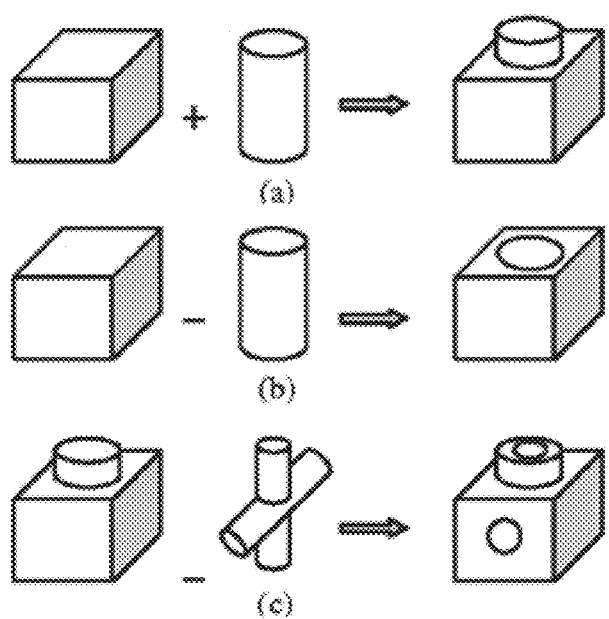

The second category involved more complex build volume section geometries that are computed based on a set of geometric primitives (e.g., those simple geometries described with respect to category one) and the use of generative methods as illustrated in FIG. 10B and FIG. 10C. The generative methods may include constructive solid geometric (CSG) operations for example, to realize a resultant build volume section as illustrated in FIG. 10A.

The third category includes predictively matched and defined based at least in part on predictive matching the target specification (as a 3D query object) to a build platform model database. The database comprises reusable build volume section geometries. The matching to an input CAD model specification may be based at least in part on STL formats, STEP formats, mesh, boundary representation, point clouds, or any other common geometrical surface or volume representation formats.

The fourth category directly synthesizes, from a 3D CAD specification or a 3-dimensional scan of a target object, to a target build volume section 312 that optimally matches the scanned target object.

The fifth category provides for direct implementation of the build platform as externally created and imported into the build platform synthesis system. In an embodiment the build platform model database described with respect to the third category and described in more detail herein.

In an embodiment, the first category is used to define the build volume section in a plurality of forms. From a simple set of geometrical patterns comprising different shapes, lengths, widths, and depths of circles, rectangles, polygons and irregular shapes, all as non-limiting geometric variants of the basic planar build platform; to more complex geometries resulting in a formal build volume section geometry comprising pluralities of boss extrusions and cuts forming a non-limiting set of build volume section geometries, shapes and configurations.

In an embodiment, when the first category does not provide a desired solution for the build volume section, the second category may be performed to provide a predictive recognition and intelligent matching of a database of build platform volume sections that have been previously generated. In this embodiment the predictive method is utilized to recognize/identify a target object and integrate additive manufacturing system and fabrication configuration and parameters, for the generation of a multi-dimensional object query vector (also referred to as a "search vector" or "multi-dimensional search vector") that is then utilized to search through a spatial database of build platform objects. The process of 3D object recognition and retrieval through machine learning methods for deriving a build platform solution (or set of solutions) occurs prior to invoking a generative synthesis process as described in the third category. Where first category is used, the resultant of any new build platform is saved within a model database comprising available build platforms allowing it to be used in future fabrication operations.

In an embodiment, significantly more complex build volume section geometries are generated through the generative computing method of CSG in conjunction with a build volume section primitive library database. In this method, a library of geometric primitives (including as example: cylinders, cuboids, conical, spherical, toroid, spline surfaces and angular wedges; full solids or half-spaces, and combinations thereof) are utilized in conjunction with a plurality of computational operations (such as Boolean and other rigid transformations) to generate a build volume section in accordance to a desired target object geometry. The desired geometry represents the build volume section that reduces or minimizes both geometric and feature error (considering the additive manufacturing system capabilities) associated to fabrication of a given target object geometric, structural, and functional specification. In an embodiment the use of CSG operations and multiple optimizations and/or predictive methods are used to produce the build volume section for a given target object input, set of fabrication requirements/specifications, and additive manufacturing system capability specifications.

Figure 13:
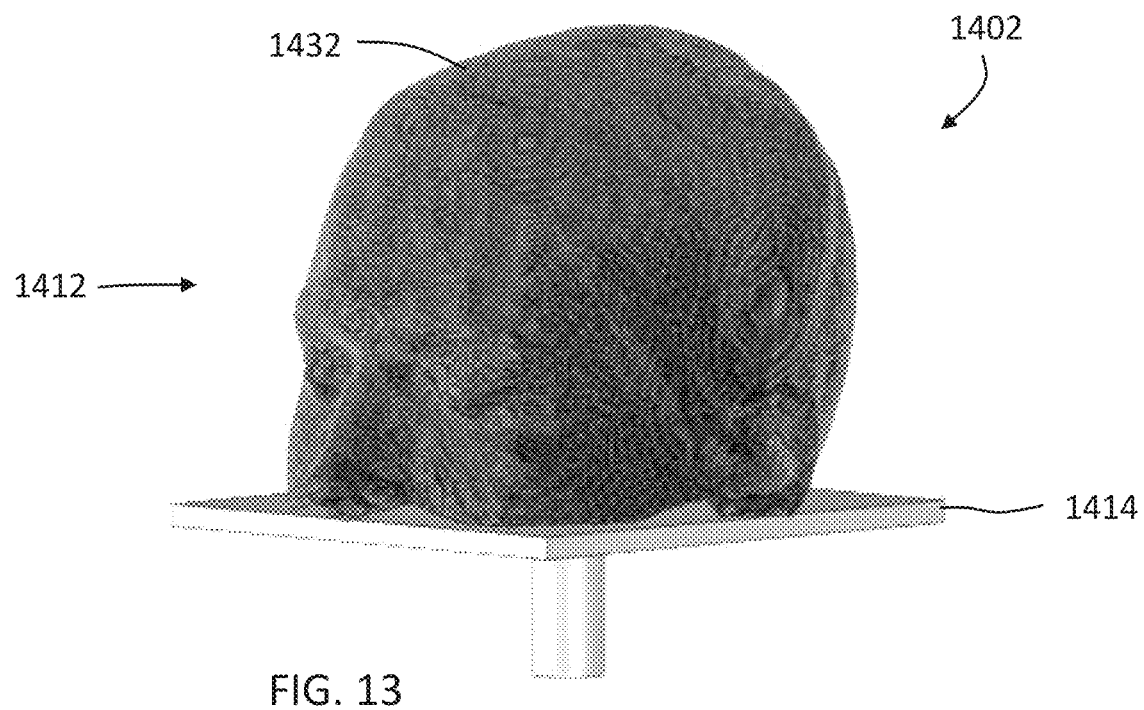
FIG. 13 and FIG. 14 are perspective view illustrations of a multi-dimensional build platform embodiment where the build volume section includes 3-dimensional objects and geometries such as anatomical human shapes and other objects that may be generated from 3D scanning systems in accordance with an embodiment.
Figure 14:
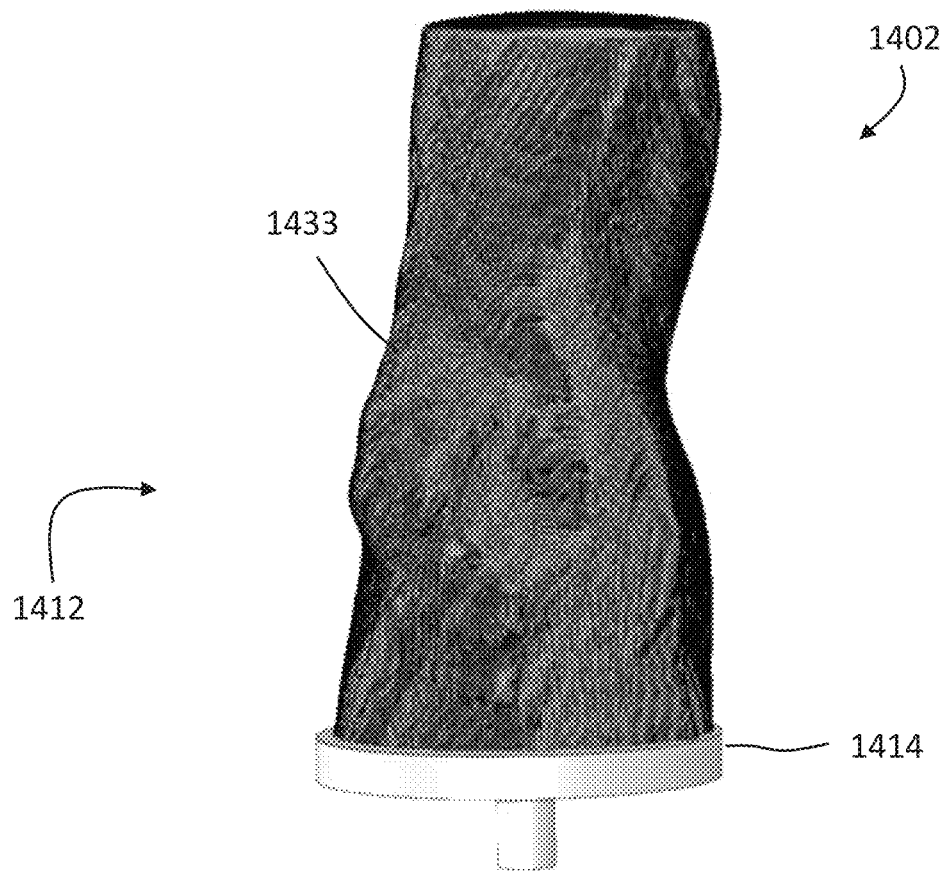

In still another embodiment, a method of defining a build volume section by direct synthesis is provided. In this embodiment, the build volume section is directly generated by the input target object specification from a 3D scan of a target object. As an example, a target object can be a human body part such as head or knee, or any other anatomical structure (FIG. 13, FIG. 14). In these cases, the synthesized build volume section could be utilized in facilitating fabrications of MRI systems, medical and prosthetic devices, as well as bio-printable structures. Once a directly synthesized build volume section is imported and enriched in a manner similar to other target objects, it is stored as an additional build volume section geometry within the build platform model database. In an embodiment, the synthesized build volume section may be enriched or modified to include metadata. This metadata may include additional information about the target object, such as the material(s) to be used, fabrication parameters (e.g., temperature(s), deposition/extrusion rate(s)), the type of fabrication process, identifiers of sub-components to be placed on the target object, or a combination of the forgoing, each of which utilized during build volume section synthesis.

Finally, in another embodiment a method is provided that enables the user to define through external CAD system tools a complete design of a build platform, or any of the three sections 312, 314, 316. In this scenario the applicable user-generated build platform section or sections are imported, normalized, and parameterized for addition into the build platform model database for use by the build platform synthesis system. As an exemplary embodiment the user-generated build platform may be imported into the build platform for training predictive and machine learning methods thereby improving their recognition accuracy.

The build volume section 312 may be utilized to fabricate complex surface or volume geometries whereby the build volume section 312 provides for geometry, tool axis, and contour support functions enabling the efficient fabrication of the target object and a reusable manner across thousands of fabrications cycles of the additive manufacturing system 300. An embodiment extends the utilization of a given build volume section 312 for use as an integral sub-assembly or prebuilt component or sub-assembly of a given target object as a volume component of the corresponding target object. In this embodiment, the build volume section is not reusable, but rather is fused or is integrally formed into the target object as part of the fabrication process and final assembly. In other words, once the additive manufacturing process is complete, the build volume section is removed with, and remains part of, the fabricated target object. That is, a target object is fabricated and directly incorporates the build volume section as a prefabricated build component element. This provides a significant technical solution for reducing fabrication time, since the build volume section is a prebuilt component structure, fabrication time used by the additive manufacturing system can be reduced by the achievable volume of the build volume section relative to the total volume of the target object. In an embodiment a factor in utilizing of build volume section as a prebuilt component primitive includes the remainder (target object less build volume section geometry) of the target object material composition being aligned with the build volume section component composition and a suitable base section and attachment interface (described hereafter) are utilized. The decision and process for determining whether a build platform is for facilitating multi-axis fabrication processing only or incorporation into the final target object as an actual integral part primitive is discussed in more detail herein.

Referring now to FIG. 6A and FIG. 6B an embodiment is shown of a multi-dimensional build platform 502 that includes a circular base section 514 that is similar to FIG. 4A. In this embodiment, the build volume section 512 includes a cylindrical portion 513 projecting from the base section 514. An attachment interface section 516 is also provided. In this embodiment, the cylindrical portion 513 has a diameter that is relatively small compared to the diameter of the base section 514. In an embodiment, the cylindrical portion 513 is coaxial with the base section 514. In another embodiment, the cylindrical portion 513 has an axis that is offset from an axis of the base section 514. The cylindrical portion 513 provides advantages in the fabricating of target objects having a thin wall cylindrical structures, including those that incorporate embedded subsystems or portions, such as but not limited to embedded electronics or conductive patterns for example. In some embodiments the embedded electronics or conductive patterns may form or function as an antenna, an NMR/MRI receive and/or transmit coil, one or more MRI shims, and/or gradient coils for example. In an embodiment, the multi-dimensional build platform 502 may be used with fixed, dynamic or static elements, or any of the feature or functional characteristic described herein.

Figure 6D:
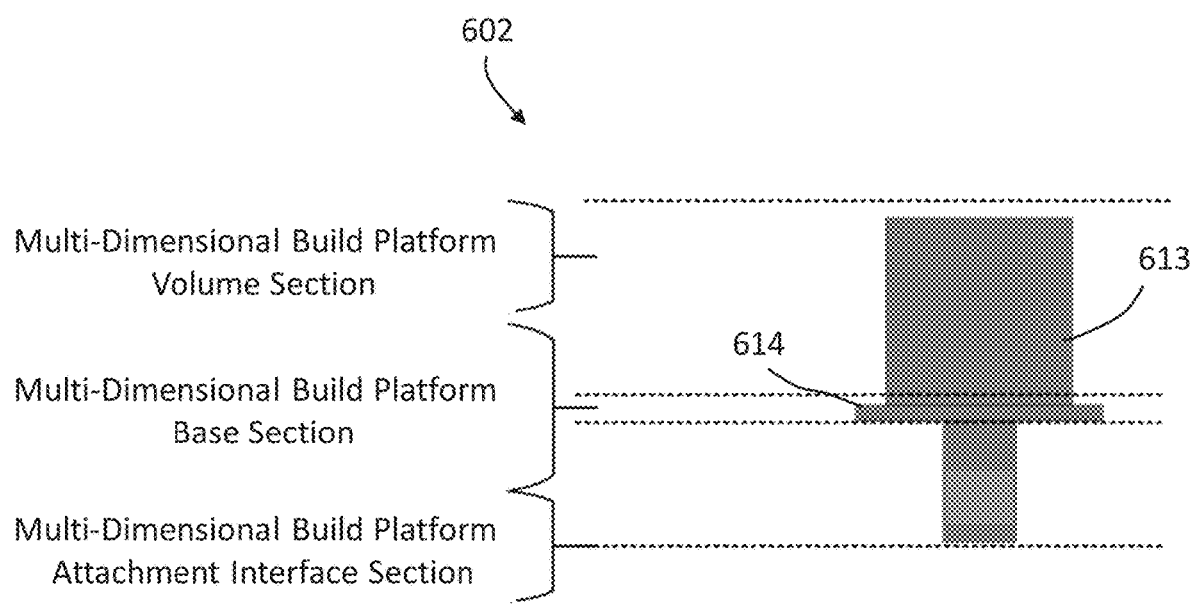

FIG. 6C and FIG. 6D show an embodiment of another multi-dimensional build platform 602 that is similar to the multi-dimensional build platform 502 of FIG. 6A. In this embodiment, the cylindrical projection 613 has a diameter that is large relative to the diameter of the base section 614. It should be appreciated that the cylindrical projections 513, 613 may have the size, radius, height or other geometry parameters varied to fabricate the desired target object. In an embodiment, the cylindrical projection 613 may be sized for a full sized MRI chamber with coils fabricated on the curved surface. In an embodiment, the multi-dimensional build platform 602 may be used with fixed, dynamic or static elements or any of the feature or functional characteristic described herein.

Figure 7A:
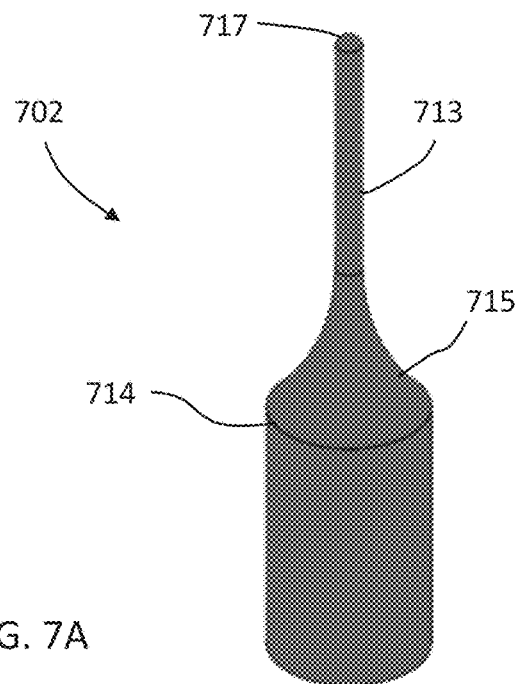
FIG. 7A and FIG. 7B are perspective and side views respectively of a multi-dimensional build platform having a circular base section, an attachment interface section, and a build volume section having a conical-cylindrical surface in accordance with an embodiment.
Figure 7B:
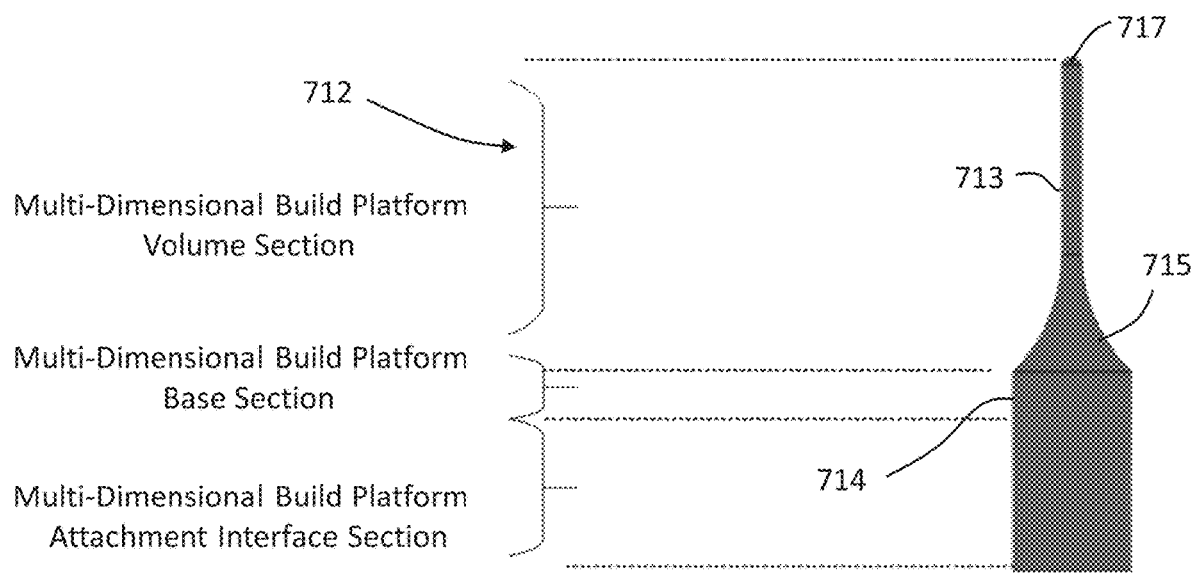
Figure 33A:
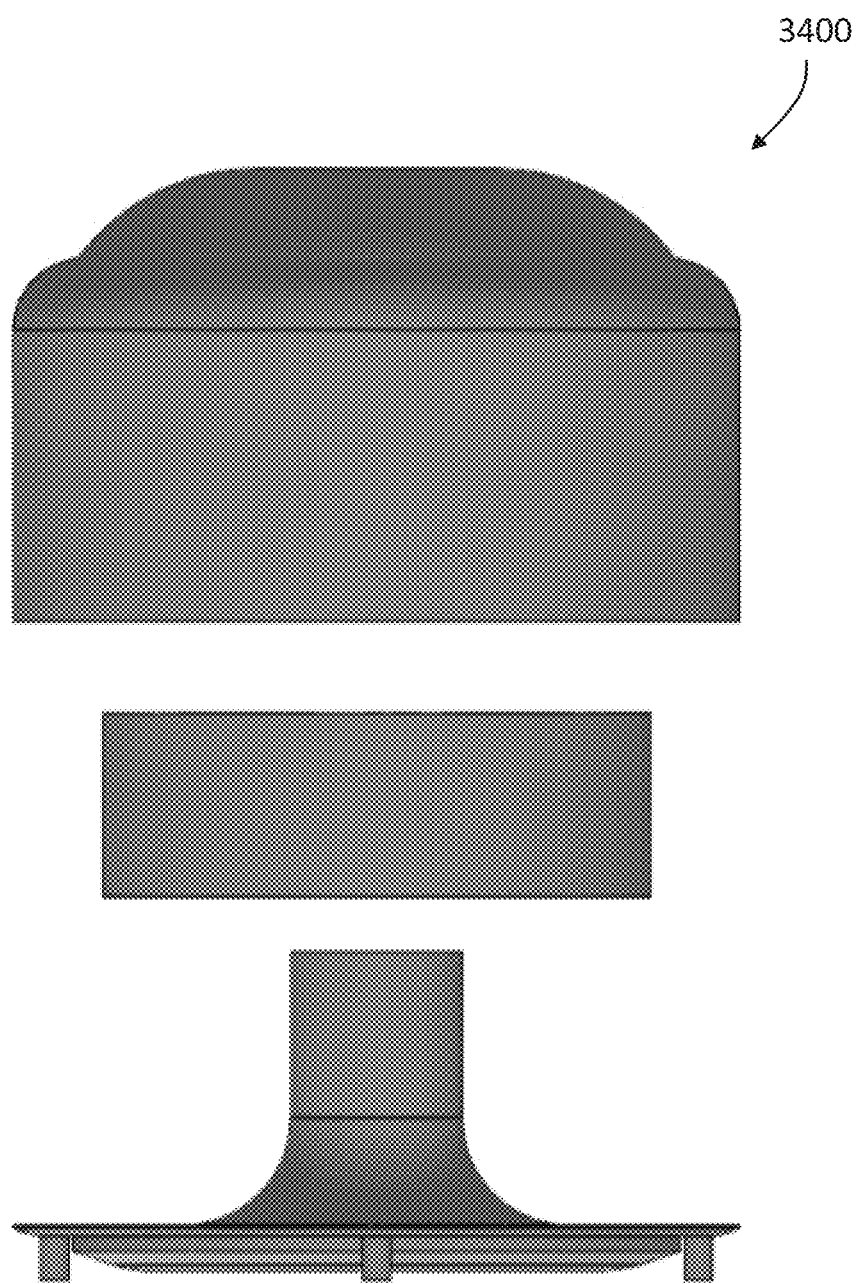
FIG. 33A, FIG. 33B and FIG. 33C illustrate a side view of a target object for use in a portable desk-top NMR/MRI functional device that is fabricated using a multi-dimensional build platforms in accordance with an embodiment.
Figure 33B:
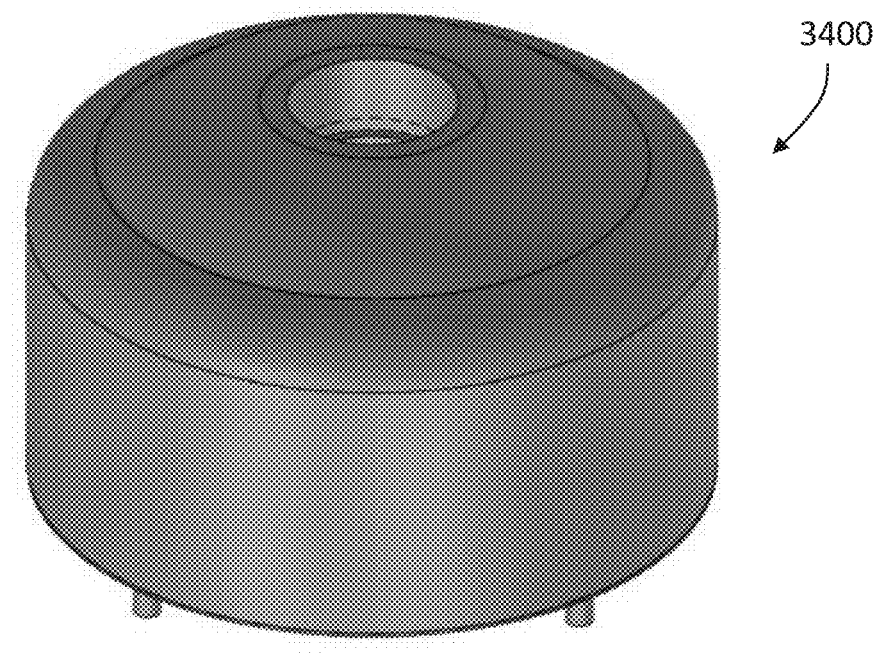
Figure 33C:
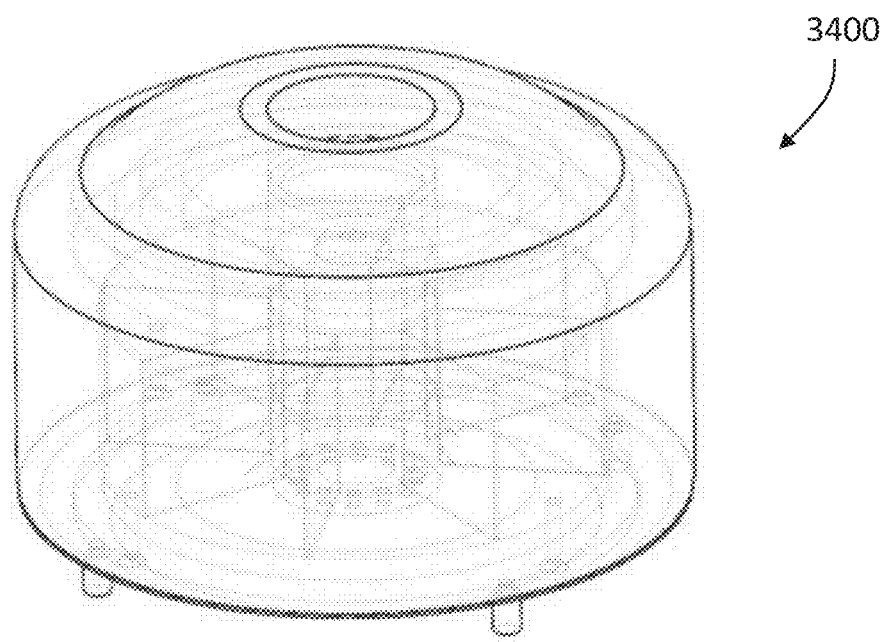

FIG. 7A and FIG. 7B show an embodiment of a multi-dimensional build platform 702. In this embodiment, the build volume section 712 includes a first portion having a curved and tapered surface 715 (e.g., a hyperboloid) extending from the base section 714. A cylindrical portion 713 extends from the end or vertex of the tapered surface 715. In an embodiment, the multi-dimensional build platform 702 may be used to fabricate medical or sensor devices, such as the medical device 3400 of FIGS. 34A-FIG. 33C. In an embodiment, a semi-spherical portion 717 may be arranged on the end of the cylindrical portion 713. In an embodiment, the multi-dimensional build platform 702 may be used with fixed, dynamic or static elements or any of the feature or functional characteristic described herein.

Figure 8A:
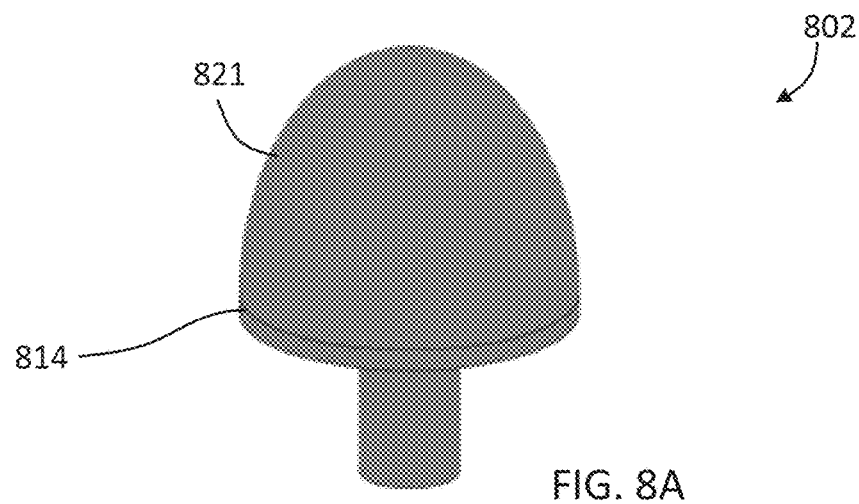
FIG. 8A and FIG. 8B are perspective and side views respectively of a multi-dimensional build platform having a circular base section, an attachment interface section, and a build volume section having spherical conical surface in accordance with an embodiment.
Figure 8B:
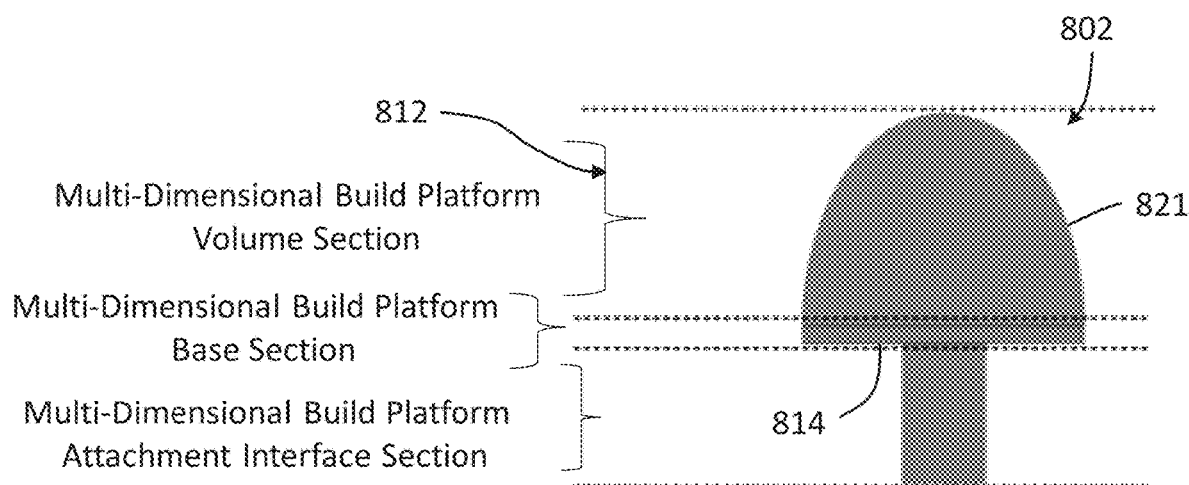

FIG. 8A and FIG. 8B show an embodiment of a multi-dimensional build platform 802. In this embodiment, the build volume section 812 includes a parabolic shape 821 that extends from the base section 814, with the widest part of the parabolic shape 821 being coupled to the base section 814. In an embodiment, the multi-dimensional build platform 802 may be used with dynamic or static heating as described herein with reference to FIG. 23-FIG. 26. It should be appreciated that a parabolic, spherical or other curved build volume sections may provide advantages in fabricating target objects, such as but not limited to: sensors (e.g., NMR, chemical, gas/liquid, optical, IoT), scanners, medical devices (e.g., MRI/NMR), consumer electronics, vehicle and aircraft sub-assemblies, antennas, and radomes as representative and non-limiting examples. In an embodiment, the multi-dimensional build platform 802 may be used with fixed, dynamic or static elements, or any of the feature or functional characteristic described herein.

Figure 9A:
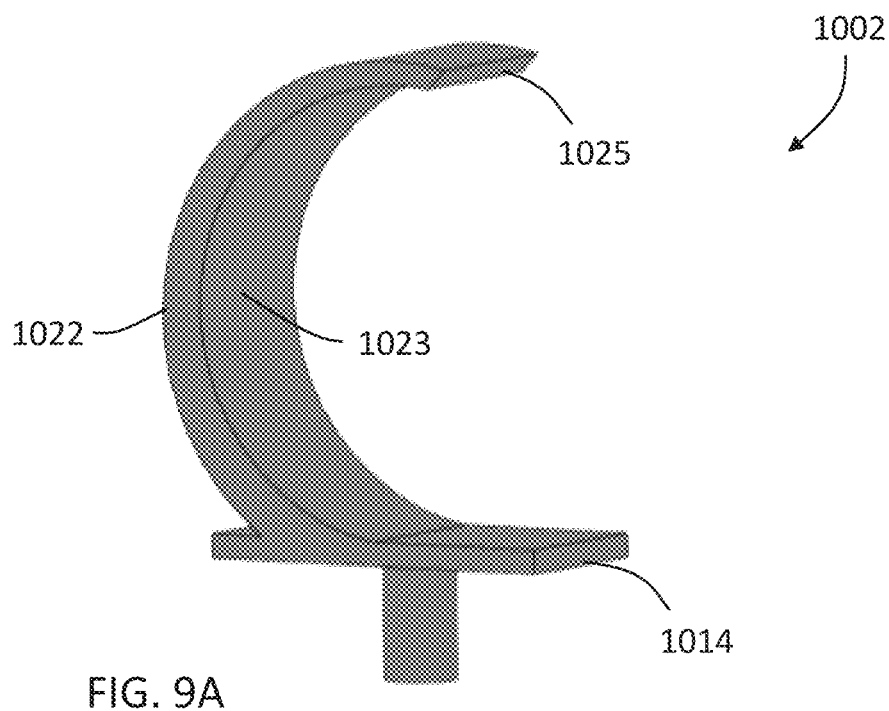
FIG. 9A and FIG. 9B are perspective and side views respectively of a multi-dimensional build platform having a rectangular base section, an attachment interface section, and a build volume section that illustrates that the use of support materials to additively manufacture the given shape, or generally any shape possessing an overhang geometry may be reduced or eliminated in accordance with an embodiment.
Figure 9B:
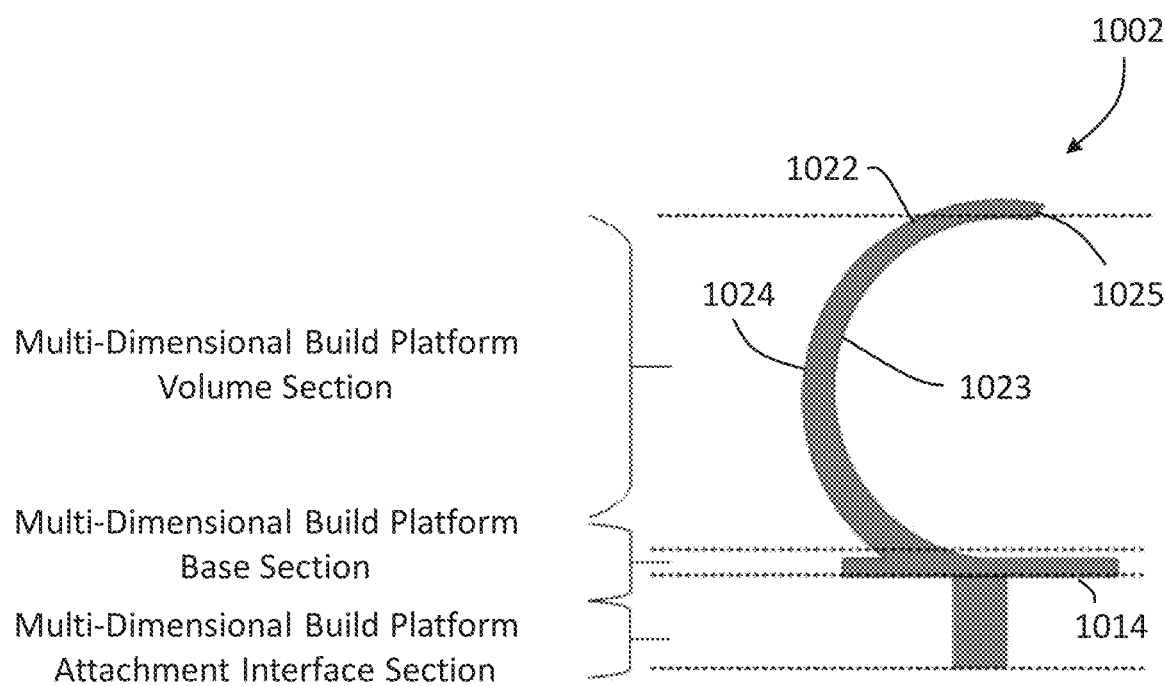

FIG. 9A and FIG. 9B show an embodiment of a multi-dimensional build platform 1002. In this embodiment, the multi-dimensional build platform 1002 includes a base section 1014 and build volume 1002 having a curved projection extending therefrom. In an embodiment, the curved projection 1022 is semi-circular and forms a "C" shape. in some embodiments, the curved projection 1022 includes an inner surface 1023 and an outer surface 1024. In an embodiment, the surfaces 1023, 1024 may have different center points resulting in the thickness of the curved projection 1022 tapering from the base section 1014 to the tip 1025. It should be appreciated that in some embodiments, the multi-dimensional build platform 1002 allows for a hollow C-shaped target object without having, or at least substantially reducing, supporting structures, while also allowing the target object to be removable from the build volume section 1012 due to the taper of the thickness between the surfaces 1023, 1024. In an embodiment, the multi-dimensional build platform 1002 may be used with fixed, dynamic or static elements, or any of the feature or functional characteristic described herein.

It should be appreciated that while the embodiment of FIG. 9A and FIG. 9B illustrates the build volume section as being generally "C" shaped, this is for example purposes and the claims should not be so limited. In other embodiments, other curved shapes may be provided that allow for the fabrication of target objects having overhangs/cantilever-portions without having to fabricate temporary support structures or introducing additional tool axes thereby simplifying the additive manufacturing system and process complexity. The lack of support structures reduces the amount of material used in the fabrication process and post processing operations are reduced or eliminated. Thus, a system 300 using a build platform as described herein provides advantages in reducing time fabrication time and costs.

FIG. 10A shows an embodiment of a multi-dimensional build platform 1102. In this embodiment, the build volume section 1112 may include a plurality of projections 1126, 1127, 1128 extending from the base section 1114. These projections may be formed from geometric primitives, such as a triangular projection 1126, a cylindrical projection 1127 that has an axis parallel to the top of the base section 1114, and a pair of semispherical projections on an end of cylindrical projections 1128. In other embodiments the geometric primitives shown in FIG. 10B and FIG. 10C may be used, either individually or in combination, to form the build volume section. In an embodiment, the multi-dimensional build platform 1102 may be used with fixed, dynamic or static elements, or any of the feature or functional characteristic described herein.

Figure 11:
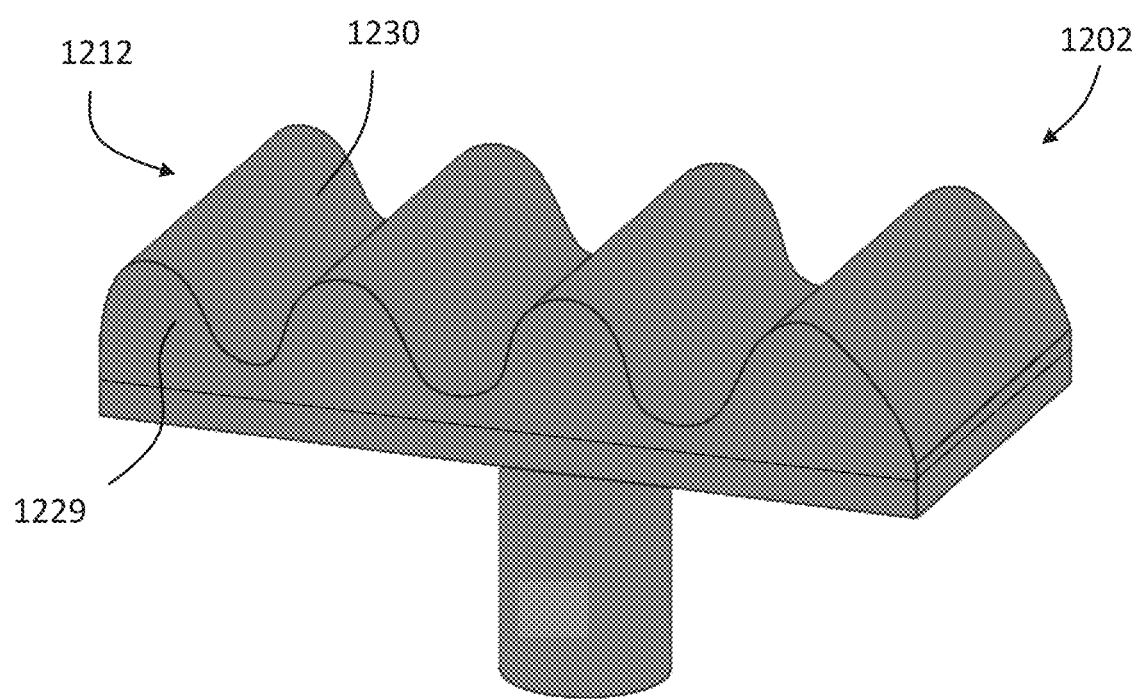
FIG. 11 is a perspective view illustration of a multi-dimensional build platform embodiment having a rectangular base section, an attachment interface section, and a build volume section that includes multiple curved geometries of arbitrary size and shape in accordance with an embodiment.

FIG. 11 shows an embodiment of a multi-dimensional build platform 1202. In this embodiment, the build volume section 1212 has a projection 1229 having a nonplanar upper surface 1230. In an embodiment, the surface 1230 has a wave, sinusoidal, or arbitrary curved surface shape. In an embodiment, the multi-dimensional build platform 1202 may be used with fixed, dynamic or static elements, or any of the feature or functional characteristic described herein.

Figure 12:
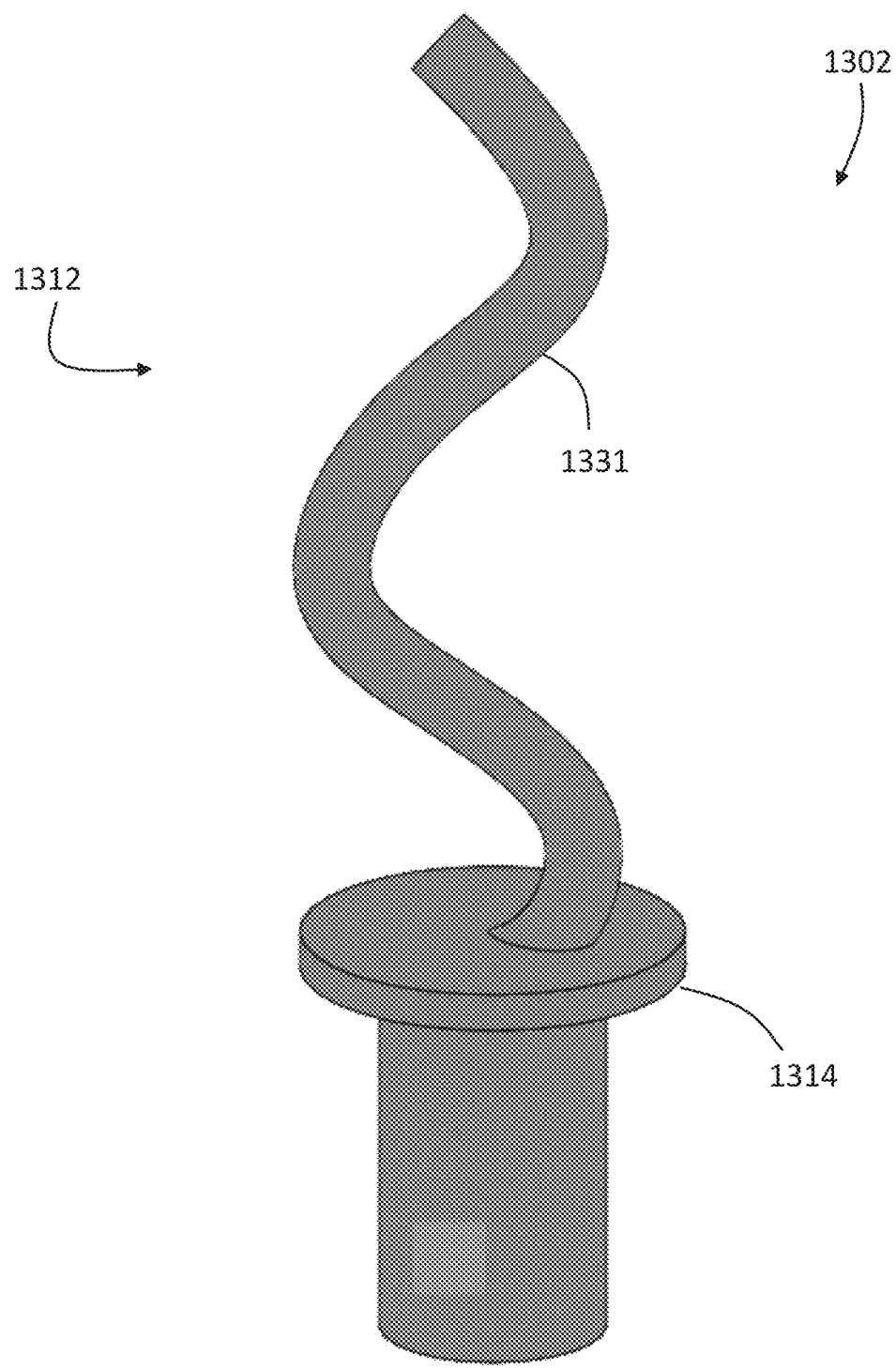
FIG. 12 is a perspective view illustration of a multi-dimensional build platform embodiment having a circular base section, an attachment interface section, and a build volume section that includes both curved and rotating geometries of arbitrary size and shape in accordance with an embodiment.

FIG. 12 shows an embodiment of a multi-dimensional build platform 1302. In this embodiment, the build volume section 1312 includes a projection 1331 having a continuous curve, such as a helical or corkscrew shape extending from the base section 1314. In one embodiment the continuous curved or helical structure of the build volume section 1312 enables the additive manufacturing of objects comprising continuous curved or helical structures or objects containing multiple curved or helical structures without the requirement of a supporting material or one or more process steps or tools for stabilizing the curved or helical structures during fabrication. In an embodiment, the projection 1331 is removably detachable from the base section 1314 so that once the target object is fabricated, the projection 1331 is integrally part of the target object. In an embodiment, the multi-dimensional build platform 1302 may be used with fixed, dynamic or static elements, or any of the feature or functional characteristic described herein.

FIG. 13 and FIG. 14 show an embodiment of a multi-dimensional build platform 1402 having a build volume section 1412 in the shape of anatomical object that extends from a base section 1414. FIG. 13 shows an embodiment where the build volume section 1412 is a portion of a human head 1432. FIG. 14 shows an embodiment where the build volume section 1412 in the shape of a human knee and a portion of the adjacent leg 1433. In an embodiment, the shapes 1432, 1433 are defined using a 3D coordinate measurement device, such as a laser scanner or a photogrammetry device for example. It should be appreciated that having a build volume section in the shape of anatomical structure allows for the custom forming of medical devices (such as to facilitate diagnostic and analysis procedures), sensors, bio-printed structures, prosthetics and wearables for an individual. In an embodiment, the multi-dimensional build platform 1402 may be used with fixed, dynamic or static elements, or any of the feature or functional characteristic described herein.

Figure 15:
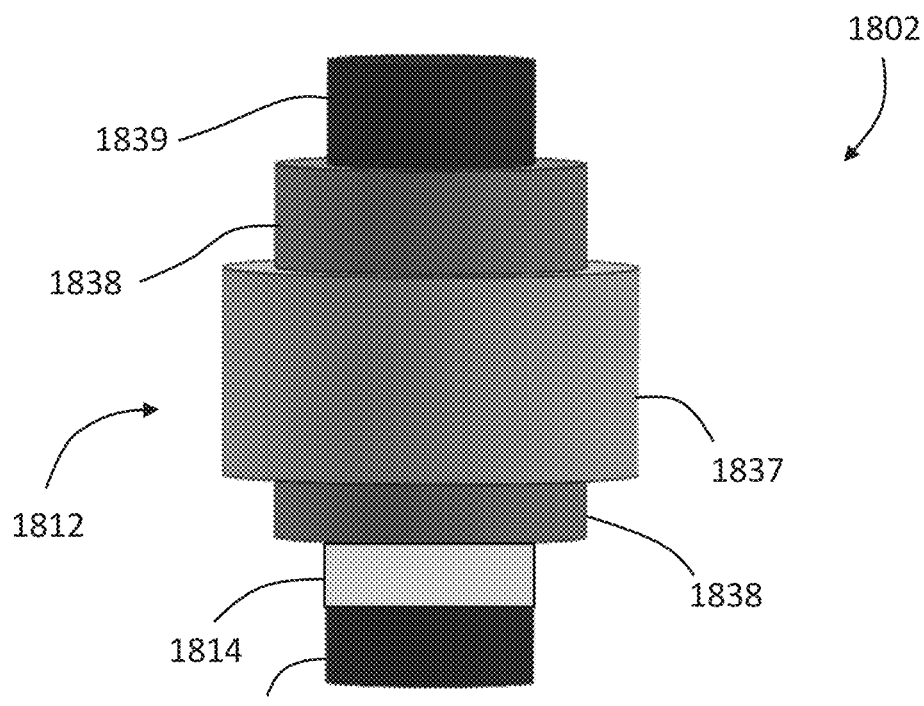
FIG. 15 is a side-view illustration of a multi-dimensional build platform embodiment having a build volume section that includes an integral sub-component of a target object in accordance with an embodiment.
Figure 16:
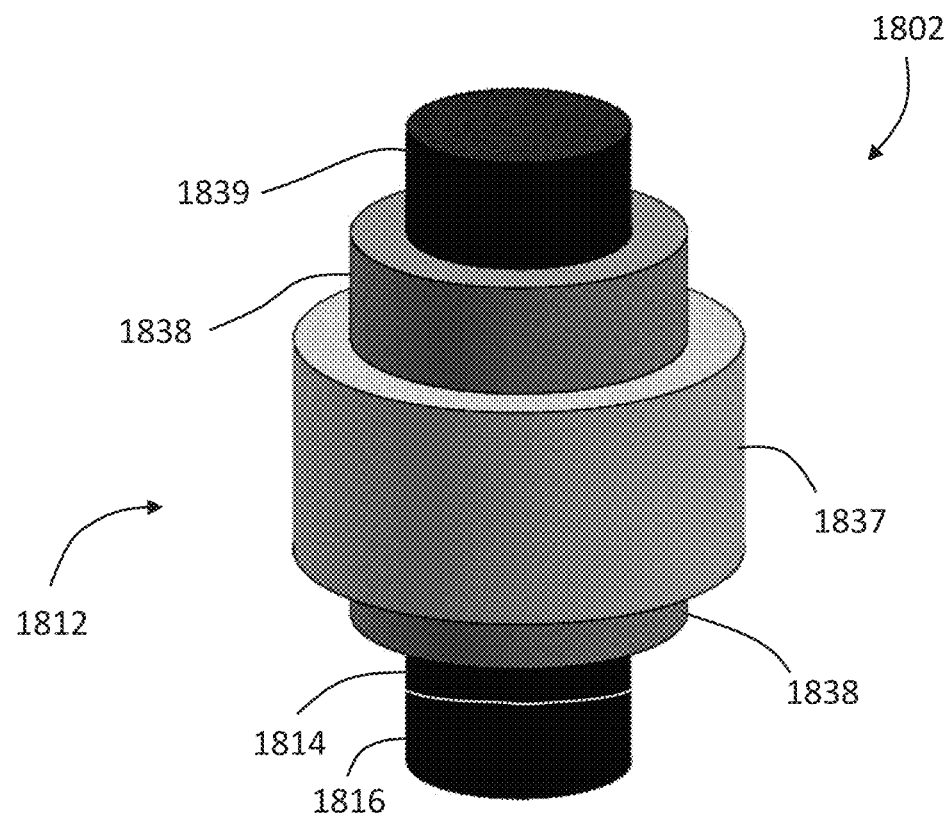
FIG. 16 is a perspective-view illustration of a multi-dimensional build platform embodiment utilized as an integral sub-component of a target object in accordance with an embodiment.

FIG. 15 and FIG. 16 show an embodiment of a multi-dimensional build platform 1802 having a build volume section 1812 that includes a cylindrical build volume section portion (sub-component) 1839 as build volume section sub-component provides a surface for the additive manufacturing system to deposit material and perform additional fabrication operations. It should be appreciated that the member 1838 is coupled to abase section 1814 and attachment section 1816. In an embodiment, the material is deposited by the additive manufacturing system onto the cylindrical member 1839 to form the complete target object. In an embodiment, once the target object is formed, the member 1839 is uncoupled from the base section and forms an integral part of the target object. In an embodiment, the multi-dimensional build platform 1802 may be used with fixed, dynamic or static elements, or any of the feature or functional characteristic described herein.

Figure 17:
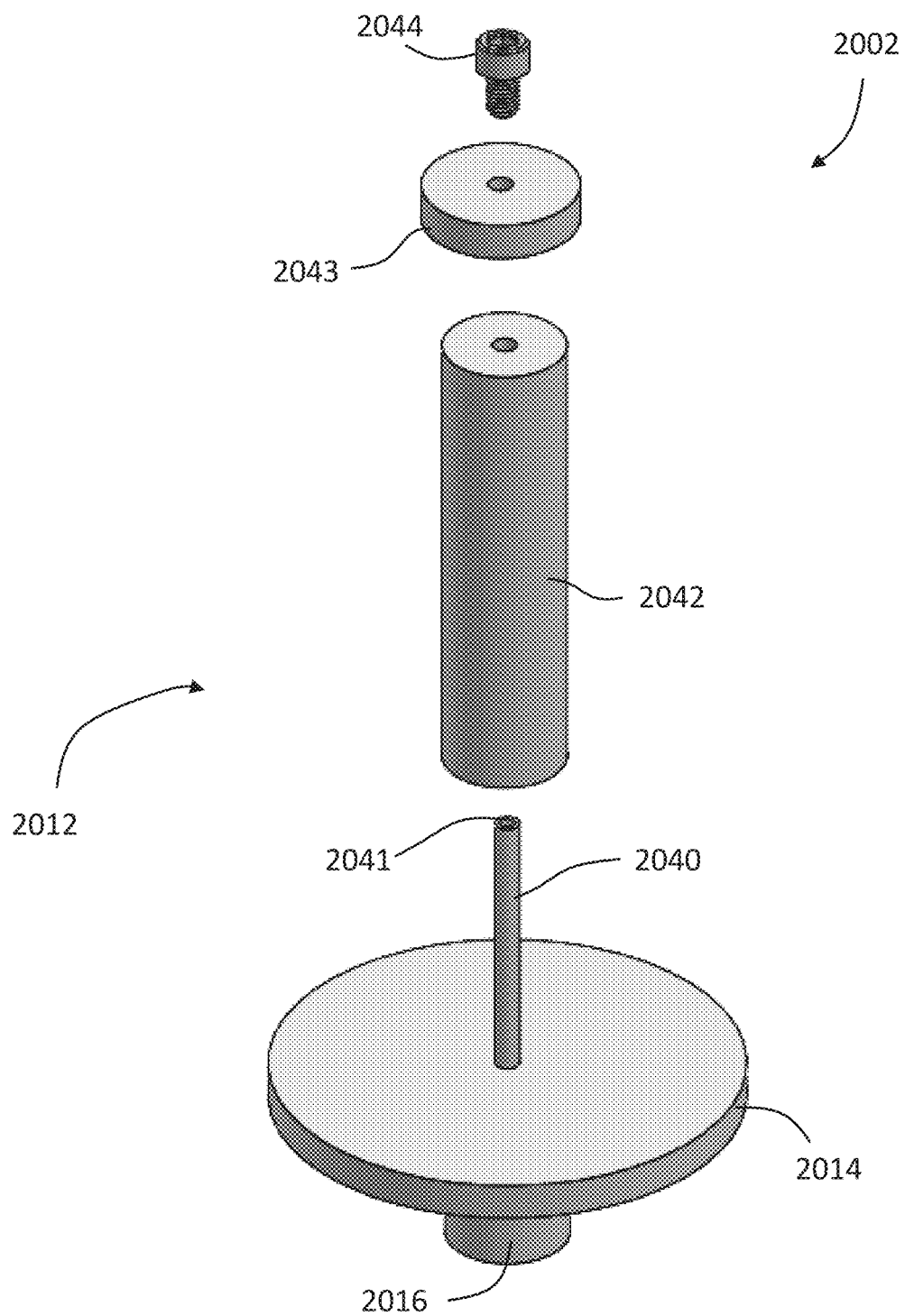
FIG. 17 is an unassembled perspective view of a multi-dimensional build platform assembly having an attachment interface section, a circular base section and a build volume section that includes at least a portion of the build volume section that is incorporated into the target object in accordance with an embodiment.

Referring now to FIG. 17, an embodiment is shown a multi-dimensional build platform 2002 having a build volume section 2012 that may be integrated into the target object. In this embodiment, the multi-dimensional build platform 2002 includes a base section 2014 and an interface section 2016. Coupled to the base section 2014 is a cylindrical projection 2040 having a bore 2041 on an end opposite the base section 2014. The bore 2041 includes a coupling means, such as screw threads, sized or configured to receive a fastener 2044. The build volume section 2012 further includes a cylindrical member 2042 having a central opening sized to slidably receive the cylindrical projection 2040. In an embodiment, the cylindrical member 2042 is sized to have a length that extends past the end of the cylindrical projection 2040. A cap member 2043 is arranged between the fastener 2041 and the cylindrical member 2042.

After the target object is formed in the build volume section 2012, the operator removes the fastener 2044 and the cap member 2043. This allows the cylindrical member 2042 together with the target object to be removed from the additive manufacturing system. In other words, the cylindrical member 2042 is a sub-assembly or sub-component of the target object. It should be appreciated that while the illustrated embodiment shows a cylindrically shaped build volume section member 2042, this is for example purposes and the claims should not be so limited. In other embodiments, the member 2042 may have other shapes and be comprised of a plurality of different surfaces. Further, the member 2042 may be formed from multiple components. In still further embodiments, the member 2042 may include a key or keyway that allows the member 2042 to be interlocked with the material deposited thereon. In an embodiment, the multi-dimensional build platform 2002 may be used with fixed, dynamic or static elements, or any of the feature or functional characteristic described herein.

Figure 18:
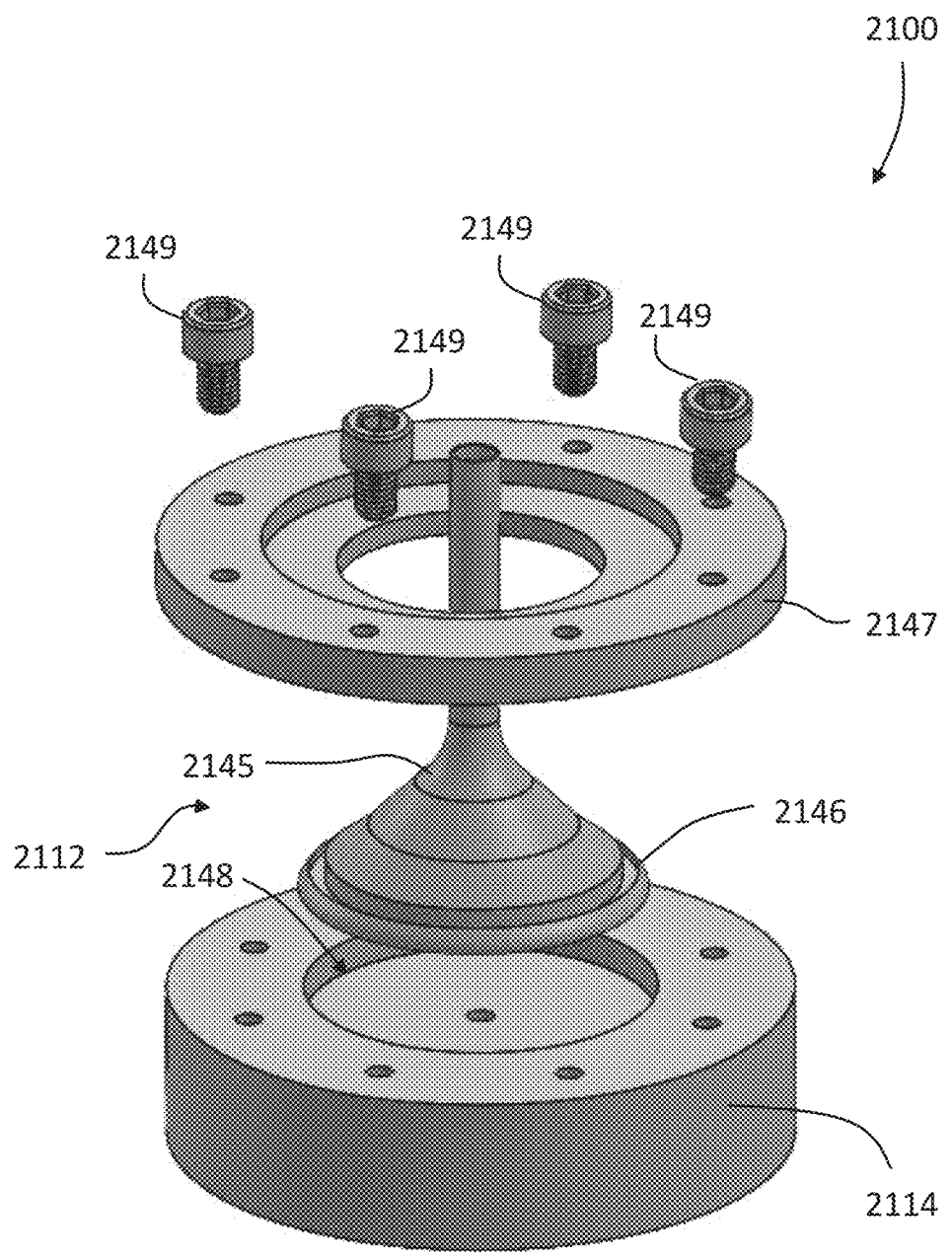
FIG. 18 is a perspective view illustration of a multi-dimensional build platform assembly having a circular base section inclusive of a compression ring and screws for securing a build volume section, where the build volume section includes a 3-dimensional conical structure that is integrated to the base section in accordance with an embodiment.

Referring now to FIG. 18, another embodiment is shown of a multi-dimensional build platform 2100 having a build volume section 2112 that is removable from the base section 2114 and is integrated into the target object. In this embodiment, the build volume section 2112 includes a component 2145 that includes a flange 2146. The component 2145 may itself have been a target object formed from additive manufacturing in a previous fabrication step. In an embodiment, the component is used to fabricate and is incorporated into a medical device 3400 shown in FIGS. 31A-33C. The component 2145 is coupled to the base section 2114 by a clamping ring 2147 that engages the flange 2146. In an embodiment, the base section 2114 includes a recess 2148 that is sized to receive a bottom end of the component 2145. The clamping ring 2147 is coupled to the base section 2114 by fasteners 2149. In an embodiment, the multi-dimensional build platform 2100 may be used with fixed, dynamic or static elements, or any of the feature or functional characteristic described herein.

Figure 19:
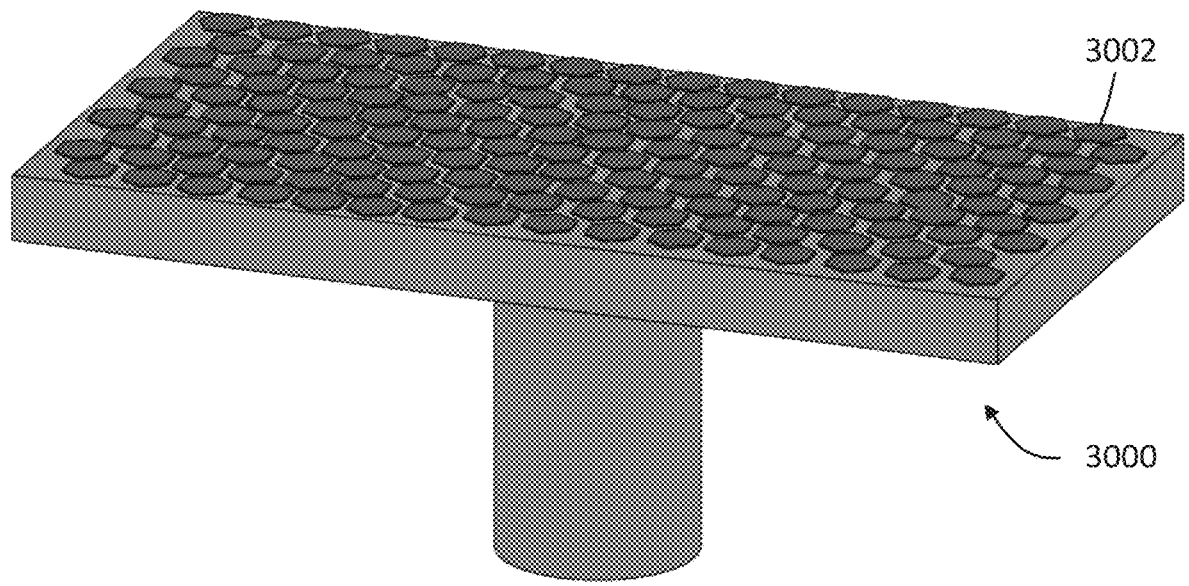
FIG. 19 is a perspective view illustration of a multi-dimensional build platform embodiment where the build volume section is dynamically reconfigurable geometrical structure based on programmable shape and geometry methods utilizing software controllable electromagnetic microcoils in accordance with an embodiment.
Figure 20:
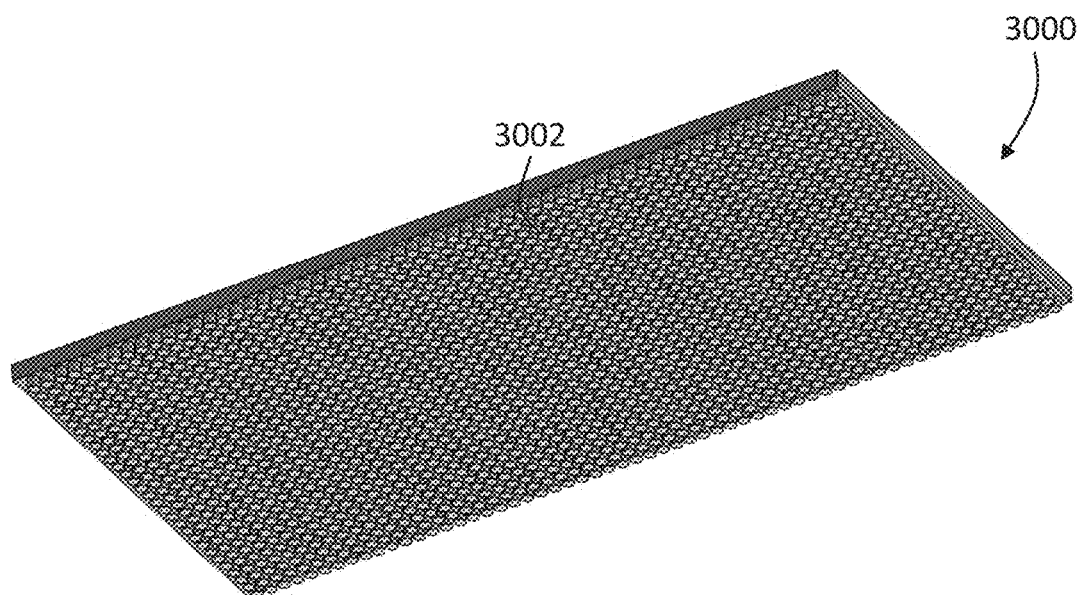
FIG. 20 is a perspective view illustration of the flexible surface structures for use with the multi-dimensional build platform of FIG. 19 incorporating topology optimized lattice and magnetic material substrates that can be selectively reconfigured into a plurality of geometries under programmatic control in accordance with an embodiment.
Figure 21A:
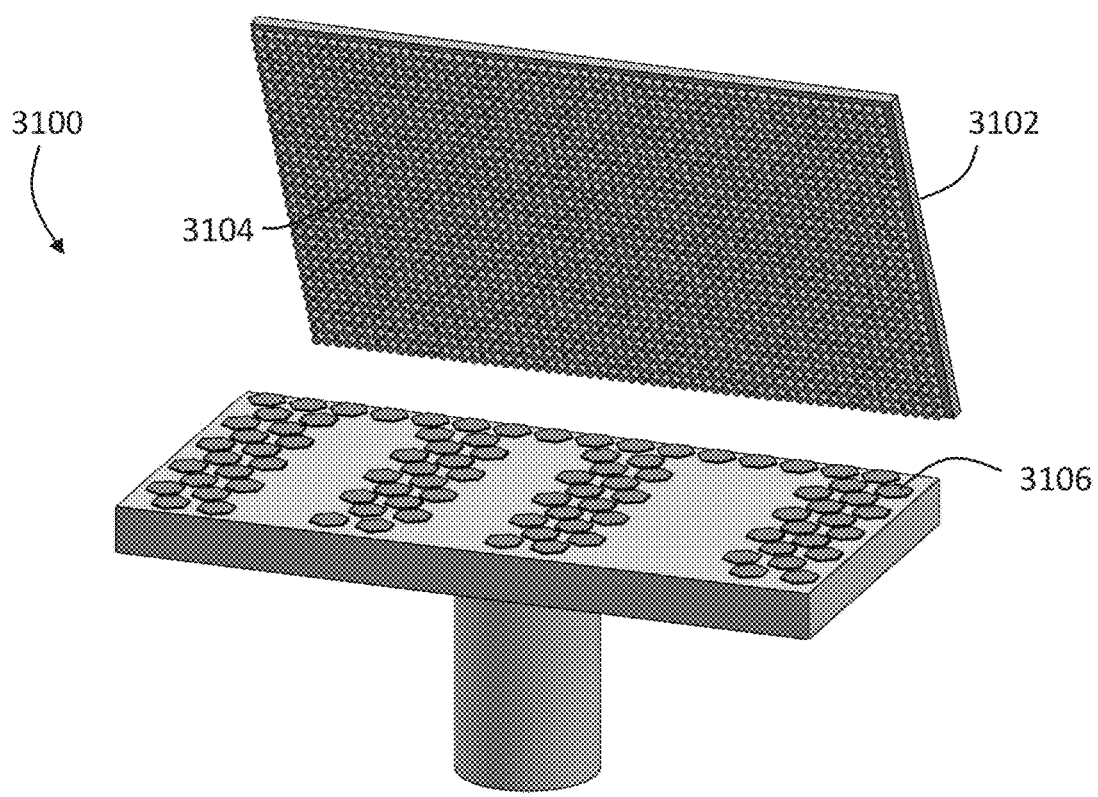
FIG. 21A is a perspective view illustration of the integration relationship between the top-most dynamically reconfigurable build volume section, such as the shape-programmable flexible surface structure of FIG. 20, and build volume section magnetic control plane of FIG. 19 in accordance with an embodiment.
Figure 21B:
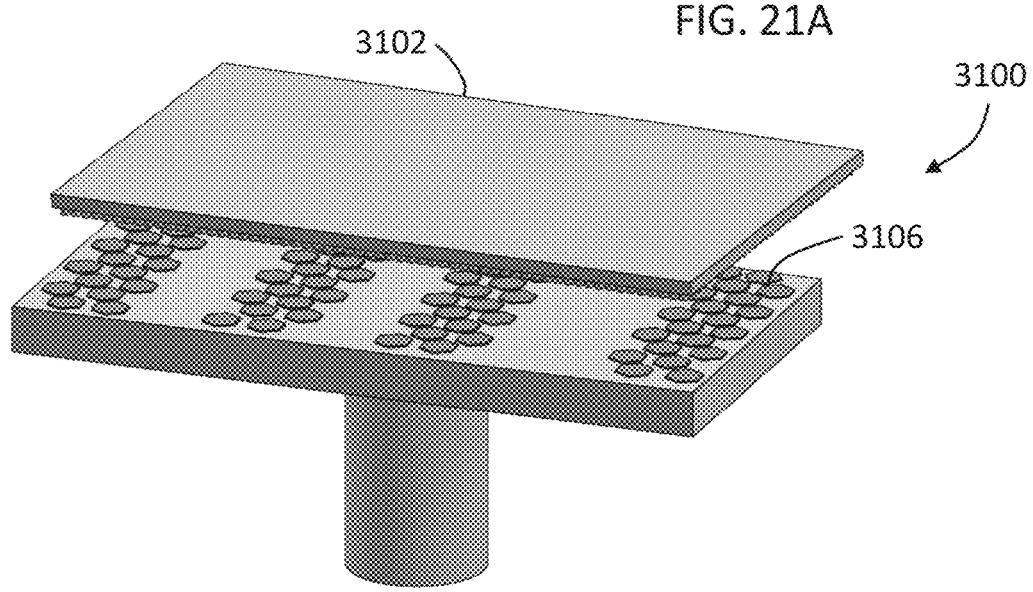
FIG. 21B is a perspective view schematic illustration of a multi-dimensional build platform of FIG. 19 with the shape-programmable flexible surface structure of FIG. 30B, where the build volume section is dynamically reconfigured programmatically to realize a curved volume in a sinusoidal pattern in accordance with an embodiment.

Referring now to FIG. 19 and FIG. 20, an exemplary embodiment of a multi-dimensional build platform 3000 utilizes the dynamic apparatus hardware/software design and an array of elements 3002 that include microcoils for geometrically reconfiguring the multi-dimensional build platform volume sections 3000. In this embodiment, the surface geometry is dynamically reprogrammable based on the ability of the elements 3002 (such as hexagonal planar coils) ability to generate electromagnetic field distributions (no longer configured for joule heating) under microcontroller control (statically prior to fabrication initiation or in real-time during fabrication process) that dynamically restructure the shape of the surface of layer one of the build volume section, such as layer 3102 of FIG. 21A, in accordance with independent modulation of the N microcoil currents thus producing the desired build volume section geometry manipulations. Equivalent synthesis operations utilized in the generation of optimal heater patterns may be used as basis for multi-dimensional build platform volume section surface tessellation patterns for defining the elements containing electromagnetic microcoils in terms of number, geometries, and locations.

Surface deformations and geometry manipulations of the build volume section are performed under the control of the microcontroller through microcoil current magnitude and direction control, as well as activation and deactivation instructions. The determination of microcoil currents, the current direction, respective activation/deactivation, and duration is based on the desired multi-dimensional build platform shape objectives such as target object geometry, determined during multi-dimensional build platform synthesis as described in more detail herein. The number of degrees of geometrical deformation or configurable multi-dimensional build platform shapes may be a function of the density and magnetic field strength characteristics. For example, microcoil magnetic field distribution is determined by both available coil current (power) and the microcoil geometry including size, shape, and number of coil-turns.

To achieve a reconfigurable build volume section surface, the build volume section 3100 (FIG. 21A, FIG. 21B) is comprised of a thin flexible outer layer 3102 with an underlying layer (e.g. layer 2) that includes a lattice structure 3104 that is structural and deformable. The lattice structure 3104 is made from a material that is ferromagnetic. For example, the lattice structure 3104 may be additively manufactured along with magnetic nano-particle inks or other materials that provide magnetic properties (i.e. the functional characteristic). In this method, the activation of the elements 3106 (microcoils) produces either compressive or tension forces for modulating (in either direction) the lattice structure 3104 and hence surface structures. As a result, build volume section shapes, such as that shown in FIGS. 22A-22D may be formed. The flexible outer layer 3102 may be formed from elements having materials with varying degrees of elasticity and temperature resistance characteristics.

During multi-dimensional build volume section synthesis, flexible material characteristics are considered along with the microcoil characteristics to determine the desired configuration to the microcontroller in order to execute the microcoil operational workflow (modulation of N microcoils) during additive manufacturing processes. This operational workflow or set of N microcontroller actuated modulations results in a variable build volume section geometry that is dynamic and fully programmable.

In an embodiment, the elements 3106 may include heating elements (not shown) that allow for selective heating of the reconfigured flexible surface layer 3102 in a similar manner described herein with respect to the static and dynamic heating of the multi-dimensional build platform. Thus, in some embodiments, the system can reconfigure the shape of the surface of the build volume section, the temperature distribution across the build volume section (e.g., different heating zones), or a combination thereof.

Figure 22A:
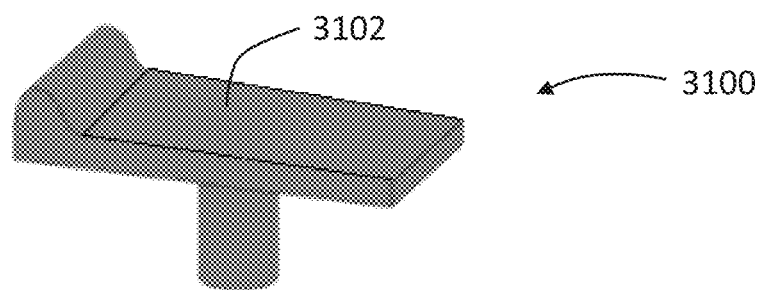
FIG. 22A-22D are perspective views of a multi-dimensional build platform with a configurable build volume section that may be dynamically changed during operation in accordance with an embodiment.
Figure 22B:
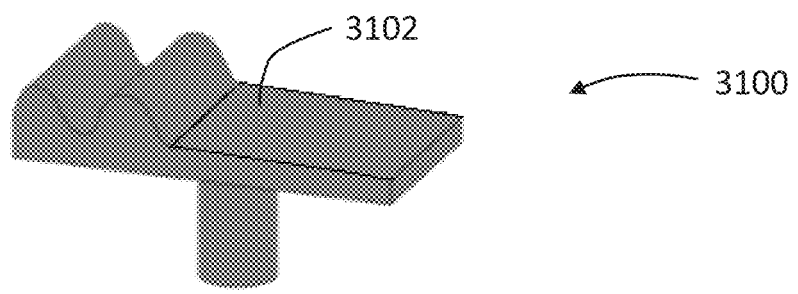
Figure 22C:
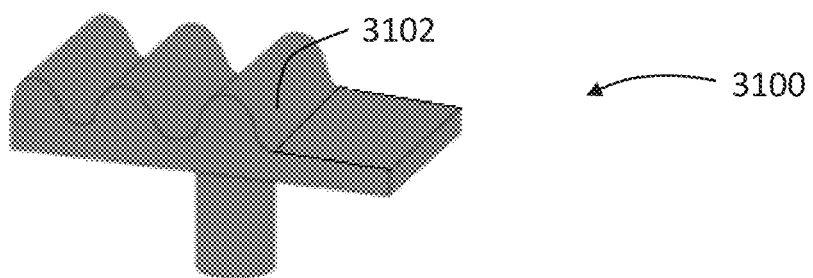
Figure 22D:
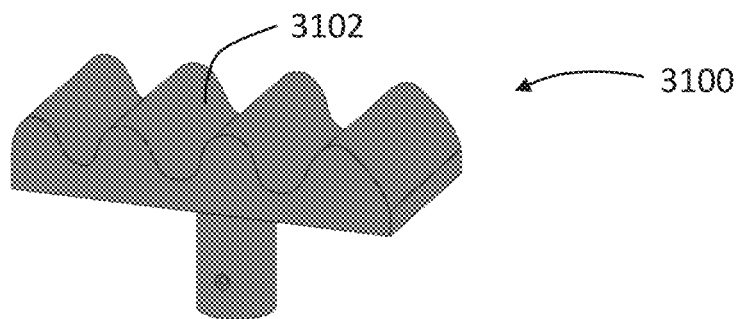
Figure 23:
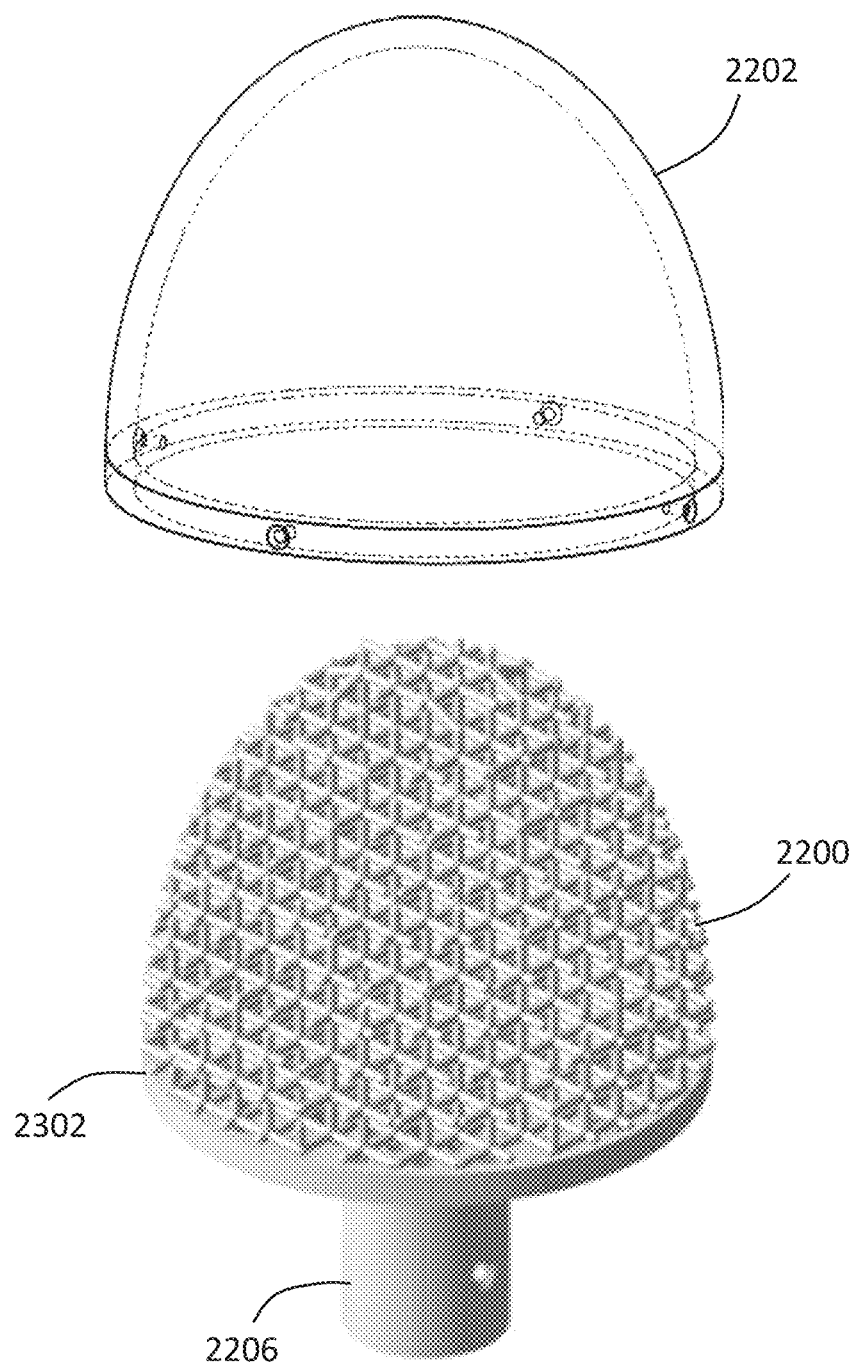
FIG. 23 is a perspective view illustration of a multi-dimensional build platform embodiment having a circular base section, an attachment interface section, and a build volume section that includes a lattice structure with surface layer in accordance with an embodiment.
Figure 24A:
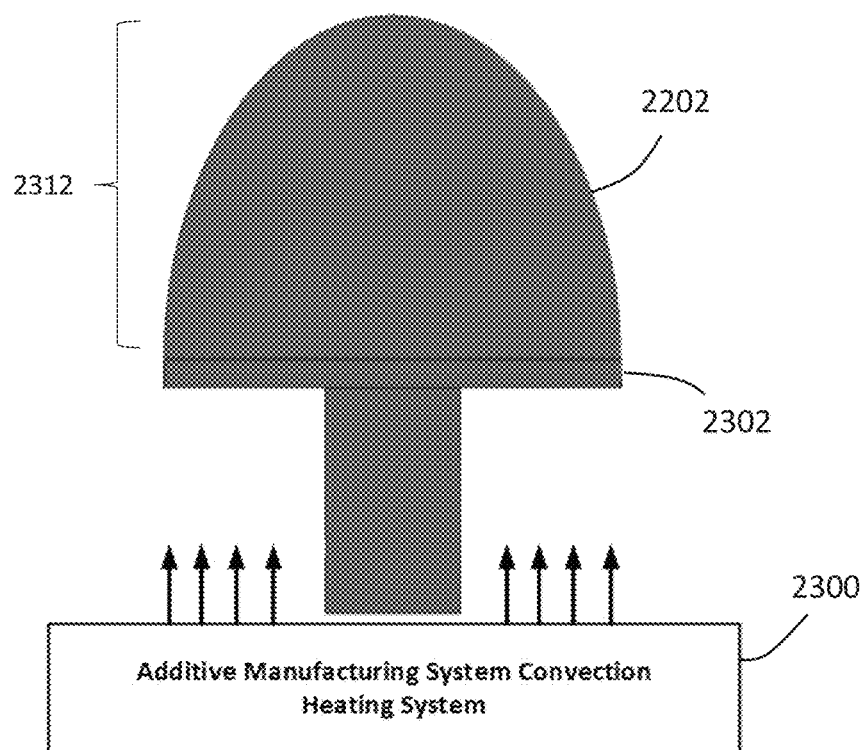
FIG. 24A, FIG. 24B and FIG. 24C are side, perspective, and bottom views respectively of a multi-dimensional build platform having a circular base section, an attachment interface section, and spherical dome shaped build volume section having a manifold that cooperates with the build volume section to allow for convection heat transfer in accordance with an embodiment.
Figure 24B:
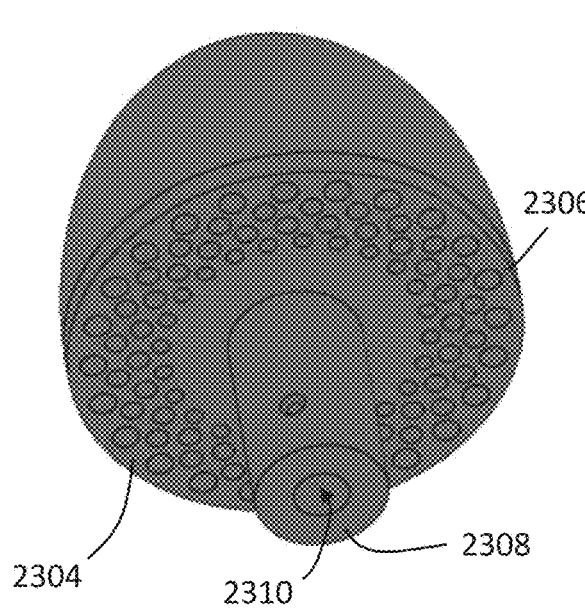
Figure 24C:
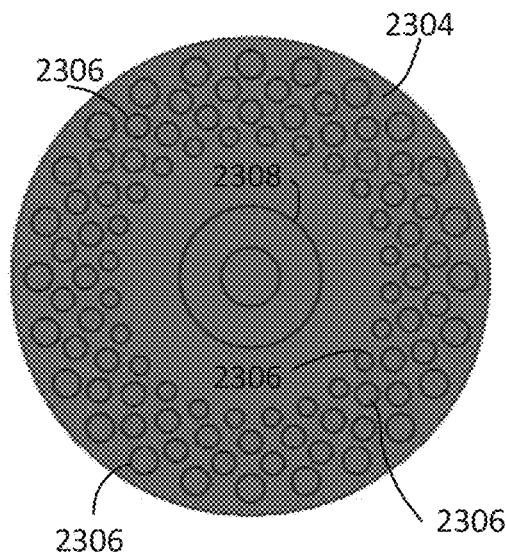
Figure 25A:
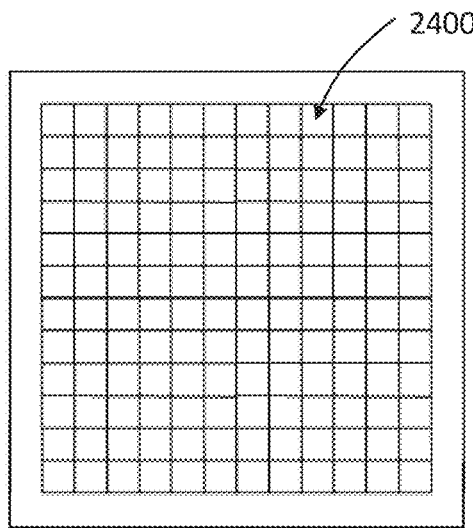
FIG. 25A is a plan view illustration of a uniformly distributed lattice structure cross-section as a build volume section embodiment in accordance with an embodiment.
Figure 25B:
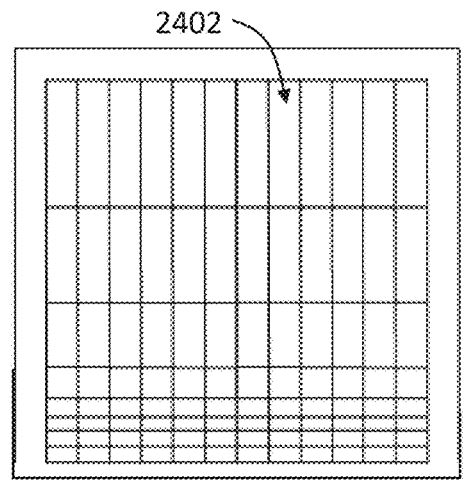
FIG. 25B is a plan view illustration of a non-uniformly distributed lattice structure cross-section that is topologically optimized for heat distribution as a build volume section embodiment in accordance with an embodiment.
Figure 25C:
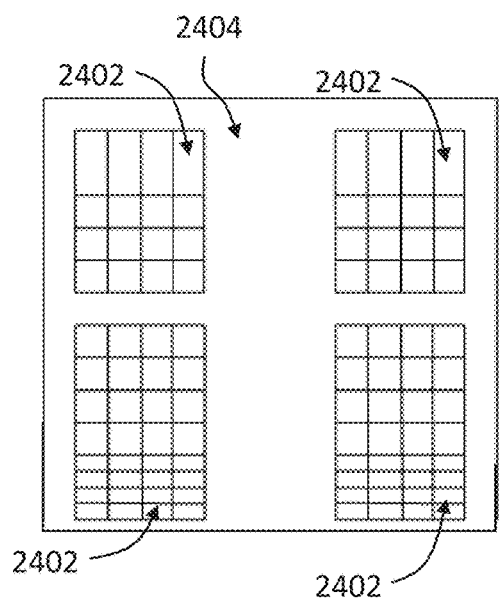
FIG. 25C is a plan view illustration of a topologically optimized lattice structure cross-section with multiple convection manifolds to distribute heat non-uniformly as a build volume section embodiment in accordance with an embodiment.
Figure 25D:
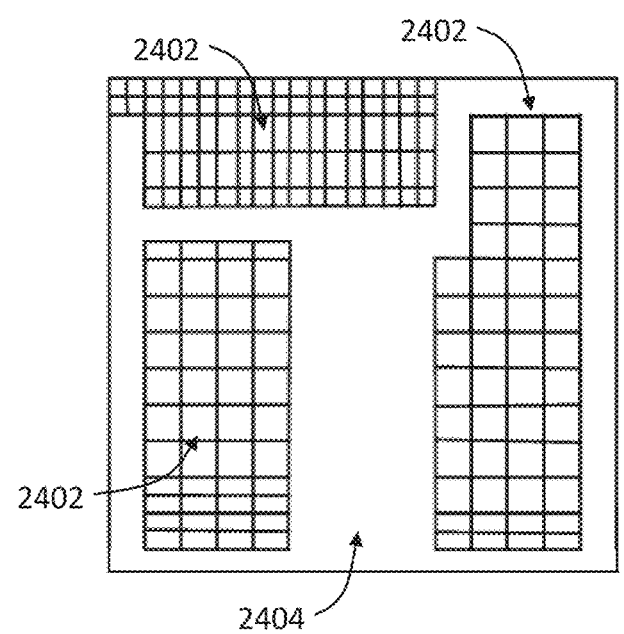
FIG. 25D is a plan view illustration of an optimized lattice structure cross-section with multiple convection manifolds that is topologically optimized in a non-uniform manner that bisects for multiple independent heater zones as a build volume section embodiment in accordance with an embodiment.

In an embodiment, the elements 3002 may be dynamic to allow the changing of the shape of the outer layer 3102 during the course of operation. FIG. 22A-FIG. 22D illustrate a time sequence of the build volume section 3100 during operation where the surface layer 3102 (i.e. layer one) changes between the start of operations (FIG. 22A) and the final shape (FIG. 22D).

One additional example is provided for using multi-dimensional build platform for food industry. In this embodiment the implementation is a programmable baking sheet or pan product. It could be for a home product or for the commercial food industry. In the context of the multi-dimensional build platform, the reconfigurable build volume section (shape changing build platform section) is used as programmable baking sheet or pan with integral heating elements for "baking". It would allow a user to pick a shape from a computer, mobile phone or tablet visually, which would communicate and send instructions (geometry selected, and heating profile for current "production" run) to the base section to provide instructions to both the heating elements and shape changing elements within the build volume section. In this case there may be no additive manufacturing system per se, in an embodiment the mobile phone or "remote host" system is the "controller" in this use-case, and with no loss of generality, the standalone build platform is utilized to fabricate a plurality of cakes, cookies, cupcakes and other food items with one baking sheet, pan, or tray that can produce many different kinds of shape food products. This would be of use to the food industry where a company can use one type of machine to make many different products, reconfigurable as need, or just-in-time, based on production needs, etc.

One type functional characteristic that may be used to accommodate different material deposition requirements is to provide heated surface profiles during fabrication. In an embodiment, the multi-dimensional build platform may provide a heated fabrication surface either through a dynamic (i.e. time variable during a production run) or static (i.e. constant during the production run) heating methods, both of which are shown in the embodiments of FIGS. 23-27. As used herein, heating may be considered a dimension of the multi-dimensional build platform. In some embodiments, the implementation of heated surfaces applies to multi-dimensional build platforms utilized for fabrication of target objects. In some embodiments, it may not be applicable to when it is desired to utilize the multi-dimensional build platform by integrating at least a portion of the multi-dimensional build platform as a sub-component of the target object.

In an embodiment involving static heating, the thermal energy or heat is generated external by a heating component 2300 (FIG. 24A) to the multi-dimensional build platform in conjunction with the additive manufacturing system. The statically heated multi-dimensional build platform is comprised of four component sections; 1) a build volume section 2312 implemented as a topological optimized lattice structure 2200 conforming to the desired build volume section geometry as is shown in FIG. 22; 2) a heat-resistant outer layer 2202 (e.g. layer one) that is also implemented to substantially conform with the geometrical shape (as a hollow or shell structure) of the build volume section, but implemented in such manner as to directly envelop or surround at least a portion of the build volume section lattice 2200; 3) a build platform base section 2302 with openings, such as a patterned fluid/gas intake and exhaust manifold 2304 that comprises pass-through holes 2306 that defined a flow path for fluid/gas flow throughout the build volume lattice 2200 in a predetermined manner; and 4) a platform attachment interface section 2206, 2308 enabling connection of the multi-dimensional build platform to the additive manufacturing system.

In some embodiments, the fluid/gas intake is through the platform attachment interface section 2308, such as through opening 2310 for example. In this embodiment, the openings 2306 may be used as an exhaust or outlet for the fluid/gas.

In an embodiment, shown in FIG. 25A-25D, the manifold in the base section 2302 may have a uniform configuration of perforations or passages (FIG. 24A) or a nonuniform distribution of perforations 2402 (FIG. 25B) to allow selective heating of different areas of the build volume section in a predetermined manner In an embodiment, the desired patterns of each lattice structure are defined by the method of topology optimization whereby heat transfer dynamics are determined to specify the geometric structure of the lattice. In some embodiments (FIG. 24C, FIG. 24D), there may be areas 2404 with no perforations or passages. The distribution, size, and shape may be changed to route thermal energy to different parts of the build volume section in accordance to varying geometrical, spatial and time-based parameters of target object or the material being used. For example, when different materials are printed at different times during the fabrication process, a different temperature may be desired for each material. It should be appreciated that in some embodiments, the individual sections of the lattice structure may be individually varied to provide the desired feature or functional characteristic (e.g., material property, temperature/thermal-energy, etc.) to the elements of an associated tessellation surface as described herein above.

The operation of the static apparatus heating component 2300 is through thermal convection, whereby heated gas/vapor streams traverse the base manifold 2304, through the build volume section lattice 2200, heating the build volume section surface layer 2202. The multi-dimensional build volume section surface heat distribution is improved or optimized through configuring the patterned and controlled methods of build volume lattice 2200 implementation to facilitate desired adhesion of materials to the multi-dimensional build platform apparatus during the additive manufacturing process.

In an embodiment one factor in the utilization of a topological optimized lattice structure where thermal convection of heated gas/vapor streams traverse the base section 2302 and build volume sections 2312 through the build volume lattice 2200 that comprises a high-temperature resin material. In an embodiment, the lattice structure is configured for gas transport to the build volume section outer surface area 2202 whose material comprises copper, aluminum, ceramic, high-temperature resin materials, or a combination of the foregoing.

In an embodiment, both the lattice structure and the material characteristics of the build volume section 2312 are used with optimization methods for configuring a desired distributed thermal conduction implementing a static heating surface element for material deposition. In some embodiments, the general method of topology optimization refers to a generative process whereby material layout within a given design space is optimized or configured based at least in part on a predetermined set of parameters, constraints, and boundary conditions. In some embodiments, this allows for the increasing or maximizing of the performance of a given multi-dimensional build platform.

An embodiment of the build volume lattice 2200 is the implementation (by the programmatic synthesis methods described herein) of non-uniform lattice structures whereby one or more interior manifolds and fluidic pathways control the trajectory or flow path of heated convention gases to pre-determined surface regions or zones 2600 (FIG. 27), thereby providing thermal energy or heat to only those regions where a predetermined surface temperature characteristic is desired. It should be appreciated that the lattice structure may be nonuniform as shown in FIGS. 25A-25D. The zones 2600 may be comprised of multiple elements having a common feature or functional characteristic (e.g. a lattice structure that heats the adjacent surface 2202 at the same temperature) as described herein above.

In an embodiment, a topological optimization method for the build volume section lattice 2200 is implemented to include at least one of the following methods; 1) a lattice structure that is non-uniformly graduated and shaped to a Venturi geometry in order to increase or maximize the heated gas transport velocity to the surface of the build volume section 2312 while slowing the gas velocity underneath the build volume section outer layer 2202 surface areas to increase or maximize heat-transfer; 2) a build volume lattice 2200 that directs substantially all convection of heated fluids/gases to the build volume section surface 2202 uniformly to achieve a substantially uniform heat distribution on the surface of the build volume section outer layer 2202; and 3) a build volume lattice 2200 that implements a fluidic manifold such that specific heated zones of arbitrary geometry are defined.

In an embodiment, the build volume lattice 2200 provides different heating zones associated with different materials and structures. In an embodiment, shape, density, and geometry of the build volume lattice 2200 is defined to provide a non-uniform distribution of heat to the build volume section in a predetermined manner In an embodiment, the build volume lattice 2200 is comprised of static elements that define zones 2600 (FIG. 26) that allow for an increase or decrease of a temperature within predetermined geometric areas. It should be appreciated that this allows for the use of different materials in the target object that have different temperature parameters.

Figure 26:
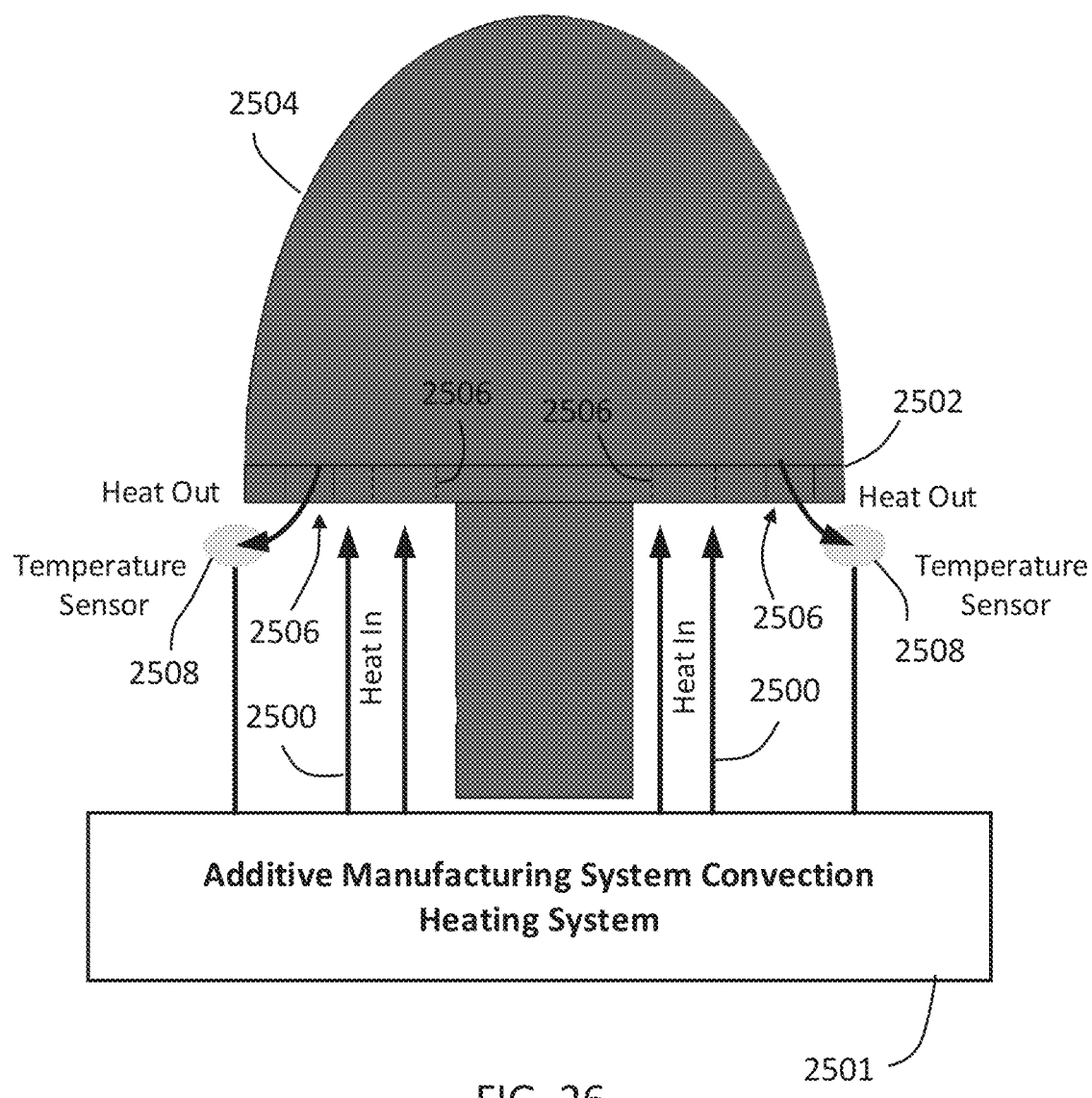
FIG. 26 is a side view illustration of a multi-dimensional build platform having a circular base section, an attachment interface section, and a build volume section having a spherical conical surface that is configured to flow convection heat comprising fluid/gases into the build volume section and sensors for externally measuring the output fluids/gases from the build volume section for controlling temperature in accordance with an embodiment.
Figure 27:
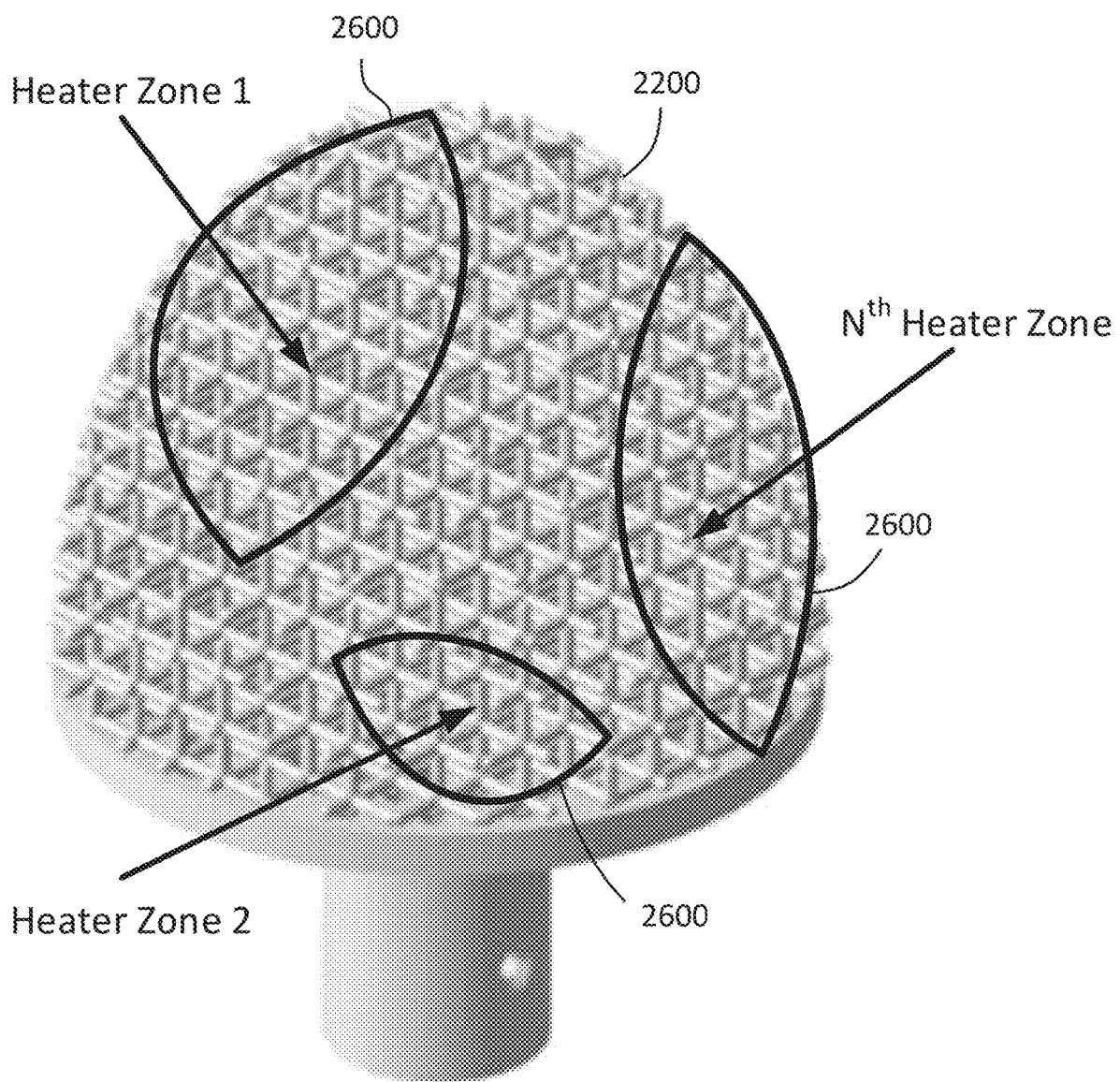
FIG. 27 is a perspective view illustration of a multi-dimensional build platform embodiment having a circular base section, an attachment interface section, and a build volume section having multiple heat/temperature zones that represent multiple regions of continuous elements with the same functional characteristics or features across the curved surface of the build volume section in accordance with an embodiment.

In an embodiment shown in FIG. 26, a convection heating system 2501 provides the input heated air 2500 (convection), which flows into the manifold 2506 of base section 2502 to flow heat into the build volume section 2504 as discussed herein. In this embodiment, the lattice structure or the manifold is configured to route the air back out of the build volume section 2504 via ports 2506. In an embodiment, a temperature sensor or thermocouple 2508 is arranged to measure the air flowing out of the ports 2506. The temperature measurement by the thermocouple 2508 may be used as a feedback signal to the heating system 2501 to adjust the temperature of the input heated air 2500.

In the previous embodiments, the build volume lattice 2200 structure additionally supports the redirection of heated fluids/gases such that an external thermal measurement system can accurately monitor the temperature profile of the multi-dimensional build platform and adjust the heated fluids/gases convection processes in accordance with the material deposition parameters of the additive manufacturing system.

It should be appreciated that the description of the heating of the multi-dimensional build platform as being either statically or dynamically heated is for example purposes and the claims should not be so limited. In other embodiments, the multi-dimensional build platform may include both elements that provide both static and dynamic heating. Further still, embodiments herein may refer or illustrate the flowing of gasses to heat the multi-dimensional build platform, but other heating means may be used, such as liquid heating mediums for example.

It should further be appreciated that while the example embodiments discuss heating of the build volume section via convection, this is for example purposes and the claims should not be so limited. In other embodiments, heating of the build volume section may be performed by conduction or radiation as well.

Figure 28:
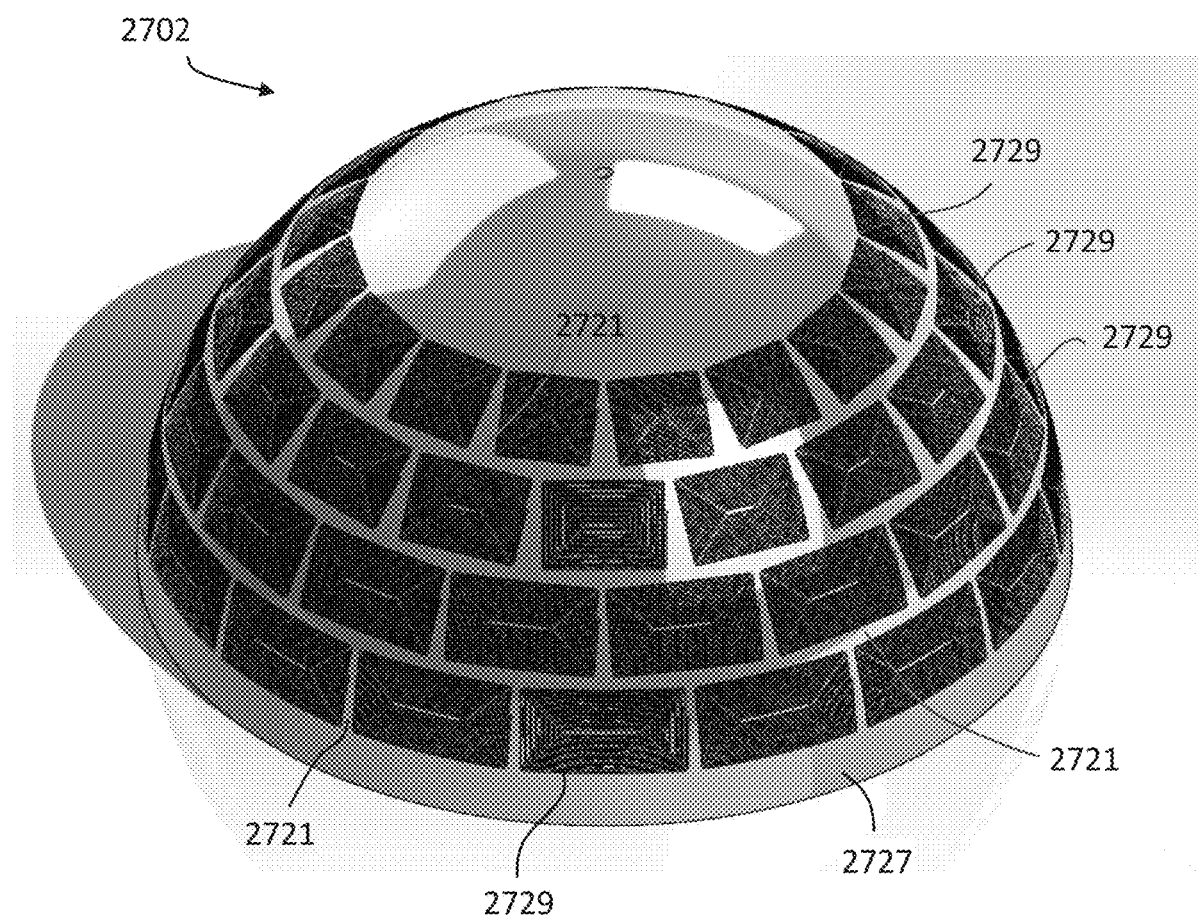
FIG. 28 and FIG. 29 are perspective views of a build volume section for a curved or semi-spherical target object where the build volume section includes concentric coils, such as heater zones or magnetic field generation regions in accordance with an embodiment.
Figure 29:
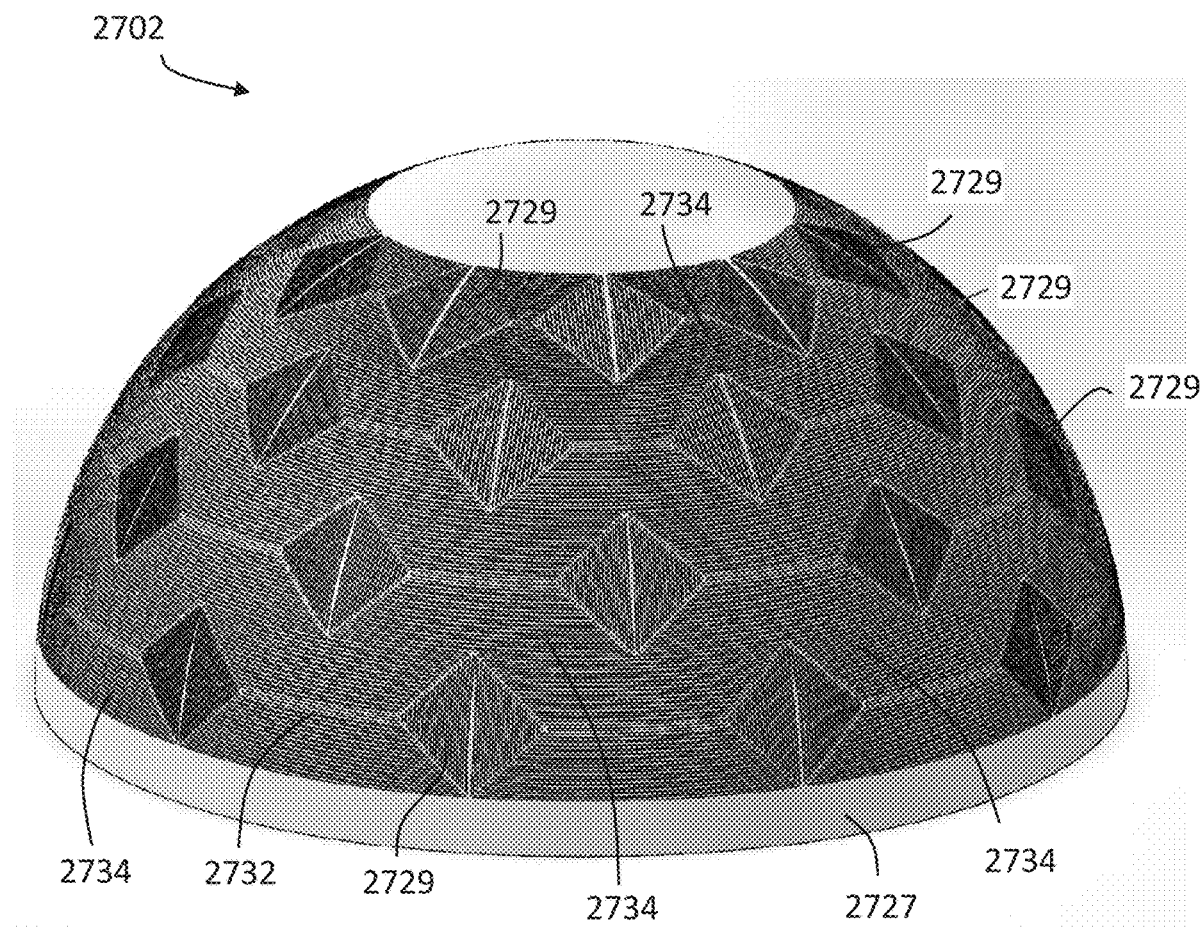

Referring now to FIG. 28 and FIG. 29, embodiments of a semi-spherical build volume section 2702 is shown. It should be noted that the build volume section 2702 would have an additional layer (layer 1) over the coils. The surface 2727 may be a layer formed by additive manufacturing, or may be the prefabricated and coupled to the base section (e.g., section 314, FIG. 3A). In this embodiment, a set of concentric coils 2729 are formed on the surface 2727. The elements may be shaped as rectangles (similar to the elements 320A-320I of FIG. 5A) with some elements inactive where the feature or functional characteristic for one set of elements is set to a fixed or null (i.e., no functional characteristic applied or a default feature is assigned). Other mesh elements are set to functional characteristic $B(z,t)_{ijk}$ that is mapped to elements within the active and static or dynamic set of concentric rings. The functional characteristic $B(z,t)_{ijk}$ is the generated magnetic field gradient function that can vary time, such as when the material is polarized (i.e., a ferromagnetic material) during fabrication in some predetermined manner as it is being deposited by the additive manufacturing system.

In the embodiment of FIG. 28, the coils 2729 are separated by spaces or areas 2731. These areas may represent null elements, in other words it is material with no other functional characteristic, or a default feature assigned. In some embodiments, the areas 2731 may include elements having other functional characteristics than the elements that comprise the coils 2729.

The embodiment of FIG. 29 is similar the embodiment of FIG. 28 where the build volume section 2702 includes a semi-spherical surface 2727 having coils 2729 formed thereon. In this embodiment, the coils 2729 are interconnected via elements 2732 and 2734 that include coils or conductors. This allows the density of the coils to be changed across the surface 2727, and hence the application of a feature characteristic or a functional characteristic (e.g., temperature or magnetic field strength).

It should be appreciated that in some embodiment the coils 2729 are connected through conductors beneath the surface 2727 such as through via's for example In other embodiments, the coils 2729 may be operated inductively. It should also be appreciated that the build volume section 2702 may include one or more outer layers that conform to the surface 2717 to allow deposition of material during the additive manufacturing process.

Figure 30A:
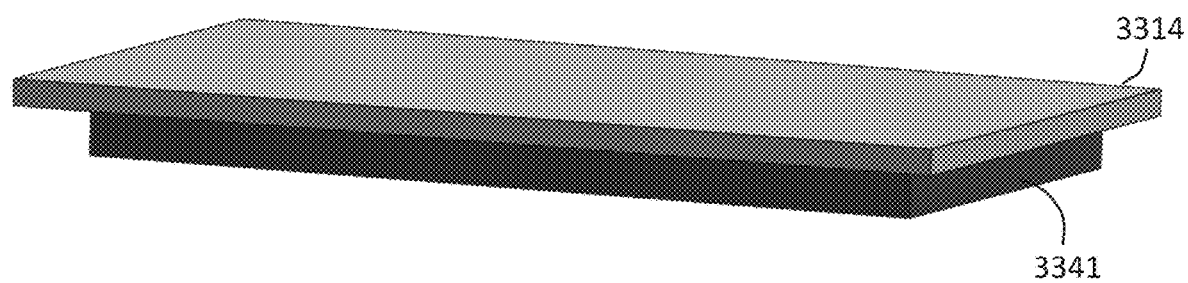
FIG. 30A and FIG. 30B are perspective view illustrations of a prior art base section modified to incorporate one or more embodiments described herein that define one or more functional characteristics of the build volume section integrated thereon, in accordance with embodiments.
Figure 30B:
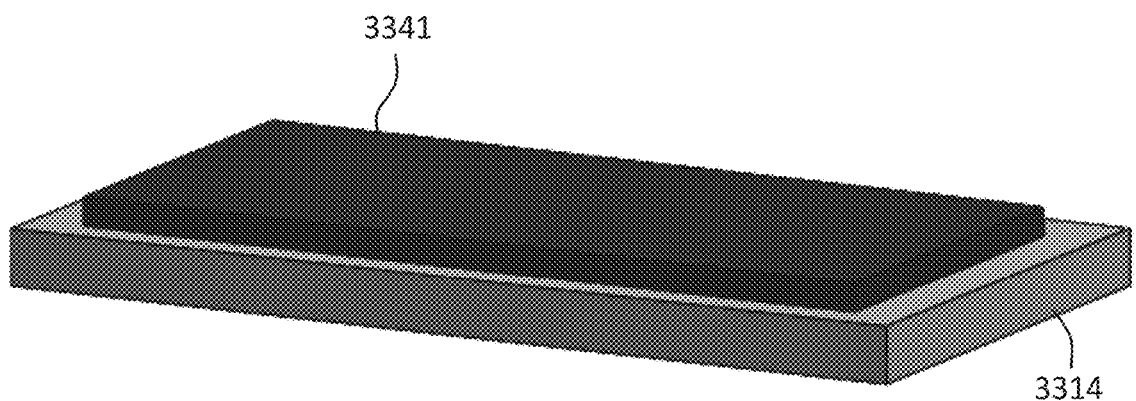
Figure 31A:
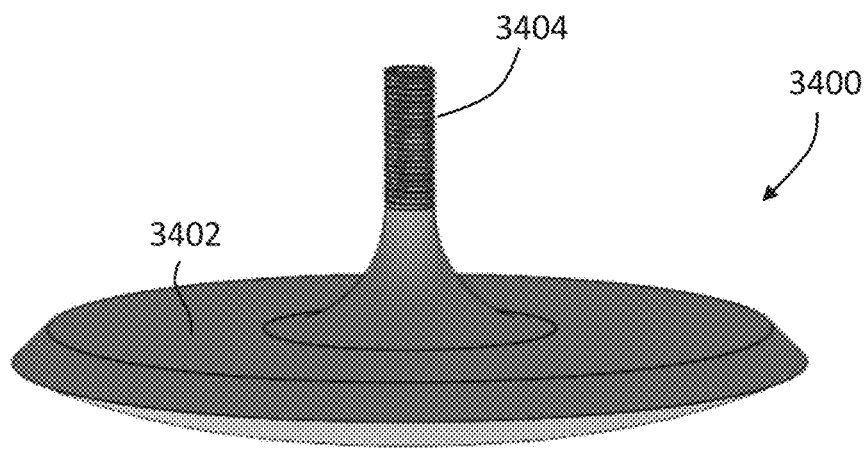
FIG. 31A, FIG. 31B and FIG. 31C are perspective views illustrating a target object for use in a NMR and MRI functional components that is fabricated using a multi-dimensional build platforms to form curved surface and volume geometries and integral electronic sub-assemblies in accordance with an embodiment.
Figure 31B:
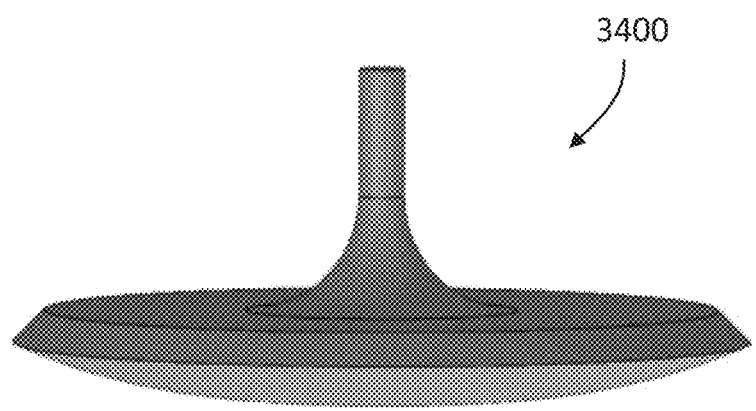
Figure 31C:
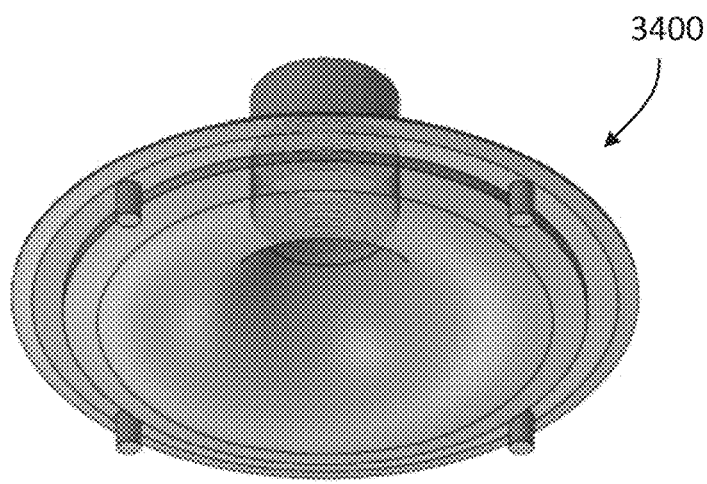
Figure 32:
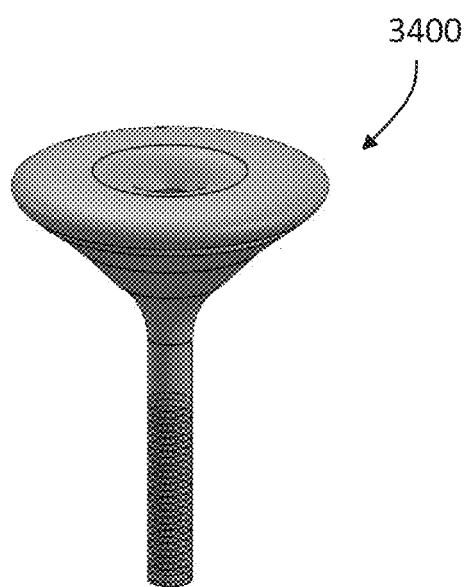
FIG. 32 is a perspective view of a target object that could be used as a NMR/MRI functional component that is fabricated using a multi-dimensional build platform to form curved surface and volume geometries that include integral electronic sub-assemblies in accordance with an embodiment.

In some embodiments, it is desirable to use an existing prior art build platform as a partial build volume section (surface layer 1) for a multi-dimensional build platform in order to upgrade an existing additive manufacturing system. Such as, for example, the original build platform provided by the additive manufacturing system. Referring now to FIG. 30A and FIG. 30B an embodiment is shown of a prior art build platform 3314 that has been modified or upgraded with a multi-dimensional build platform 3341 that is implemented such that it may be directly incorporated into the prior art build platform. FIG. 30A illustrates the integration of a multi-dimensional build platform mounted under a typical planar such as a fused filament fabrication (FFF) printer build plate, whereas FIG. 30B illustrates the integration of a multi-dimensional build platform on the top portion, such as a typical stereolithography (SLA) printer build plate. The adaptation of the additive manufacturing system pre-existing build plate with the multi-dimensional build platform enables the inclusion of any feature and/or functional characteristics described herein. The elements 3341 may include any functional characteristics provided herein, such as feature, and/or functional heating elements, magnetic coils, light sources, radio frequency transmitters, or combinations thereof for example. In an embodiment, when modifying an existing platform 3314, the elements 3341 may be arranged on a side opposite the build volume section, such as the bottom of the platform section 3314 (FIG. 30A), the top of the platform section 3314 (FIG. 30B).

As discussed herein, in embodiments, the multi-dimensional build platform may be either an emulated build platform that is adapted to fit within a prior art additive manufacturing system as previously described. It should be appreciated, that a multi-dimensional build platform may be implemented as a complete replacement, such that the multi-dimensional build volume section geometry substantially matches the original additive manufacturing system build platform.

In an embodiment, the multi-dimensional build platform 302 is an efficient means for the implementation of medical and sensor electronic devices 3400 such as NMR and MRI systems as is shown in FIG. 31A-33C. In some embodiments, the NMR devices 3400 may be used for chemical analysis, detection and monitoring in a variety of applications, including but not limited to pharmacological evaluation and testing, biologics, counterfeit detection, chemical monitoring, water quality analysis, oil testing and material testing. In other embodiments, MRI systems may be efficiently fabricated with complex MRI multi-coil systems and electronics directly fabricated upon, and based on the multi-dimensional build platforms, and variants thereof, such as in multi-dimensional build platforms 302, 402, 502, 602, 702, 802, and 1402. Each of these devices 3400 in the variety of forms contains both structural materials 3402 and functional electronics including coil systems 3404 which are used as both transmitting and receiving antennas, shimming and gradient coil systems. Using multi-axis additive manufacturing systems and multi-dimensional build platforms 302 a plurality of NMR and MRI systems can be realized. Multi-dimensional build platforms in the shape of cylinders, spheres and conical sections closely match the target object geometries of NMR and MRI systems and through multi-axis conductive material deposition tools, electronic circuits, and coils 3404 can be fabricated in conjunction with the various multi-dimensional build platform movements in 3D space including X, Y, Z, yaw, pitch and rotational degrees of freedom. In terms of additive manufacturing system and multi-dimensional build platform fabrication processes within medical device applications such as NMR or MRI, each respective target system fabrication process utilizes a multi-dimensional build platform 302 that simultaneously supports material fabrication as a structural framework of the target NMR or MRI system as well as implementation of electronic components, circuits, and coil patterns with the fabricated structural framework.

Other medical and sensor devices may also be efficiently fabricated utilizing the multi-dimensional build platform, including; flexible wearables and other coil assemblies associated with flexible materials that conform with human anatomical structures such as receive coils, vital signs monitoring, and other biometric sensor devices in use today. The multi-dimensional build platform may also be utilized in prosthetic applications such as artificial joints and other multi-dimensional anatomical structures or organs. In an embodiment, the anatomical geometry may be used in with bioprinting utilizing biomaterials such as for cellular structures, DNA, or stem cells for example that may be used to fabricate skin or an organ for example.

Figure 34:
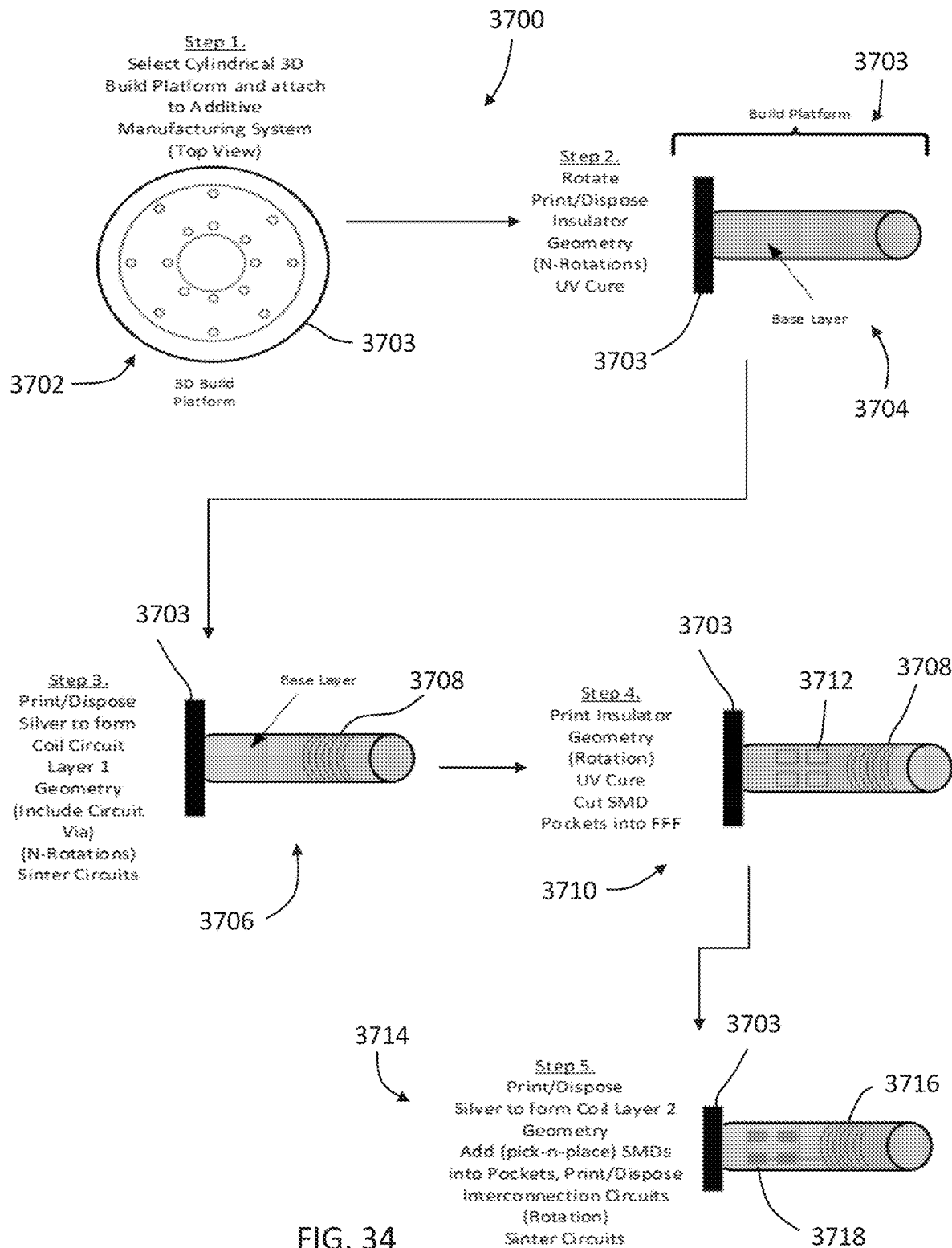
FIG. 34 is a flow diagram illustrating the use of multi-dimensional build platforms using a build volume section such as that shown in FIG. 6A in conjunction with an additive manufacturing process to fabricate NMR/MRI electronics and coil sub-assemblies in accordance with an embodiment.

Referring now to FIG. 34, an embodiment is shown of a method 3700 of fabricating a target object 3400, such as the medical and sensor devices for example. In this embodiment, the method 3700 begins at a first step 3702 where the multi-dimensional build platform 3703 is selected (as described herein) and attached to the additive manufacturing system. The method 3700 then proceeds to block 3704 where the multi-dimensional build platform 3703 is moved (rotated) to deposit insular material and is cured using ultraviolet (UV) light. The method 3700 then proceeds to step 3706 where silver material is deposited onto the UV cured insular material to generate a circuit 3708. In the illustrated embodiment, the circuit 3078 is a coil. The method 3700 then proceeds to step 3710 where additional insulator material is deposited and UV cured. In an embodiment, pockets 3712 may be cut into the UV cured material that are sized to hold a surface mounted device electronics. The pockets 3712 may be formed using subtractive manufacturing tools within the additive manufacturing system. The method 3700 proceeds to step 3714 where additional silver material is deposited to define a second circuit (e.g., coil) layer 3716 is deposited and the surface mounted device electronics are placed in the pockets 3712. Finally, further electrically conductive material, such as silver for example, is deposited to interconnect the surface mounted device electronics 3718 and the circuit 3716. In some embodiments, after depositing the silver material, the material may be sintered to improve the circuit conductive properties.

Figure 35A:
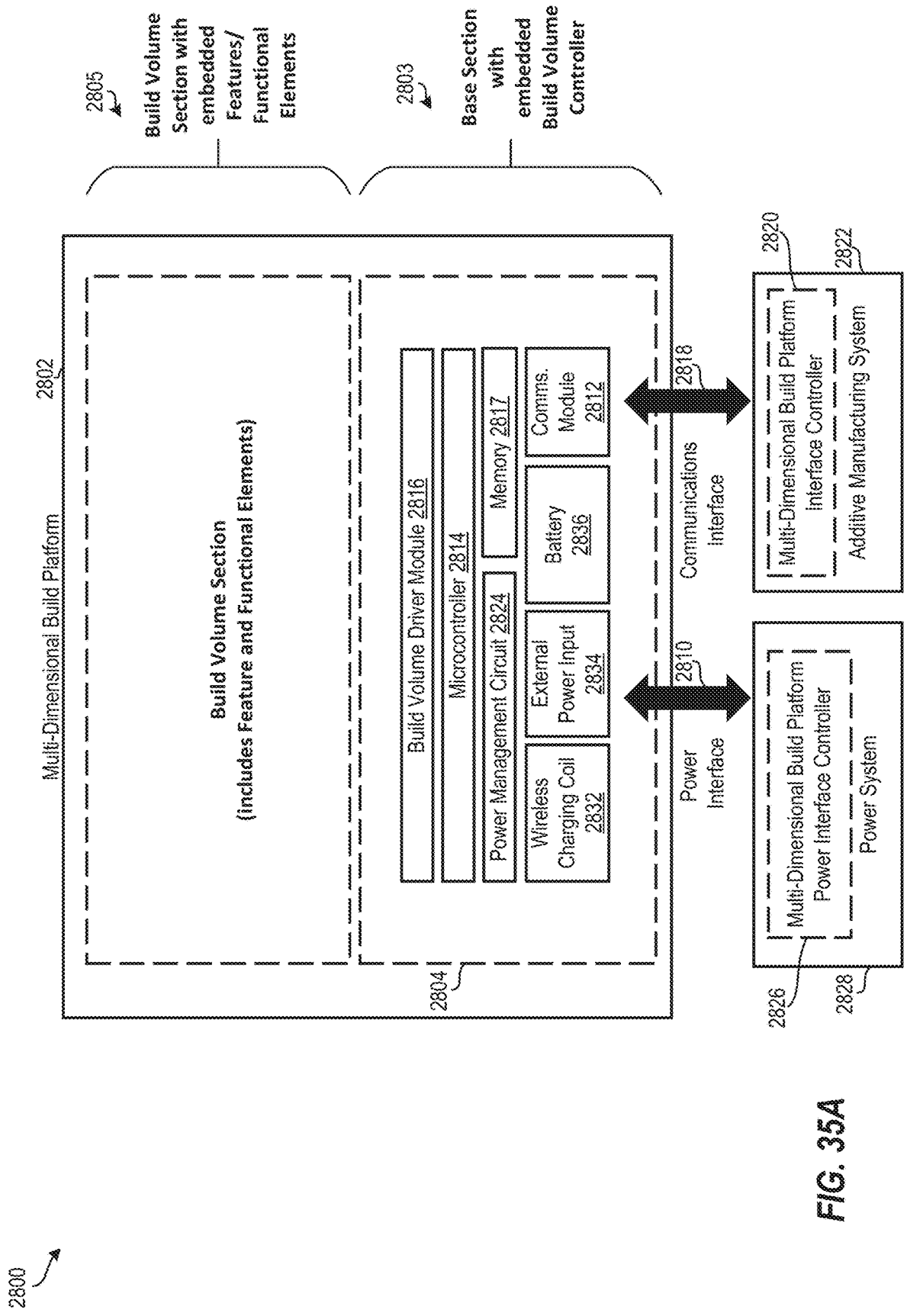
FIG. 35A is a schematic illustration of a system for a multi-dimensional build platform in accordance with an embodiment.

One or more of the embodiments described herein, as shown in FIGS. 1-34, can be implemented in using any suitable processing system(s), processing device(s), and/or the like, including combinations thereof. For example, FIG. 35A is a schematic illustration of a system 2800 for a multi-dimensional build platform 2802 in accordance with an embodiment. The system 2800 includes the multi-dimensional build platform 2802, which in turn includes a base section 2803 and a build volume section 2805, which can include one or more feature or functional layers (see, e.g., FIG. 3B). The build volume section 2805 includes one or more feature and functional elements, within one or more of the feature or functional layers, that represent capabilities of the multi-dimensional build platform 2802 as described herein. In examples, the functional elements can include heater coils, magnetic coils, optical devices, and the like. It should be appreciated that any suitable features and/or functional elements can be used, including various combinations thereof. Some examples are described further herein with reference to FIGS. 37A-37C, but these should not be taken to be limiting examples. The base section 2803 includes a build volume controller 2804, which can control the one or more feature and functional elements of the build volume section 2805.

According to one or more embodiments described herein, the build volume controller 2804 includes one or more of a power interface(s) 2810 (wired and/or wireless); communication ("comms") module 2812 (e.g., wired and/or wireless, such as Bluetooth™ and Wi-Fi); a processor-based microcontroller 2814 which can include or be communicatively coupled to a memory 2817 and/or persistent storage; a build volume driver module 2816 that includes hardware and/or software to control one or more functional elements, which can be a coil power driver (e.g., MOSFET power driver circuits) (see, e.g., FIG. 37A), a magnetic coil driver (see, e.g., FIG. 37B), an optical driver (see, e.g., FIG. 37C), and the like depending on the feature or functional element operational requirements; power management circuit 2824; a wireless charging coil 2832; an external power input 2834; and/or a battery 2836. In an embodiment, the build volume driver module 2816 may be swappable and/or replaceable enabling different build volume driver module types, configurations, and/or versions.

In an embodiment, the build volume controller 2804 within the base section 2803 provides control and operational integration with the additive manufacturing system 2822 through a wireless communications medium that provides for command and control of the build volume controller 2804 with no wires, entangling, or restrictive connections being used. Thus, the multi-dimensional build platform 2802 and additive manufacturing system 2822 have multi-axis degrees of freedom and movement. To facilitate this, a power interface 2810 may provide power charging capability wirelessly (e.g., via induction) to the build volume controller 2804 and a communications interface 2818 may provide command and control wirelessly to the build volume controller 2804. However, in other embodiments, including where the additive manufacturing system 2822 has limited axes of movement, limited range of motion, and/or where high levels of power are provided over extended periods of time, the power interface 2810 may be a wired interface. In these embodiments, the communications interface 2818 may provide command and control wirelessly and/or via a wired link. According to an example, a build platform power interface controller 2826 controls a power system 2828, which supplies power to the build volume controller 2804, using wired and/or wireless methods, via the power interface 2810.

With continued reference to FIG. 35A, the system 2800 includes the build volume section 2805 and the base section 2803 that implement a processor-based (e.g., microcontroller 2814) build volume controller 2804 that includes multiple components, such as shown. The build volume controller 2804 receives signals, data, commands and control instruction messages, etc. as well as transmits status messages, data, etc., wirelessly (e.g., Wi-Fi, Bluetooth™, etc.) and/or wired through the communications interface 2818 to the additive manufacturing system 2822 via a multi-dimensional build platform interface controller 2820 in or associated with the additive manufacturing system 2822. The multi-dimensional build platform interface controller 2820 provides system integration between the build volume controller 2804 and the additive manufacturing system 2822. According to one or more embodiments described herein, the multi-dimensional build platform interface controller 2820 can be integral to the additive manufacturing system 2822, can be separate but associated with the additive manufacturing system 2822, or can otherwise be configured and arranged (see, e.g., FIGS. 36A-36D).

With continuing reference to FIG. 35A, subsystems of the system 2800 are now described. In an embodiment, at least two power interfaces are supported: a direct connection interface (external power input 2834) and a wireless charging interface that includes a wireless charging coil 2832 for inductive energy absorption. Both power interfaces interface to the power management circuit 2824, which provides charging current to an integral rechargeable energy cell or battery 2836 and regulates electrical energy for digital, all active electronics and components within the build volume section. In some embodiments whereby the additive manufacturing system build attachment supports degrees of freedom consistent with a direct power connection, a direct (i.e., wired) connection may be useful for long running fabrication processes. However, a wireless power solution in conjunction with a desired power utilization control by functional elements or zones is advantageous in embodiments that include additive manufacturing systems with degrees of axis freedom such as rotation.

The build volume controller 2804 can communicate with the multi-dimensional build platform interface controller 2820 over any suitable wired and/or wireless link (e.g., the communications interface 2818), such as Bluetooth™ (BT), 802.11 Wi-Fi, or another suitable communications interface. The communications interface 2818 is bidirectional and enables the additive manufacturing system 2822 to deliver instructions (through the multi-dimensional build platform interface controller 2820) to the build volume controller 2804 to manage one or more feature and functional elements, such as heater coils (see, e.g., FIG. 37A), magnetic coils (see, e.g., FIG. 37B), optical devices (see, e.g., FIG. 37A), and/or the like, including combinations thereof. It should be appreciated that the build volume controller may manage any feature or functional characteristic as described herein and is not so limited by the examples described. The build volume controller 2804 can manage any active component in the build volume section 2805, or more specifically, any of the features or functional elements disposed therein or associated therewith.

The microcontroller 2814 is provided that is responsive to executable computer instructions for activating, deactivating, and/or otherwise controlling the features and/or functional elements from instructions computed during dynamic apparatus multi-dimensional build platform synthesis (as described herein) and in accordance with the additive manufacturing system tool path operations associated to a given set of target object fabrication instructions. In an embodiment, software instructions, such as G-code, generate fabrication and activation/deactivation operations that the microcontroller 2814 further processes into feature or functional pattern activation and deactivation operations during the fabrication process. In this manner, minimal energy is expended while still providing for material deposition requirements. The microcontroller 2814 can be any suitable microcontroller, micro-processor, FPGA, digital signal processor, etc. One such example is a SoC or SoM single chip Linux-based computer complete with peripheral functions, input-outputs, communication interfaces, memory, and non-volatile storage. The operating system and/or application software may be controlled, configured, and updated through command-and-control operations transported via the communications interface 2818 providing integration to the additive manufacturing system 2822 through the multi-dimensional build platform interface controller 2820. In an embodiment, operating system and/or application software may also be controlled, configured, and/or updated through command-and-control operations transported via the communications interface 2818 providing integration to a remote system (e.g., smartphone, tablet, computer, cloud system, etc.).

According to one or more embodiments described herein, the microcontroller 2814 supports multiple digital input-outputs which are utilized by the build volume driver module 2816 to control one or more power active driver circuits, where each driver controls power and/or a signal distribution to a given functional element. For example, one or more of the heater coils (see, e.g., FIG. 37A) provide joule-based heating across one or more layers of the build volume section 2805. For example, with reference to FIG. 37A, temperature control and stability is achieved through the software execution of a closed-loop feedback system such as PID model (proportional-integral-derivative) whereby temperature sensors 2830 (e.g., a thermistor) measure respective heater elements (e.g., the heater elements 2808a-2808n) within the multi-dimensional build platform volume section and the microcontroller 2814 executes the PID control operations as part of modulating the build volume driver module (implemented as MOSFET power circuits driving respective coil elements) 2816 to maintain a given temperature profile for each heater zone. The number of heater coils is determined during multi-dimensional build platform synthesis as described herein. The number of heater elements and their respective pattern or geometry is a function of the given target object geometry and material distribution. As an embodiment of the present disclosure, the number of heater coils is optimized to minimize their number and size, activation time, and duration based on the target object geometry and tool path operations. Reducing or minimizing power requirements of the dynamic apparatus in turn extends the amount of time the heater coils are available during additive manufacturing fabrication time Similar approaches can be applied to the magnetic coils and/or the optical devices of the systems 2800B, 2800C of FIGS. 2800B, 2800C respectively.

With continued reference to FIG. 35A, the multi-dimensional build platform interface controller 2820 provides an integration mechanism between the multi-dimensional build platform 2802A and the additive manufacturing system 2822. In some examples, the multi-dimensional build platform interface controller 2820 is based on the same hardware design as the build volume section 2805C, 2805B, 2805C and base section 2803A, 2803B, 2803C without the requirement of functional elements (e.g., heater coils, magnetic coils, optical devices, etc.) or driver electronics. In some embodiments, this configuration is similar as to simplify the systems 2800A, 2800B, 2800C in terms of a common implementation method and secondly to reduce the total cost of the multi-dimensional build platform 2802A, 2802B, 2802C through use of common electronic components.

Figure 35B:
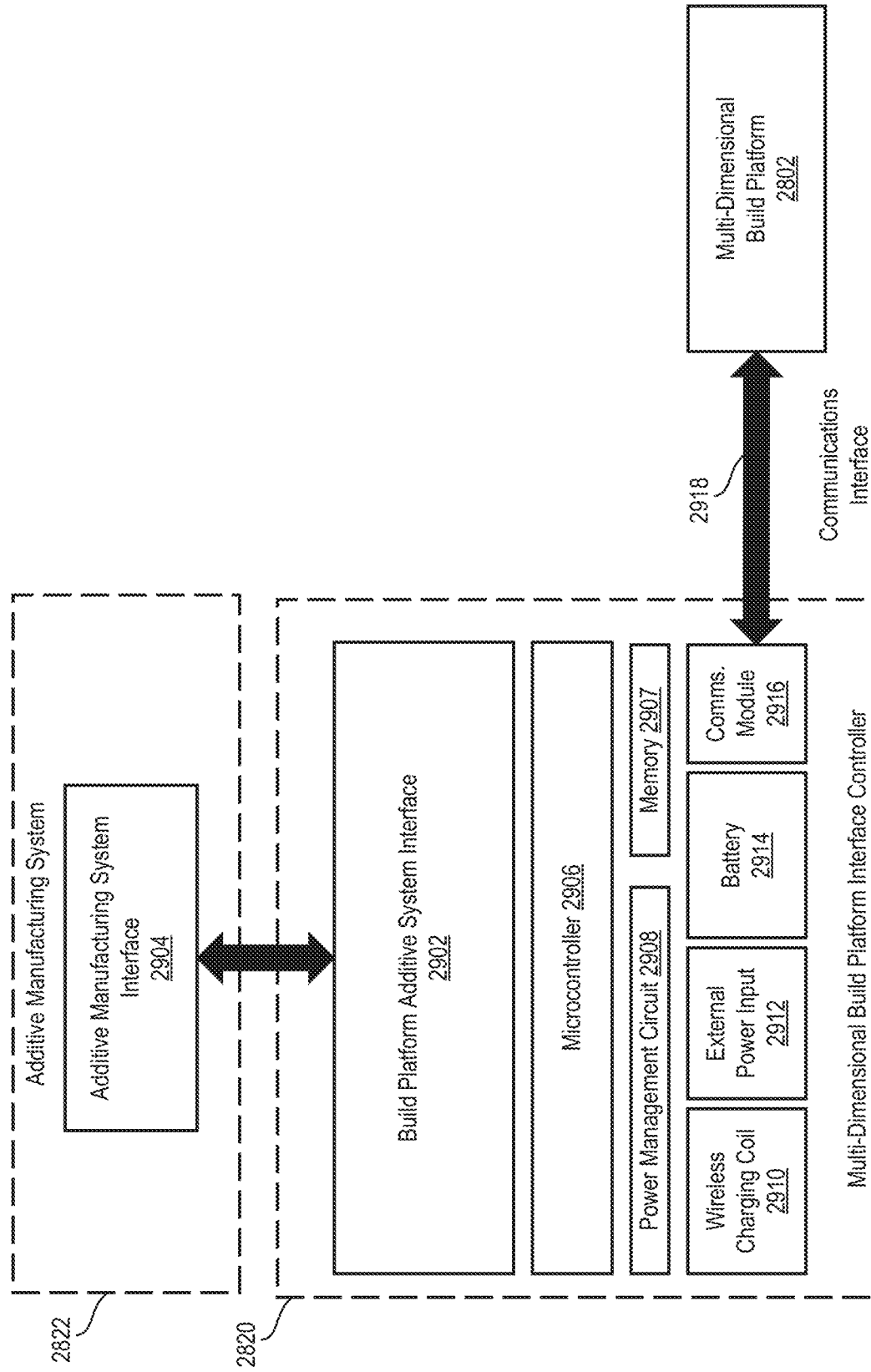
FIG. 35B is a schematic illustration of the multi-dimensional build platform interface controller of FIG. 35A according to one or more embodiments described herein.

Referring now to FIG. 35B, one embodiment of the multi-dimensional build platform interface controller 2820 is shown. The multi-dimensional build platform interface controller 2820 includes a build platform additive system interface 2902 for interfacing and communicating (wired and/or wirelessly) with the additive manufacturing system 2822 via an additive manufacturing system interface 2904. Similar to the build volume controller 2804, the multi-dimensional build platform interface controller 2820 includes: a microcontroller 2906, a memory 2907 which may include persistent storage, a power management circuit 2908, a wireless charging coil 2910, an external power input 2912, a battery 2914, and a communication module 2916 for wired and/or wireless communications, which can be a Bluetooth™, WiFi, or other suitable communications interface and antenna. The communication module 2916 enables the multi-dimensional build platform interface controller 2820 to communicate with the multi-dimensional build platform 2802 via a communications interface 2918, which can be any suitable wired and/or wireless communications interface.

In some embodiments, integration of the multi-dimensional build platform interface controller 2820 into the additive manufacturing system 2822 may be achieved either through the general purpose I/O communications of the microcontroller 2814 in the case of parallel I/O or serial communications, or wirelessly utilizing Bluetooth, near-field communication (NFC), radio frequency (RF), infrared (IR), and/or Wi-Fi communication interfaces and the like (e.g., communications module 2812). For example, the communications module 2812 can implement any suitable short-range communication protocol. As mentioned, the functionality of the multi-dimensional build platform interface controller 2820 is to provide an integration mechanism of the multi-dimensional build platform 2802 to the additive manufacturing system 2822. However, as an embodiment, the direct integration, through wireless transports mentioned, of the multi-dimensional build platform 2802 with the additive manufacturing system 2822 is possible, provided the additive manufacturing system 2822 supports wireless communications. The control process is the synthesized programmatic set of command-and-control instructions to orchestrate the operation of the microcontroller 2814 as part of intelligent management of the functional elements (e.g., heater elements, magnetic elements, optical devices, etc.) of the build volume section (see, e.g., FIGS. 37A-37C).

Figure 37A:
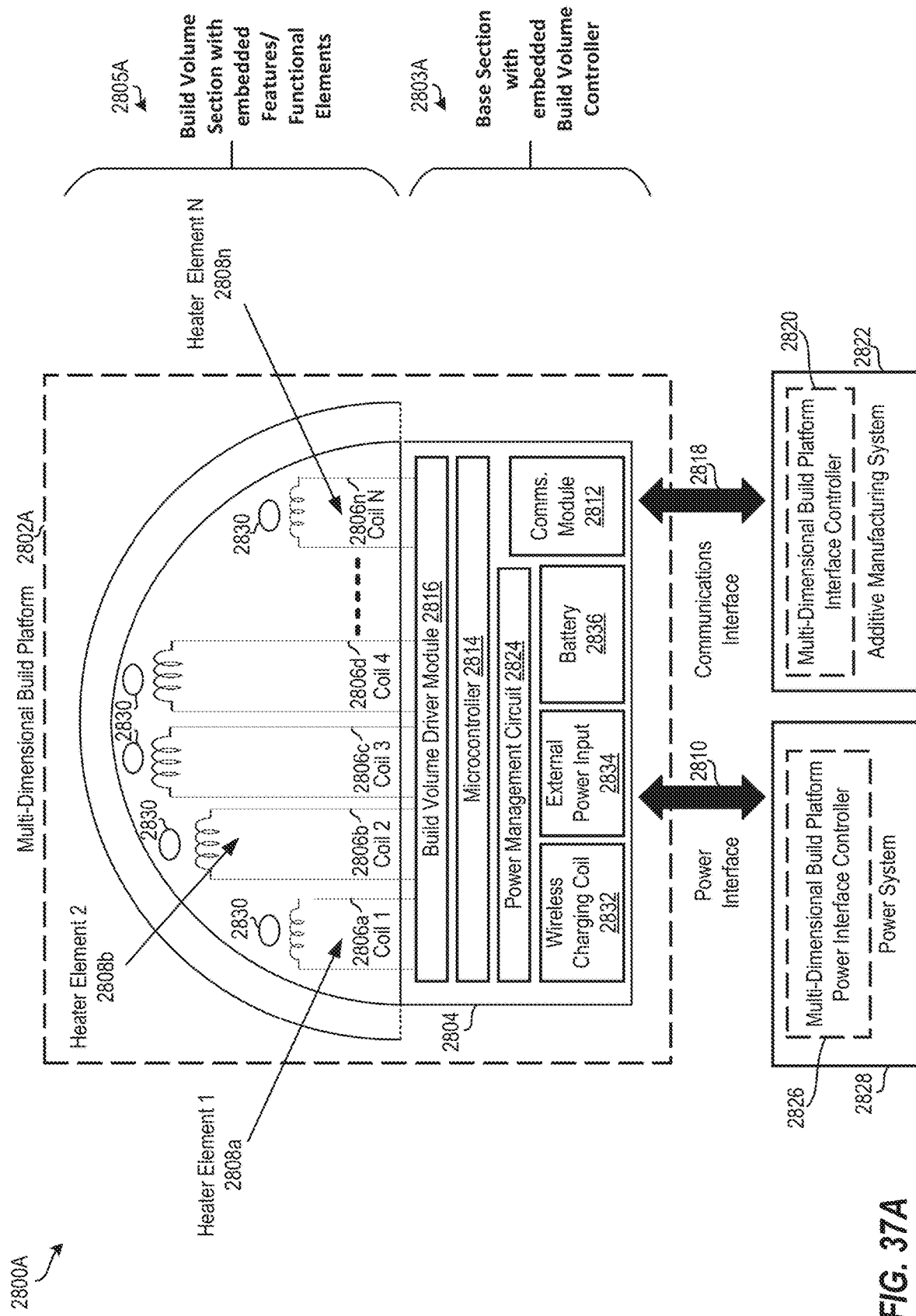
FIG. 37A is a schematic illustration of a system for a multi-dimensional build platform in accordance with an embodiment.
Figure 37B:
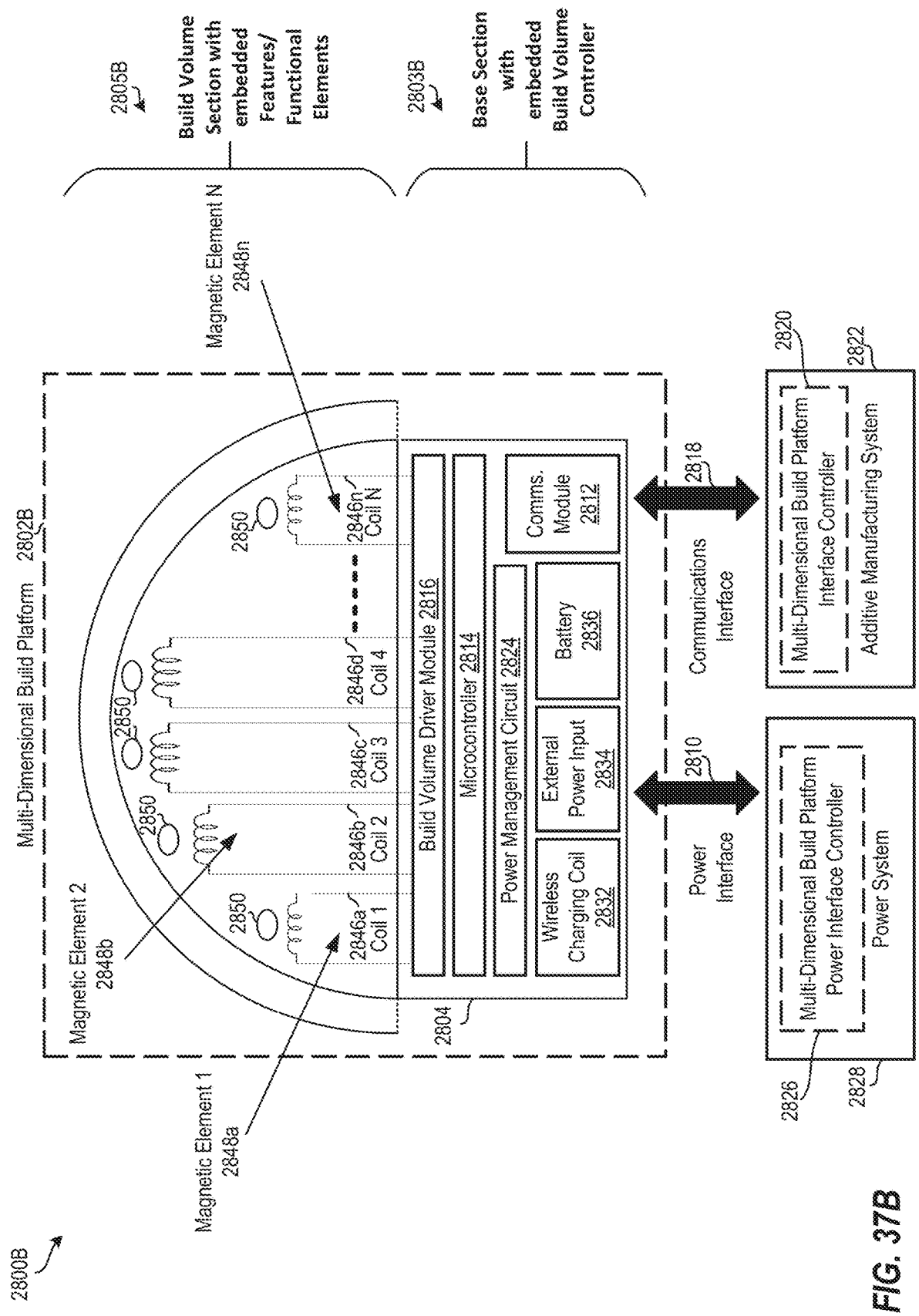
FIG. 37B is a schematic illustration of a system for a multi-dimensional build platform in accordance with an embodiment.
Figure 37C:
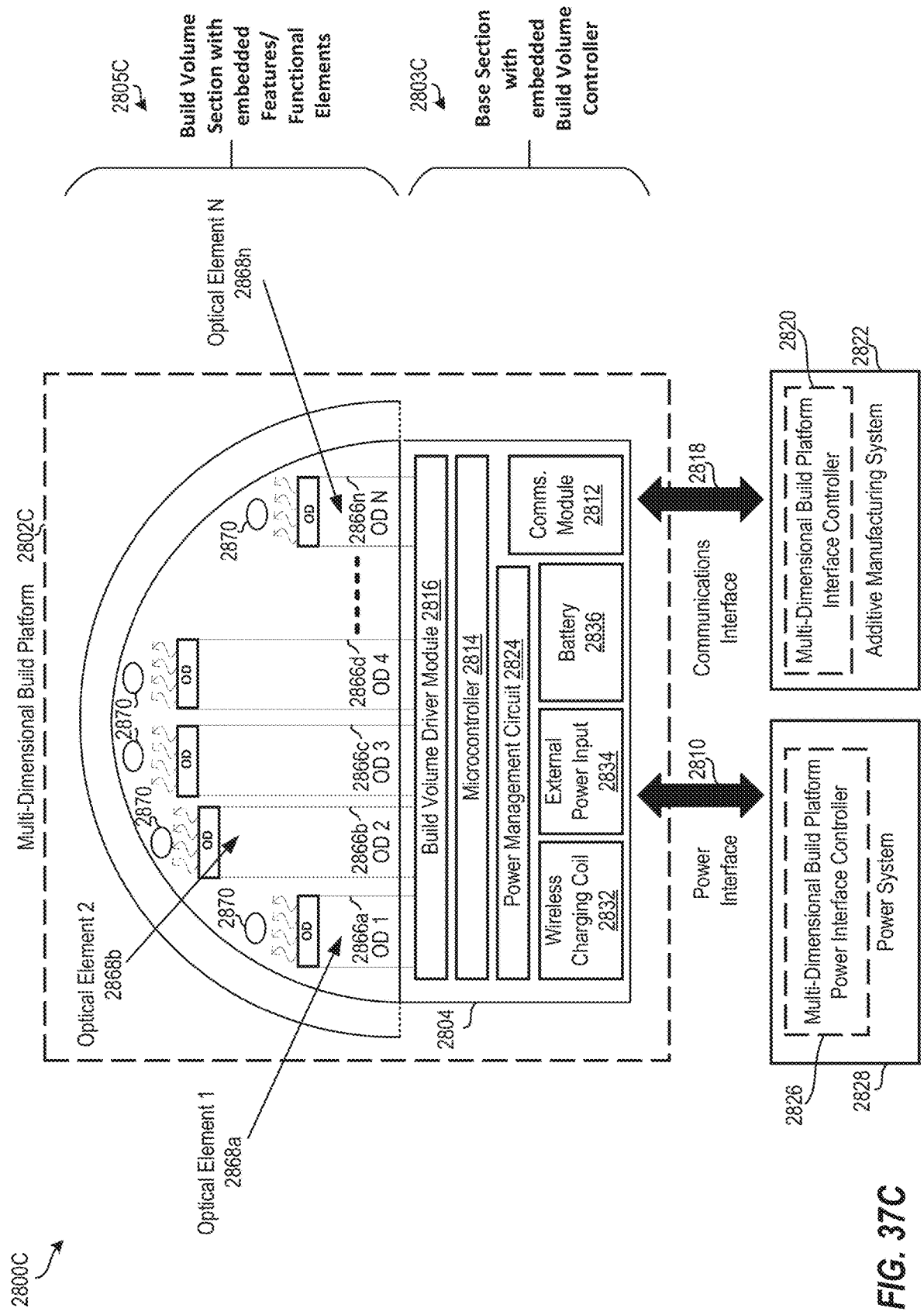
FIG. 37C is a schematic illustration of a system for a multi-dimensional build platform in accordance with an embodiment.

Referring now to FIGS. 37A-37C, systems 2800A, 2800B, and 2800C (which are representative implementation examples of the system 2800 of FIG. 35A) are shown according to one or more embodiments described herein. Each of the systems 2800A, 2800B, 2800C include a multi-dimensional build platform 2802A, 2802B, 2802C (which can be referred to generically as the "multi-dimensional build platform 2802" as shown in FIG. 35A), which in turn each include a base section 2803A, 2803B, 2803C and a build volume section 2805A, 2805B, 2805C. The systems 2800A, 2800B, 2800C can be used to fabricate an object using the respective multi-dimensional build platforms 2802A, 2802B, 2802C. While performing the fabrication, each of the systems 2800A, 2800B, 2800C can control one or more individually addressable functional elements to control characteristics such as temperature, magnetic polarization, optical characteristics, and the like, including combinations thereof. Such control can be fixed, static, and/or dynamic as described herein.

Referring now to FIG. 37A, the multi-dimensional build platform 2802A facilitates heating within the build volume section 2805A in one or more heater elements (e.g., heater element 1 2808a, heater element 2 2808b, . . . heater element N 2808n) using associated heater coils (e.g., coil 1 2806a, coil 2 2806b, coil 3 2806c, coil 4 2806d, coil N 2806n) to implement a desired temperature distribution at the build volume surface layer and/or another desired layer or layers. The heater elements 2808a-2808n are examples of individually addressable elements of a functional layer, such as the functional layer 413 of FIG. 3B, which is described in more detail herein.

Referring now to FIG. 37B, the multi-dimensional build platform 2802B facilitates magnetic polarization within the build volume section 2805B in one or more magnetic elements (e.g., magnetic element 1 2848a, magnetic element 2 2848b, . . . magnetic element N 2848n) using associated magnetic coils (e.g., coil 1 2846a, coil 2 2846b, coil 3 2846c, coil 4 2846d, coil N 2846n) to implement a desired magnetic field distribution at the build volume surface layer and/or another desired layer or layers. The magnetic elements 2848a-2848n are examples of individually addressable elements of a functional layer, such as the functional layer 413 of FIG. 3B, which is described in more detail herein.

Referring now to FIG. 37C, the multi-dimensional build platform 2802C facilitates manipulating optical characteristics within the build volume section 2805C in one or more optical elements (e.g., optical element 1 2868a, optical element 2 2868b, . . . optical element N 2868n) using associated optical devices (e.g., optical device 1 2866a, optical device 2 2866b, optical device 3 2866c, optical device 4 2866d, optical device N 2846n) to implement a desired optical energy distribution at the build volume surface layer and/or another desired layer or layers. The optical elements 2868a-2868n are examples of individually addressable elements of a functional layer, such as the functional layer 413 of FIG. 3B, which is described in more detail herein.

The features and functionality of the systems 2800A, 2800B, and 2800C are now described in more detail with reference to FIGS. 37A, 37B, and 37C respectively.

Particularly, each of the systems 2800A, 2800B, and 2800C include within the respective base sections 2803A, 2803B, 2803C embedded hardware and/or software to provide build volume section control using the build volume controller 2804. For example, the build volume controller 2804 can control one or more of the feature and functional elements of the build volume section 2805A (e.g., temperature, magnetic polarization, optical characteristics, etc.). Such control can be fixed, static, and/or dynamic as described herein.

For example, with reference to FIG. 37A, the heater coils (e.g., coil 1 2806a, coil 2 2806b, coil 3 2806c, coil 4 2806d, coil N 2806n) may be embedded within one or more layers of the build volume section 2805A, whose composition may be metal, ceramic, a high-temperature thermoplastic such as a resin material with a heat deflection temperature above the melting point of the target object material deposition temperature, and the like or a combination of the foregoing. In this embodiment, heat distributions of the build volume section are mapped to the number of heater coils and then optimized to provide a patterning each of heater coil for the given build volume section geometry. The heater coils are then managed (in either of static or dynamic configuration mode) by the microcontroller 2814 and controlled via the build volume driver module 2816 in conjunction with a feature and functional element hardware interface (which in this scenario includes one or more heater coil drive interfaces) to control and activate each heater coil 2806a, 2806b, 2806c, 2806d, 2806n at a desired temperature level, time, and duration to achieve a precise temperature profile or function-of-time for optimal fabrication during additive manufacturing system tool path operation and duration for energy efficiency. In this manner, the build volume controller 2804 facilitates adhesion of materials to the multi-dimensional build platform apparatus or manipulation of the target-object material properties during the additive manufacturing process while also reducing or minimizing power utilization compared to prior art systems.

In an embodiment, the build volume controller 2804 within the base section (e.g., the base section 2803A, the base section 2803C, the base section 2803C) provides control and operational integration with the additive manufacturing system 2822 through a wireless communications medium that provides for command and control of the build volume controller 2804 with no wires, entangling, or restrictive connections being used. Thus, the multi-dimensional build platform and additive manufacturing system have desired freedom of movement. To facilitate this, a power interface 2810 may provide power charging capability wirelessly (e.g., via induction) to the build volume controller 2804 and a communications interface 2818 may provide command and control wirelessly to the build volume controller 2804. However, in other embodiments, including where the additive manufacturing system 2822 has limited axes of movement, limited range of motion, and/or where high levels of power are provided over extended periods of time, the power interface 2810 may be a wired interface. In these embodiments, the communications interface 2818 may provide command and control wirelessly and/or via a wired link. According to an example, a build platform power interface controller 2826 controls a power system 2828, which supplies power to the build volume controller 2804, using wired and/or wireless methods, via the power interface 2810.

With continued reference to FIG. 35A, the system 2800A of FIG. 35A includes the build volume section 2805A and the base section 2803A that implement a processor-based (e.g., microcontroller 2814) build volume controller 2804 that includes multiple components, such as shown. The build volume controller 2804 receives signals, data, commands and control instruction messages, etc. as well as transmits status messages, data, etc., wirelessly (e.g., Wi-Fi, Bluetooth™, etc.) and/or wired through the communications interface 2818 to the additive manufacturing system 2822 via the multi-dimensional build platform interface controller 2820 in the additive manufacturing system 2822. The multi-dimensional build platform interface controller 2820 provides system integration between the build volume controller 2804 and the additive manufacturing system 2822. According to one or more embodiments described herein, the multi-dimensional build platform interface controller 2820 can be integral to the additive manufacturing system 2822, can be separate but associated with the additive manufacturing system 2822, or can otherwise be configured and arranged.

With continuing reference to FIG. 35A, subsystems of the systems 2800A-2800C are now described. In an embodiment, at least two power interfaces are supported: a direct connection interface (external power input 2834) and a wireless charging interface that includes a wireless charging coil 2832 for inductive energy absorption. Both power interfaces interface to the power management circuit 2824, which provides charging current to an integral rechargeable energy cell or battery 2836 and regulates electrical energy for digital and coil any active electronics and components within the build volume section. In some embodiments whereby the additive manufacturing system build attachment supports degrees of freedom consistent with a direct power connection, a direct (i.e., wired) connection may be useful for long running fabrication processes. However, a wireless power solution in conjunction with a desired power utilization control by heater coils is advantageous in embodiments that include additive manufacturing systems with degrees of axis freedom such as rotation.

The build volume controller 2804 can communicate with the multi-dimensional build platform interface controller 2820 over any suitable wired and/or wireless link (e.g., the communications interface 2818), such as Bluetooth™ (BT), 802.11 Wi-Fi, or another suitable communications interface. The communications interface 2818 is bidirectional and enables the additive manufacturing system 2822 to deliver instructions (through the multi-dimensional build platform interface controller 2820) to the build volume controller 2804 to manage features, such as the heater coils (e.g., coil 1 2806*a*, coil 2 2806*b*, coil 3 2806*c*, coil 4 2806*d*, coil N 2806*n*), the magnetic coils (e.g., coil 1 2846*a*, coil 2 2846*b*, coil 3 2846*c*, coil 4 2846*d*, coil N 2846*n*), optical devices (e.g., optical device 1 2866*a*, optical device 2 2866*b*, optical device 3 2866*c*, optical device 4 2866*d*, optical device N 2846*n*), and/or the like, including combinations thereof. It should be appreciated that the build volume controller 2804 may manage any feature or functional characteristic as described herein and the embodiments described herein are not so limited to the disclosed feature or functional characteristics in FIGS. 37A-37C.

The microcontroller 2814 is provided that is responsive to executable computer instructions for activating, deactivating, and/or other wise controlling the features and/or functional elements from instructions computed during dynamic apparatus multi-dimensional build platform synthesis (as described herein) and in accordance with the additive manufacturing system tool path operations associated to a given set of target object fabrication instructions. In an embodiment, software instructions, such as G-code, generate fabrication and activation/deactivation operations that the microcontroller 2814 further processes into feature pattern activation and deactivation operations during the fabrication process. In this manner, minimal energy is expended while still providing for material deposition requirements. The microcontroller 2814 can be any suitable microcontroller, micro-processor, FPGA, digital signal processor, etc. One such example is a SoC or SoM single chip Linux-based computer complete with peripheral functions, input-outputs, communication interfaces, memory, and non-volatile storage. In an embodiment, the operating system and/or application software may be controlled, configured, and/or updated through command-and-control operations transported via the communications interface 2818 providing integration to the additive manufacturing system 2822 through the multi-dimensional build platform interface controller 2820. In an embodiment, operating system and/or application software may also be controlled, configured, and/or updated through command-and-control operations transported via the communications interface 2818 providing integration to a remote system (e.g., smartphone, tablet, computer, cloud system, etc.).

According to one or more embodiments described herein, the microcontroller 2814 supports multiple digital input-outputs which are utilized by the build volume driver module hardware to implement one or more power MOSFET driver circuits, where each driver controls power distribution to a given coil. For example, one or more of the heater coils (e.g., coil 1 2806*a*, coil 2 2806*b*, coil 3 2806*c*, coil 4 2806*d*, coil N 2806*n*) provide joule-based heating across the specified heater pattern specifications of the build volume section 2805A. With reference to FIG. 37A, temperature control and stability is achieved through the software execution of a closed-loop feedback system such as PID model (proportional-integral-derivative) whereby temperature sensors 2830 (e.g., a thermistor) measure respective heater elements (e.g., the heater elements 2808*a*-2808*n*) within the multi-dimensional build platform volume section and the microcontroller 2814 executes the PID control operations as part of modulating the build volume driver module 2816 to maintain a given temperature profile for each heater element. The number of heater coils is determined during multi-dimensional build platform synthesis as described herein. The number of heater elements and their respective pattern or geometry is a function of the given target object geometry and material distribution. As an embodiment of the present disclosure, the number of heater coils is optimized to minimize their number and size, activation time, and duration based on the target object geometry and tool path operations. Reducing or minimizing power requirements of the dynamic apparatus in turn extends the amount of time the heater coils are available during additive manufacturing fabrication time. Similar approaches can be applied to the magnetic coils and/or the optical devices of the systems 2800B, 2800C of FIGS. 2800B, 2800C respectively.

The multi-dimensional build platform interface controller 2820 provides an integration mechanism between the multi-dimensional build platform 2802A and the additive manufacturing system 2822. In some examples, the multi-dimensional build platform interface controller 2820 is based on the same hardware design as the build volume section 2805C, 2805B, 2805C and base section 2803A, 2803B, 2803C without the requirement of features (e.g., heater coils, magnetic coils, optical devices, etc.) or driver electronics. In some embodiments, this configuration is similar as to simplify the systems 2800A, 2800B, 2800C in terms of a common implementation method and secondly to reduce the total cost of the multi-dimensional build platform 2802A, 2802B, 2802C through use of common electronic components.

FIGS. 37B and 37C depict, respectively, system 2800B and system 2800C for multi-dimensional build platforms 2802B, 2802C implemented in accordance with embodiments. In the example of FIG. 37A, the system 2800A provided for generating joule heating across the surface of the build volume section 2805A. The system 2800B of FIG. 37B provides for a multi-dimensional build platform 2802B embodiment where magnetic field(s) may be provided to the surface of the build volume section 2805B. This enables ferrous material to be magnetized during fabrication using the multi-dimensional build platform 2802B.

In this example, the build volume section 2805B includes magnetic coils 2846a, 2846b, 2846c, 2846d, . . . 2846n, which may be associated with magnetic elements (e.g., magnetic element 1 2848a, magnetic element 2 2848b, . . . magnetic element N 2848n). According to one or more embodiments described herein, each magnetic element may include one or more magnetic field sensors, such as a Hall effect sensor, shown as sensors 2850. The sensors 2850 measure magnetic field strength in their respective magnetic elements. Readings from the sensors 2850 can be used to adjust, using the build volume driver module 2816 (e.g., a magnetic coil driver), the magnetic field within one or more of the magnetic elements 2848a, 2848b, 2848n. In one or more embodiments, each magnetic element can include a single sensor 2850, multiple sensors 2850, or no sensor.

The system 2800C of FIG. 37C provides for a multi-dimensional build platform 2802C embodiment where optical energy may be provided to the surface of the build volume section 2805C. This enables the optical properties (e.g., opacity) of a material to be altered during fabrication using the multi-dimensional build platform 2802C.

In this example, the build volume section 2805C includes optical devices (ODs) 2866a, 2866b, 2866c, 2866d, . . . 2866n (e.g., LEDs, lasers, etc.), which may be associated with optical elements (e.g., optical element 1 2868a, optical element 2 2868b, . . . optical element N 2868n). According to one or more embodiments described herein, each optical element may include one or more optical sensors, shown as sensors 2870. The sensors 2870 measure optical energy so it can be known how much photonic power or energy is output from each of the optical devices 2866a-2866n in their respective optical elements. Readings from the sensors 2870 can be used to adjust, using the build volume driver module 2816 (e.g., an optical device driver), the optical characteristics within one or more of the optical elements 2868a, 2868b, 2868n. In one or more embodiments, each optical element can include a single sensor 2870, multiple sensors 2870, or no sensor.

It should be appreciated that the systems 2800B and 2800C operate substantially similarly to the system 2800A of FIG. 37A regarding communication, control, and the like and differ merely with respect to the type of functional elements, properties, characteristics, etc. of the multi-dimensional build platform being dynamically monitored and/or controlled.

Figure 36B:
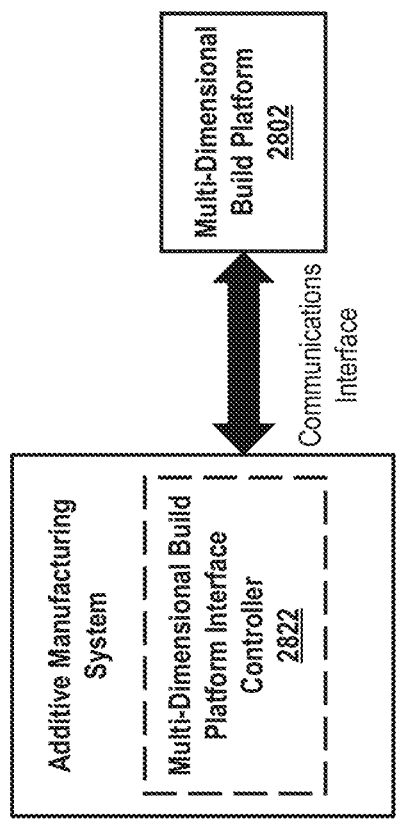
FIGS. 36A-36D are schematic illustrations of implementation scenarios of the integration of the multi-dimensional build platform and additive manufacturing system, where the multi-dimensional build platform interface controller is implemented according to one or more embodiments described herein.
Figure 36D:
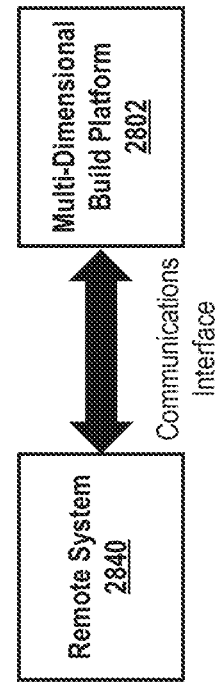
Figure 36A:
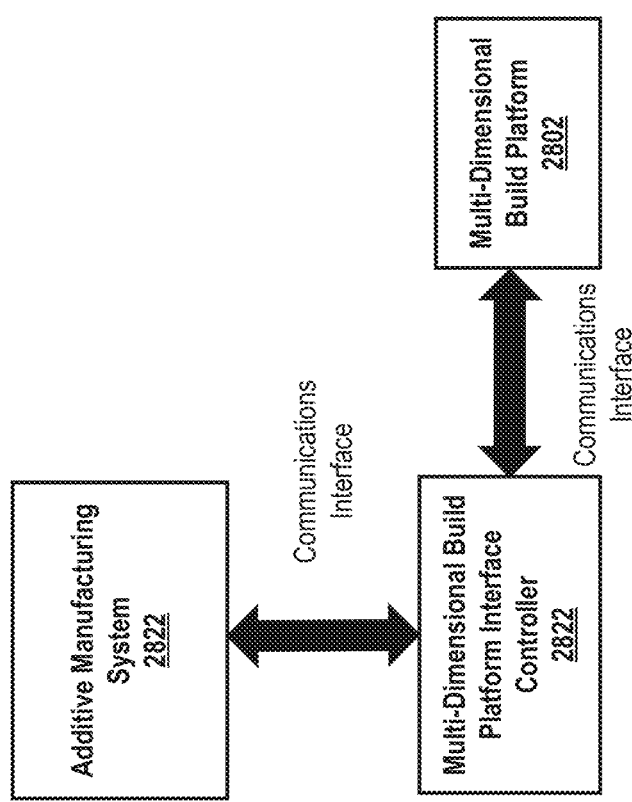

Turning now to FIGS. 36A-36D, example implementations of the multi-dimensional build platform interface controller 2820 of FIGS. 37A-37C are shown. In the example of FIG. 36A, the multi-dimensional build platform interface controller 2822 is separate from the additive manufacturing system 2822 and the multi-dimensional build platform 2802 (e.g., one or more of the multi-dimensional build platforms 2802A, 2802B, 2802C). In this embodiment, the multi-dimensional build platform interface controller 2820 communicates with the additive manufacturing system 2822 and the multi-dimensional build platform 2802 via communications interfaces as shown.

In the example of FIG. 36B, the multi-dimensional build platform interface controller 2822 added into the additive manufacturing system 2822 but separate from the multi-dimensional build platform 2802 (e.g., one or more of the multi-dimensional build platforms 2802A, 2802B, 2802C). In this embodiment, the multi-dimensional build platform interface controller 2820 may be added to the additive manufacturing system 2822, such as using a "daughter board" that connects into and extends the functionality of the additive manufacturing system 2822. In such an example, the multi-dimensional build platform interface controller 2822 communicates with the additive manufacturing system 2822 directly using internal communication channel(s) of the additive manufacturing system 2822. The multi-dimensional build platform interface controller 2822 communicates with the multi-dimensional build platform 2802 via a communications interface as shown.

Figure 36C:
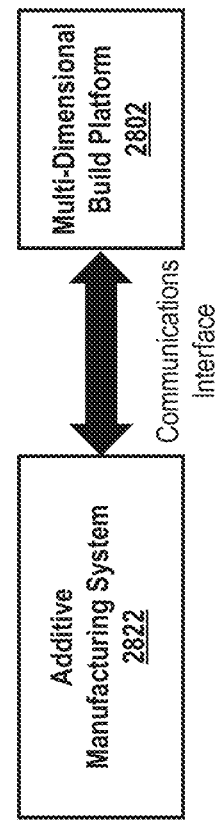

In the example of FIG. 36C, the features and functionality of the multi-dimensional build platform interface controller 2822 are integrated directly into the additive manufacturing system 2822. In this embodiment, the additive manufacturing system 2822 is designed and built with the features and functionality of the multi-dimensional build platform interface controller 2822 integrated therein. In such an example, the additive manufacturing system 2822 communicates with the multi-dimensional build platform 2802 via a communications interface as shown.

In the example of FIG. 36D, the multi-dimensional build platform 2802 is configured for a standalone application scenario as an embodiment, and as such the features and functionality of the multi-dimensional build platform 2802 are controllable from a remote host 2840, which may be computer, mobile phone, tablet, industrial control system, cloud computing environment, and/or the like.

Figure 38:
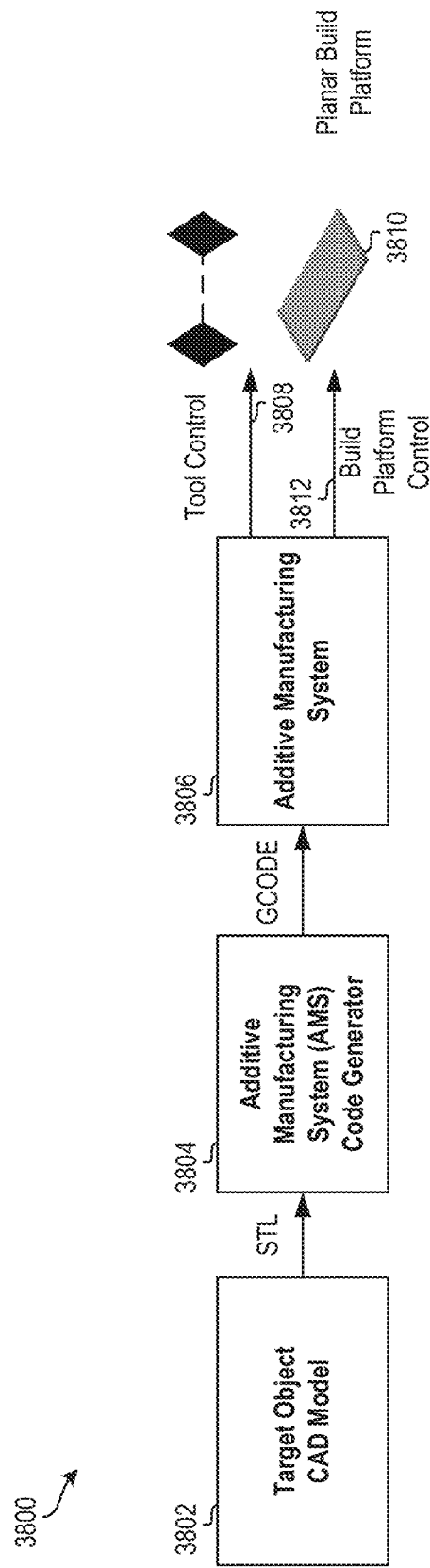
FIG. 38, is a flow diagram of a method for fabricating an object or an assembly using an additive manufacturing system and planar build platform.

FIG. 38 depicts a flow diagram of a method 3800 for fabricating an object or an assembly using a planar build platform 3810 according to one or more embodiments described herein. A target object CAD model 3802 is input into an additive manufacturing system (AMS) code generator 3804 (e.g., a slicer) using a suitable file type that describes the surface geometry of the object or assembly to be fabricated as a 3-dimensional object model. According to one or more embodiments described herein, the AMS code generator 3804 may be part of the CAD software system, the additive manufacturing system 2822, or both. One example of such a file type is an STL file, which is a stereolithography-based or mesh-based file that describes the surface geometry of a 3-dimensional object or assembly. The AMS code generator 3804 receives the STL file from the target object CAD model 3802 and converts the 3-dimensional object model of the STL file into specific instructions for an additive manufacturing system 3806 to use to fabricate the object or assembly. Those instructions are contained in an instruction file, such as a "G-code" file, output by the AMS code generator 3804, and are received by the additive manufacturing system 3806. The additive manufacturing system 3806 uses the instructions in the instruction file from the AMS code generator 3804 to fabricate the object or assembly. That is, the instruction file describes how the additive manufacturing system 3806 should fabricate the object or assembly. In this example, the additive manufacturing system 3806 controls a tool (such as a print head) using tool control 3808 to fabricate the object or assembly on a planar build platform 3810. The additive manufacturing system 3806 controls the planar build platform 3810 using build platform control 3812, which can include manipulating the orientation and position of the planar build platform 3810. According to one or more embodiments, the additive manufacturing system 3806 can control the temperature characteristics of the planar build platform 3810. For example, the instruction file can include instructions that cause the additive manufacturing system 3806 to activate and/or deactivate a planar heater bed (not shown).

Figure 39A:
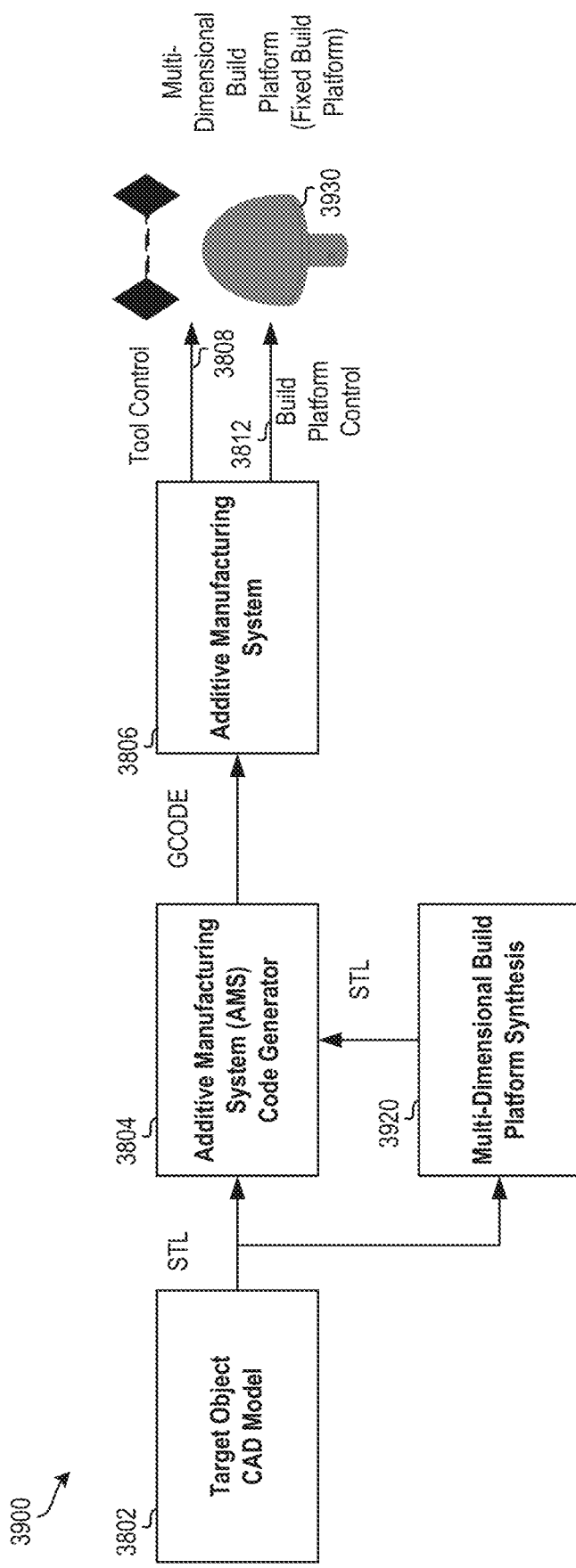
FIGS. 39A, 39B, and 40A, are flow diagrams of methods for fabricating an object or an assembly using a multi-dimensional build platform in accordance with one or more embodiments.
Figure 39B:
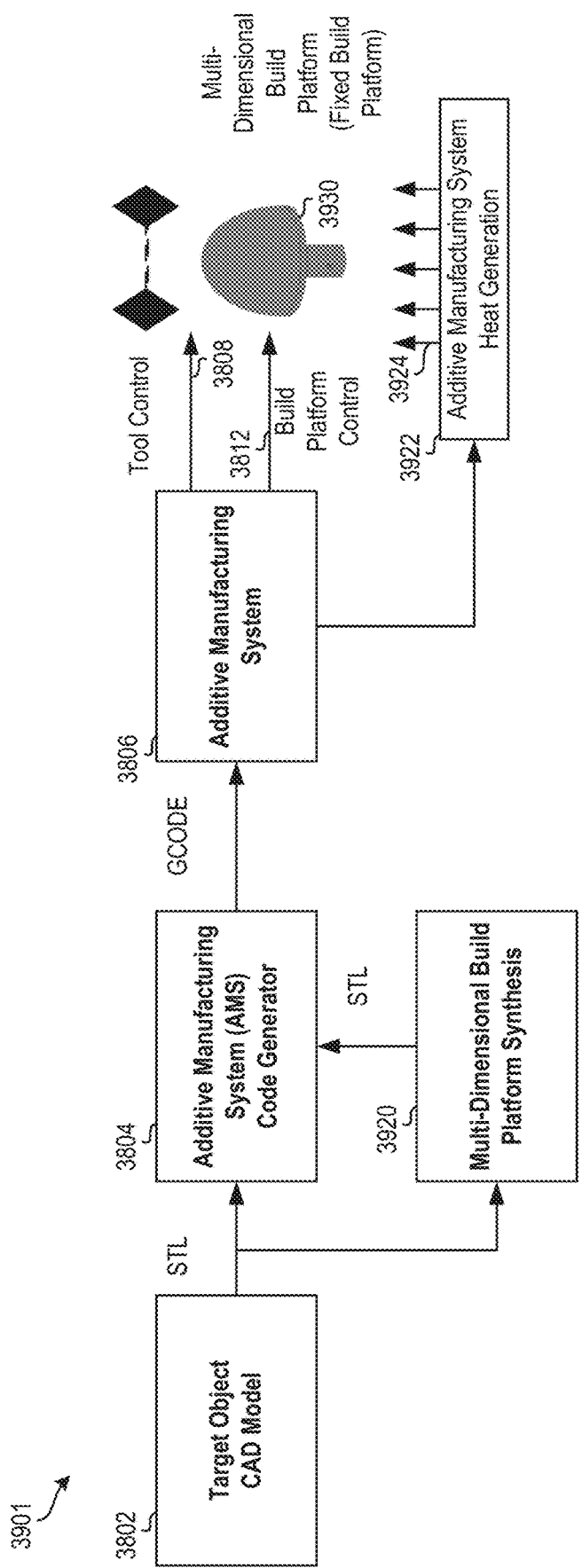

FIG. 39A depicts a flow diagram of a method 3900 for fabricating an object or an assembly according to one or more embodiments described herein. For example, FIG. 39A shows a multi-dimensional build platform 3930 (e.g., a fixed build platform) whereby the instructions from a multi-dimensional build platform synthesis 3920 are provided to the AMS code generator 3804 to incorporate a multi-dimensional build platform geometry into a additive manufacturing system (e.g., the additive manufacturing system 3806) as a build platform system component. In this example, the multi-dimensional build platform 3930 does not provide support for heated surface or volume region functionalities within the multi-dimensional build platform 3930. FIG. 39B shows the multi-dimensional build platform 3930 with support for heated surfaces provided by the additive manufacturing system 3806.

Particularly, FIG. 39B depicts a flow diagram of a method 3901 for fabricating an object or an assembly using a multi-dimensional build platform 3930 (e.g., a fixed build platform) according to one or more embodiments described herein. It should be appreciated the multi-dimensional build platform 3930 could be a planar build platform (e.g., the planar build platform 3810 of FIG. 38) or a non-planar build platform according to one or more of embodiments described herein. The methods 3900 and 3901 of FIGS. 39A and 39B respectively are now described together.

A target object CAD model 3802 is input into the AMS code generator 3804 (which can be a slicer) using a suitable file type that describes the surface geometry of the object or assembly to be fabricated as a 3-dimensional object model, such as an STL file. According to one or more embodiments, the AMS code generator 3804 is a program that can support a slicer whose code output supports the operation of an additive manufacturing system (e.g., the additive manufacturing system 3806) that can operate in multiple degrees of freedom and supports fabrication operations over various surfaces.

It should be appreciated that the tools (e.g., a print head) and/or the build platform (e.g., the multi-dimensional build platform 3930) may have independent freedom or degrees of movement. As one example, a tool can move along the x-axis and/or y-axis while the build platform can move only along the z-axis. As another example, a tool can move along the x-axis and/or y-axis while the build platform can move only along the z-axis and/or rotate. As another example, a tool can move along the x-axis and/or y-axis while the build platform can move along the x-axis, the y-axis, and/or the z-axis and/or rotate. As another example, a tool can move along the x-axis, y-axis, and/or x-axis while the build platform can move along the x-axis, the y-axis, and/or the z-axis and/or rotate. In this example, the tools and build platform have independent degrees of freedom. As another example, other degrees of freedom (e.g., 5 axis, such as X,Y,Z, yaw, pitch, rotation, and roll; 7-axis; etc.) may be available and can be utilized.

It should be appreciated that one or more of the embodiments described herein can be implemented in the AMS code generator 3804 to support fabrication to non-planar build surfaces as is the case with the multi-dimensional build platform within additive manufacturing systems whose tool operations utilize a consistent orientation to the build surface. The STL file is also input into a multi-dimensional build platform synthesis 3920, which synthesizes the object model to determine a multi-dimensional build platform configuration to be used as described herein. In the example of FIG. 39B, a static (i.e., statically heated) multi-dimensional build platform 3930 is used. Once the multi-dimensional build platform synthesis 3920 determines the multi-dimensional build platform configuration to be used, such configuration is provided to the AMS code generator 3804 by the multi-dimensional build platform synthesis 3920 as a STL file (or other suitable file) in order to reference the target object fabrication relative to the multi-dimensional build platform geometry within the additive manufacturing system 3806. Particularly, the AMS code generator 3804 can function as a slicer to slice the target object in relation to the multi-dimensional build platform geometry while taking the geometry into account during the slicing process. Using the STL files received from the target object CAD model 3802 and from the multi-dimensional build platform synthesis 3920, the AMS code generator 3804 converts the target object model into specific instructions for the additive manufacturing system 3806 to use to fabricate the object or assembly. For example, in the context of the multi-dimensional build platform geometry, this can be accomplished by generating a G-code file or another suitable instruction set. The additive manufacturing system 3806 controls a tool (such as a print head) using tool control 3808 to fabricate the object or assembly on the multi-dimensional build platform 3930. The additive manufacturing system 3806 controls the multi-dimensional build platform 3930 using build platform control 3812, which can include manipulating the orientation and position of the multi-dimensional build platform 3930.

According to one or more embodiments described herein, the additive manufacturing system 3806 may also control a heating system (referred to as additive manufacturing system heat generation 3922) to generate directed convection heat 3924 for utilization by the multi-dimensional build platform 3930.

Figure 40A:
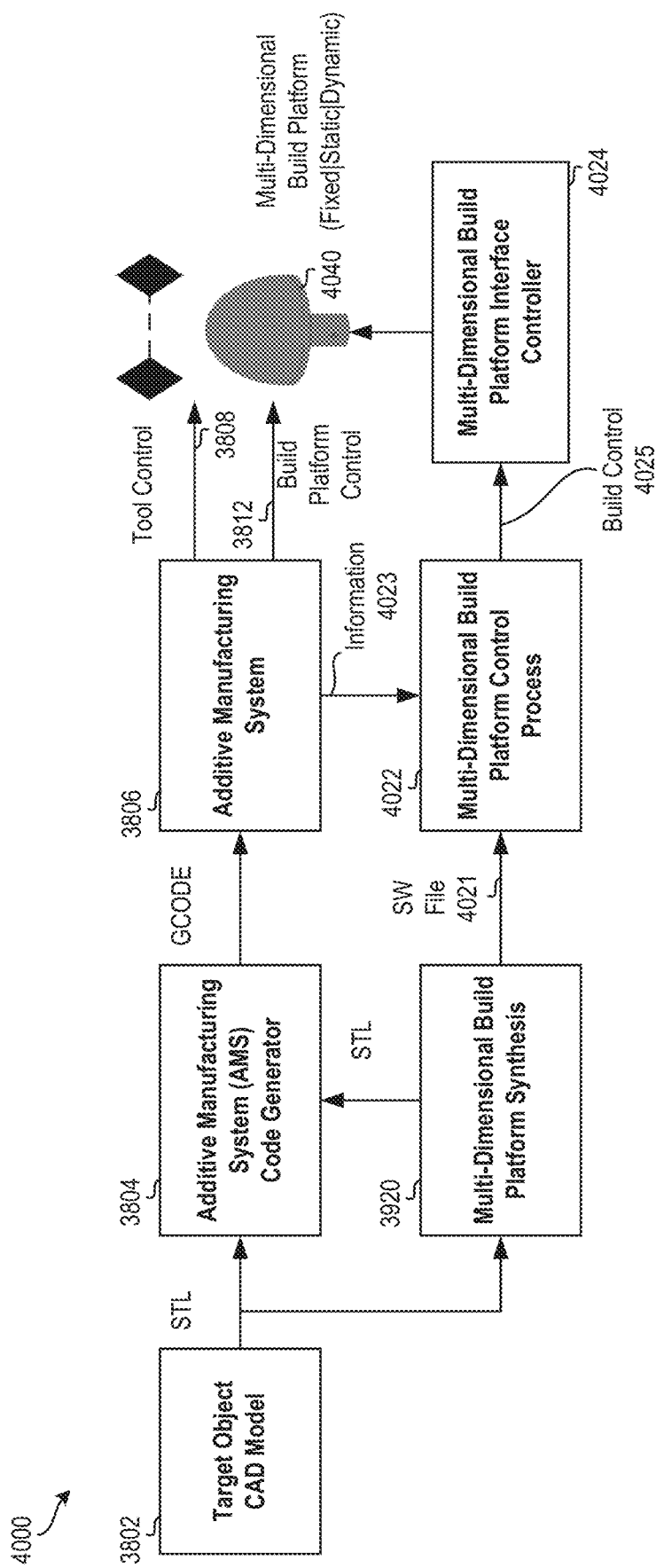
Figure 40B:
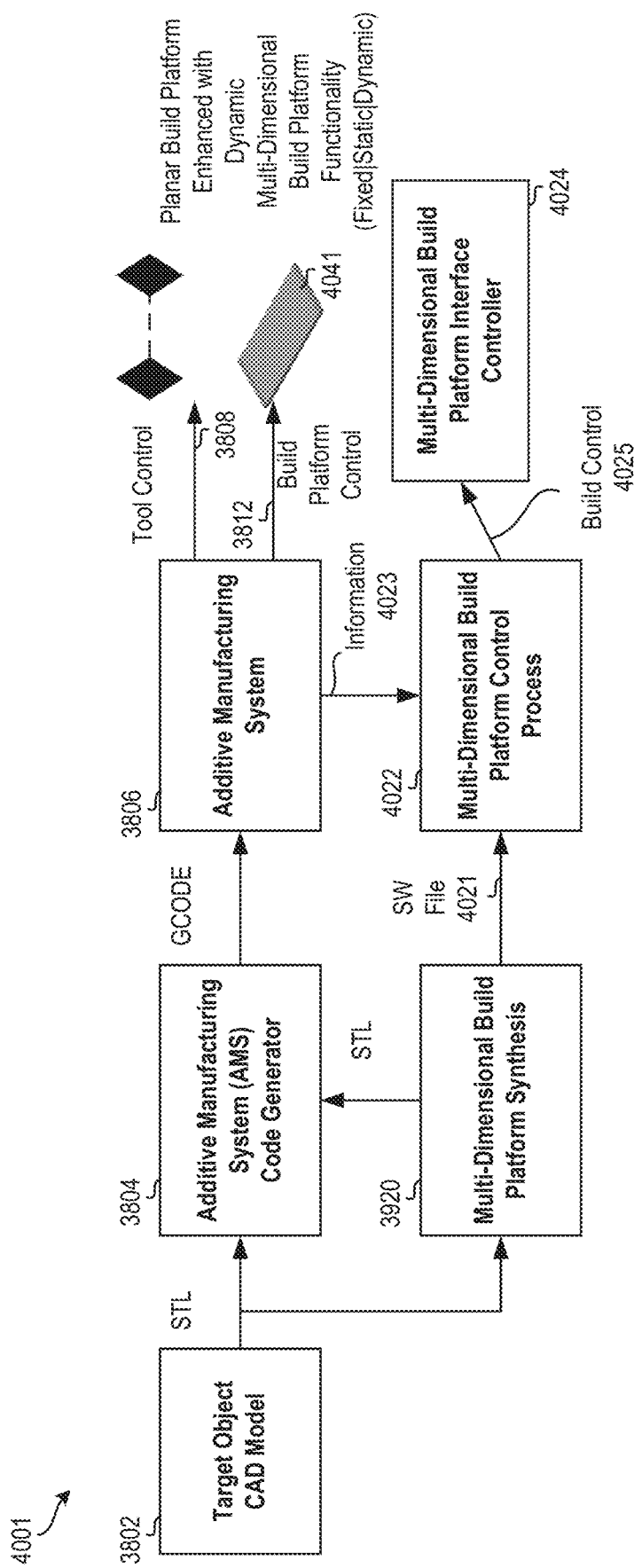

FIG. 40A depicts a flow diagram of a method 4000 for fabricating an object or an assembly using a multi-dimensional build platform 4040 (which can be fixed, static, and/or dynamic) according to one or more embodiments described herein. In this example, a dynamic (i.e., dynamically heated) multi-dimensional build platform 4040 is described. FIG. 40B depicts a flow diagram of a method 4001 for fabricating an object or an assembly using a planar build platform 4041 (which can be fixed, static, and/or dynamic) enhanced according to one or more embodiments described herein. In this example, the planar build platform 4041 is enhanced with dynamic multi-dimensional build platform functionality as described herein. The methods 4000, 4001 are now described together. In FIG. 40B, the method 4001 represents an "upgrade" scenario for conventional build platforms (like the planar case of FIG. 1) to provide the new/expanded capabilities described as described herein. Further, by enhanced or emulated, it is meant that the shape of an existing OEM or printer build plate can be emulated by creating a new build plate having that shape but including the multi-dimensional features and functionality described herein. As another example, an existing OEM build plate can be upgraded to include the multi-dimensional features and functionality described herein. (See, e.g., FIG. 30A, 30B). This enables the one or more embodiments described herein to work with existing 3D printers to enhance existing build plates.

A target object CAD model 3802 is input into the AMS code generator 3804 using a suitable file type that describes the surface geometry of the object or assembly to be fabricated as a 3-dimensional object model, such as an STL file. The STL file is also input into the multi-dimensional build platform synthesis 3920, which synthesizes the object model to determine a multi-dimensional build platform configuration to be used as described herein.

Once the multi-dimensional build platform synthesis 3920 determines the multi-dimensional build platform configuration to be used, such configuration is provided to the AMS code generator 3804 to reference the target object fabrication relative to the multi-dimensional build platform geometry within the additive manufacturing system 3806 and to a multi-dimensional build platform control process 4022 as a software (SW) file 4021 (or other suitable file). For example, the software file 4021 can be a control script, library file, or other suitable software file. Using the STL files received from the target object CAD model 3802 and from the multi-dimensional build platform synthesis 3920, the AMS code generator 3804 converts the multi-dimensional object model configuration of the STL files into specific instructions for the additive manufacturing system 3806 to use to fabricate the object or assembly, such as by generating a G-code file. The additive manufacturing system 3806 controls a tool (such as a print head) using tool control 3808 to fabricate the object or assembly on the multi-dimensional build platform 4040. The additive manufacturing system 3806 controls the multi-dimensional build platform 4040 using build platform control 3812, which can include manipulating the orientation and location of the multi-dimensional build platform 4040.

The multi-dimensional build platform control process 4022 provides for real-time (or near-real-time) monitoring of the additive manufacturing system 3806. This enables synchronization between the multi-dimensional build platform 4040 and the additive manufacturing system 3806. Particularly, according to one or more embodiments, the multi-dimensional build platform control process 4022 monitors (e.g., "snoops") position information, active tools, system, timing and state information (e.g., what the additive manufacturing system 3806 is doing) using the information 4023, which can be G-code control commands for example. Based on the information 4023, the multi-dimensional build platform control process 4022 can determine what operations the multi-dimensional build platform interface controller 4024 executes. Then, the multi-dimensional build platform interface controller 4024 controls the multi-dimensional build platform 4040 based on the build control 4025 generated by the multi-dimensional build platform control process 4022.

As an example, the multi-dimensional build platform control process 4022 also uses the software file 4021 from the multi-dimensional build platform synthesis 3920 and information 4023 from the additive manufacturing system 3806 to control the functional elements, such as heating coils (e.g., one or more of the heater coils 2806a, 2806b, 2806c, 2806d, 2806n of FIG. 37A) via the multi-dimensional build platform interface controller 4024. The multi-dimensional build platform interface controller 4024 can send signals/commands to the multi-dimensional build platform 4040 (such as by a wired and/or wireless communication interface) to control the heating elements associated with the multi-dimensional build platform 4040. For example, the multi-dimensional build platform control process 4022 can cause the multi-dimensional build platform interface controller 4024 to turn on a heating coil, to turn off a heating coil, to increase or decrease a temperate of a heating element, etc. using build control 4025. Other functional elements such as optical devices, magnetic coils, etc. can also be controlled in this manner. It should be appreciated that the multi-dimensional build platform control process 4022 can manage any suitable feature or functional element of the multi-dimensional build platform 4040.

According to one or more embodiments described herein the multi-dimensional build platform control process 4022 receives information 4023 from the additive manufacturing system 3806. The information 4023 could be received using a poll and/or a pull delivery method, whereby the multi-dimensional build platform control process 4022 requests the information 4023 from the additive manufacturing system 3806, and/or the information 4023 could be received using a push delivery method, whereby the additive manufacturing system 3806 pushes, streams, messages, or otherwise makes available the information 4023 to the multi-dimensional build platform control process 4022. The information 4023 can include default or generic commands (e.g., M commands) and/or other language extensions to turn the functional elements (e.g., heater coils, magnetic coils, optical devices, etc.) on or off as well as setting global characteristics (e.g., temperature, polarization, opacity, etc.). The multi-dimensional build platform control process 4022 uses the information 4023 along with geometry information of a current extruder or tool position to signal (via the multi-dimensional build platform interface controller 4024) the multi-dimensional build platform control process 4022 so that it knows which functional elements (e.g., one or more of heater coils 2806a, 2806b, 2806c, 2806d, 2806n) to, inter alia, activate/deactivate, control, synchronize timing, or otherwise when to do so, for how long, and at what temperature in accordance with the required global temperature characteristics and material requirements. In an embodiment, the G-code for the target object is received prior to fabrication of the target object so preheating or energizing the heater coils (e.g., heater coils 2806a, 2806b, 2806c, 2806d, 2806n) can occur so that when a real-time command (e.g., the G-code heater control commands) is received from the additive manufacturing system, a heat path trajectory would already have been calculated.

In some embodiments, the multi-dimensional build platform control process 4022 can use the information 4023 to geometrically reconfigure the multi-dimensional build platform 4040. For example, a surface geometry of the multi-dimensional build platform 4040 can be dynamically reprogrammable/reconfigurable as defined by the information 4023. According to one or more embodiments described herein, the dynamic geometrical reconfiguration of the multi-dimensional build platform 4040 is accomplished by programmatic control of each functional element. Particularly, electronic control, light control, or some other control/actuation can be used for reconfiguration/control of the surface geometry. Other methods for such control/reconfiguration can be implemented in the functional elements to control shape. The G-code (as described herein) or programming of the multi-dimensional build platform interface controller 2820 can be enhanced to add additional support for different control scenarios. For example, in the case of magnetic polarization (see, e.g., FIG. 37B), the direction and/or magnitude of coil electric currents to control magnetization field vectors can be changed in terms of each magnetic coil's electromagnetic field distributions (compression or attractive forces, and opposite tension or repulsion forces) that may operate in conjunction with a ferromagnetic treated multi-dimensional build platform structure residing within the multi-dimensional build volume section whose shape and volume region can change in geometry in accordance with the multi-dimensional build platform control process 4022, multi-dimensional build platform interface controller 4024, and multi-dimensional build platform 4040. Similar programmatic control can be accomplished with respect to each of the embodiments of FIGS. 37A-37C and the like, including variations and/or combinations thereof.

FIG. 41 depicts a block diagram of a system 4100 for performing multi-dimensional build platform synthesis and additive manufacturing (of one or more target objects) according to one or more embodiments described herein. A multi-dimensional build platform synthesis system application 4102, executing on a local host computer for example, performs a synthesis analysis to determine or design a multi-dimensional build platform for additive manufacturing. This is an example of the multi-dimensional build platform synthesis 3920. The multi-dimensional build platform synthesis system application 4102 receives one or more of a target object CAD model 4104, a target object multi-dimensional scan 4106, a target object RGB-D image 4107, and/or a user-generated multi-dimensional build platform CAD model 4108.

The target object CAD model 4104 represents a CAD model of a target object (i.e., an object or assembly to be fabricated). The target object multi-dimensional scan 4106 represents a multi-dimensional (e.g., 2D and/or 3D) scan of the target object or of an article associated with the target object. A scan can be useful when a target object is desired for a unique application. For example, in a case where the target object is a knee brace, a scan of a human's knee intended to use the knee brace can be used. The user-generated multi-dimensional build platform CAD model 4108 represents a CAD model generated by a user to be used to fabricate the target object as a multi-dimensional build platform itself.

The multi-dimensional build platform synthesis system application 4102 communicates with the additive manufacturing system 3806 and the multi-dimensional build platform control process 4022 in the additive manufacturing system domain 4112 to manufacture the target object given a suitable input file specification of the target object. Particularly, the multi-dimensional build platform synthesis system application 4102 can send the G-code configuration file to the additive manufacturing system 3806 software system and/or software code to the multi-dimensional build platform control process 4022 to orchestrate target object fabrication by the additive manufacturing system in conjunction with the multi-dimensional build platform. For example, an STL file is sent to the AMS code generator 3804, which can be part of the additive manufacturing system 3806 software preprocessing. The slicer uses the multi-dimensional build platform geometry information to reconcile the build platform (for example the build platform may no longer be a planer flatbed) to input target object STL to be fabricated.

According to an example, the multi-dimensional build platform synthesis system application 4102 runs on a local host computer (not shown) communicatively coupled to the additive manufacturing system 3806 and a multi-dimensional build platform control process 4022 as shown. The multi-dimensional build platform synthesis system application 4102 can be integrated into or executed by the local host computer, although other implementations are also possible. This example is referred to as the "local deployment" and utilizes the multi-dimensional build platform synthesis system 4150, which is integrated into the multi-dimensional build platform synthesis system application 4102. The features and functionality of the multi-dimensional build platform synthesis system application 4102 described with reference to FIGS. 42A, 42B, and 42C can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the features and functionality of the multi-dimensional build platform synthesis system application 4102 described herein can be a combination of hardware and programming. The programming can be processor executable instructions stored on a tangible memory, and the hardware can include a processing device 4120 for executing those instructions. Thus, a system memory 4122 can store program instructions that when executed by the processing device 4120 implement the features and functionality described herein.

In another example, the multi-dimensional build platform synthesis system application 4102 can be implemented using cloud computing, which is referred to as the "cloud deployment" (e.g., cloud deployment 4113). In the cloud deployment 4113, at least some of the features and functionality of the multi-dimensional build platform synthesis system application 4102 are deployed to one or more cloud computing nodes, which together form the multi-dimensional build platform synthesis system 4152. For example, in one or more embodiments, a cloud computing system (e.g., the multi-dimensional build platform synthesis system 4152) can be in wired or wireless electronic communication with one or more of the elements of the system 4100, such as the multi-dimensional build platform synthesis system application 4102. Cloud computing can supplement, support, and/or replace some or all of the functionality of the elements of the system 4100, including the multi-dimensional build platform synthesis system application 4102. Additionally, some or all of the functionality of the elements of system 4100 can be implemented as a node or nodes of a cloud computing system. A cloud computing node is only one example of a suitable cloud computing node and is not intended to suggest any limitation as to the scope of use or functionality of embodiments described herein.

FIGS. 42A, 42B, and 42C together depict a flow diagram of a method 4200 for fabricating a multi-dimensional build platform according to one or more embodiments described herein. The method 4200 can implement one or more of the components depicted in, inter alia, FIGS. 28, 29, 38, 39, 40, and 41 and/or any other suitable components, systems, etc. as described herein and/or as depicted in the figures.

The multi-dimensional build platform synthesis system application 4102 receives one or more of a target object CAD model 4104, a target object multi-dimensional scan 4106, target object RGB-D image 4107, and/or a user-generated multi-dimensional build platform CAD model 4108 as described herein. These inputs are collectively referred to as the "input data." The input data can take the form of an STL file, object file, mesh file, a point cloud file, B-rep, voxel, etc., each describing the geometry of the target object. The multi-dimensional build platform synthesis system application 4102 uses the received input data to perform multi-dimensional platform selection and synthesis as shown by block 4210, which is now described.

For the target object multi-dimensional scan 4106, the multi-dimensional build platform selection and synthesis at block 4210 performs parametric tagging of the target object to optimize multi-dimensional build platform synthesis at block 4212. For the target object CAD model 4104 and the user-generated multi-dimensional build platform CAD model 4108, the parametric tagging at block 4212 is processed similarly.

Next, an intelligent multi-dimensional build platform model matching engine 4214 determines whether the input data, in conjunction with parametric fabrication data, match an existing multi-dimensional build platform model. This is done, for example, using machine learning to compare the geometry and fabrication parametric data sets to data associated with existing multi-dimensional build platform models stored in a multi-dimensional build platform model database 4215. This enables the multi-dimensional build platform selection and synthesis at block 4210 to determine whether an existing model multi-dimensional build platform can be used as a multi-dimensional build platform for the object or assembly to be fabricated as indicated by the target object input data. It should be appreciated that, in some examples, the input data are tagged or enriched via automated and/or user control within the multi-dimensional build platform synthesis system application 4102. The input data includes geometry data, so parameterization occurs on the input data within a user interface of the multi-dimensional build platform synthesis system application 4102, for example. The techniques described in FIG. 42A et seq. can utilize a neural network to perform categorization of a given shape into a classification that forms a geometry vector 4614, whereas feature and functional metadata forms a fabrication vector 4620. Both of which (vectors 4614 and 4620) are then combined into a multi-dimensional search vector ("search vector") data structure where the search vector is utilized to index or query (see block 4622 of FIG. 46) a database of 3D objects (e.g., the multi-dimensional build platform model database 4215). The one or more embodiments described herein provide for supplementing and extending a geometry vector (e.g., geometry vector 4614 of FIG. 46) with a fabrication/additive manufacturing fabrication vector (e.g., fabrication vector 4620 of FIG. 46) derived from a separate neural network classifier that operates in parallel to the geometry recognition neural network, that in combination, produces a multi-dimensional search vector representing multi-dimensional geometry and fabrication inference or knowledge about the optimal multi-dimensional build platform selection criteria for the given target object manufacturing goal. This enables an integrated or unified query to become enriched, so a given search of the multi-dimensional build platform model database 4215 considers aspects of both geometry and fabrication/additive system parameters as well as feature and functional characteristics as described herein when returning the solution set of viable build platforms.

A given candidate solution is returned by the intelligent multi-dimensional build platform model matching engine 4214 as a triplet of build volume section, base section, and attachment interface section grouped in accordance to a ranked order by similarity and alignment score based on geometries, feature/functional characteristics and fabrication parametric datasets in relation to the target object input dataset.

According to one or more embodiments described herein, the present techniques can incorporate and utilize rule-based decision making and artificial intelligence (AI) reasoning to accomplish the various operations described herein, namely performing multi-dimensional build platform model matching. The phrase "machine learning" broadly describes a function of electronic systems that learn from data. A machine learning system, engine, or module can include a trainable machine learning algorithm that can be trained, such as in an external cloud environment, to learn functional relationships between inputs and outputs that are currently unknown, and the resulting model can be used for performing multi-dimensional build platform model matching. In one or more embodiments, machine learning functionality can be implemented using an artificial neural network (ANN) having the capability to be trained to perform a currently unknown function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANN that are particularly useful at analyzing visual imagery.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was read. In some examples, unsupervised methods of machine learning can be implemented, including iterative learning as in a random sample consensus (RANSAC) technique, clustering, etc. These and other methods for object recognition or comparison can be use in accordance with one or more of the embodiments described herein. Particularly, the present techniques can make use of any development in 3D object recognition and retrieval with no loss of generality relative to the extension method to include fabrication data as part of the model search and retrieval techniques as described herein. It should be appreciated that these same techniques can be applied in the case of multi-dimensional build platform model matching at block 4214.

If no match is detected by the intelligent multi-dimensional build platform model matching engine 4214, or if the matching process yields a solution set as returned by the multi-dimensional build platform model database 4215 is non-optimal as determined by the user, the multi-dimensional build platform synthesis 4216 can use multi-dimensional build platform geometry primitives stored in a multi-dimensional build platform primitive database 4218 to generate a new build volume section geometry model that is further enhanced to include fabrication feature data that can be used as a candidate multi-dimensional build volume section to fabricate the object or assembly specified by the input data. The next step in creating a complete synthesized multi-dimensional build platform within the multi-dimensional build platform synthesis 4216 is to associate the newly synthesized multi-dimensional build volume section with compatible base section and attachment interface section (as stored within the multi-dimensional build platform model database 4215) for the given multi-dimensional build volume section and fabrication parametric data. Then, the multi-dimensional build platform model database 4215 is updated with data from the previous step and to generate new indices so the new multi-dimensional build platform model or set of models are searchable by the intelligent multi-dimensional build platform model matching engine 4214. This process of generating a new multi-dimensional build platform model can be automated, such as by machine learning, or can be manual, such as by a user manually generating the new multi-dimensional build platform model or sub-sections such as the base section or attachment interface section. Once generated, a new multi-dimensional build platform model or sub-sections can be stored to the database 4215. It should further be appreciated that the user-generated multi-dimensional build platform CAD model 4108 can be stored directly in the multi-dimensional build platform model database 4215 and can additional be utilized by the intelligent multi-dimensional build platform model matching engine 4214 for training the machine learning system.

If a match in the form of a feasible solution or set of solutions are detected by the intelligent multi-dimensional build platform model matching engine 4214, or once a new multi-dimensional build platform model is generated at the multi-dimensional build platform synthesis 4216 and incorporated into the multi-dimensional build platform model database 4215 thereafter available within the multi-dimensional build platform solution set, a multi-dimensional build platform solution is selected. The method 4200 proceeds to a multi-dimensional build platform partitioning process 4220 shown in FIG. 42B. That is, the configuration for the determined multi-dimensional build platform is input into the multi-dimensional build platform partitioning process 4220. An example of a partitioning process is described in "Chopper: Partitioning Models into 3D-Printable Parts" to Linjie Luo, et al., which is incorporated by reference herein.

According to an example, and with reference to FIG. 42B, the partitioning process 4220 begins at block 4222, where it is determined whether the multi-dimensional build platform (based on the configuration from the multi-dimensional build platform selection and synthesis at block 4210) will fit within the additive system usable fabrication volume of the additive manufacturing system 3806. That is, a size of the multi-dimensional build platform is compared to a usable fabrication volume of the additive manufacturing system 3806 to determine whether the additive manufacturing system 3806 can accommodate the multi-dimensional build platform in whole or whether the multi-dimensional build platform will need to be partitioned. This determination is based on data about the additive manufacturing system 3806 using additive system profiles 4223, the multi-dimensional build platform, and target object attributes (e.g., technical specifications, dimensions, types of material(s), etc.). If the multi-dimensional build platform will not fit within the additive system usable fabrication volume as determined at block 4222, the multi-dimensional build platform is partitioned at block 4224 until it will fit. It should be appreciated that the multi-dimensional build platform can be partitioned iteratively. Once it is determined that yes, the multi-dimensional build platform will fit within the additive system usable fabrication volume, the multi-dimensional build platform is output. For each multi-dimensional build platform (block 4226), it is determined whether it is a multi-dimensional build platform or a multi-dimensional build platform sub-component at block 4228. The sub-component decision is based on user-selection criteria previously tagged as a fabrication attribute in the parametric tagging and normalization of target object representation to optimize multi-dimensional build platform synthesis at block 4212. A multi-dimensional build platform is the platform upon which the target object or assembly is fabricated and is separated from the finished fabricated object or assembly post fabrication. A multi-dimensional build platform sub-component is the platform upon which the target object or assembly is fabricated and is also part of the finished fabricated object or assembly.

For multi-dimensional build platforms (as determined at block 4228), the method 4200 proceeds to the multi-dimensional build platform generation at block 4230 as shown in FIG. 42C. For multi-dimensional build platform sub-components (as determined at block 4228), the method 4200 proceeds to direct multi-dimensional platform sub-component generation at block 4232 as shown in FIG. 42C.

At blocks 4230, 4232, 4234, 4236, and 4238, the method 4200 is again implemented using the multi-dimensional build platform synthesis at block 4210 and is controlled interactively using the multi-dimensional build platform synthesis system application 4102. At block 4230, build volume section mesh & layer generation and optimization of features/functional elements (e.g., heating, magnetic fields, optical devices, etc.) occurs. According to one or more embodiments described herein, mesh/layer generation and definition of properties occurs at block 4230 (see, e.g., FIGS. 3B-3I). If a mesh/layer is defined, at block 4230 the build volume section and associated features/functional elements are linked to the appropriate mesh/layer element or set of elements and/or layers in the case of a contiguous zone defined in some 3-dimensional space of the build volume section (see, e.g., FIGS. 37A-37C). At block 4232, the base section and attachment interface section generation occurs based on the solution selected by the user in conjunction with the intelligent multi-dimensional build platform model matching engine 4214. At block 4234, multi-dimensional build platform geometry generation occurs, and the configuration is output as build platform STL files to the AMS code generator 3804. Each of blocks 4230, 4232, and 4234, performed in conjunction with the multi-dimensional build platform synthesis system application 4102, can utilize the additive system profiles 4223 about the additive manufacturing system being used and/or target object model and attributes 4225 about the target object or assembly. The target object model and attributes 4225 can be based on, included in, or derived from the input data 4104, 4106, and/or 4108.

At block 4236, the method 4200 includes generating the multi-dimensional build platform features/functions, component (such as sensors, electronic devices including analog and digital electronics, circuits and their interconnections/netlists, etc.) and toolpath information. Corresponding G-code is output to the toolpath process 4242. At block 4238, the multi-dimensional build platform command and control configuration (features/functions) and code configuration occurs and is output as G-code and/or a dynamic native library, and/or other computer language instructions and formats to the multi-dimensional build platform control process 4022. The AMS code generator 3804 (which may be a slicer, for example) causes the additive manufacturing system 3806 to fabricate the target object or assembly using the target object STL files and while considering the multi-dimensional build platform as part of the additive manufacturing system fabrication process. The AMS code generator 3804 also generates the multi-dimensional build platform manufacturing files used to fabricate at block 4244 in conjunction with the toolpath process 4242.

According to one or more embodiments described herein, the combination of the multi-dimensional build platform geometry generation at block 4234, the multi-dimensional build platform feature, functional, component, and toolpath generation at block 4236, the toolpath process 4242, and the fabricate multi-dimensional build platform block 4244 are instructions to build/fabricate the multi-dimensional build platform using instructions from the AMS code generator 3804. The AMS code generator 3804 in combination with the additive manufacturing system 3806 enables the fabrication of the desired multi-dimensional platform (including the build volume, interface, and base sections).

According to one or more embodiments described herein, the combination of the multi-dimensional build platform geometry generation at block 4234 and the multi-dimensional build platform control process 4022 provides code for controlling the functional elements (see, e.g., FIGS. 37A-37C). For example, commands can include turning on a heater, turning on a magnetic functional element, turning on an optical device, and the like, including turning off such functional elements).

Additional processes also may be included, and it should be understood that the process depicted in FIGS. 42A-42C represent an illustration, and that other processes may be added, or existing processes may be removed, modified, or rearranged without departing from the scope of the present disclosure.

FIGS. 43A, 43B, and 44 together depict a flow diagram of a method 4300 for user interaction and operation of the multi-dimensional build platform programmatic synthesis and generation as shown in, inter alia, FIGS. 38, 39A, 39B, 40A, 40B, 41, 42A, 42B, 42C according to one or more embodiments described herein.

At block 4302, a user starts the multi-dimensional build platform synthesis system application 4102. At block 4304, the multi-dimensional build platform synthesis system execution is started either on the local deployment or cloud-based deployment (see, e.g., FIG. 41). At block 4306, the user selects and loads the input target object (e.g., the CAD model 4104 or scan 4106) or inputs a user-generated multi-dimensional build platform CAD model 4108. At block 4307, the user defines a target object 2D/3D mesh. At block 4308, the user defines the target object properties, such as materials properties, functional properties, structural properties, and/or feature/functional-to-target mesh mappings and the target.

For example, the user defines the way in which the target object is to be made, its material characteristics, desired attributes, etc., and what the user is trying to accomplish. That is, the user define a target object mesh with one or more functional elements, and associates target object properties to corresponding mesh elements. The collection of target object properties are used to identify a suitable build volume section (such as in the multi-dimensional build platform model database 4215) or to create the build volume section (such as using synthesis as described herein). As an example, consider a target object as a planar slab made from approximately 50% of a first material on a first half and approximately 50% of a second material on a second half opposite the first half. In such a scenario, it might be that the first material needs a certain amount of heat (e.g., 200 F) applied while the second material needs a different amount of heat (e.g., 300 F) applied. The user defines these parameters at blocks 4307, 4308 as target object properties that are used to identify or create the build platform.

At block 4310, the user selects one or more (1:N) target additive manufacturing systems based on the target object properties from block 4308. That is, the user selects a type/model of additive manufacturing system that is suitable for fabricating the target object. At block 4312, the user defines additive manufacturing system operating parameters and configuration. At block 4314, the user invokes the intelligent multi-dimensional build platform model matching engine 4214 from FIG. 42. At block 4316, using the intelligent multi-dimensional build platform model matching engine 4214, the intelligent multi-dimensional build platform model matching engine 4214 computes a multi-dimensional search vector based on the target object geometries, material properties, feature/functional definitions, static and dynamic features/functional elements versus mesh/layer mappings and properties, and the additive manufacturing system properties that were defined at blocks 4306, 4307, 4308. The multi-dimensional search vector is used to search for existing multi-dimensional build platform models that may be suitable to fabricate the target object based on the properties that were defined at blocks 4306, 4307, 4308. The method 4300 then continues to block 4318, shown on FIG. 43B.

At block 4318, the intelligent multi-dimensional build platform model matching engine 4214 (see FIG. 42A) performs a multi-dimensional build platform heuristic search of the multi-dimensional build platform model database 4215 using the multi-dimensional search vector computed at block 4316. That is, a the multi-dimensional build platform model database 4215 is searched (using the multi-dimensional search vector) to identify candidate models that meet the criteria of the target object, target object properties, etc. as defined at blocks 4306, 4307, 4308.

At block 4320, the intelligent multi-dimensional build platform model matching engine 4214 returns a set of multi-dimensional build platform candidate solutions. A given candidate solution is a triplet of build volume section, base section, and attachment interface section grouped in accordance with a ranked order by similarity and alignment score based on geometries, feature/functional attributes, and fabrication parametric datasets in relation to the target object input dataset. For any given target object input, there can be one or more candidate solutions forming a candidate solution set. At block 4321, it is determined whether the solution set is an empty set or is outside the defined threshold criteria. If "no" at block 4321 (that is, if the solution set is not empty and is not outside defined threshold criteria), the method 4300 proceeds to block 4322.

At block 4322, the user evaluates and selects the multi-dimensional build platform from the set of solution candidate from the multi-dimensional build platform model database 4215. Then, at block 4323, the selected multi-dimensional build platform is implemented to fabricate the object and/or assembly. The method 4300 then proceeds to block 4428 (see FIG. 44) to perform synthesis.

If "yes" at block 4321 (that is, if an empty set or the solution(s) are outside the defined threshold criteria), the method 4300 proceeds to block 4325. At block 4325, it is determined whether the solution(s) fit within the additive system usable fabrication volume. If "no" at block 4325, the method 4300 continues to block 4326 multi-dimensional build platform partitioning is performed as described herein, and the method 4300 returns to block 4318. If "yes" at block 4325, the method 4300 proceeds to block 4428 (see FIG. 44) to perform synthesis.

With reference to FIG. 44, the method 4300 continues by invoking the multi-dimensional build platform synthesis 4216 to update the multi-dimensional build platform model database 4215 with a new build platform model. Specifically, at block 4428, it is determined based on previously tagged fabrication attributes if the multi-dimensional build platform (or partitions 1 . . . N) are for build volume section fabrication or a sub-component of the target object or assembly (see block 4228 of FIG. 42B). For build volume section fabrication, the build volume section functionality is configured at block 4430 and 2D/3D mesh and layer generation is performed. At block 4432, the multi-dimensional build platform synthesis system application 4102 executes build volume section feature/functional generation and optimization. The method 4300 continues at block 4434 for both build volume section fabrication or sub-component fabrication, where the base section and attachment interface section selection and generation occurs. During one or more of the operation of blocks 4430, 4432, 4434, the multi-dimensional build platform model database 4215 is updated at block 4435. At block 4436, the multi-dimensional build platform synthesis system completes generation of the output files (e.g., STL and/or G-code, and/or software files). The object can then be manufactured/fabricated by the additive manufacturing system 3806.

Additional processes also may be included, and it should be understood that the process depicted in FIGS. 43A, 43B, and 44 represent an illustration, and that other processes may be added, or existing processes may be removed, modified, or rearranged without departing from the scope of the present disclosure.

FIG. 45 depicts a flow diagram of a method 4500 for parametric tagging and normalization of target object representation to optimize multi-dimensional build platform synthesis according to FIG. 42A according to one or more embodiments described herein. The method 4500 includes geometry processing 4502 and feature and functional metadata processing 4504, which are described in more detail as follows.

The geometry processing 4502 builds information about the geometry of the target object or a multi-dimensional build platform. To do this, the geometry processing 4502 processes geometry data using a multi-dimensional format conversion processor 4505 to convert various types of input data into various other types of output data that can be used downstream. For example, the multi-dimensional format conversion processor 4505 can convert one or more of the following input data types into different output data types: multi-format MESH and B-Rep data from a multi-format MESH and B-Rep importer 4506, RGB-D data (e.g., 2.5D data from scanners) from a RGB-D importer 4508, and/or point cloud data from a point cloud importer 4510. Examples of data fed into the importers 4506, 4508, 4510 include the target object CAD model 4104, the target object multi-dimensional scan 4106, the target object RGB-D image 4107, and/or the user-generated multi-dimensional build platform CAD model 4108 (see FIG. 42A). Particularly, the multi-dimensional format conversion processor 4505 can convert the input data into one or more of the following output data types: a voxel data set 4512, a point cloud data set 4514, an object dataset 4516, and/or a skeleton dataset 4518.

A configurable multi-view scene generator 4520 can also receive data from the multi-dimensional format conversion processor 4505 and, using that data, can configure a multi-view scene dataset 4522 in the form of images. The configurable multi-view scene generator 4520 uses scenes/poses, for example, to take a camera view, put it in a unit sphere, and take snap shots of the unit sphere from different angles to generate the dataset 4522. In other examples, the configurable multi-view scene generator 4520 uses tetrahedrons or other geometries instead of spheres. The configurable multi-view scene generator 4520 can take planer views in some examples. Each of the various implementations of the configurable multi-view scene generator 4520 uses different views to generate internal datasets, selects what kind of view generation to execute, and then generates the multi-view scene dataset 4522 as images based thereon. In some examples, the configurable multi-view scene generator 4520 uses one or more scene generation techniques to generate the dataset 4522. For example, the configurable multi-view scene generator 4520 can generate a scene (i.e., the multi-view scene dataset 4522) using geometry primitives. The configurable multi-view scene generator 4520 is configurable in that the way in which views/scenes are generated can be configured, such as by selecting different geometry primitives to generate the scenes.

The feature and functional metadata processing 4504 builds information about the fabrication of a target object and/or a multi-dimensional build platform. To do this, feature and functional metadata processing 4504 uses an additive system & target object parametric fabrication vector and 2D/3D mesh/layer generator 4524 to generate fabrication features/functional datasets using the additive system profiles & target object attributes 4209 with selections and data provided by the user. For example, one or more configurable fields is built into the feature and functional metadata processing 4504 while one or more other fields can be based on user input. In some examples, the additive system profiles & target object attributes 4209 are imported so that they can be used for matching against the multi-dimensional build platform model database 4215. In other examples, such as when it is desired to add a new multi-dimensional build platform 4525 to the multi-dimensional build platform model database 4215, the new multi-dimensional build platform 4525 can be imported directly into the additive system & target object parametric fabrication vector and 2D/3D mesh/layer generator 4524. The additive system & target object parametric fabrication vector and 2D/3D mesh/layer generator 4524 generates a vector of features/functional metadata associated with the additive system profiles & target object attributes 4209, and its output is combined with the output of the geometry processing 4502. The additive system & target object parametric fabrication vector and 2D/3D mesh/layer generator 4524 also maps features/functional characteristics to their respective mesh/layer elements, which are addressable, on the build platform, as described herein.

The outputs of the geometry processing 4502 and the feature and functional metadata processing 4504 represent geometry information, feature/functional, and fabrication information respectively about the target object and/or or a multi-dimensional build platform. These outputs are used to generate a target object unified geometry and attribute dataset 4526 for a target object and/or a multi-dimensional build platform unified geometry and feature/functional training/predefined dataset 4528 for a multi-dimensional build platform. Each of datasets 4526, 4528 represent and contain the set of geometrical, properties, attributes, characteristics, and/or behavior associated with the imported target object and/or desired multi-dimensional build platform respectively.

As a result, the dataset 4528 is generated that is unified in nature (in an internal format) that has one dataset one per target object or one dataset per multi-dimensional build platform. These datasets representing either of target object or multi-dimensional build platform geometry models can take the form of voxels, point clouds, skeletons, etc. and can be enhanced in the case of a 3D target object with multiple views of the object as 2D images of the object. The models can be further enhanced with additive manufacturing system profiles and target object attributes (e.g., material type, etc.) that are not captured in the geometry.

FIG. 46 depicts a flow diagram of a method 4600 for determining whether an existing multi-dimensional build platform model exists according to one or more embodiments described herein. To do this, the method 4600 generates a search vector that is used to search the multi-dimensional build platform model database 4215. The search vector is generated based on two datasets: the target object unified geometry and attribute dataset 4526 and the multi-dimensional build platform unified geometry and feature/functional training/predefined dataset 4528. For example, with reference to FIG. 42A, the intelligent multi-dimensional build platform model matching engine 4214 determines whether the input data match (e.g., one or more of the target object CAD model 4104, the target object multi-dimensional scan 4106, the target object RGB-D image 4107) an existing multi-dimensional build platform model stored in the multi-dimensional build platform model database 4215. To do this, the method 4600 performs a multi-dimensional geometry analysis 4602 on the target object unified geometry and attribute dataset 4526 for a target object. In the case of the multi-dimensional build platform unified geometry and feature/functional training/predefined dataset 4528 for a multi-dimensional build platform from FIG. 45, the multi-dimensional geometry analysis 4602 follows a encoder-decoder neural network implementation thereby translating a new multi-dimensional build platform geometry directly to its corresponding geometry classification label 4612 and geometry vector 4614 based on its multi-dimensional build platform unified geometry and feature/functional training/predefined dataset 4528. Particularly, the target object unified geometry and attribute dataset 4526 for a target object and the multi-dimensional build platform unified geometry and feature/functional training/predefined dataset 4528 for a multi-dimensional build platform are input into a multi-view scene processing block 4604, an object processing block 4606, a point cloud processing block 4608, and a skeleton processing block 4610 to construct the multi-dimensional search vector(s) (e.g., the geometry vector 4614 and the fabrication vector 4620, for each of the target object and multi-dimensional build platforms). That is, the intelligent multi-dimensional build platform model matching engine 4214 uses the fabrication vector 4620 associated with the feature characteristics, functional capabilities, and fabrication aspects of the multi-dimensional build platform, which enables consideration of the manufacturability of the multi-dimensional build platform and not merely its geometry.

The multi-dimensional geometry analysis 4602 analyzes the outputs of the multi-view scene processing block 4604, the object processing block 4606, the point cloud processing block 4608, and/or the skeleton processing block 4610 as input into a neural network or multiple neural networks, which use those outputs as inputs and generate a geometry classification label 4612 and the geometry vector 4614. For example, multiple neural network algorithms can be implemented by the multi-dimensional geometry analysis 4602. These multiple neural network algorithms can be based on multiple views or 2D images, voxels, point clouds, etc. depending upon the 3D shape recognition and retrieval algorithm in use. For example, multiple neural network algorithms can be executed, and the resulting results can be ranked and provided as part of a set of solutions. "Large-Scale 3D Shape Retrieval from ShapeNet Core55" to Manolis Savva, et al., is incorporated by reference. "A survey of Content Based 3D shape Retrieval Methods" to Johan W. H. Tangelder and Remco C. Veltkamp is also incorporated by reference herein.

A multi-dimensional object parametric fabrication feature/functional analysis 4618 analyzes the target object unified geometry and attribute dataset 4526 for a target object and the multi-dimensional build platform unified geometry and feature/functional training/predefined dataset 4528 using a neural network (or multiple neural networks). The neural network in the multi-dimensional object parametric fabrication feature/functional analysis 4618 generates a fabrication vector 4620, which enables consideration of functional capabilities, operation, and manufacturability of the multi-dimensional build platform.

In some cases, the unified multi-dimensional build platform query/update engine 4622 operates in an update mode to update a model stored in the multi-dimensional build platform model database 4215. In other cases, the unified multi-dimensional build platform query/update engine 4622 operates in a query mode to generate a multi-dimensional query to retrieve one or more models from the multi-dimensional build platform model database 4215. For example, in such cases, the unified multi-dimensional build platform query/update engine 4622 performs a similarity analysis using the geometry classification label 4612 and the geometry vector 4614. Particularly, the geometry classification label 4612 generated by the multi-dimensional geometry analysis 4602 indicates a class/category using for performing course filtering (as a first step of the similarity analysis) to identify a set of possible candidates. The geometry vector 4614 can the then be used (as a second step of the similarity analysis) to perform a finer filtering to perform a detailed lookup based on geometry characteristics of items stored in the multi-dimensional build platform model database 4215 using, for example, an L2 Euclidean distance measurement or other suitable similarity matching technique (e.g., wavelets, Fourier analysis, probability density, etc.). By using the two-step filtering in the similarity analysis/ query processing, 3D object retrieval processing performance is improved, and processing time is reduced because the geometry classification label 4612 can be used to eliminate a portion of the stored models, meaning that the similarity matching (e.g., L2 Euclidean distance measurement) need not be performed on each of the stored models but only on a subset thereof (as identified by the geometry classification label 4612). To make this even more efficient, the multi-dimensional build platform model database 4215 is indexed, not as a lookup/relational database, but through a combination of classified multi-dimensional build platform models indexed by a geometry classification label-set. Within each category, the use of R-trees implementing a multi-dimensional index/key structure that organizes multi-dimensional spatial datasets can be implemented.

In some examples, the unified multi-dimensional build platform query/update engine 4622 can also use a label classifier to cut down the search space to pre-classify the models. The neural network of the multi-dimensional object parametric fabrication feature/functional analysis 4618 focuses on the features, functional characteristics, and fabrication aspects of the multi-dimensional build platform. This enables the unified multi-dimensional build platform query/update engine 4622 to combine geometry attributes (i.e., the geometry classification label 4612 and the geometry vector 4614) with fabrication attributes (i.e., the features such as material properties, functional characteristics such as active and dynamic components, aggregated into a single fabrication vector 4620) to find candidate set of solutions for a multi-dimensional build platform configuration.

FIG. 47 depicts a flow diagram of a method 4700 for creating a new build volume section and associating a new build volume section dataset with one or more base section and attachment interface section datasets within the multi-dimensional build platform model database 4215 according to one or more embodiments described herein. This can be done, for example, using the multi-dimensional build platform selection and synthesis at block 4210 of FIG. 42A. The multi-dimensional build platform section is made up of geometry specifications and fabrication specifications (features/functional characteristics). It should be appreciated that, according to one or more embodiments described herein, an annotated target object is known, as are its characteristics, what the multi-dimensional build platform needs to be aware of, and properties of the additive manufacturing system. Now, the method 4700 creates the build volume section using target object metadata 4701 from the target object unified geometry and attribute dataset 4526 (also referred to as "target object metadata"). The method 4700 begins with the multi-dimensional build platform synthesis 4216 receiving the target object unified geometry and attribute dataset 4526 (see FIG. 45) and loading that data into a predictive pipeline 4702 and a generative pipeline 4704. The target object metadata describes the geometry specifications and fabrication specifications for the target object.

The predictive pipeline 4702 produces a first rendering 4710 using the target object unified geometry and attribute dataset 4526. To do this, the predictive pipeline 4702 uses neural networks to recognize the shape of an object and generate a constructive solid geometry (CSG) operation tree. For example, the predictive pipeline 4702 uses a shape/primitive analysis pipeline 4706 to recognize the shape of the object using a first neural network(s). Then, predicted CSG tree generation 4708 generates the first rendering 4710 using a second neural network(s) to construct a CSG tree for the object. According to one or more embodiments described herein, the predictive pipeline 4702 induces a CSG tree using a parsing methodology. The predictive pipeline 4702 uses a set of neural networks (blocks 4706, 4708) to predict the CSG tree and render the tree to generate the first rendering 4710. "CSGNet: Neural Shape Parser for Constructive Solid Geometry" to Gopal Sharma, et al., is incorporated by reference.

The generative pipeline 4704 produces a second rendering 4712 using the target object unified geometry and attribute dataset 4526. A shape/primitive analysis 4714 implements a random sample consensus (RANSAC) technique used for computer vision, which is an unsupervised approach. A CSG tree program synthesis 4716 is performed that follows the CSG design model and uses a synthesis method using a CSG tree. An example of CSG tree generation is described in "InverseCSG: Automated Conversion of 3D Models to CSG Trees" to Tao Du, et al., which is incorporated by reference herein. In an example, the CSG tree includes leaves that are primitive shapes and edges that are interactions (e.g., unions). This approach provides a method to analyze a given 3D target/image and construct, through program synthesis, the second rendering 4712. The second rendering 4712 can be post-processed at 4718.

A similarity and scoring analysis 4722 is performed on the renderings 4710, 4712 to compare the renderings 4710, 4712, and score/rank the renderings 4710, 4712. Particularly, the similarity and scoring analysis 4722 compares the first rendering 4710 (from the predictive pipeline 4702) to the second rendering 4710 (from the generative pipeline 4704) to determine how good the predictive rendering (the first rendering 4710) as compared to the generative rendering (the second rendering 4712). The similarity and scoring analysis 4722 can be performed iteratively (e.g., a certain number of times, until a desired similarity has been obtained, etc.). In examples, the similarity and scoring analysis 4722 utilizes an L2 Euclidean distance measurement technique to compare the renderings 4710, 4712. It should be appreciated that L2 Euclidean distance measurement is one approach to measuring similarity, but others exist (e.g., wavelets, Fourier analysis, probability density, etc.) and are within the scope of the embodiments described herein. The similarity and scoring analysis 4722 determines whether the renderings 4710, 4712 are sufficiently similar, such as by comparing their Euclidean distances. For example, several CSG trees are returned and ranked using their Euclidean distances, and the highest ranked CSG tree is passed as geometry data for incorporation into the multi-dimensional build platform unified geometry and feature/functional training/predefined dataset 4528.

In some examples, the predictive pipeline 4702 uses a reinforced learning methodology to update/improve the neural networks of blocks 4706, 4708 to improve the predictive pipeline 4702. For example, at block 4720, an objective function uses reinforced learning to improve the predictive pipeline 4702 as shown using results of the similarity and scoring analysis 4722 and the target object metadata 4701. The objective function at block 4720 can re-train/improve the neural networks (blocks 4706, 4708) of the predictive pipeline 4702 by updating them using reinforced learning (see block 4720). In examples, the objective function at block 4720 has a reward function that is used to adjust weights based on comparing (see block 4722) the two renderings 4710, 4712 and the target object metadata 4701. In some examples, the reinforced learning (at block 4720) is performed iteratively, such as until the Euclidean distances meet a desired threshold.

The target object metadata 4701 also used to perform a multi-dimensional object parametric-based fabrication vector analysis 4730 using a neural network(s). Particularly, the multi-dimensional object parametric-based fabrication vector analysis 4730 generates a vector (i.e., a fabrication vector, such as the fabrication vector 4620) that is unified into a common index with the final geometry data (from block 4724) and the target object metadata 4701 into the multi-dimensional build platform unified geometry and feature/functional training/predefined dataset 4528. From this, an array of elements that include geometry, feature and functional characteristics, fabrication parameters, and other information is used as an index for the multi-dimensional build platform model database 4215.

According to one or more embodiments described herein, the predictive pipeline 4702 and the generative pipeline 4704 can be utilized together along with the similarity and scoring analysis 4722 and the objective function 4720 to implement a third (virtual) pipeline. The third (virtual) pipeline acts in a manner similar to a generative adversarial network (GAN) by using the generative pipeline 4704 to generate candidate solutions and then using the predictive pipeline 4702 (along with the similarity and scoring analysis 4722 and the objective function 4720) to evaluate a given solution instance in order to compute NN updates in 4706 and 4708 that improve the predictive pipeline so that is may in turn generate a new more optimal solution instance. The third (virtual) pipeline creates a corpus of build volume section solutions that are stored in the multi-dimensional build platform model database 4215 in a manner consistent with each individual pipeline 4702 and 4704.

From the foregoing, as shown in FIG. 47, it should be understood that at least three different multi-dimensional build platform synthesis pipelines can be utilized to produce a build volume section solution: the predictive pipeline 4702 (a predicted neural network parser to CSG tree approach), the generative pipeline 4704 (a CSG synthesis as optimization/generative program problem approach), and the third (virtual) pipeline (a competitive or hybrid mixture of the predictive pipeline 4702 and the generative pipeline 4704). In examples, a user can select one or more of the three pipelines to generate a given multi-dimensional build platform.

It should be appreciated that while embodiments herein may refer to a specific target object being fabricated; this is for exemplary purposes and the claims should not be so limited. The system and build platforms described herein may be used fabricate any suitable target object, such as but not limited to: fixtures, components, sub-assemblies and finished products for the transportation, automotive, aerospace, marine, construction, energy, telecommunications, medical, biological, biomaterial, chemical, and internet of things (IoT) applications.

The term "about" is intended to include the degree of error associated with measurement of the particular quantity based upon the equipment available at the time of filing the application. For example, "about" can include a range of ±8% or 5%, or 2% of a given value.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection." It should also be noted that the terms "first", "second", "third", "upper", "lower", and the like may be used herein to modify various elements. These modifiers do not imply a spatial, sequential, or hierarchical order to the modified elements unless specifically stated.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A method comprising:
   receiving data defining a build platform for fabricating a target object using an additive manufacturing system;
   generating a search vector based at least in part on the data defining the build platform;
   determining whether an existing build platform model that satisfies the data defining the build platform is stored in a build platform model database by using the search vector to search the build platform model database for existing build platform model that satisfies the data defining the build platform; and
   generating the build platform based on the data prior to fabricating the target object;
   wherein the search vector is a unified query;
   wherein the build platform comprises:
      an interface section configured to couple with the additive manufacturing system;
      a build volume section having at least one layer of a plurality of individually addressable elements; and
      a base section coupled to the interface section between the interface section and the build volume section;
      wherein the at least one layer has an outermost surface configured to receive a deposited material from the additive manufacturing system, the outermost surface being fabricated prior to the fabrication of the target object.

2. The method of claim 1, further comprising:
   responsive to determining that an existing build platform model that satisfies the data defining the build platform is stored in the build platform model database, implementing the existing model to generate the build platform,
   wherein the build platform is generated based on the existing build platform model.

3. The method of claim 1, further comprising:
responsive to determining that no existing build platform model that satisfies the data defining the build platform is stored in the build platform model database, generating a new build platform model based on the data, wherein the build platform is generated based on the new build platform model.

4. The method of claim 3, further comprising storing the new build platform model in the build platform model database.

5. The method of claim 3, wherein the new build platform is generated by:
performing a first analysis to generate a first rendering using a predictive pipeline;
performing a second analysis to generate a second rendering using a generative pipeline to generate a second rendering; and
scoring the first rendering and the second rendering to generate final geometry data.

6. The method of claim 5, further comprising improving the predictive pipeline using a virtual pipeline, wherein the virtual pipeline implements aspects of the generative pipeline and the predictive pipeline.

7. The method of claim 1, wherein the search vector is further generated based at least in part on a target object unified geometry and attribute dataset and a multi-dimensional build platform unified geometry and feature/functional training/predefined dataset.

8. The method of claim 1, wherein the search vector comprises a geometry vector and a fabrication vector.

9. The method of claim 8, wherein the geometry vector is generated by performing a multi-dimensional geometry analysis, and wherein the fabrication vector is generated by performing a multi-dimensional object parametric fabrication feature/functional analysis.

10. The method of claim 9, wherein at least one of the multi-dimensional geometry analysis or the multi-dimensional object parametric fabrication feature/functional analysis is performed using a neural network.

11. The method of claim 1, wherein the data defining the build platform is one or more of target object computer aided design (CAD) model data, target object scan data, a target object image, or a user generated multi-dimensional build platform CAD model.

12. The method of claim 1, further comprising:
determining whether the build platform fits within a usable fabrication volume of the additive manufacturing system; and
responsive to determining that the build platform does not fit within the usable fabrication volume of the additive manufacturing system, partitioning the build platform.

13. The method of claim 1, further comprising:
performing geometry processing on the data defining the build platform; and
performing feature and functional metadata processing on data about the target object or an additive manufacturing system profile.

14. The method of claim 13, wherein the feature and functional metadata processing is further based on information used to search or implement a new build platform.

15. The method of claim 13, wherein the geometry processing generates a target object unified geometry and attribute dataset.

16. The method of claim 13, wherein the feature and functional metadata processing generates a fabrication portion of a multi-dimensional build platform unified geometry and feature/functional training/predefined dataset.

17. The method of claim 1, further comprising:
manufacturing, using the additive manufacturing system, at least part of the build platform; and
manufacturing, using the additive manufacturing system, the target object using the manufactured build platform.

18. The method of claim 1, wherein the at least one layer of the build volume section includes an outermost layer and a plurality of underlying layers.

19. The method of claim 18, wherein at least one of the plurality of individually addressable elements in each of the plurality of underlying layers of the build volume section includes at least one of a feature characteristic or a functional characteristic.

20. The method of claim 19, wherein at least one of the plurality of individually addressable elements in the plurality of underlying layers of the build volume section includes the functional characteristic.

* * * * *